US012777384B2

(12) United States Patent
Kim et al.

(10) Patent No.: US 12,777,384 B2
(45) Date of Patent: Oct. 27, 2026

(54) DEACTIVATION OF RESOURCE FOR LAYER 1 AND LAYER 2 TRIGGERED MOBILITY

(71) Applicant: Ofinno, LLC, Reston, VA (US)

(72) Inventors: Taehun Kim, Fairfax, VA (US); Jian Xu, McLean, VA (US); Esmael Hejazi Dinan, McLean, VA (US); Hyoungsuk Jeon, Centreville, VA (US); Fasil Abdul Latheef, Dresden (DE); Hua Zhou, Vienna, VA (US); Kyungmin Park, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/345,977

(22) Filed: Sep. 30, 2025

(65) Prior Publication Data

US 2026/0025722 A1 Jan. 22, 2026

Related U.S. Application Data

(63) Continuation of application No. PCT/US2024/023617, filed on Apr. 8, 2024.

(Continued)

(51) Int. Cl.

*H04W 36/04* (2009.01)
*H04B 7/06* (2006.01)

(Continued)

(52) U.S. Cl.

CPC .......... *H04W 36/04* (2013.01); *H04B 7/0626* (2013.01); *H04W 36/0033* (2013.01); *H04W 76/20* (2018.02)

(58) Field of Classification Search

CPC ....... H04W 76/16; H04W 76/34; H04W 8/14; H04W 8/20; H04W 24/02; H04W 24/04;

(Continued)

(56) References Cited

U.S. PATENT DOCUMENTS

2019/0053193 A1* 2/2019 Park .................... H04B 7/0617
2019/0387561 A1 12/2019 Paladugu et al.

(Continued)

FOREIGN PATENT DOCUMENTS

EP 4228341 A1 * 8/2023 ........ H04W 52/0216
EP 4443761 A1 * 10/2024 ........... H04L 5/0023

(Continued)

OTHER PUBLICATIONS

R3-230401; 3GPP TSG-RAN WG3 #119-e; Athens, GR, Feb. 27-Mar. 3, 2023; Agenda Item: 14.2; Source: CATT; Title: Discussion on other issues for L1/L2 mobility; Document for: Discussion.

(Continued)

*Primary Examiner* — Nathan S Taylor

(74) *Attorney, Agent, or Firm* — John F. Sun; Kavon Nasabzadeh; Jacob L. Mangan

(57) ABSTRACT

A base station central unit sends, to a base station distributed unit, a UE context setup or modification request message, for a wireless device, comprising an identifier of a candidate cell for LTM of the wireless device. The base station distributed unit receives a UE context setup or modification response message comprising a configuration of the candidate cell, and sends, to the base station distributed unit, a message comprising a parameter indicating whether to activate or deactivate a channel state information reference signal (CSI-RS) resource of the candidate cell for the LTM of the wireless device.

20 Claims, 45 Drawing Sheets

Related U.S. Application Data

(60) Provisional application No. 63/457,708, filed on Apr. 6, 2023.

(51) Int. Cl.
*H04W 36/00* (2009.01)
*H04W 76/20* (2018.01)

(58) Field of Classification Search
CPC ..... H04W 76/15; H04W 76/25; H04W 8/205; H04W 88/06; H04W 16/32; H04W 72/0457; H04W 76/20; H04W 36/0055; H04W 36/0072; H04W 36/0077; H04W 36/087; H04W 88/085; H04W 36/00; H04W 36/08; H04W 88/08
USPC .......................................................... 455/42
See application file for complete search history.

(56) References Cited

U.S. PATENT DOCUMENTS

| | | | | |
|---|---|---|---|---|
| 2023/0370212 | A1* | 11/2023 | Horn | H04W 28/0215 |
| 2023/0388871 | A1* | 11/2023 | Guo | H04W 36/0069 |
| 2023/0397082 | A1* | 12/2023 | Pan | H04W 36/362 |
| 2024/0056148 | A1* | 2/2024 | Ibrahim | H04B 7/0626 |
| 2024/0114403 | A1* | 4/2024 | Latheef | H04W 36/0061 |
| 2024/0114406 | A1* | 4/2024 | Zhou | H04W 36/0055 |
| 2024/0147321 | A1* | 5/2024 | Zhou | H04W 36/24 |
| 2024/0147328 | A1* | 5/2024 | Kim | H04W 36/30 |
| 2024/0187954 | A1* | 6/2024 | Zhou | H04W 36/0077 |
| 2024/0244666 | A1* | 7/2024 | Wu | H04W 74/0833 |
| 2024/0267820 | A1* | 8/2024 | Zhou | H04W 36/08 |
| 2024/0284277 | A1* | 8/2024 | Jeon | H04W 36/08 |
| 2024/0284284 | A1* | 8/2024 | Jin | H04W 36/087 |
| 2024/0334278 | A1* | 10/2024 | Jin | H04W 36/04 |
| 2024/0334281 | A1* | 10/2024 | Khoshkholgh Dashtaki | H04W 74/0833 |
| 2024/0334538 | A1* | 10/2024 | Zhou | H04W 76/28 |
| 2024/0340966 | A1* | 10/2024 | Cirik | H04W 74/0833 |
| 2025/0071639 | A1* | 2/2025 | Hong | H04W 36/00835 |
| 2025/0071648 | A1* | 2/2025 | Hong | H04W 36/0058 |
| 2025/0088926 | A1* | 3/2025 | Hong | H04W 36/08 |
| 2025/0212114 | A1* | 6/2025 | Sha | H04W 52/0203 |
| 2025/0358696 | A1* | 11/2025 | Zhang | H04W 16/28 |

FOREIGN PATENT DOCUMENTS

| | | | | |
|---|---|---|---|---|
| WO | WO-2024096575 A1 * | 5/2024 | | H04B 17/328 |
| WO | WO-2024096793 A1 * | 5/2024 | | H04W 36/0055 |
| WO | WO-2024154712 A1 * | 7/2024 | | H04L 1/0026 |
| WO | WO-2024155219 A1 * | 7/2024 | | H04W 52/40 |
| WO | WO-2024155221 A1 * | 7/2024 | | H04W 36/0077 |
| WO | WO-2024156415 A1 * | 8/2024 | | H04W 36/362 |
| WO | WO-2024210807 A1 * | 10/2024 | | H04W 36/0055 |

OTHER PUBLICATIONS

R3-230580; 3GPP TSG-RAN WG3 Meeting #119; Athens, GR, Feb. 27-Mar. 3, 2023; Title: (TP for L1L2Mob BLCR for TS 38.401): L1/L2 Mobility; Source: Huawei; Agenda item: 14.2; Document Type: Discussion.
R3-230581; 3GPP TSG-RAN WG3 Meeting #119; Athens, GR, Feb. 27-Mar. 3, 2023; Title: (TP for L1L2Mob BLCR for TS 38.401): BLCR update with latest agreements; Source: Huawei; Agenda item: 14.2; Document Type: Other.
R3-230617; 3GPP TSG-RAN WG3 #119; Athens, Greece, Feb 27-Mar. 3, 2023; Agenda item: 14.2; Source: Samsung; Title: (TP to Mob_enh2 BL CR TS38.401) Discussion on L1/L2 based Inter-cell Mobility; Document for: Discussion & Decision.
R3-230658; 3GPP TSG-RAN WG3 Meeting #119; Athens, Greece, Feb. 27-Mar. 3, 2023; Agenda item: 14.2; Source: CMCC; Title: Discussion on L1/L2 based Inter-Cell Mobility; Document for: Discussion.
R3-230659; 3GPP TSG-RAN WG3 Meeting #119; Athens, Greece, Feb. 27-Mar. 3, 2023; Agenda item: 14.2; Source: CMCC; Title: (TP to TS 38.401) L1/L2 based Inter-Cell Mobility; Document for: Approval.
R3-230660; 3GPP TSG-RAN WG3 Meeting #119; Athens, Greece, Feb. 27-Mar. 3, 2023; Agenda item: 14.2; Source: CMCC; Title: (TP to TS 38.473) L1/L2 based Inter-Cell Mobility; Document for: Approval.
R3-230670; 3GPP TSG-RAN WG3 #119; Feb. 27-Mar. 3, 2023; Athens, Greece; Agenda item: 14.2; Source: LG Electronics Inc.; Title: Discussion on inter-gNB-DU LTM related impacts; Document for: Discussion.
R3-230671; 3GPP TSG-RAN WG3 #119; Feb. 27-Mar. 3, 2023; Athens, Greece; Agenda item: 14.2; Source: LG Electronics Inc.; Title: (TP for NR_Mob_enh2 BL CR for TS 38.401) Discussion on inter-gNB-DU LTM related impacts; Document for: Other.
R3-230672; 3GPP TSG-RAN WG3 #119; Feb. 27-Mar. 3, 2023; Athens, Greece; Agenda item: 14.2; Source: LG Electronics Inc.; Title: (TP for NR_Mob_enh2 BL CR for TS 38.473) Discussion on inter-gNB-DU LTM related impacts; Document for: Other.
R3-230693; 3GPP TSG-RAN WG3 #119; Athens, Feb. 27-Mar. 3, 2023; Agenda Item: 14.2. Signaling Support for L1/L2 based Inter-Cell Mobility; Source: NTT Docomo Inc.; Title: Further discussion on LTM; Document for: Discussion, agreement.
R3-230710; 3GPP TSG-RAN WG3 Meeting #119; Athens, Greece, Feb. 27-Mar. 3, 2023; Agenda item: 14.2; Source: Intel Corporation; Title: Discussions on general principles still missing but important for LTM (including TP for TS 38.401); Document for: Other.
R3-230711; 3GPP TSG-RAN WG3 Meeting #119; Athens, Greece, Feb. 27-Mar. 3, 2023; Agenda item: 14.2; Source: Intel Corporation; Title: Considerations on parallel vs single (including TPs for TS 38.473); Document for: Other.
R3-230717; 3GPP TSG-RAN WG3 #119; Athens, Greece, Feb. 27-Mar. 3, 2023; Title: Discussion on L1/L2 triggered mobility; Source: ZTE; Agenda item: 14.2; Document for: Discussion and Approval.
R3-230718; 3GPP TSG-RAN WG3 #119; Athens, Greece, Feb. 27-Mar. 3, 2023; Online; Title: TP for LTM BL CR to TS 37.483; Source: ZTE; Agenda item: 14.2; Document for: Discussion and Approval.
R3-230750; 3GPP TSG-RAN WG3 Meeting #119; Athens, Greece, Feb. 27-Mar. 3, 2023; Title: gNB-DU initiated target cell re-configuration for L1/L2 triggered mobility; Source: Rakuten Symphony Inc.; Agenda item: 14.2; Document Type: Discussion and Approval.
R3-230889; 3GPP TSG-RAN WG3 Meeting #119; Athens, Greece, Feb. 27-Mar. 3, 2023; Title: LS on Approaches during execution for inter-DU LTM; Response to:; Release: Rel-18; Work Item: NR_mob_enh2-Core; Source: RAN3; To: RAN2; Cc: RAN1.
R3-230890; 3GPP TSG-RAN WG3 Meeting #119; Athens, GR, Feb. 27-Mar. 3, 2023; Agenda Item: 14.2; Source: Huawei (moderator); Title: Summary of Offline Discussion on CB: # 22_L1L2mobility; Document for: Approval.
R3-230932; 3GPP TSG-RAN WG3 #119; Athens, Greece, Feb. 27-Mar. 3, 2023; Title: (TP for L1L2Mob BLCR for TS 38.401) BLCR update with latest agreements for intra-DU LTM; Source: ZTE, Nokia, Nokia Shanghai Bell; Agenda item: 14.2; Document for: Discussion and Approval.
R3-230968; 3GPP TSG-RAN WG3 Meeting #119; Athens, GR, Feb. 27-Mar. 3, 2023; Title: (TP for L1L2Mob BLCR for TS 38.401): BLCR update with latest agreements for inter-DU LTM; Source: Huawei; Agenda item: 14.2; Document Type: Other.
R3-231026; 3GPP TSG-RAN WG3 Meeting #119; Athens, GR, Feb. 27-Mar. 3, 2023; Title: (TP for L1L2Mob BLCR for TS 38.401): BLCR update with latest agreements for inter-DU LTM; Source: Huawei, Ericsson, Nokia, Nokia Shanghai Bell, ZTE, CMCC, Qualcomm Incorporated; Agenda item: 14.2; Document Type: Other.
R3-231027; 3GPP TSG-RAN WG3 #119; Athens, Greece, Feb. 27-Mar. 3, 2023; Title: (TP for L1L2Mob BLCR for TS 38.401) BLCR update with latest agreements for intra-DU LTM; Source:

(56) References Cited

OTHER PUBLICATIONS

ZTE, Nokia, Nokia Shanghai Bell, Huawei, Ericsson, CMCC, Qualcomm Incorporated; Agenda item: 14.2; Document for: Discussion and Approval.
International Search Report and Written Opinion of the International Searching Authority mailed Aug. 1, 2024, in International Application No. PCT/US2024/023617.
3GPP TS 38.300 V17.3.0 (Dec. 2022); Technical Specification; 3rd Generation Partnership Project; Technical Specification Group Radio Access Network; Nr; Nr and NG-RAN Overall Description; Stage 2; (Release 17), Dec. 2022.
3GPP TS 38.331 V17.3.0 (Dec. 2022); Technical Specification; 3rd Generation Partnership Project; Technical Specification Group Radio Access Network; NR; Radio Resource Control (RRC) protocol specification; (Release 17), Dec. 2022.
3GPP TS 38.473 V17.3.0 (Dec. 2022); Technical Specification; 3rd Generation Partnership Project; Technical Specification Group Radio Access Network; NG-RAN; F1 application protocol (F1AP); (Release 17), Dec. 2022.
R2-2300092; 3GPP TSG-RAN WG2 Meeting #121; Athens, Greece, Feb. 27-Mar. 3, 2023; Source: CATT; Title: Discussion on Applicable Scenarios and Procedure; Agenda Item: 8.4.2.1; Document for: Discussion and Decision.
R2-2300220; 3GPP TSG-RAN2#121; Athens, Greece, Feb.-Mar. 2023; Agenda item: 8.4.2.1; Source: Lenovo; Title: LTM stage-2 design models; Document for: Discussion and Decision.
R2-2300221; 3GPP TSG-RAN2#121; Athens, Greece, Feb.-Mar. 2023; Agenda item: 8.4.2.3; Source: Lenovo; Title: Details of Early TA work; Document for: Discussion and Decision.
R2-2300246; 3GPP TSG-RAN WG2 Meeting #121; Athens, Greece, Feb. 27-Mar. 3, 2023; Agenda Item: 8.4.2.3; Source: NEC; Title: L1 Measurement Report for Cell Switch; Document for: Discussion, Decision.
R2-2300314; 3GPP TSG-RAN WG2 Meeting #121; Athens, Greece, Feb. 27-Mar. 3, 2023; Source: vivo; Title: Discussion on scenarios and aspects with other WGs; Agenda Item: 8.4.2.1; Document for: Discussion and Decision.
R2-2300372; 3GPP TSG-RAN WG2 Meeting #121; Athens, Greece, Feb. 27-Mar. 3, 2023; Agenda Item: 8.4.2.1; Source: MediaTek Inc.; Title: LTM Procedure and Support of Inter-DU LTM; Document for: Discussion and decision.
R2-2300380; 3GPP TSG-RAN WG2 Meeting #121; Athens, Feb. 2023; Agenda Item: 8.4.2.1; Source: OPPO; Title: Discussion on general procedure for LTM; Document for: Discussion and Decision.
R2-2300400; 3GPP TSG-RAN WG2 Meeting #121; Athens, Greece, Feb. 27-Mar. 3, 2023; Agenda item: 8.4.2.1; Source: Intel Corporation; Title: Procedure descriptions of LTM; Document for: Discussion and Decision.
R2-2300408; 3GPP TSG-RAN WG2 Meeting #121; Athens, Greece, Feb. 27-Mar. 3, 2023; Agenda item: 8.4.2.1; Source: Intel Corporation; Title: Discussion on the early TA acquisition; Document for: Discussion and Decision.
R2-2300473; 3GPP TSG-RAN WG2 Meeting #121; Athens, Greece, Feb. 27-Mar. 3, 2023; Agenda item: 8.4.2.1; Source: Nokia, Nokia Shanghai Bell; Title: On Early TA Acquisition in LTM; WID/SID: NR_Mob_enh2-Core—Release 18; Document for: Discussion and Decision.
R2-2300568; 3GPP TSG-RAN WG2 Meeting #121; Athens, Greece, Feb. 27-Mar. 3, 2023; Agenda item: 8.4.2.2; Source: Qualcomm Incorporated; Title: Configuring measurements and reporting of LTM cell; Document for: Discussion.
R2-2300575; 3GPP TSG RAN WG2 #121; Athens, Greece, Feb. 27-Mar. 3, 2023; Agenda Item: 8.4.2.1; Source: InterDigital, Inc.; Title: LTM Overall Procedure.; Document for: Discussion.
R2-2300576; 3GPP TSG RAN WG2 #121; Athens, Greece, Feb. 27-Mar. 3, 2023; Agenda Item: 8.4.2.2; Source: InterDigital, Inc.; Title: LTM Measurement considerations.; Document for: Discussion.
R2-2300767; 3GPP TSG RAN WG2#121; Athens, Greece, Feb. 27-Mar. 3, 2023; Agenda item: 8.4.2.3; Source: Apple Inc; Title: MAC TA RAN2 aspects for LTM; Document for: Discussion and Decision; Work Item Code: NR_Mob_enh2-Core.
R2-2301113; 3GPP TSG-RAN WG2 Meeting #121; Athens, Greece, Feb. 27-Mar. 3, 2023; Source: Xiaomi; Title: Remaining issues of MT SDT procedure; Agenda Item: 8.4.2.1; Document for: Discussion and Decision.
R2-2301150; 3GPP TSG-RAN WG2 Meeting #121; Athens, Greece, Feb. 27-Mar. 3, 2023; Agenda item: 8.4.2.3; Source: Huawei, HiSilicon; Title: RACH-less cell switch in LTM; Document for: Discussion and Decision.
R2-2301196; 3GPP TSG-RAN WG2 #121; Athens, Greece, Feb. 27-Mar. 3, 2023; Agenda Item: 8.4.2.1; Source: Ericsson; Title: Discussion on procedures for LTM; Document for: Discussion, Decision.
R2-2301258; 3GPP TSG-RAN WG2 Meeting #121; Athens, Greece, Feb. 27-Mar. 3, 2023; Agenda item: 8.4.2.1; Source: CMCC; Title: Considerations on general aspects of LTM; Document for: Discussion, Decision.
R2-2301259; 3GPP TSG-RAN WG2 Meeting #121; Athens, Greece, Feb. 27-Mar. 3, 2023; Agenda item: 8.4.2.1; Source: CMCC; Title: Considerations on failure handling; Document for: Discussion, Decision.
R2-2301260; 3GPP TSG-RAN WG2 Meeting #121; Athens, Greece, Feb. 27-Mar. 3, 2023; Agenda item: 8.4.2.2; Source: CMCC; Title: Considerations on measurement configuration; Document for: Discussion, Decision.
R2-2301325; 3GPP TSG-RAN WG2 Meeting #121; Athens, Greece, Feb. 27-Mar. 3, 2023; Agenda item: 8.4.2.1 (General and Stage-2); Source: Samsung; Title: Discussion on potential enhancement before LTM cell switch; Document for: Discussion & Decision.
R2-2301358; 3GPP TSG-RAN WG2 Meeting #121; Athens, Greece, Feb. 27-Mar. 3, 2023; Agenda Item: 8.4.2.1; Source: Huawei, HiSilicon; Title: LTM procedure descriptions and stage 2 aspects; Document for: Discussion.
R2-2301549; 3GPP TSG RAN WG2#121; Athens, Greece, Feb. 27-Mar. 3, 2023; (resubmission of R2-2211708); Agenda item: 8.4.2.1; Source: Apple Inc; Title: Conditional handover in L2/L1 mobility; Document for: Discussion and Decision; Work Item Code: NR_Mob_enh2-Core.
R2-2301593; 3GPP TSG-RAN WG2 Meeting #121; Athens, Greece, Feb. 27-Mar. 3, 2023; Agenda Item: 8.4.2.3; Source: Transsion Holdings; Title: Discussion on measurement enhancement of L1L2 triggered mobility; Document for: Discussion and Decision.
R2-2301817; 3GPP TSG-RAN WG2 #121; Athens, Greece, Feb. 27-Mar. 3, 2023; Source: NTT Docomo, Inc.; Title: Discussion on L1 measurement configuration for LTM; Document for: Discussion and decision.
R2-2301846; 3GPP TSG-RAN WG2 #121; Athens, Greece, Feb. 27-Mar. 3, 2023; Source: NTT Docomo, Inc.; Title: Discussion on Early sync phase of LTM; Document for: Discussion and decision.
R2-2301859; 3GPP TSG-RAN WG2 Meeting #R2-121; Athens, Feb. 27-Mar. 3, 2023; Agenda Item: 8.4.2.1; Source: Rakuten Symphony Inc.; Title: Discussion on RACH-less Handover for L1/L2 Triggered Mobility; Document for: Discussion and agreement.
R2-2301860; 3GPP TSG-RAN WG2 Meeting #R2-121; Athens, Feb. 27-Mar. 3, 2023; Agenda Item: 8.4.2.1; Source: Rakuten Symphony Inc.; Title: Performance Enhancements for L1/L2 Triggered Mobility; Document for: Discussion and agreement.
R2-2301874; 3GPP TSG-RAN WG2 Meeting #R2-121; Athens, Feb. 27-Mar. 3, 2023; Agenda Item: 8.4.2.1; Source: Rakuten Symphony Inc.; Title: Delayed Resource Reservation for inter gNB-DU L1/L2 Triggered Mobility; Document for: Discussion and decision.
R2-2301888; 3GPP TSG RAN WG2 #121; Athens, Greece, Feb. 27-Mar. 3, 2023; Agenda Item: 8.4.2.1; Source: InterDigital, Inc.; Title: LTM Overall Procedure.; Document for: Discussion.
R3-230011; 3GPP TSG-RAN3 Meeting #119; Athens, Greece, Feb. 27-Mar. 3, 2023; R1-2212948; 3GPP TSG RAN WG1 #111; Toulouse, France, Nov. 14-18, 2022; Title: LS on RAN1 agreements for

(56) References Cited

OTHER PUBLICATIONS

L1/L2-based inter-cell mobility; Response to:; Release: Rel-18; Work Item: NR_mob_enh2-Core; Source: RAN1; To: RAN2, RAN3, RAN4.

R3-230012; 3GPP TSG-RAN3 Meeting #119; Athens, Greece, Feb. 27-Mar. 3, 2023; R2-2212988; 3GPP TSG-RAN WG2 Meeting #120; Toulouse, France, Nov. 14-18, 2022; Title: Reply LS on L1 measurement and configurations for LTM; Response to: R2-2211154/ R1-2210727 LS on L1 intra- and inter- frequency measurement and configurations for L1/L2-based inter-cell mobility; Release: Rel-18; Work Item: NR_mob_enh2-Core; Source: RAN2; To: RAN1, RAN3; Cc: RAN4.

R3-230067; 3GPP TSG-RAN WG3 Meeting #119; Athens, Greece, Feb. 27-Mar. 3, 2023; Change Request; 38.473; CR 1037; rev 3; Current version: 17.3.0.

R3-230073; 3GPP TSG-RAN WG3 Meeting #119; Athens, GR, Feb. 27-Mar. 3, 2023; Change Request; 38.401; CR 0260; rev 6; Current version: 17.2.0.

R3-230084; 3GPP TSG-RAN WG3#119; Athens Greece, Feb. 27-Mar. 3, 2023; Agenda item: 14.2 Signaling Support for L1/L2 based Inter-Cell Mobility; Source: Nokia, Nokia Shanghai Bell; Title: TP (BL CR TS 38.401) L1/2 Triggered Mobility (LTM) Procedures; Document for: Discussion and Decision.

R3-230085; 3GPP TSG-RAN WG3#119; Athens Greece, Feb. 27-Mar. 3, 2023; Agenda item: 14.2 Signaling Support for L1/L2 based Inter-Cell Mobility; Source: Nokia, Nokia Shanghai Bell; Title: Discussion on Additional Considerations for L1/2 Triggered Mobility (LTM); Document for: Discussion and Decision.

R3-230107; 3GPP TSG-RAN WG3 Meeting #119; Athens, Greece, Feb. 27-Mar. 3, 2023; Agenda item: 14.2; Source: Qualcomm Incorporated; Title: Signalling Support for LTM; WID/SID: NR_Mob_enh2-Core—Release 18; Document for: Discussion and decision.

R3-230158; 3GPP TSG-RAN WG3 Meeting #119; Athens, Greece, Feb. 27-Mar. 3, 2023; Source: vivo; Title: Collision between L1/L2-triggered mobility and L3 mobility; Agenda Item: 14.2; Document for: Discussion and Decision.

R3-230159; 3GPP TSG-RAN WG3 Meeting #119; Athens, Greece, Feb. 27-Mar. 3, 2023; Source: vivo; Title: Discussion on L1/L2-triggered Mobility; Agenda Item: 14.2; Document for: Discussion and Decision.

R3-230162; 3GPP TSG RAN WG3#119; Feb. 27-Mar. 3, 2023; Athens, Greece; Title: Discussion on remaining issue for LTM procedures; Source: China Telecom; Agenda item: 14.2; Document for: Discussion and decision.

R3-230163; 3GPP TSG RAN WG3#119; Feb. 27-Mar. 3, 2023; Athens, Greece; Title: (TP for NR_Mob_enh2 BL CR for TS 38.473) On support of LTM procedure; Source: China Telecom; Agenda item: 14.2; Document for: Others.

R3-230203; 3GPP TSG-RAN WG3 Meeting #119; Feb. 27-Mar. 3, 2023; Athens, Greece; Agenda Item:14.2; Source: Ericsson; Title: (TP for LTM BL CR to TS 38.401) Solutions for L1/L2 triggered mobility; Document for: Discussion, Decision.

R3-230204; 3GPP TSG-RAN WG3 Meeting #119; Feb. 27-Mar. 3, 2023; Athens, Greece; Agenda Item: 14.2; Source: Ericsson; Title: (TP for LTM BL CR to TS 38.473) F1AP impacts for LTM; Document for: Approval.

R3-230270; 3GPP TSG-RAN WG3 #119; Athens, Greece, Feb. 27-Mar. 3, 2023; Agenda Item: 14.2; Source: NEC; Title: (TP to TS 38.401 on LTM) Support for L1/L2 based inter-cell mobility; Document for: decision.

R3-230342; 3GPP TSG-RAN WG3 Meeting #119; Athens, Greece, Feb. 27-Mar. 3, 2023; Title: Discussion on L1/L2 based inter-cell mobility; Source: Lenovo; Agenda item: 14.2; Document Type: Discussion and Approval.

R3-230343; 3GPP TSG-RAN WG3 Meeting #119; Athens, Greece, Feb. 27-Mar. 3, 2023; Title: (TP to TS 38.401 & TS 38.470) Support of L1/L2 based inter-cell mobility; Source: Lenovo; Agenda item: 14.2; Document Type: Other.

R3-230400; 3GPP TSG-RAN WG3 #119-e; Athens, GR, Feb. 27-Mar. 3, 2023; Agenda Item: 14.2; Source: CATT; Title: Discussion on the remained FFSs for L1/L2 mobility; Document for: Discussion.

* cited by examiner

```
RRCReconfiguration-IEs ::=          SEQUENCE {
  radioBearerConfig               RadioBearerConfig
  secondaryCellGroup               OCTET STRING (CONTAINING CellGroupConfig)
  measConfig                      MeasConfig
  nonCriticalExtension             RRCReconfiguration-v1530-IEs
}
RRCReconfiguration-v1530-IEs ::=        SEQUENCE {
  masterCellGroup           OCTET STRING (CONTAINING CellGroupConfig)
  fullConfig                ENUMERATED {true}       OPTIONAL, -- Cond FullConfig
  ...}
CellGroupConfig ::=                  SEQUENCE {
  cellGroupId                       CellGroupId,
  rlc-BearerToAddModList       SEQUENCE (SIZE(1..maxLC-ID)) OF RLC-BearerConfig
  mac-CellGroupConfig          MAC-CellGroupConfig
  physicalCellGroupConfig      PhysicalCellGroupConfig
  spCellConfig                 SpCellConfig
  sCellToAddModList            SEQUENCE (SIZE (1..maxNrofSCells)) OF SCellConfig
...,}

SpCellConfig ::=                SEQUENCE {
  servCellIndex               ServCellIndex
  reconfigurationWithSync          ReconfigurationWithSync
  spCellConfigDedicated           ServingCellConfig
  ...,}
ServingCellConfig ::=           SEQUENCE {
  initialDownlinkBWP              BWP-DownlinkDedicated
  downlinkBWP-ToAddModList  SEQUENCE (SIZE (1..maxNrofBWPs)) OF BWP-Downlink
  firstActiveDownlinkBWP-Id         BWP-Id
  defaultDownlinkBWP-Id            BWP-Id
  uplinkConfig                 UplinkConfig
  ...}

UplinkConfig ::=              SEQUENCE {
  initialUplinkBWP              BWP-UplinkDedicated
  uplinkBWP-ToAddModList   SEQUENCE (SIZE (1..maxNrofBWPs)) OF BWP-Uplink
  firstActiveUplinkBWP-Id         BWP-Id
  carrierSwitching              SetupRelease { SRS-CarrierSwitching }
  ...,}

ReconfigurationWithSync ::=        SEQUENCE {
  spCellConfigCommon               ServingCellConfigCommon
  newUE-Identity                RNTI-Value,
  t304                       ENUMERATED {ms50, ms100, ms150, ...},
  rach-ConfigDedicated             CHOICE {
    uplink                    RACH-ConfigDedicated,
    supplementaryUplink             RACH-ConfigDedicated
  }...,}
```

FIG. 21

```
RACH-ConfigDedicated ::=      SEQUENCE {
   cfra                     CFRA
   ra-Prioritization            RA-Prioritization
...}

CFRA ::=                SEQUENCE {
   occasions                SEQUENCE {
      rach-ConfigGeneric        RACH-ConfigGeneric,
      ssb-perRACH-Occasion  ENUMERATED {oneEighth, oneFourth, oneHalf, one, two, ...}
      }
   resources                CHOICE {
      ssb                   SEQUENCE {
         ssb-ResourceList   SEQUENCE (SIZE(1..maxRA-SSB-Resources)) OF CFRA-SSB-
Resource,
         ra-ssb-OccasionMaskIndex      INTEGER (0..15)
      },
      csirs                 SEQUENCE {
         csirs-ResourceList           SEQUENCE (SIZE(1..maxRA-CSIRS-Resources)) OF
CFRA-CSIRS-Resource,
         rsrp-ThresholdCSI-RS         RSRP-Range
      }
   },
   ...,}

CFRA-SSB-Resource ::=         SEQUENCE {
   ssb                      SSB-Index,
   ra-PreambleIndex             INTEGER (0..63),
   ...,}

CFRA-CSIRS-Resource ::=       SEQUENCE {
   csi-RS                     CSI-RS-Index,
   ra-OccasionList              SEQUENCE (SIZE(1..maxRA-OccasionsPerCSIRS)) OF
INTEGER (0..maxRA-Occasions-1),
   ra-PreambleIndex             INTEGER (0..63),
   ...}


RACH-ConfigGeneric ::=          SEQUENCE {
   prach-ConfigurationIndex        INTEGER (0..255),
   msg1-FDM                     ENUMERATED {one, two, four, eight},
   msg1-FrequencyStart            INTEGER (0..maxNrofPhysicalResourceBlocks-1),
   zeroCorrelationZoneConfig        INTEGER(0..15),
   preambleReceivedTargetPower       INTEGER (-202..-60),
   preambleTransMax              ENUMERATED {n3, n4, n5, n6, n7, n8, n10, ...},
   powerRampingStep              ENUMERATED {dB0, dB2, dB4, dB6},
   ra-ResponseWindow              ENUMERATED {sl1, sl2, sl4, sl8, sl10, sl20, sl40, sl80},
   ...,}
```

FIG. 22

```
RRCReconfiguration-v1610-IEs ::=      SEQUENCE {
   otherConfig-v1610                   OtherConfig-v1610
   bap-Config-r16                      SetupRelease { BAP-Config-r16 }
   iab-IP-AddressConfigurationList-r16   IAB-IP-AddressConfigurationList-r16
   conditionalReconfiguration-r16        ConditionalReconfiguration-r16
   daps-SourceRelease-r16                ENUMERATED{true}
   t316-r16                            SetupRelease {T316-r16}
   ...
   targetCellSMTC-SCG-r16                SSB-MTC
   }

ConditionalReconfiguration-r16 ::=   SEQUENCE {
   attemptCondReconfig-r16             ENUMERATED {true}
condReconfigToRemoveList-r16           CondReconfigToRemoveList-r16
condReconfigToAddModList-r16           CondReconfigToAddModList-r16
 ...
}

CondReconfigToAddModList-r16 ::= SEQUENCE (SIZE (1.. maxNrofCondCells-r16)) OF
CondReconfigToAddMod-r16

CondReconfigToAddMod-r16 ::=    SEQUENCE {
   condReconfigId-r16              CondReconfigId-r16,
   condExecutionCond-r16              SEQUENCE (SIZE (1..2)) OF MeasId
   condRRCReconfig-r16               OCTET STRING (CONTAINING RRCReconfiguration)
   ...,
}

CondReconfigId-r16 ::=           INTEGER (1.. maxNrofCondCells-r16)
```

*condExecutionCond*

The execution condition that needs to be fulfilled in order to trigger the execution of a conditional reconfiguration for CHO, CPA, intra-SN CPC without MN involvement or MN initiated inter-SN CPC. When configuring 2 triggering events (Meas Ids) for a candidate cell, network ensures that both refer to the same *measObject*. For CHO, if network configures *condEventD1* or *condEventT1* for a candidate cell network configures a second triggering event *condEventA3, condEventA4* or *condEventA5* for the same candidate cell. Network does not configure both *condEventD1* and *condEventT1* for the same candidate cell.

CondEvent A3: Conditional reconfiguration candidate becomes amount of offset better than PCell/PSCell;
CondEvent A4: Conditional reconfiguration candidate becomes better than absolute threshold;
CondEvent A5: PCell/PSCell becomes worse than absolute threshold1 AND Conditional reconfiguration candidate becomes better than another absolute threshold2;

FIG. 24

[examples of message indicating whether to deactivate or activate resource (or candidate target cell or cell group)]

[examples of message indicating whether to deactivate or activate candidate target cell (or cell group or resource)]

DEACTIVATION OF RESOURCE FOR LAYER 1 AND LAYER 2 TRIGGERED MOBILITY

CROSS-REFERENCE TO RELATED APPLICATIONS

This application is a continuation of International Application No. PCT/US2024/023617, filed Apr. 8, 2024, which claims the benefit of U.S. Provisional Application No. 63/457,708, filed Apr. 6, 2023, all of which are hereby incorporated by reference in their entireties.

BRIEF DESCRIPTION OF THE DRAWINGS

Examples of several of the various embodiments of the present disclosure are described herein with reference to the drawings.

FIG. 21 illustrates an example of RRC message for handover (HO).

FIG. 22 illustrates an example of RRC messages for RACH resource configuration for HO procedure.

FIG. 24 illustrates an example of RRC message for CHO.

DETAILED DESCRIPTION

Figure 1A:
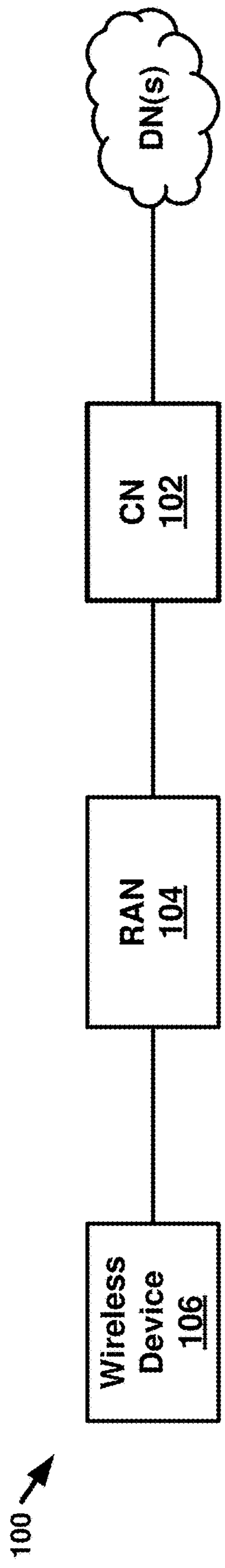
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g., hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNS (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
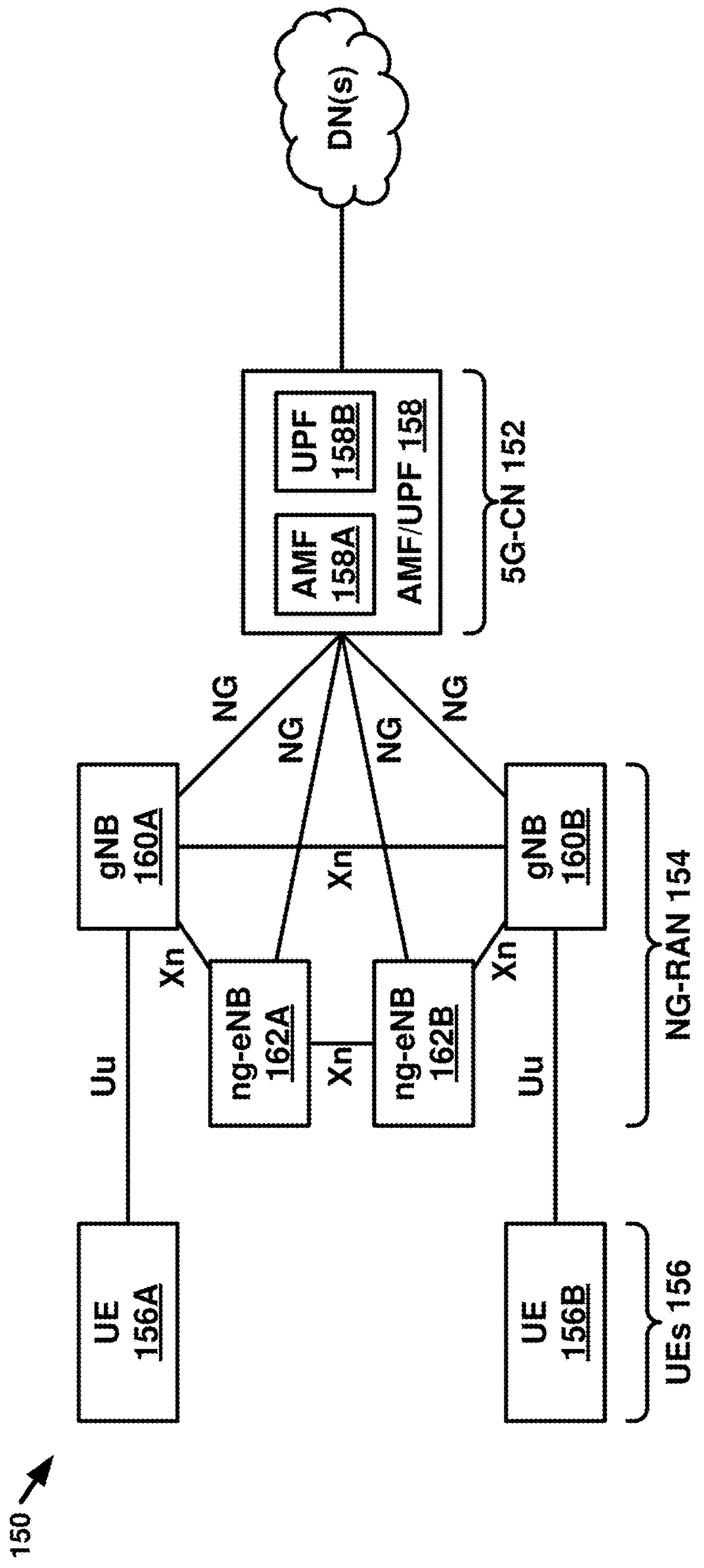

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNS (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
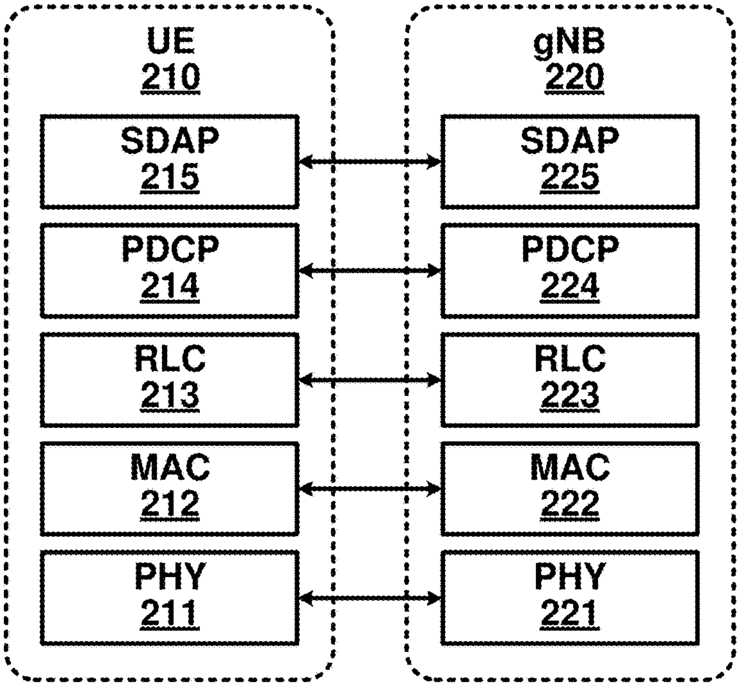
FIG. 2A and FIG. 2B respectively illustrate a New Radio (NR) user plane and control plane protocol stack.
Figure 2B:
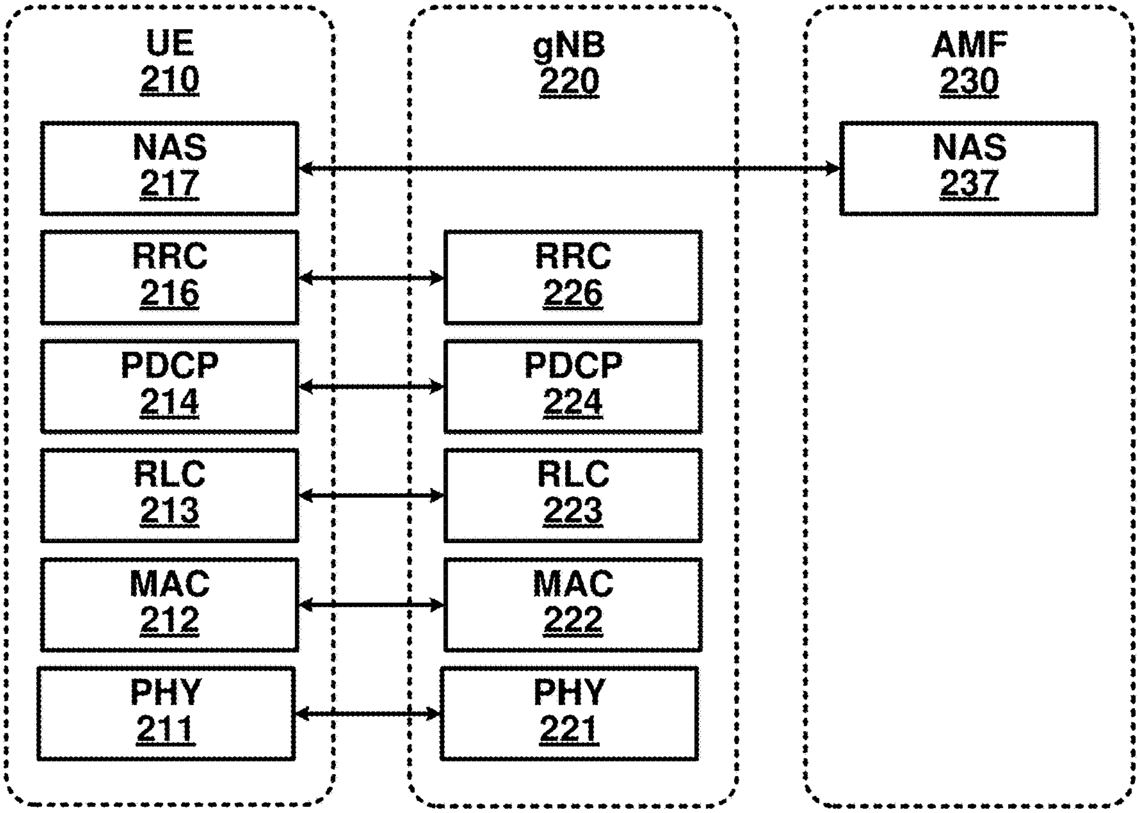

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
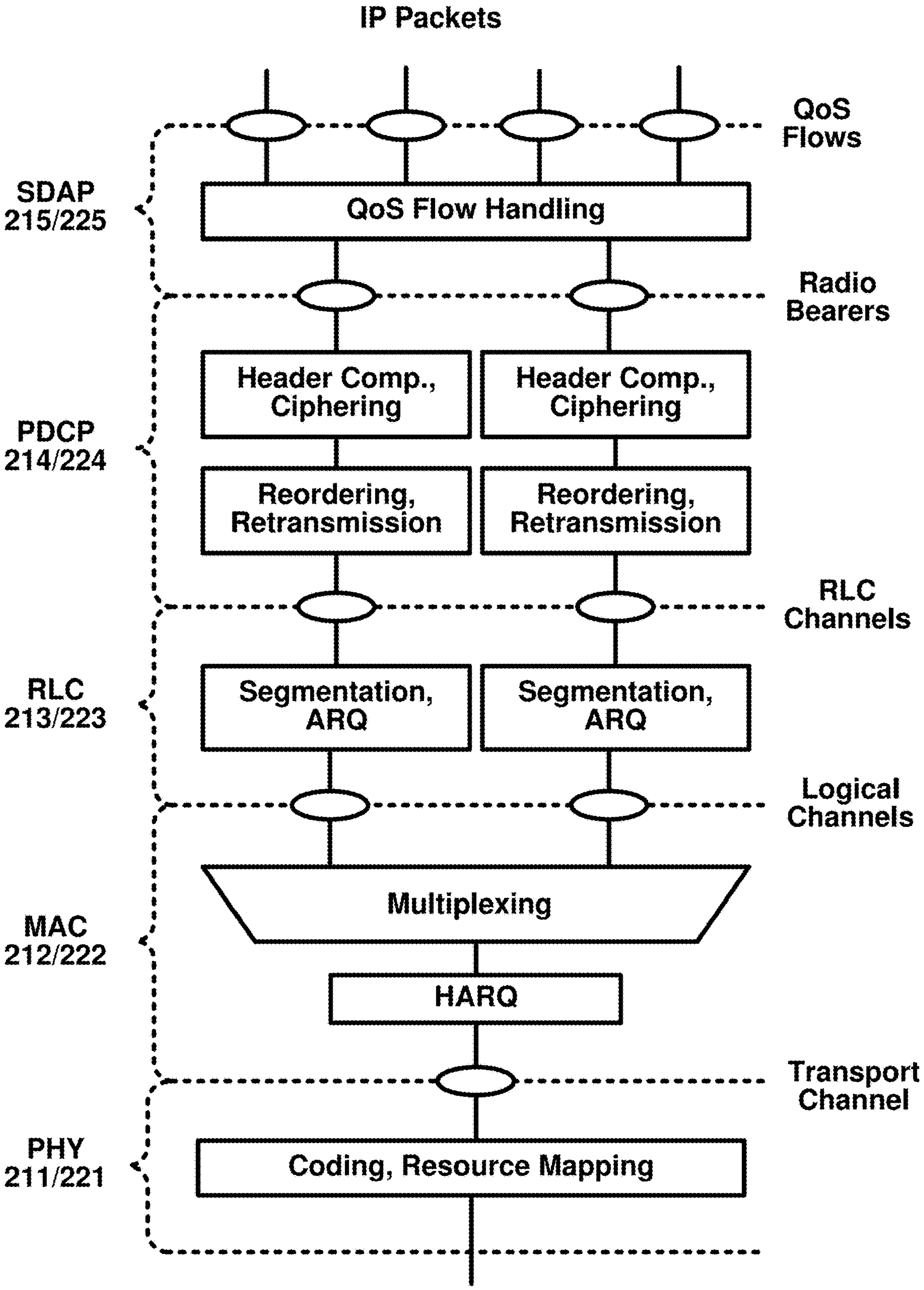
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
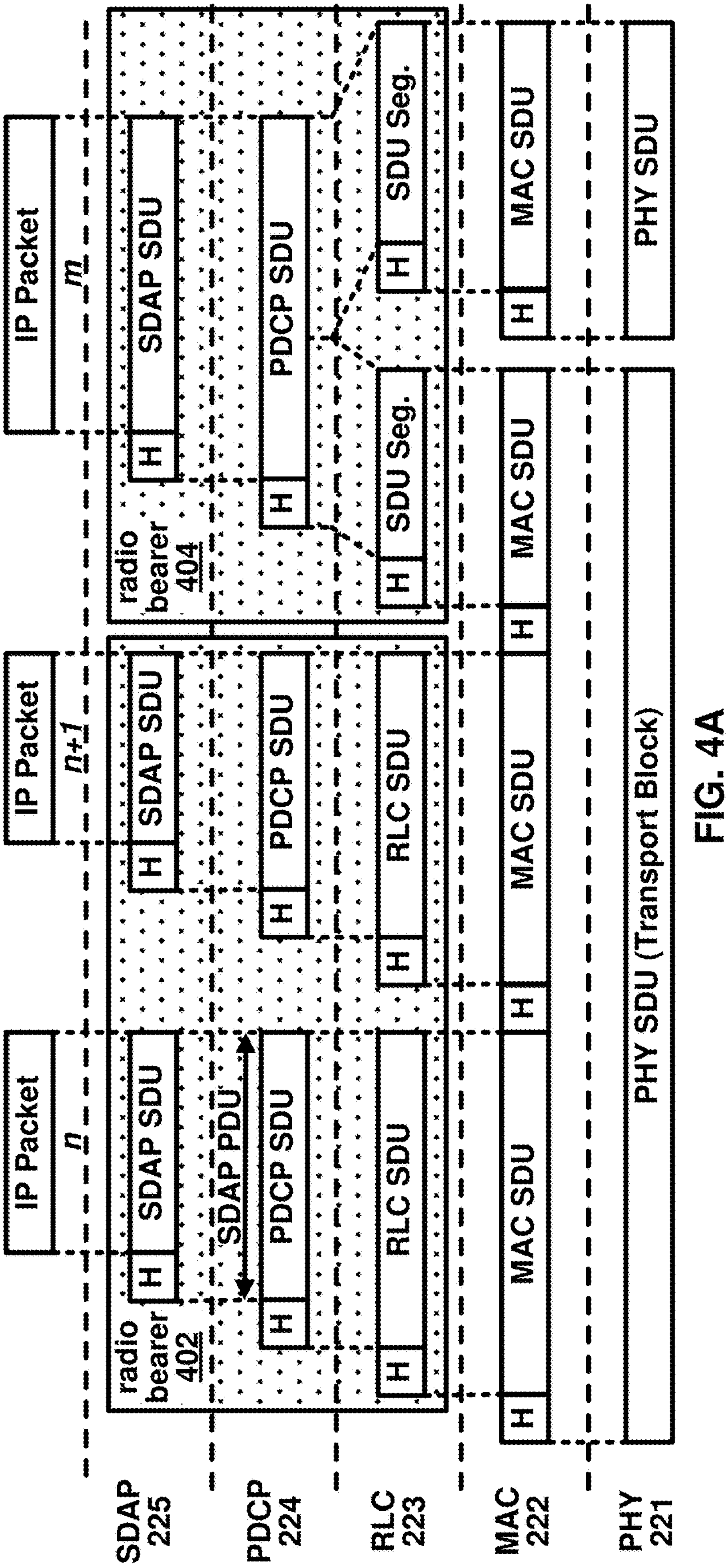
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
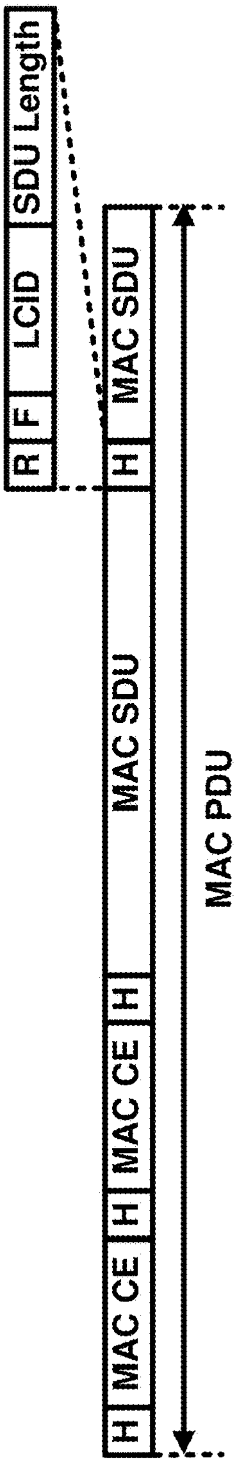
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
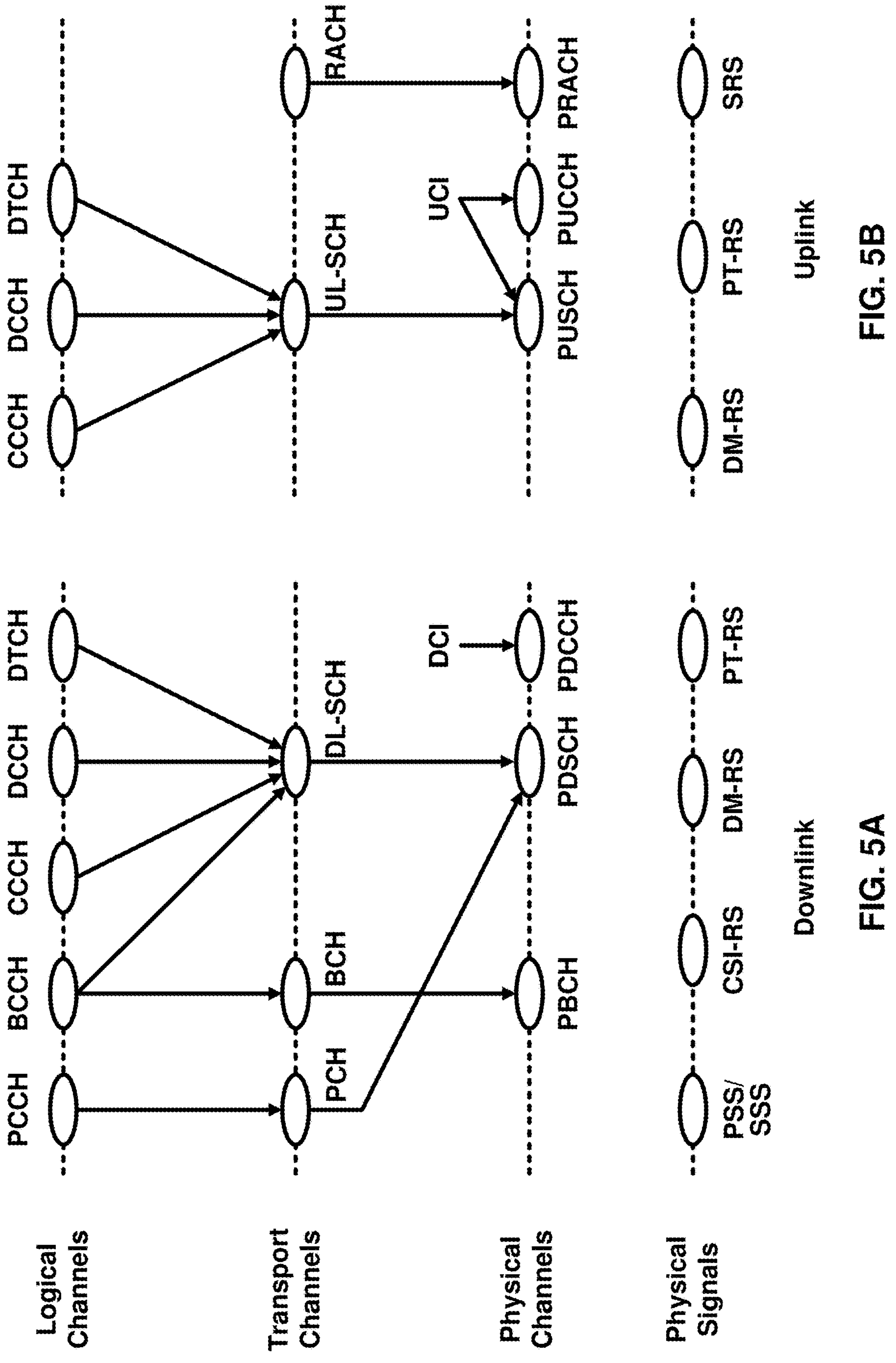
FIG. 5A and FIG. 5B respectively illustrate a mapping between logical channels, transport channels, and physical channels for the downlink and uplink.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and
- a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
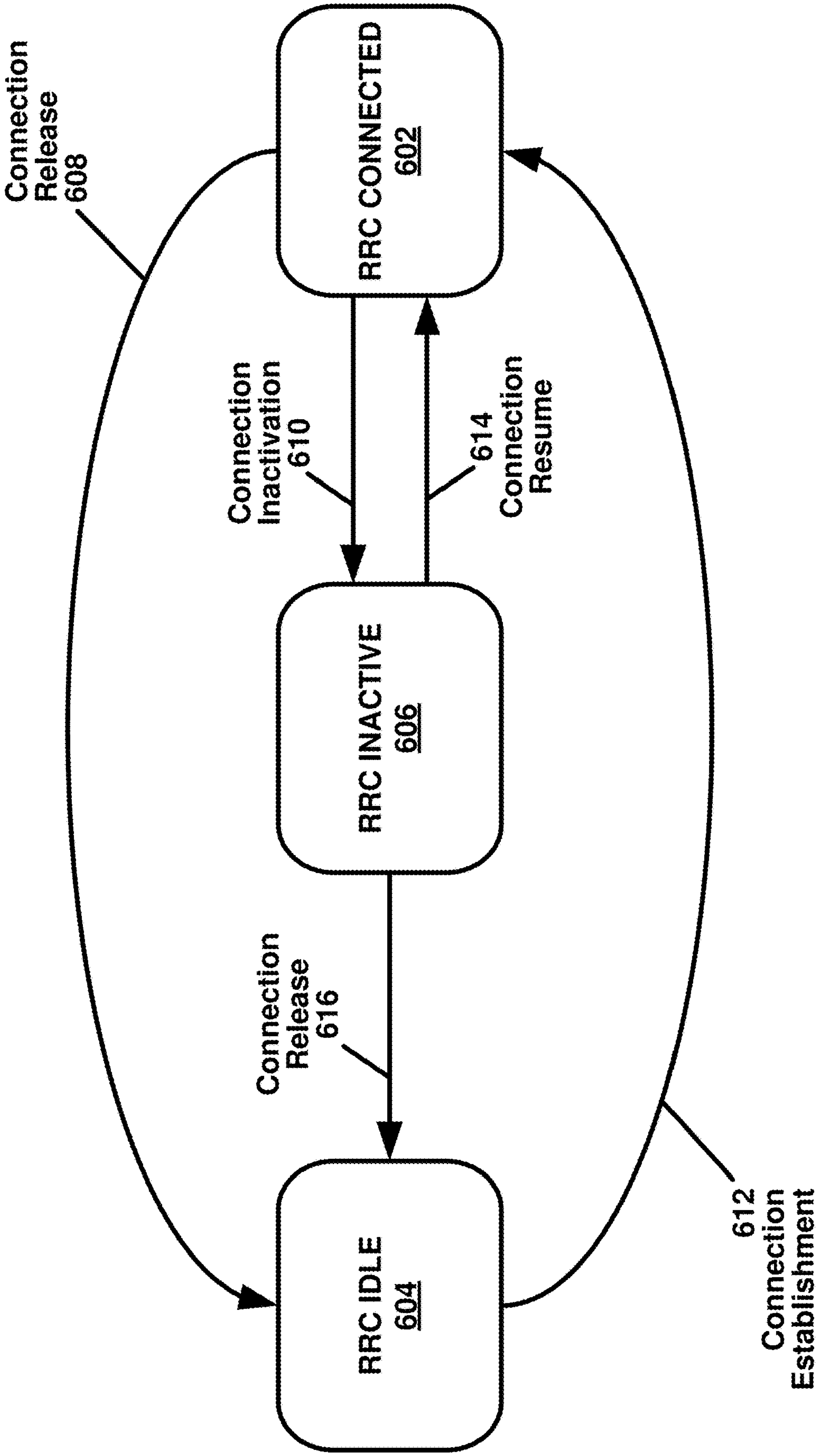
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
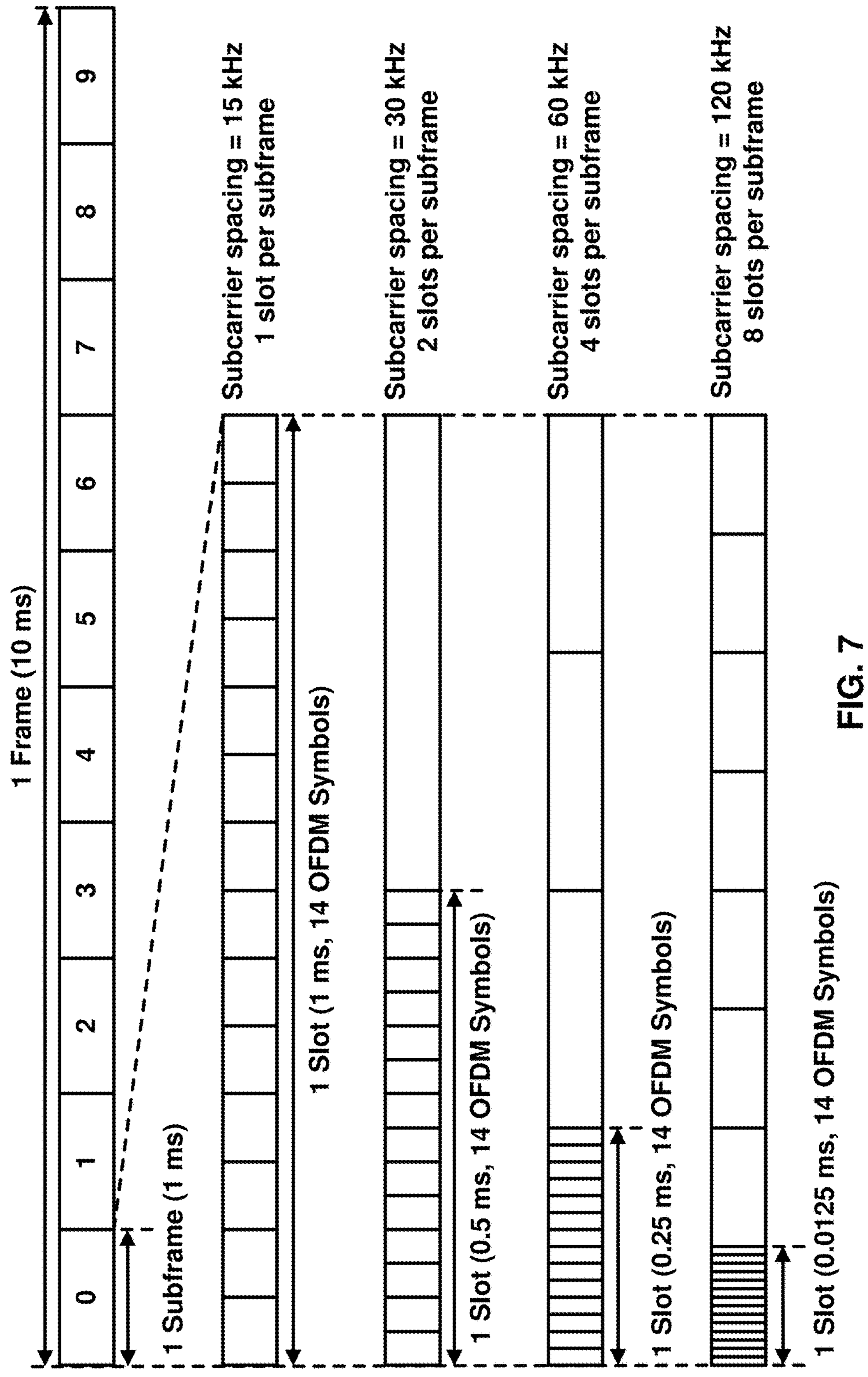
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 KHz/2.3 μs; 60 KHz/1.2 μs; 120 KHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 KHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
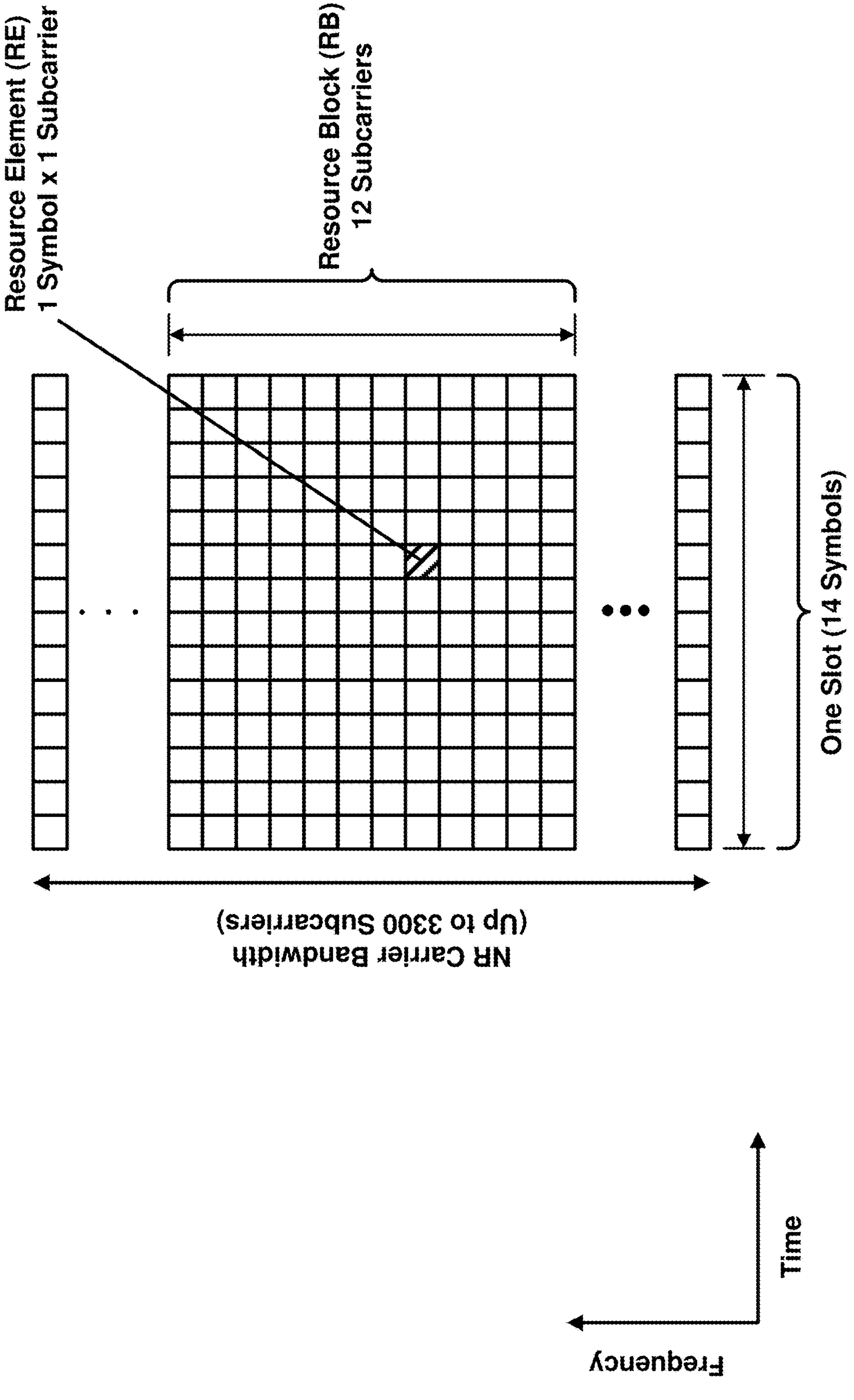
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHZ bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via an RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
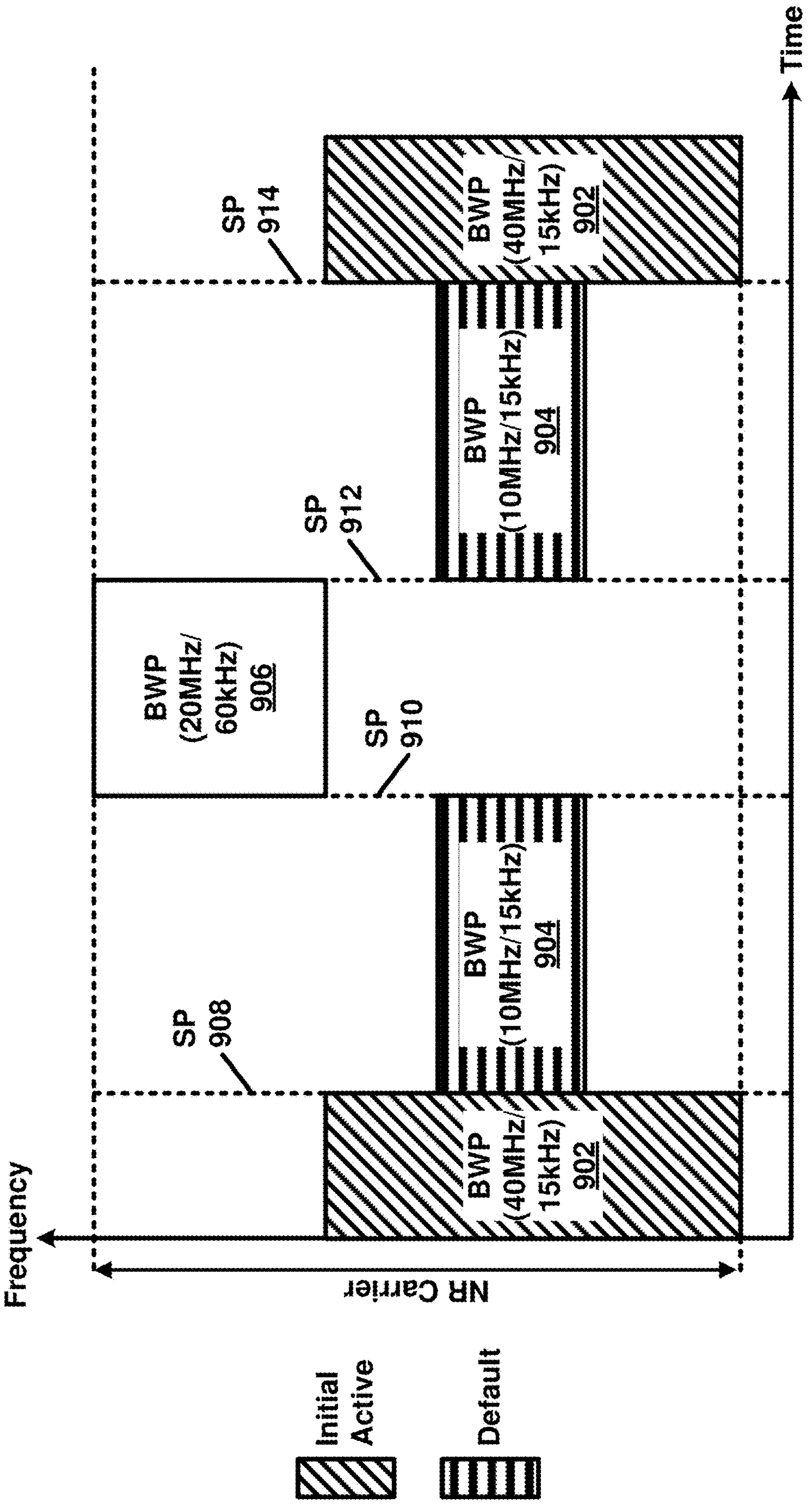
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 KHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
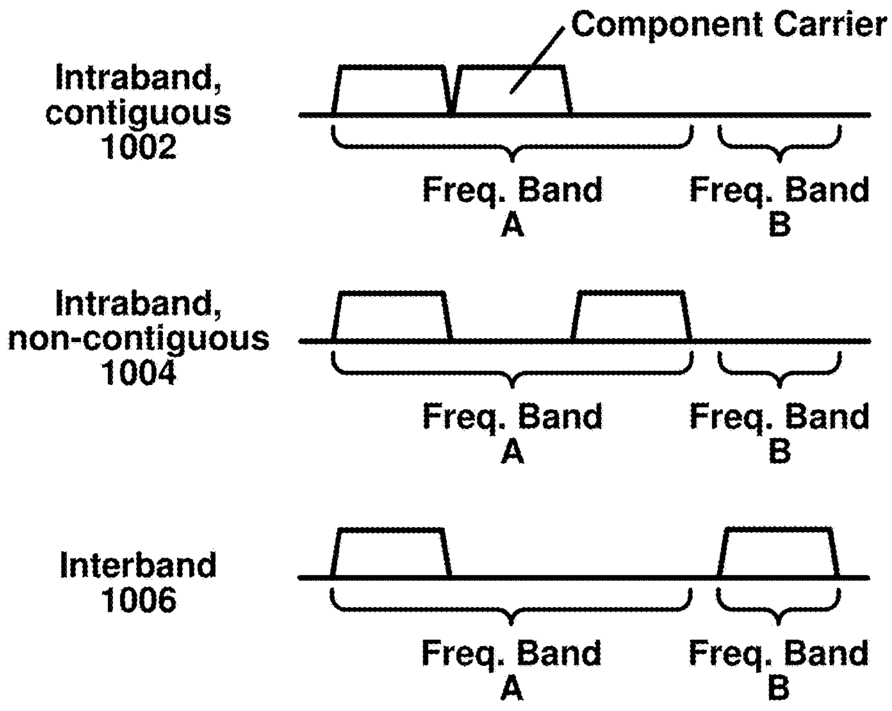
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
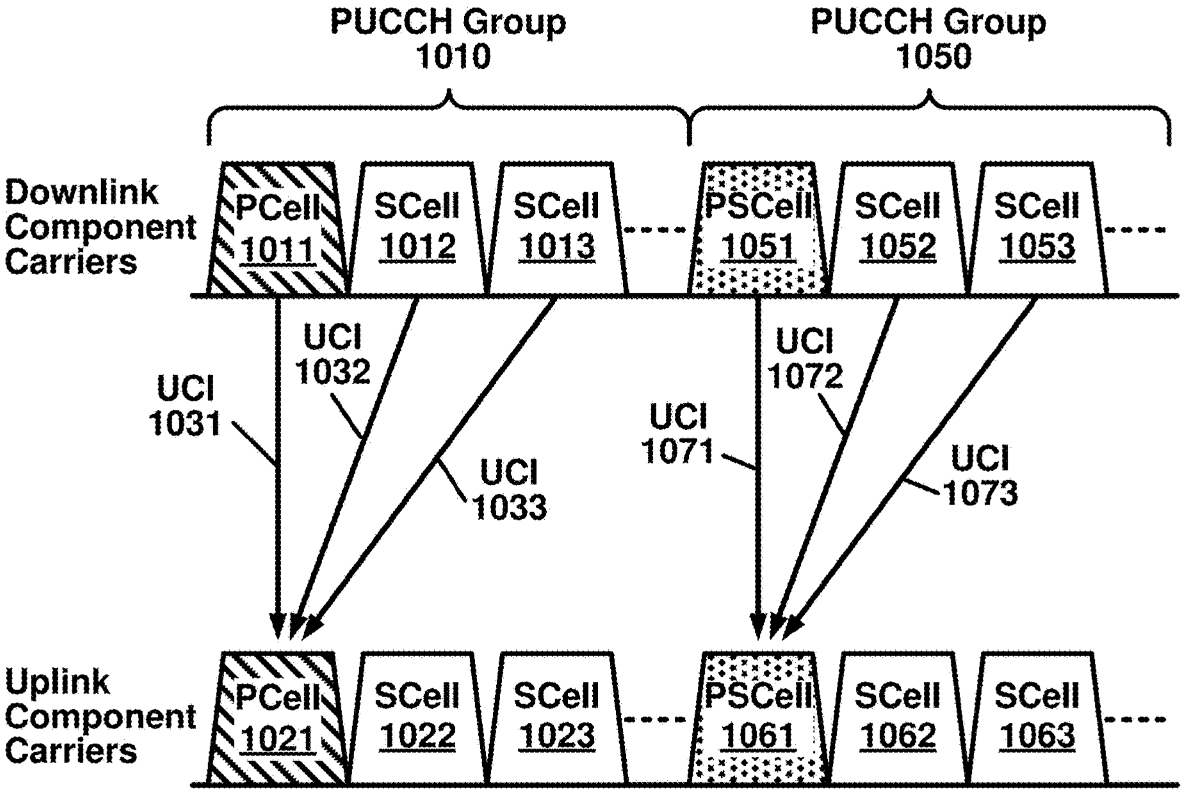
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary SCell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
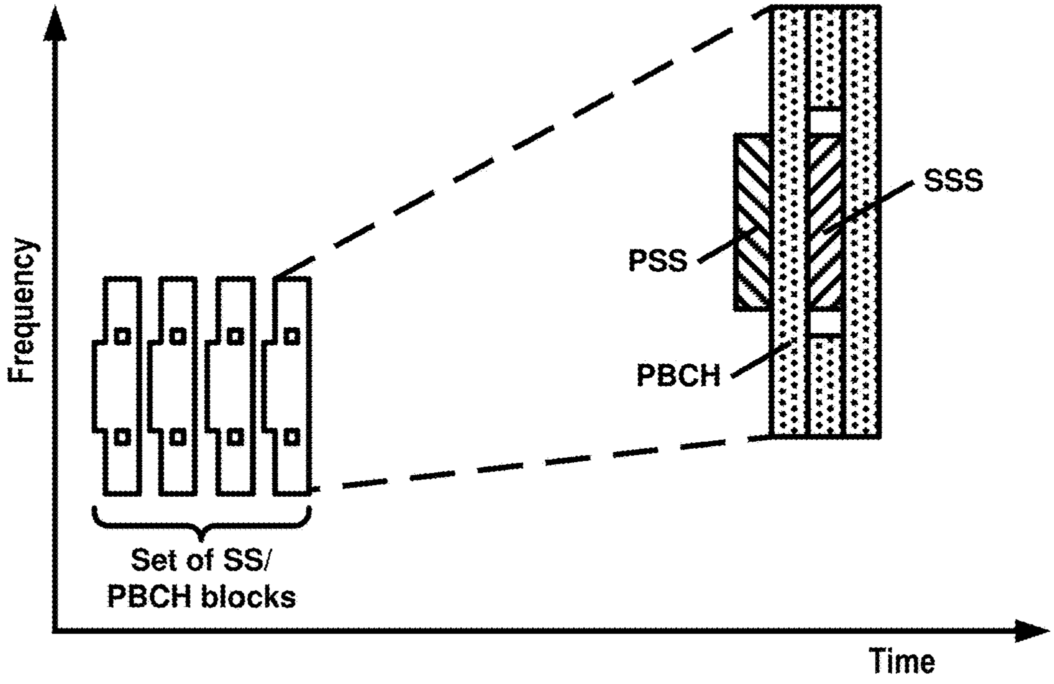
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g., a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g., maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
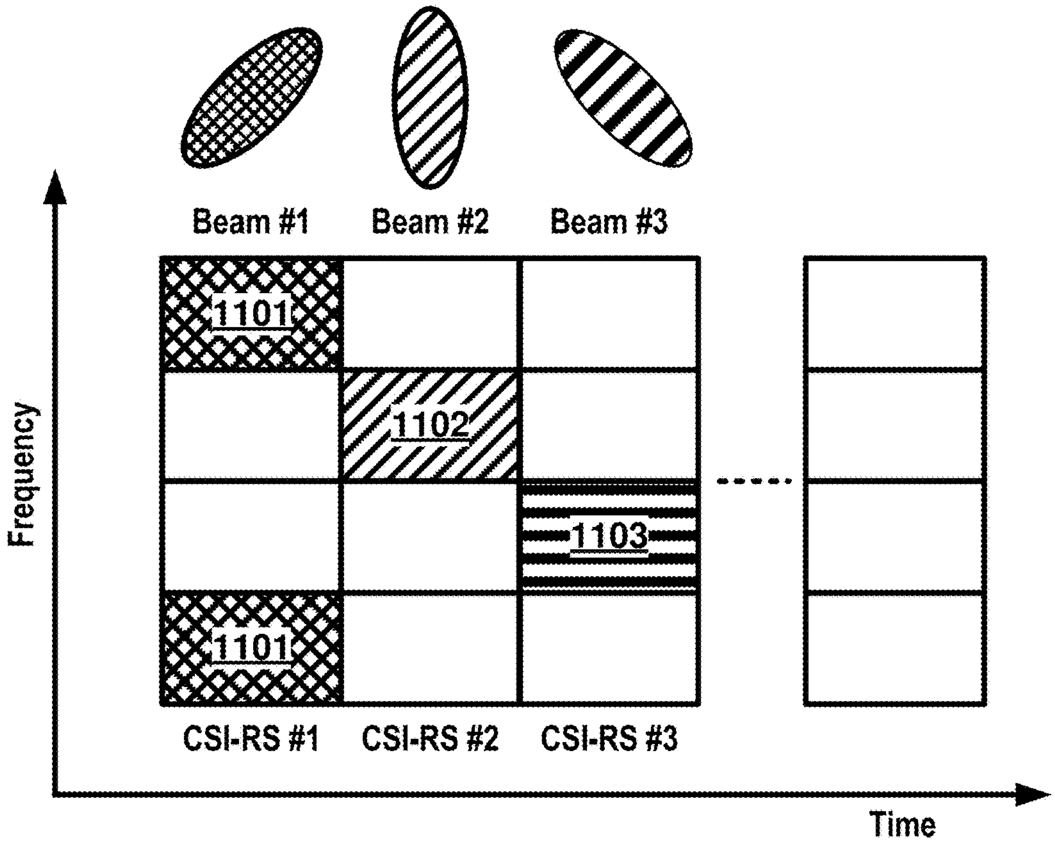
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via an RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figure 12A:
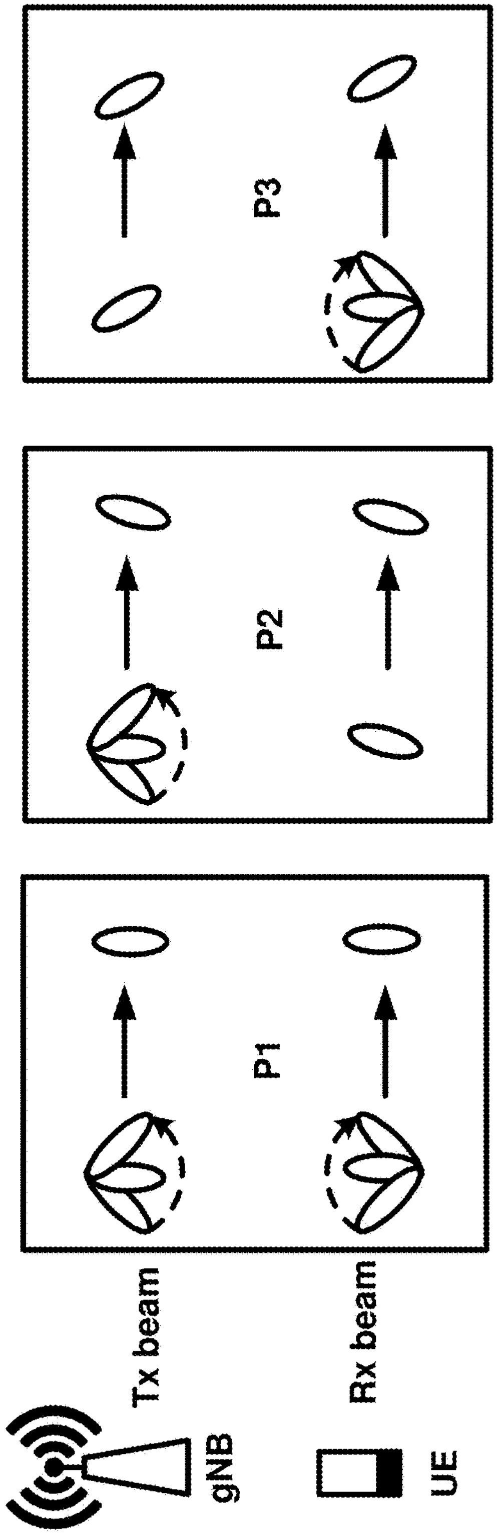
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

Figure 12B:
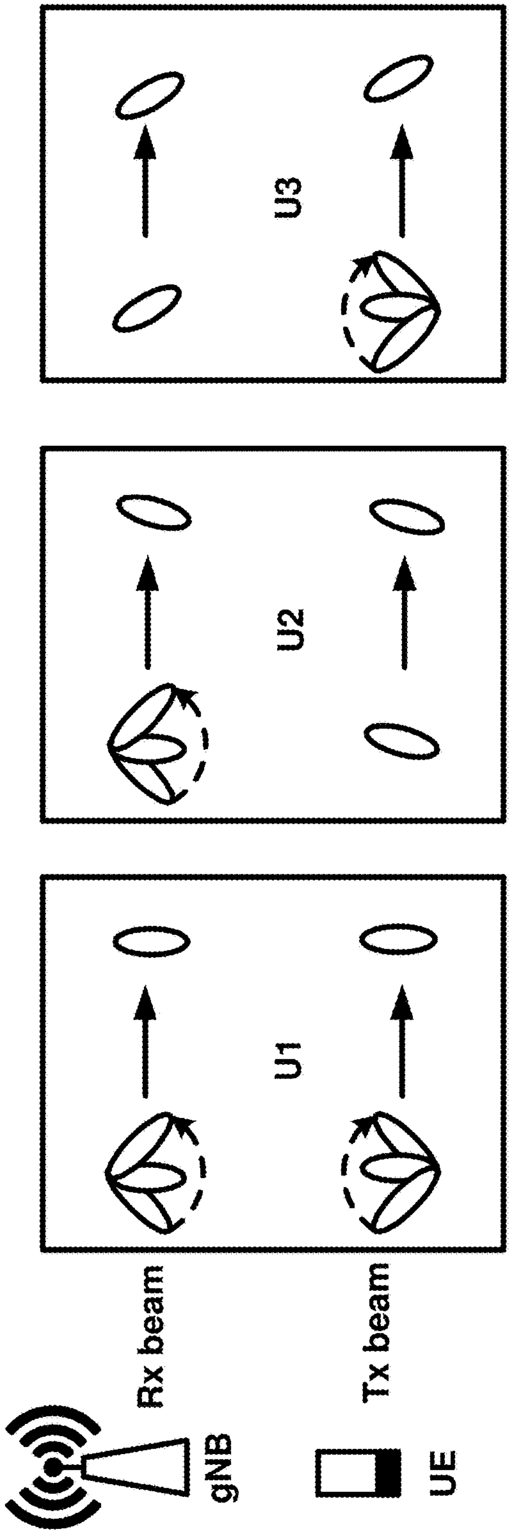

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13A:
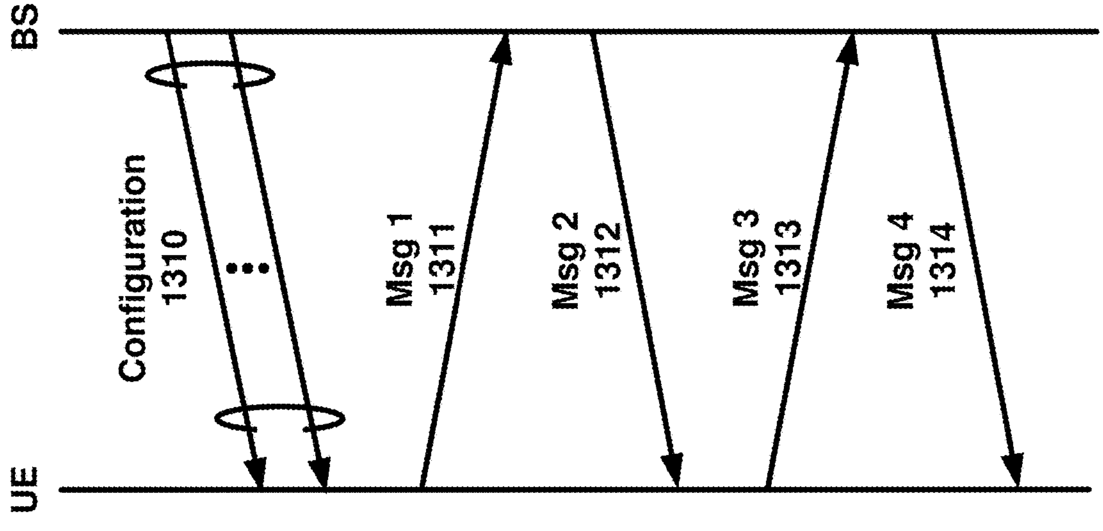
FIG. 13A, FIG. 13B, and FIG. 13C respectively illustrate a four-step contention-based random access procedure, a two-step contention-free random access procedure, and another two-step random access procedure.

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMaskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., $0 \le s\_id < 14$), t_id may be an index of a first slot of the PRACH occasion in a system frame (e.g., $0 \le t\_id < 80$), f_id may be an index of the PRACH occasion in the frequency domain (e.g., $0 \le f\_id < 8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

Figure 13B:
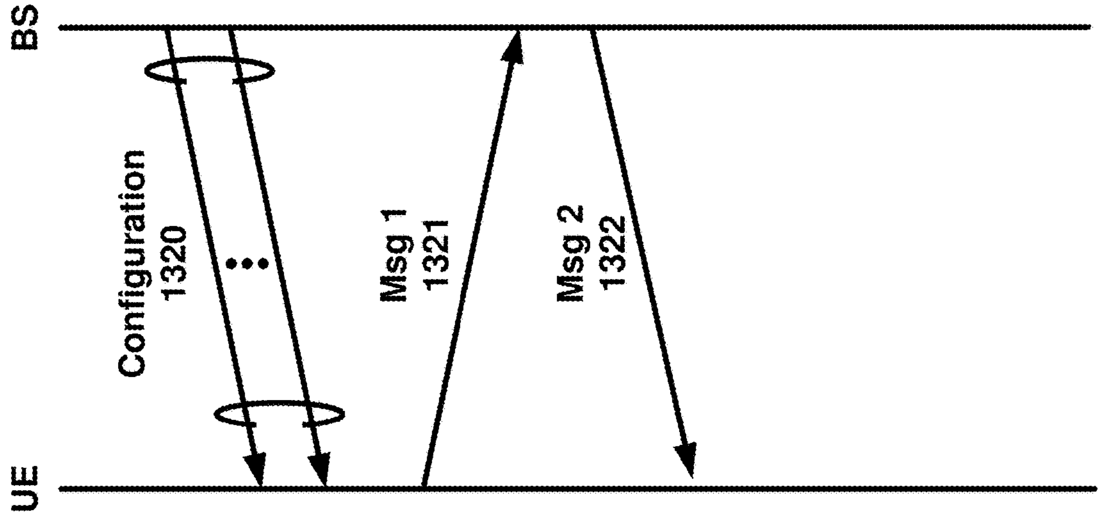

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

Figure 13C:
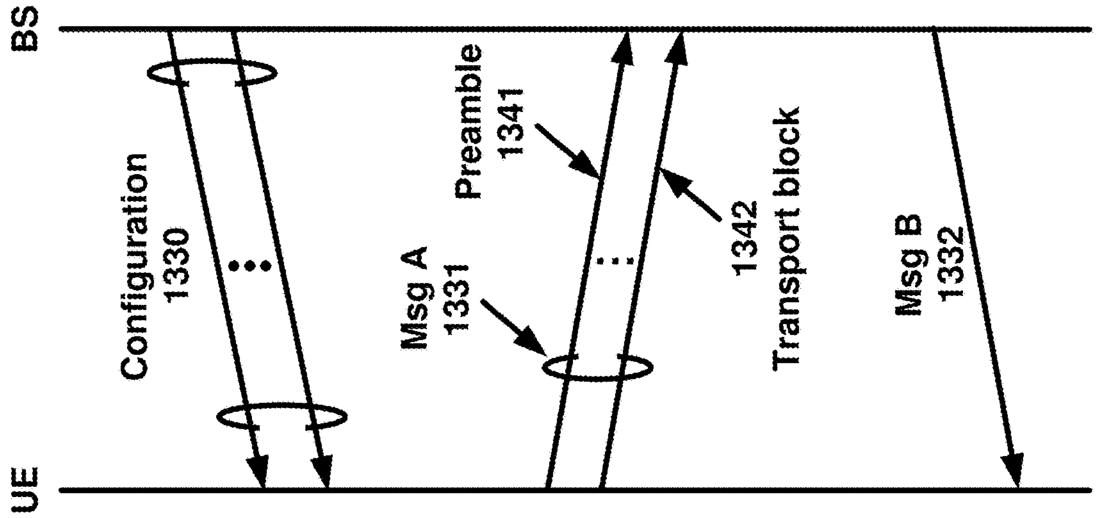

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as “FFFE” in hexadecimal. A DCI having CRC parity bits scrambled with a system information RNTI (SI-RNTI) may indicate a broadcast transmission of the system information. The SI-RNTI may be predefined as “FFFF” in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
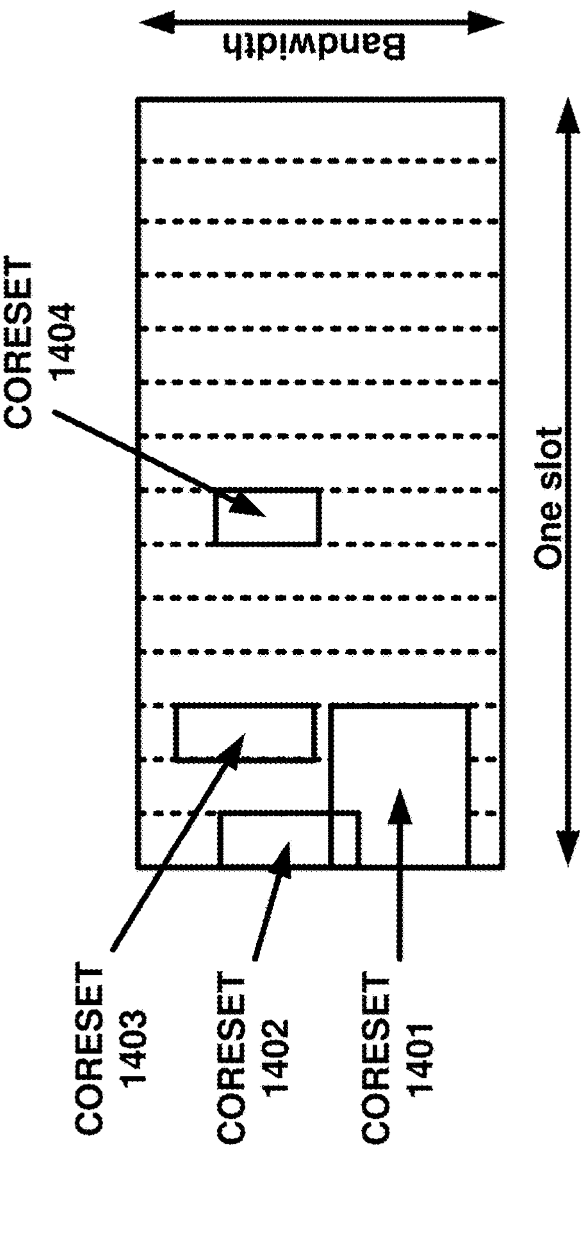
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
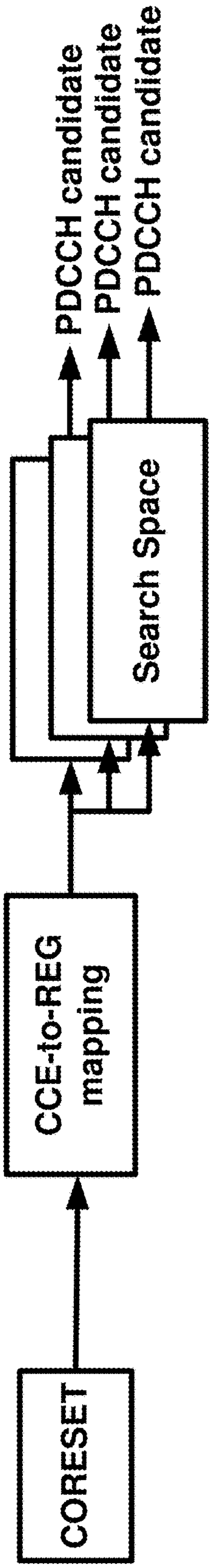
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g., a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
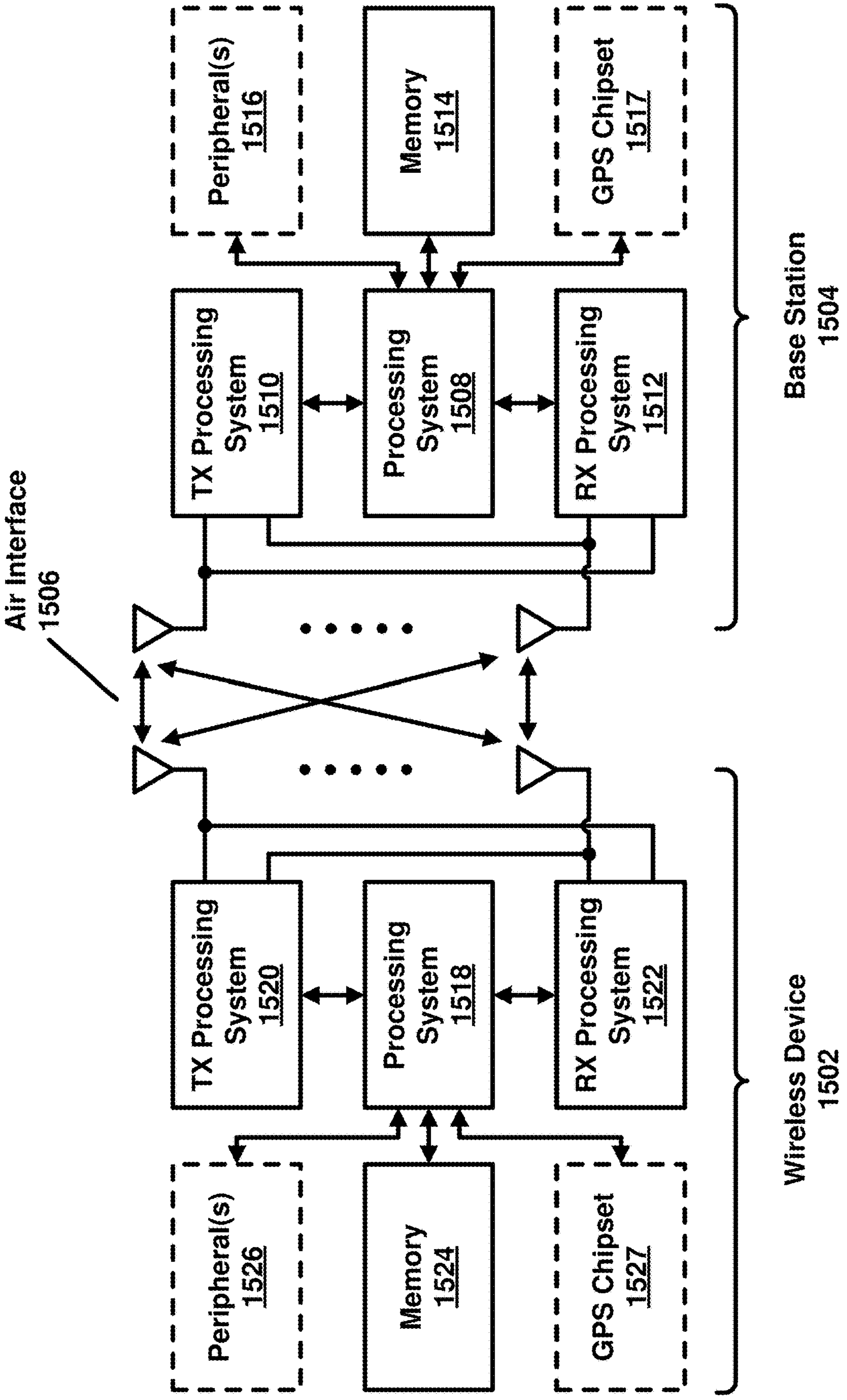
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figure 16A:
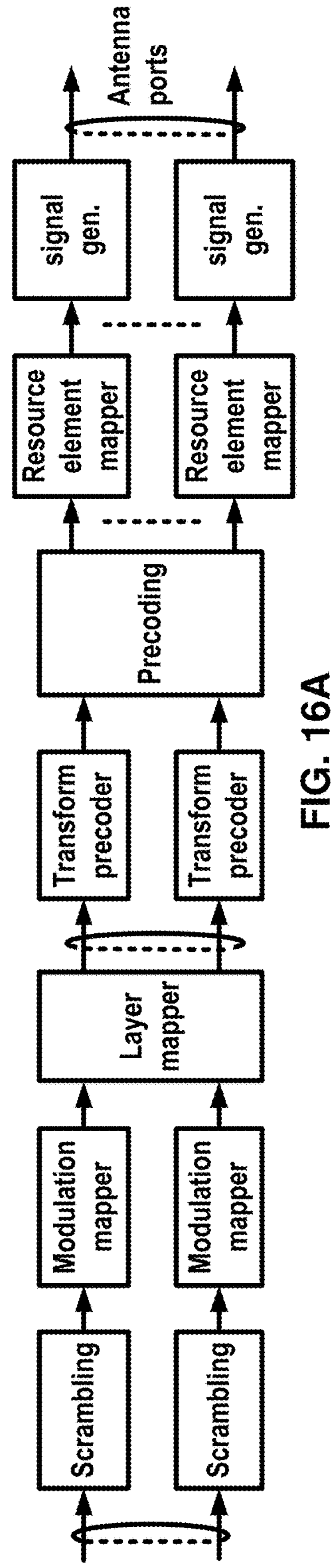
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

Figure 16B:
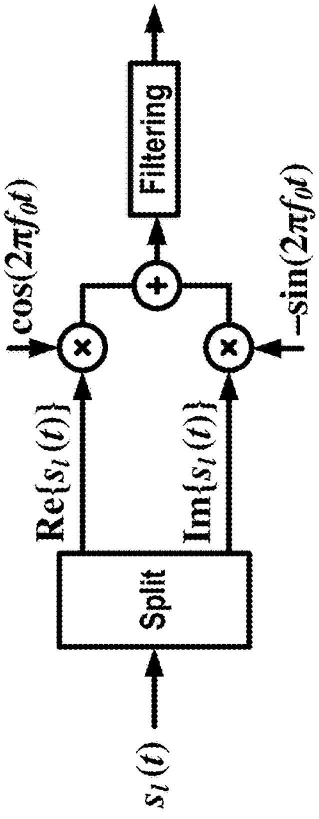

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

Figure 16D:
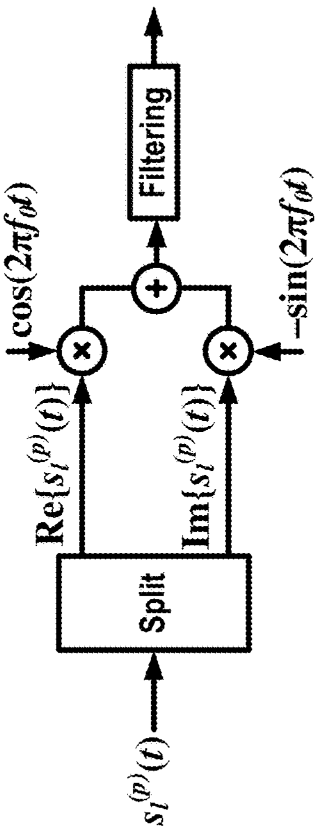
Figure 16C:
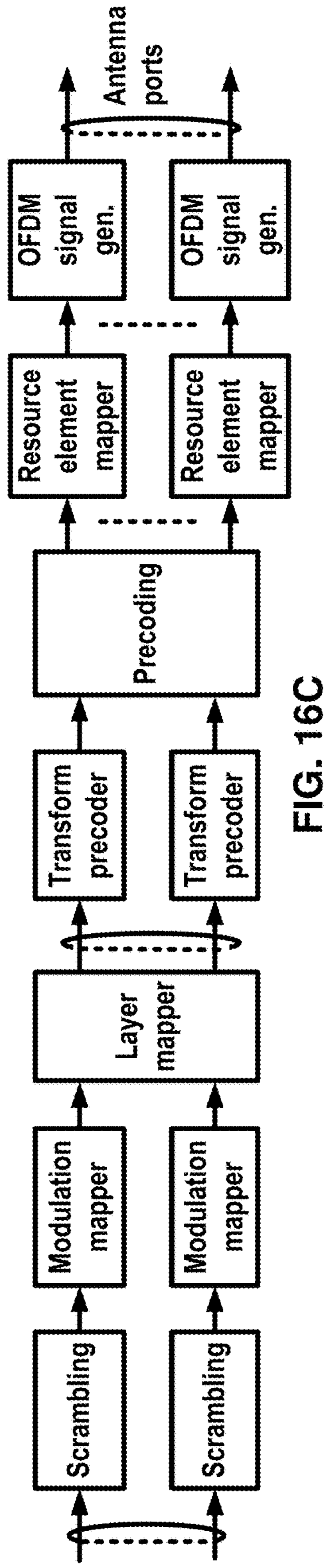

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g., RRC messages) comprising configuration parameters of a plurality of cells (e.g., primary cell, secondary cell). The wireless device may communicate with at least one base station (e.g., two or more base stations in dual-connectivity) via the plurality of cells. The one or more messages (e.g., as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g., the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A UE may be either in an RRC connected state or in an RRC inactive state when an RRC connection has been established. When no RRC connection is established, the UE is in an RRC idle state.

When a UE is in an RRC idle state, (an RRC layer of) the UE or a base station may support PLMN selection; broadcast of system information; cell re-selection mobility; paging for mobile terminated data is initiated by 5GC; DRX for core network (CN) paging configured by non-access stratum (NAS). When a UE is in an RRC idle state, a UE specific DRX may be configured by upper layers; and/or UE controlled mobility based on network configuration. When a UE is in an RRC idle state, (an RRC layer of) the UE may: monitor short messages transmitted with P-RNTI over DCI; monitor a paging channel for core network (CN) paging using serving temporary mobile subscriber identity (S-TMSI) (e.g., 5G-S-TMSI); perform neighbouring cell measurements and cell (re-)selection; acquire system information; send SI request; perform logging of available measurements together with location and time for logged measurement configured UEs.

When a UE is in an RRC inactive state, (an RRC layer of) the UE or a base station may support PLMN selection; broadcast of system information; cell re-selection mobility; paging is initiated by NG-RAN (RAN paging); RAN-based notification area (RNA) is managed by NG-RAN; DRX for RAN paging configured by NG-RAN; core network (e.g., 5G core, 5GC)-RAN (e.g., a base station) connection (both control and/or user planes) is established for UE; an UE AS context is stored in RAN and the UE; RAN knows the RNA which the UE belongs to. For example, when (the RRC layer) of a UE is in an RRC inactive state, a UE specific DRX may be configured by upper layers or by RRC layer; the UE may perform/support UE controlled mobility based on network configuration; the UE may store the UE inactive AS context; a RAN-based notification area (RNA) may be configured by the RRC layer. When a UE is in an RRC inactive state, (an RRC layer of) the UE may: monitor short messages transmitted with P-RNTI over DCI; monitor a paging channel for CN paging using S-TMSI and RAN paging using full inactive-RNTI (I-RNTI) (or full resume identity); perform neighbouring cell measurements and cell (re-)selection; perform RAN-based notification area (RNA) updates periodically and when moving outside the configured RAN-based notification area; acquire system information; send SI request; perform logging of available measurements together with location and time for logged measurement configured UEs.

When a UE is in an RRC connected state, (an RRC layer of) the UE or a base station may support that: 5GC-NG-RAN connection (both C/U-planes) is established for UE; an UE AS context is stored in RAN (e.g., a base station) and the UE; RAN knows the cell which the UE belongs to; transfer of unicast data to/from the UE; network controlled mobility including measurements. For example, when a UE is in an RRC connected state, (an RRC layer of) the UE may: store the AS context; transfer/receive unicast data; at lower layers, be configured with a UE specific DRX; for UEs supporting CA, use of one or more SCells, aggregated with the SpCell, for increased bandwidth; for UEs supporting DC, use of one SCG, aggregated with the MCG, for increased bandwidth; perform/support Network controlled mobility within NR and to/from E-UTRA; when a UE is in an RRC connected state, the UE may: monitor short messages transmitted with P-RNTI over DCI; monitor control channels associated with the shared data channel to determine if data is scheduled for it; provide channel quality and feedback information; perform neighbouring cell measurements and measurement reporting; acquire system information; perform immediate minimization of drive tests (MDT) measurement together with available location reporting.

Radio bearers may be categorized into two groups: data radio bearers (DRB) for user plane data and signalling radio bearers (SRB) for control plane data.

Signalling radio bearers" (SRBs) may be defined as radio bearers (RBs) that are used only for a transmission of RRC and NAS messages. Following SRBs may be defined: SRB0 may be for RRC messages using the common control channel (CCCH) logical channel; SRB1 may be for RRC messages (which may include a piggybacked NAS message) as well as for NAS messages prior to an establishment of SRB2, all using dedicated control channel (DCCH) logical channel; SRB2 may be for NAS messages and for RRC messages which may include logged measurement information, all using DCCH logical channel. SRB2 may have a lower priority than SRB1 and may be configured by the network after access stratum (AS) security activation; SRB3 may be for specific RRC messages when UE is in dual connectivity (e.g., (NG) EN-DC or NR-DC), all using DCCH logical channel. In downlink, piggybacking of NAS messages may be used for one dependent (e.g., with joint success/failure) procedure: bearer establishment/modification/release. In uplink piggybacking of NAS message may be used for transferring the initial NAS message during (RRC) connection setup and (RRC) connection resume. NAS messages transferred via SRB2 may be contained in RRC messages, which may not include any RRC protocol control information. Once AS security is activated, all RRC messages on SRB1, SRB2 and SRB3, including those containing NAS messages, may be integrity protected and ciphered by PDCP. NAS independently may apply integrity protection and ciphering to the NAS messages. Split SRB may is supported for dual connectivity (e.g., multi radio (MR)-DC options) in both SRB1 and SRB2. The split SRB may be not supported for SRB0 and SRB3. For operation with shared spectrum channel access, SRB0, SRB1 and SRB3 may be assigned with the highest priority channel access priority class (CAPC), (e.g., CAPC=1) while CAPC for SRB2 is configurable.

A MAC layer of a UE or a base station may offer different kinds of data transfer service. Each logical channel type may be defined by what type of information is transferred. Logical channels may be classified into two groups: control channels and traffic channels. control channels may be used for the transfer of control plane information: broadcast control channel (BCCH) which is a downlink channel for broadcasting system control information; paging control channel (PCCH) which is a downlink channel that carries paging messages; common control channel (CCCH) which is a channel for transmitting control information between UEs and network. This channel is used for UEs having no RRC connection with the network; and dedicated control channel (DCCH) which is a point-to-point bi-directional channel that transmits dedicated control information between a UE and the network. Used by UEs having an RRC connection. Traffic channels may be used for the transfer of user plane information: dedicated traffic channel (DTCH) which is point-to-point channel, dedicated to one UE, for the transfer of user information. A DTCH may exist in both uplink and downlink.

A UE may transition to an RRC connected state when an RRC connection is established or resumed. The UE may transition to an RRC idle state when RRC connection is released or suspended. The UE may transition to an RRC inactive state when RRC connection is suspended. When the UE is in an RRC idle state, the UE may have a suspended RRC connection. Based on the suspended RRC connection in the RRC idle state, the UE is in an RRC idle state with a suspended RRC connection.

An RRC connection establishment may comprise the establishment of SRB1. A base station may complete the RRC connection establishment prior to completing the establishment of a connection (e.g., N2/N3 connection) with a core network, (e.g., prior to receiving the UE context information from core network entity (e.g., AMF). Access stratum (AS) security may be not activated during the initial phase of the RRC connection. During the initial phase of the RRC connection, the base station may configure the UE to perform measurement reporting. The UE may send the corresponding measurement reports after successful AS security activation. The UE may receive or accept a handover message (e.g., a handover command) when AS security has been activated.

Upon receiving the UE context from the core network (e.g., AMF), an RAN (a base station) may activate AS security (both ciphering and integrity protection) using the initial AS security activation procedure. RRC messages to activate AS security (command and successful response) may be integrity protected while ciphering is started after completion of the procedure. The response to the RRC messages used to activate AS security may be not ciphered, while the subsequent messages (e.g., used to establish SRB2 and DRBs) may be both integrity protected and ciphered.

After having initiated the initial AS security activation procedure, the network (e.g., the base station) may initiate the establishment of SRB2 and DRBs, e.g., the network may do this prior to receiving the confirmation of the initial AS security activation from the UE. The network may apply both ciphering and integrity protection for RRC reconfiguration messages used to establish SRB2 and DRBs. The network should release the RRC connection if the initial AS security activation and/or the radio bearer establishment fails. A configuration with SRB2 without DRB or with DRB without SRB2 may be not supported (i.e., SRB2 and at least one DRB must be configured in the same RRC Reconfiguration message, and it may be not allowed to release all the DRBs without releasing the RRC Connection). For integrated access and backhaul mobile termination (IAB-MT), a configuration with SRB2 without DRB may be supported.

The release of the RRC connection may be initiated by the network. The procedure of the release may be used to re-direct the UE to an NR frequency or an E-UTRA carrier frequency.

The suspension of the RRC connection may be initiated by the network. When the RRC connection is suspended, the UE may store the UE Inactive AS context and any configuration received from the network, and transit to RRC inactive state. The RRC message to suspend the RRC connection may be integrity protected and ciphered.

The resumption of a suspended RRC connection may be initiated by upper layers when the UE needs to transit from RRC inactive state to RRC connected state or by RRC layer to perform a RNA update or by RAN paging from RAN (e.g., a base station). When the RRC connection is resumed, network may configure the UE according to the RRC connection resume procedure based on the stored UE Inactive AS context and any RRC configuration received from the network. The RRC connection resume procedure re-activates AS security and re-establishes SRB(s) and DRB(s).

In response to a request to resume the RRC connection, the network may resume the suspended RRC connection and send/transition UE to RRC connected state, or reject the request to resume and send UE to RRC inactive state (with a wait timer), or directly re-suspend the RRC connection and send UE to RRC_INACTIVE, or directly release the RRC connection and send/transition UE to RRC idle state, or instruct the UE to initiate NAS level recovery (in this case the network sends an RRC setup message). For user data (DRBs), ciphering may provide user data confidentiality and integrity protection provides user data integrity. For RRC signalling (SRBs), ciphering may provide signalling data confidentiality and integrity protection signalling data integrity. Ciphering and integrity protections may be optionally configured except for RRC signalling for which integrity protection may be always configured. Ciphering and integrity protection may be configured per DRB.

For key management and data handling, network entities or a UE processing cleartext may be protected from physical attacks and located in a secure environment. Base station (e.g., gNB or eNB) (AS) keys may be cryptographically separated from the (NAS) keys. Separate AS and NAS level security mode command (SMC) procedures may be used. A sequence number (COUNT) may be used as input to the ciphering and integrity protection and a given sequence number may be used once for a given key (except for identical re-transmission) on the same radio bearer in the same direction.

Keys for security may are organized and derived as follows. A key for a core network entity (e.g., AMF or a key for mobility management entity (MME)) may comprise KAMF (or KMME). The key for a core network entity may be a key derived by mobile equipment (ME) of a UE and a security anchor function (SEAF) from a key for the SEAF (KSEAF). Keys for NAS signalling may comprise: KNASint is a key derived by mobile equipment (ME) of a UE and the core network from a key for the core network entity, which may be used for the protection of NAS signalling with a particular integrity algorithm; and KNASenc is a key derived by ME and the core network entity from a key for the core network entity (e.g., KAMF/KMME), which may be used for the protection of NAS signalling with a particular encryption algorithm. A key for a base station (e.g., gNB or eNB) may comprise KgNB (or KeNB) is a key derived by ME and a core network entity (e.g., AMF/MME) from a key for the core network entity (e.g., KAMF/KMME). A key for a base station may be further derived by ME and source base station when performing horizontal or vertical key derivation. Keys for UP traffic may comprise: KUPenc is a key derived by ME and a base station from key for a base station, which may be used for the protection of UP traffic between ME and a base station with a particular encryption algorithm; KUPint may be a key derived by ME and a base station from a key for a base station, which may be used for the protection of UP traffic between ME and a base station with a particular integrity algorithm. Keys for RRC signalling may comprise: KRRCint is a key derived by ME and a base station from a key for a base station, which may be used for the protection of RRC signalling with a particular integrity algorithm; KRRCenc is a key derived by ME and a base station from a key for a base station, which may be used for the protection of RRC signalling with a particular encryption algorithm. Intermediate keys may comprise: next hop parameters (NH) is a key derived by ME and a core network entity (e.g., AMF/MME) to provide forward security; KgNB* (or KeNB*) is a key derived by ME and a base station when performing a horizontal or vertical key derivation.

A primary authentication may enable mutual authentication between the UE and the network and provide an anchor key called KSEAF. From KSEAF, a key for a core network entity (e.g., KAMF/KMME) may be created during e.g., primary authentication or NAS key re-keying and key refresh events. Based on the key for the core network entity, KNASint and KNASenc may be then derived when running a successful NAS SMC procedure.

Whenever an initial AS security context needs to be established between UE and a base station, a core network entity (e.g., AMF/MME) and the UE may derive a key for a base station (e.g., KgNB/KeNB) and a next hop parameter (NH). The key for a base station and the NH may be derived from the key for a core network entity. A next hop chaining counter (NCC) may be associated with each key for a base station and NH parameter. A key for a base station may be associated with the NCC corresponding to the NH value from which it was derived. At initial setup, the key for a base station may be derived directly from a key for a core network entity, and be then considered to be associated with a virtual NH parameter with NCC value equal to zero. At initial setup, the derived NH value may be associated with the NCC value one. On handovers, the basis for the key for a base station that will be used between the UE and the target base station, called KgNB* (or KeNB*), may be derived from either the currently active key for a base station or from the NH parameter. If KgNB* (or KeNB*) may be derived from the currently active key for a base station, this is referred to as a horizontal key derivation and is indicated to UE with an NCC that does not increase. If the KgNB* (or KeNB*) is derived from the NH parameter, the derivation is referred to as a vertical key derivation and is indicated to UE with an NCC increase. KRRCint, KRRCenc, KUPint and KUPenc may be derived based on a key for a base station after a new key for a base station is derived.

Based on key derivation, a base station with knowledge of a key for a base station (e.g., a KgNB/KeNB), shared with a UE, may be unable to compute any previous KgNB that has been used between the same UE and a previous base station, therefore providing backward security. A base station with knowledge of a key for a base station shared with a UE, may be unable to predict any future key for a base station that will be used between the same UE and another base station after n or more handovers (since NH parameters are only computable by the UE and the core network entity (e.g., AMF/MME)).

An AS SMC procedure may be for RRC and UP security algorithms negotiation and RRC security activation. When AS security context is to be established in a base station, the AMF (or MME) may send security capabilities of a UE to the base station. The base station may choose a ciphering algorithm. The chosen ciphering algorithm may have the highest priority from its configured list and be also present in the security capabilities. The base station may choose an integrity algorithm. The chosen integrity algorithm may have the highest priority from its configured list and be also present in the security capabilities. The chosen algorithms may be indicated to the UE in the AS SMC and this message may be integrity protected. RRC downlink ciphering (encryption) at the base station may start after sending the AS SMC message. RRC uplink deciphering (decryption) at the base station may start after receiving and successful verification of the integrity protected AS security mode complete message from the UE. The UE may verify the validity of the AS SMC message from the base station by verifying the integrity of the received message. RRC uplink ciphering (encryption) at the UE may start after sending the AS security mode complete message. RRC downlink deciphering (decryption) at the UE may start after receiving and successful verification of the AS SMC message. The RRC connection reconfiguration procedure used to add DRBs may be performed only after RRC security has been activated as part of the AS SMC procedure.

A UE may support integrity protected DRBs. In case of failed integrity check (e.g., faulty or missing message authentication code for integrity (MAC-I)), the concerned packet data unit (PDU) may be discarded by a receiving PDCP entity. Key refresh may be possible for a key for a base station ($K_{gNB}$/$K_{eNB}$), $K_{RRC-enc}$, $K_{RRC-int}$, $K_{UP-enc}$, and $K_{UP-int}$ and may be initiated by the base station when a PDCP COUNTs are about to be re-used with the same Radio Bearer identity and with the same $K_{gNB}$. Key re-keying may be possible for the key for a base station ($K_{gNB}$/$K_{eNB}$), $K_{RRC-enc}$, $K_{RRC-int}$, $K_{UP-enc}$, and $K_{UP-int}$ and may be initiated by a core network entity (e.g., AMF/MME) when a AS security context different from the currently active one may be activated.

When a UE transition from an RRC idle state to an RRC connected state, RRC protection keys and UP protection keys may be generated while keys for NAS protection as well as higher layer keys are assumed to be already available. These higher layer keys may have been established as a result of an authentication and key agreement (AKA) run, or as a result of a transfer from another AMF during handover or idle mode mobility. When a UE transitions from an RRC connected state to an RRC idle state, base station may delete the keys it stores for that UE such that state information for idle mode UEs only has to be maintained in a core network entity (e.g., AMF/MME). A base station may do no longer store state information about the corresponding UE and delete the current keys from its memory (e.g., when transitioning an RRC connected state to an RRC idle state): the base station and UE may delete NH, key for a base station, KgNB, KRRCint, KRRCenc, KUPint and KUPenc and related NCC; the core network entity (e.g., AMF/MME) and UE may keep key for a core network entity (e.g., KAMF/KMME), KNASint and KNASenc stored.

On mobility with vertical key derivation the NH may be further bound to the target physical cell identifier (PCI) and its frequency absolute radio frequency channel number-downlink link (ARFCN-DL) before it is taken into use as the key for a base station in the target base station. On mobility with horizontal key derivation the currently active key for a base station may be further bound to the target PCI (PCI of the target cell) and its frequency ARFCN-DL before it is taken into use as the key for a base station in the target gNB. In both cases, ARFCN-DL may be the absolute frequency of SSB of the target primary cell (PCell). It may be not required to change the AS security algorithms during intra-gNB-central unit (CU) handover. If the UE does not receive an indication of new AS security algorithms during an intra-gNB-CU handover, the UE may continue to use the same algorithms as before the handover.

AS security may comprise of the integrity protection and ciphering of RRC signalling (SRBs) and user data (DRBs). The AS may apply four different security keys: one for the integrity protection of RRC signalling (KRRCint), one for the ciphering of RRC signalling (KRRCenc), one for integrity protection of user data (KUPint) and one for the ciphering of user data (KUPenc). The four AS keys may be derived from a key for a base station (e.g., KgNB/KgNB). The key for a base station may be based on a key for a core network entity (KAMF/KMME), which may be handled by upper layers (e.g., NAS layer). The integrity protection and ciphering algorithms may be changed with reconfiguration with sync (e.g., handover command). The AS keys (KgNB, KRRCint, KRRCenc, KUPint and KUPenc) may change upon reconfiguration with sync and upon connection re-establishment and connection resume. For each radio bearer an independent counter (count) may be maintained for each direction. For each radio bearer, the count may be used as input for ciphering and integrity protection.

Paging may allow a base station to reach UEs in an RRC idle state and in an RRC inactive state through paging messages, and to notify UEs in an RRC idle state, in an RRC inactive state and an RRC connected state of system information change, and earthquake and tsunami warning system (ETWS) or commercial mobile alert service (CMAS) indications through short messages. Both paging messages and short messages may be addressed with P-RNTI on PDCCH. The paging messages may be sent on PCCH, the short message may be sent over PDCCH directly.

While a UE is in an RRC idle state, the UE may monitor a paging channels for core network (CN)-initiated paging. While a UE is in an RRC inactive state, the UE may monitor paging channels for RAN-initiated paging. A UE may need not monitor paging channels continuously though. Paging DRX is defined where the UE in an RRC idle state or an RRC inactive state may be only required to monitor paging channels during one paging occasion (PO) per DRX cycle. The Paging DRX cycles may be configured by the network (e.g., a base station or a core network entity (e.g., AMF/MME)): for CN-initiated paging, a default cycle may be broadcast in system information; For CN-initiated paging, a UE specific cycle may be configured via an NAS signalling; For RAN-initiated paging, a UE-specific cycle may be configured via an RRC signalling; The UE may use the shortest of the DRX cycles applicable. For example, a UE in an RRC idle state may use the shortest of the first two cycles above. A UE in RRC_INACTIVE may use the shortest of the three cycles above.

The POs of a UE for CN-initiated and RAN-initiated paging may be based on the same UE identity (ID), resulting in overlapping POs for both. The number of different POs in a DRX cycle may be configurable via system information and a network may distribute UEs to those POs based on their IDs.

When in RRC_CONNECTED, the UE may monitor the paging channels in any PO signaled in system information for SI change indication and PWS notification. A UE in RRC connected state only may monitor paging channels on the active BWP with common search space configured. For operation with shared spectrum channel access, a UE may be configured for an additional number of PDCCH monitoring occasions in its PO to monitor for paging. When the UE detects a PDCCH transmission within the UE's PO addressed with P-RNTI, the UE may be not required to monitor the subsequent PDCCH monitoring occasions within this PO.

A network (e.g., a base station) may initiate a paging procedure by transmitting the paging message at the UE's paging occasion. The network may address multiple UEs within a paging message by including one paging record for each UE. The paging message may comprise a paging record list. The paging record list may comprise one or more paging records. Each paging record may comprise at least one of: a UE identity (ID) and access type. The UE identity may comprise S-TMSI or I-RNTI (resume identity). The access type may indicate whether the paging message originated due to a PDU sessions from non-3GPP access.

Cell selection may be required on transition from registration management (RM)-DEREGISTERED to RM-REGISTERED, from CM-IDLE to CM-CONNECTED and from CM-CONNECTED to CM-IDLE. the RM-DEREGISTERED state, the UE may be not registered with the network. The UE context in a core network entity (e.g., AMF/MME) may hold no valid location or routing information for the UE. The UE may be not reachable by the AMF. In the RM-REGISTERED state, the UE is registered with the network. In the RM-REGISTERED state, the UE can receive services that require registration with the network. A UE in CM-IDLE state may have no NAS signalling connection established with the core network entity (e.g., AMF/MME) (e.g., over N1/S1 interface). The UE may perform cell selection/cell reselection and PLMN selection. A UE in CM-CONNECTED state may have a NAS signalling connection with the core network entity (e.g., over N1/S1 interface). A NAS signalling connection may use an RRC connection between the UE and a base station (e.g., RAN) and a next generation application protocol (NGAP)/S1AP UE association between access network (AN) (e.g., AN of the base station) and the core network entity (e.g., AMF/MME).

Cell selection may be based on following principles. The UE NAS layer may identify a selected PLMN and equivalent PLMNs. Cell selection may be based on cell defining SSB (CD-SSBs) located on synchronization raster: A UE may search the frequency (NR) bands and for each carrier frequency may identify the strongest cell as per the CD-SSB. The UE may then read cell system information broadcast to identify its PLMN(s): The UE may search each carrier in turn ("initial cell selection") or make use of stored information to shorten the search ("stored information cell selection"). The UE may seek to identify a suitable cell; if the UE is not able to identify a suitable cell it seeks to identify an acceptable cell. When a suitable cell is found or if only an acceptable cell is found, the UE may camp on that cell and commence the cell reselection procedure: A suitable cell is one for which the measured cell attributes satisfy the cell selection criteria; the cell PLMN is the selected PLMN, registered or an equivalent PLMN; the cell is not barred or reserved and the cell is not part of a tracking area which is in the list of "forbidden tracking areas for roaming"; An acceptable cell is one for which the measured cell attributes satisfy the cell selection criteria and the cell is not barred.

On transition from an RRC connected state or RRC inactive state to an RRC idle state, a UE may camp on a cell as result of cell selection according to the frequency be assigned by RRC in the state transition message. The UE may attempt to find a suitable cell in the manner described for stored information or initial cell selection above. If no suitable cell is found on any frequency or RAT, the UE may attempt to find an acceptable cell. In multi-beam operations, the cell quality may be derived amongst the beams corresponding to the same cell.

A UE in an RRC idle may perform cell reselection. The principles of the procedure are the following. Cell reselection may be based on CD-SSBs located on the synchronization raster. The UE may make measurements of attributes of the serving and neighbor cells to enable the reselection process: For the search and measurement of inter-frequency neighbouring cells, the carrier frequencies need to be indicated. Cell reselection may identify the cell that the UE should camp on. The cell reselection may be based on cell reselection criteria which involves measurements of the serving and neighbor cells: intra-frequency reselection is based on ranking of cells; inter-frequency reselection is based on absolute priorities where a UE tries to camp on the highest priority frequency available; an neighbor cell list (NCL) may be provided by a serving cell to handle specific cases for intra- and inter-frequency neighbouring cells; Black lists may be provided to prevent the UE from reselecting to specific intra- and inter-frequency neighbouring cells; White lists may be provided to request the UE to reselect to only specific intra- and inter-frequency neighbouring cells; Cell reselection may be speed dependent; Service specific prioritization. In multi-beam operations, the cell quality may be derived amongst the beams corresponding to the same cell.

A UE may perform one of two procedures such as initial cell selection and cell selection by leveraging stored information. The UE may perform the initial cell selection when the UE does not have stored cell information for the selected PLMN. Otherwise, the UE may perform the cell selection by leveraging stored information. For initial cell selection, a UE may scan all RF channels in the (NR) frequency bands according to its capabilities to find a suitable cell. Based on results of the scan, the UE may search for the strongest cell on each frequency. The UE may select a cell which is a suitable cell. For the cell selection by leveraging stored information, the UE may require stored information of frequencies and optionally also information on cell parameters from previously received measurement control information elements or from previously detected cells. Based on the stored information, the UE may search a suitable cell and select the suitable cell if the UE found the suitable cell. If the UE does not find the suitable cell, the UE may perform the initial cell selection.

A base station may configure cell selection criteria for cell selection. A UE may seek to identify a suitable cell for the cell selection. The suitable cell is one for which satisfies following conditions: (1) the measured cell attributes satisfy the cell selection criteria, (2) the cell PLMN is the selected PLMN, registered or an equivalent PLMN, (3) the cell is not barred or reserved, and (4) the cell is not part of tracking area which is in the list of "forbidden tracking areas for roaming". An RRC layer in a UE may inform a NAS layer in the UE of cell selection and reselection result based on changes in received system information relevant for NAS. For example, the cell selection and reselection result may be a cell identity, tracking area code and a PLMN identity.

A UE-RRC layer may initiate an RRC connection establishment procedure, an RRC connection resume procedure, or an RRC connection re-establishment procedure. Based on initiating the RRC connection establishment procedure or the RRC connection resume procedure, the UE may perform one or more procedures where the one or more procedures comprise at least one of: performing a unified access control procedure (e.g., access barring check) for access attempt of the RRC establishment/resume procedure on a serving cell; applying default configurations parameters and configurations/parameters provided by SIB1, (e.g., based on the access attempt being allowed, applying default configurations and configurations/parameters provided by SIB1); performing sending a random access preamble to the serving cell, for example, based on the access attempt being allowed; sending an RRC request message to the serving cell (e.g., based on determining a reception of a random access response being successful, sending an RRC request message to the serving cell0; starting a timer based on sending the RRC request message; receiving an RRC response message or an RRC reject message from the serving cell (e.g., in response to the RRC request message); or sending an RRC complete message (e.g., in response to receiving the RRC response message, sending an RRC complete message). For the RRC connection re-establishment procedure, the UE may not perform the unified access procedure (e.g., access barring check) for access attempt of the RRC reestablishment procedure.

A base station (e.g., NG-RAN) may support overload and access control functionality such as RACH back off, RRC Connection Reject, RRC Connection Release and UE based access barring mechanisms. Unified access control framework applies to all UE states (e.g., an RRC idle, inactive and connected state). The base station may broadcast barring control information associated with access categories and access identities (in case of network sharing, the barring control information may be set individually for each PLMN). The UE may determine whether an access attempt is authorized based on the barring information broadcast for the selected PLMN, the selected access category and access identities for the access attempt. For NAS triggered requests, the UE-NAS layer may determine the access category and access identities. For AS triggered requests, the UE-RRC layer determines the access category while NAS determines the access identities. The base station may handle access attempts with establishment causes "emergency", "mps-priority access" and "mcs priority access" (e.g., emergency calls, MPS, MCS subscribers) with high priority and respond with RRC Reject to these access attempts only in extreme network load conditions that may threaten the base station stability.

Based on initiating the RRC connection establishment procedure or the RRC connection resume procedure, the UE in an RRC inactive or idle state may perform or initiate access barring check (or a unified access control procedure) for access attempt of the RRC connection establishment procedure or the RRC connection resume procedure. Based on the performing or initiating the access barring check, the UE may determine the access category and access identities for access attempt. The UE may determine the access attempt being barred based on at least one of: timer T309 is running for the access category for the access attempt; and timer T302 is running, and the Access Category is neither '2' nor '0'. The UE may determine the access attempt being allowed based on at least one of: the access Category is '0'; and system information block (system information block type 25) comprising unified access control (UAC) barring parameters is not broadcasted by a serving cell. The UE may determine the access attempt being barred based on at least one of: an establishment cause (e.g., for the access attempt) being other than emergency; access barring per RSRP parameter of the system information block comprising (or being set to) threshold 0 and the wireless device being in enhanced coverage; access barring per RSRP parameter of the system information block comprising (or being set to) threshold 1 and measured RSRP being less than a first entry in RSRP thresholds PRACH info list; the access barring per RSRP parameter of the system information block comprising (or being set to) threshold 2 and measured RSRP being less than a second entry in the RSRP thresholds PRACH info list; and the access barring per RSRP parameter of the system information block comprising (or being set to) threshold 3 and measured RSRP being less than a third entry in the RSRP thresholds PRACH info list.

The UE may determine the access attempt being allowed based on that system information block not comprising the UAC barring parameters for the access attempt. For example, the UE may determine the access attempt being allowed based on that system information block not comprising the UAC barring parameters for PLMN the UE selected and UAC barring parameters for common. The UE may determine the access attempt being allowed based on the UAC barring parameters for common not comprising the access category of the access attempt. The UAC barring parameters may comprise at least one of: UAC barring parameters per PLMN; and UAC barring parameters for common. The UE may perform access barring check for the access category of the access attempt based on the UAC barring parameters in the system information block. The UE may determine the access attempt being allowed based on corresponding bit of at least one of the access identities in the UAC barring parameters being zero. The UE may draw a first random number uniformly distributed in a range where the range is greater than equal to 0 and lower than 1.

The UE may determine the access attempt being allowed based on the first random number being lower than UAC barring factor in the UAC barring parameters. The UE may determine the access attempt being barred based on the first random number being greater than the UAC barring factor in the UAC barring parameters. In response to the determining the access attempt being barred, the UE may draw a second random number uniformly distributed in a range where the range is greater than equal to 0 and lower than 1. The UE may start barring timer T309 for the access category based on the second random number. When the barring timer T309 is running, the access attempt associated to the access category is barred (e.g., not allowed to transmit). Based on the barring timer T309 expiry, the UE may consider barring for the access category being alleviated. Based on the barring for the access category being alleviated, the UE may perform access barring check for the access category if the UE have access attempt for the access category.

Based on initiating the RRC connection reestablishment procedure, the UE may stop one or more barring timer T309 for all access categories if the one or more barring timer T309 is running. Based on stopping the one or more barring timer T309, the UE may determine barring for all access categories being alleviated. The UE may perform the RRC connection reestablishment procedure based on the barring for all access categories being alleviated. For example, the UE may send an RRC establishment request without barring based on the barring for all access categories being alleviated.

For initiating RRC connection establishment/resume/re-establishment procedure, the UE-RRC layer may use parameters in a received SIB1. The UE-RRC layer may use L1 parameter values and a time alignment timer in the SIB1. The UE-RRC layer may use UAC barring information in the SIB1 to perform the unified access control procedure. Based on the unified access control procedure, the UE-RRC layer may determine whether the access attempt of those RRC procedures is barred or allowed. Based on the determining the access attempt is allowed, the UE-RRC layer may determine send an RRC request message to a base station where the RRC request message may be an RRC setup request message, an RRC resume request message, or an RRC re-establishment message. The UE-NAS layer may or may not provide S-TMSI as a UE identity. The UE-RRC layer may set a UE identity in the RRC request message.

For the RRC setup request message, the UE in an RRC idle state may initiate an RRC connection establishment procedure. Based on initiating the RRC connection establishment procedure, the UE-RRC layer in an RRC idle state may set the UE identity to S-TMSI if the UE-NAS layer provides the S-TMSI. Otherwise, the UE-RRC layer in an RRC idle state may draw a 39-bit random value and set the UE identity to the random value. For the RRC resume request message, the UE-RRC layer in an RRC inactive or idle state may set the UE identity to resume identity stored. For the RRC reestablishment request message, the UE-RRC layer in an RRC connected state may set the UE identity to C-RNTI used in the source PCell. The UE-NAS layer may provide an establishment cause (e.g., UE-NAS layer). The UE-RRC layer may set the establishment cause for the RRC request message.

For the RRC resume request message, the UE in an RRC inactive may initiate an RRC connection resume procedure. the UE in an RRC idle state with a suspended RRC connection may initiate the RRC connection resume procedure. The UE may in an RRC inactive state or an RRC idle state may initiate the RRC connection procedure based on at least one of: resuming a (suspend) RRC connection; and performing/initiating UP small data transmission. Based on initiating the RRC connection resume procedure, the UE-RRC layer may restore stored configuration parameters and stored security keys from the stored UE inactive AS context. Based on the security keys, the UE-RRC layer in an RRC inactive or idle state may set a resume MAC-I value to the 16 least significant bits of the MAC-I calculated based on variable resume MAC input, security key of integrity protection for RRC layer in a UE inactive AS context, the previous configured integrity protection algorithm, and other security parameters (e.g., count, bearer, and direction). The variable resume MAC input may comprise at least one of: physical cell identity of a source cell; C-RNTI of the source cell; and cell identity of a target cell (e.g., a selected cell) where the cell identity is a cell identity in system information block (e.g., SIB1) of the target cell (e.g., the selected cell). Based on the security keys and next hop chaining count (NCC) value, the UE-RRC layer in an RRC inactive or idle state derive new security keys for integrity protection and ciphering, and configure lower layers (e.g., UE-PDCP layer) to apply them. The UE may have a stored NCC value and resume identity. The UE may receive an RRC release message with suspend indication (or suspend configuration parameters) where the RRC release message comprises at least one of: the resume identity; and the NCC value. The UE-RRC layer in an RRC inactive or idle state may re-establish PDCP entities for one or more bearers. The UE-RRC layer may resume one or more bearer. For example, based on resuming the RRC connection, the UE-RRC layer may resume SRB1. Based on performing the UP small data transmission, the UE-RRC layer may resume one or more SRB(s) and DRB(s). The UE-RRC layer in the RRC inactive or idle state may send an RRC resume request message to the base station where the RRC resume request message may comprise at least one of: the resume identity; the resume MAC-I; and resume cause.

For the RRC reestablishment request message, the UE in an RRC connected state may initiate an RRC connection reestablishment procedure. Based on initiating the RRC connection reestablishment procedure, the UE-RRC layer in an RRC connected state may contain the physical cell identity of the source PCell and a short MAC-I in the RRC reestablishment message. The UE-RRC layer in an RRC connected state may set the short MAC-I to the 16 east significant bits of the MAC-I calculated based on variable short MAC input, security key of integrity protection for RRC layer and the integrity protection algorithm, which was used in a source PCell or the PCell in which the trigger for the reestablishment occurred, and other security parameters (e.g., count, bearer and direction). The variable short MAC input may comprise at least one of: physical cell identity of the source cell; C-RNTI of a source cell; and cell identity of a target cell (e.g., a selected cell) where the cell identity is a cell identity in system information block (e.g., SIB1) of the target cell (e.g., the selected cell). The UE-RRC layer in an RRC connected state may re-establish PDCP entities and RLC entities for SRB1 and apply default SRB1 configuration parameters for SRB1. The UE-RRC layer in an RRC connected state may configure lower layers (e.g., PDCP layer) to suspend integrity protection and ciphering for SRB1 and resume SRB1.

A UE-RRC layer may send an RRC request message to lower layers (e.g., PDCP layer, RLC layer, MAC layer and/or PHY layer) for transmission where the RRC request message may be an RRC setup request message, an RRC resume request message, or an RRC re-establishment message.

A UE-RRC layer may receive an RRC setup message in response to an RRC resume request message or an RRC reestablishment request message. Based on the RRC setup message, the UE-RRC layer may discard any stored AS context, suspend configuration parameters and current AS security context. The UE-RRC layer may release radio resources for all established RBs except SRB0, including release of the RLC entities, of the associated PDCP entities and of SDAP. The UE-RRC layer may release the RRC configuration except for default L1 parameter values, default MAC cell group configuration and CCCH configuration. The UE-RRC layer may indicate to upper layers (e.g., NAS layer) fallback of the RRC connection. The UE-RRC layer may stop timer T380 if running where the timer T380 is periodic RAN-based Notification Area (RNA) update timer.

A UE-RRC layer may receive an RRC setup message in response to an RRC setup request message, an RRC resume request message or an RRC reestablishment request message. The RRC setup message may comprise a cell group configurations parameters and a radio bearer configuration parameter. The radio bearer configuration parameters may comprise at least one of signaling bearer configuration parameters, data radio bearer configuration parameters and/or security configuration parameters. The security configuration parameters may comprise security algorithm configuration parameters and key to use indication indicating whether the radio bearer configuration parameters are using master key or secondary key. The signaling radio bearer configuration parameters may comprise one or more signaling radio bearer configuration parameters. Each signaling radio configuration parameters may comprise at least one of SRB identity, PDCP configuration parameters, reestablish PDCP indication and/or discard PDCP indication. The data radio bearer configuration parameters may comprise one or more data radio bearer configuration parameters. Each data radio configuration parameters may comprise at least one of DRB identity, PDCP configuration parameters, SDAP configuration parameters, reestablish PDCP indication and/or recover PDCP indication. The radio bearer configuration in the RRC setup message may comprise signaling radio configuration parameters for SIB1. Based on the RRC setup message, the UE-RRC layer may establish SRB1. Based on the RRC setup message, the UE-RRC layer may perform a cell group configuration or radio bearer configuration. The UE-RRC layer may stop a barring timer and wait timer for the cell sending the RRC setup message. Based on receiving the RRC setup message, the UE-RRC layer may perform one or more of the following: transitioning to RRC connected state; stopping a cell re-selection procedure; considering the current cell sending the RRC setup message to be the PCell; or/and sending an RRC setup complete message by setting the content of the RRC setup complete message.

A UE-RRC layer may receive an RRC resume message in response to an RRC resume request message.

Based on the RRC resume message, the UE-RRC layer may discard a UE inactive AS context and release a suspend configuration parameters except RNA notification area information. The RRC resume message may comprise at least one of: radio bearer configuration parameters; cell group configuration parameters; measurement configuration parameters; sk counter for AS security; an first indication to request idle/inactive measurement results; an second indication to restore secondary cells (SCells) of master cell group (MCG); a third indication to restore secondary cell group (SCG); and SCG configuration parameters; Based on the RRC resume message, the UE-RRC layer may perform a procedure to configure or restore configuration parameters (e.g., a cell group configuration, a radio bearer configuration and/or SCG configuration); security key update procedure; and/or measurement (configuration) procedure. Based on receiving the RRC resume message, the UE-RRC layer may perform one or more of the following: indicating upper layers (e.g., NAS layer) that the suspended RRC connection has been resumed; resuming SRB2, all DRBs and measurements; entering RRC connected state; stopping a cell re-selection procedure; considering the current cell sending the RRC resume message to be the PCell; or/and sending an RRC resume complete message by setting the content of the RRC resume complete message.

Cell group configuration parameters may be used to configure a master cell group (MCG) or secondary cell group (SCG). If the cell group configuration parameters are used to configure the MCG, the cell group configuration parameters are master cell group configuration parameters. If the cell group configuration parameters are used to configure the SCG, the cell group configuration parameters are secondary cell group configuration parameters. A cell group comprises of one MAC entity, a set of logical channels with associated RLC entities and of a primary cell (SpCell) and one or more secondary cells (SCells). The cell group configuration parameters (e.g., master cell group configuration parameters or secondary cell group configuration parameters) may comprise at least one of RLC bearer configuration parameters for the cell group, MAC cell group configuration parameters for the cell group, physical cell group configuration parameters for the cell group, SpCell configuration parameters for the cell group or SCell configuration parameters for the cell group. The MAC cell group configuration parameters may comprise MAC parameters for a cell group where the MAC parameters may comprise at least DRX parameters. The physical cell group configuration parameters may comprise cell group specific L1 (layer 1) parameters.

The special cell (SpCell) may comprise a primary cell (PCell) of an MCG or a primary SCG cell (PSCell) of a SCG. The SpCell configuration parameters may comprise serving cell specific MAC and PHY parameters for a SpCell. The MR-DC configuration parameters may comprise at least one of SRB3 configuration parameters, measurement configuration parameter for SCG, SCG configuration parameters.

Cell group configuration parameters may comprise at least one of RLC bearer configuration parameters, MAC cell group configuration parameters, physical cell group configuration parameters, SpCell configuration parameters for the first cell group or SCell configuration parameters for other cells of the second base station. The SpCell configuration parameter may comprise at least one of radio link failure timer and constraints, radio link monitoring in sync out of sync threshold, and/or serving cell configuration parameters of the first cell. The serving cell configuration parameters may comprise at least one of: downlink BWP configuration parameters; uplink configuration parameters; uplink configuration parameters for supplement uplink carrier (SUL); PDCCH parameters applicable across for all BWPs of a serving cell; PDSCH parameters applicable across for all BWPs of a serving cell; CSI measurement configuration parameters; SCell deactivation timer; cross carrier scheduling configuration parameters for a serving cell; timing advance group (TAG) identity (ID) of a serving cell; path loss reference linking indicating whether the UE shall apply as pathloss reference either the downlink of SpCell or SCell for this uplink; serving cell measurement configuration parameters; channel access configuration parameters for access procedures of operation with shared spectrum channel access;

The CSI measurement configuration parameters may be to configure CSI-RS (reference signals) belonging to the serving cell, channel state information report to configure CSI-RS (reference signals) belonging to the serving cell and channel state information reports on PUSCH triggered by DCI received on the serving cell.

In an example, the downlink BWP configuration parameters may be used to configure dedicated (UE specific) parameters of one or more downlink BWPs. The one or more downlink BWPs may comprise at least one of an initial downlink BWP, a default downlink BWP and a first active downlink BWP. The downlink BWP configuration parameters may comprise at least one of: configuration parameters for the one or more downlink BWPs; one or more downlink BWP IDs for the one or more downlink BWPs; and BWP inactivity timer. The configuration parameters for a downlink BWP may comprise at least one of: PDCCH configuration parameters for the downlink BWP; PDSCH configuration parameters for the downlink BWP; semi-persistent scheduling (SPS) configuration parameters for the downlink BWP; beam failure recovery SCell configuration parameters of candidate RS; and/or radio link monitoring configuration parameters for detecting cell- and beam radio link failure occasions for the downlink BWP. The one or more downlink BWP IDs may comprise at least one of an initial downlink BWP ID, a default downlink BWP identity (ID) and a first active downlink BWP ID.

In an example, the uplink configuration parameters may be uplink configuration parameters for normal uplink carrier (not supplementary uplink carrier). The uplink configuration parameters (or the uplink configuration parameters for SUL) may be used to configure dedicated (UE specific) parameters of one or more uplink BWPs. The one or more uplink BWPs may comprise at least one of an initial uplink BWP and a first active uplink BWP. The uplink BWP configuration parameters may comprise at least one of: configuration parameters for the one or more uplink BWPs; one or more uplink BWP IDs for the one or more uplink BWPs; PUSCH parameters common across the UE's BWPs of a serving cell; SRS carrier switching information; and power control configuration parameters. The configuration parameters for a uplink BWP may comprise at least one of: one or more PUCCH configuration parameters for the uplink BWP; PUSCH configuration parameters for the uplink BWP; one or more configured uplink grant configuration parameters for the uplink BWP; SRS configuration parameters for the uplink BWP; beam failure recovery configuration parameters for the uplink BWP; and/or cyclic prefix (CP) extension parameters for the uplink BWP.

The one or more uplink BWP IDs may comprise at least one of an initial uplink BWP ID (e.g., the initial uplink BWP ID=0) and/or an first active uplink BWP ID. The SRS carrier switching information may be is used to configure for SRS carrier switching when PUSCH is not configured and independent SRS power control from that of PUSCH. The power control configuration parameters may comprise at least one of power control configuration parameters for PUSCH, power configuration control parameters for PUCCH and power control parameters for SRS.

A UE-RRC layer in an RRC inactive or idle state may receive an RRC reject message in response to an RRC setup request message or an RRC resume request message. The RRC reject message may contain wait timer. Based on the wait timer, the UE-RRC layer may start timer T302, with the timer value set to the wait timer. Based on the RRC reject message, the UE-RRC layer may inform upper layers (e.g., UE-NAS layer) about the failure to setup an RRC connection or resume an RRC connection. The UE-RRC layer may reset MAC and release the default MAC cell group configuration. Based on the RRC Reject received in response to a request from upper layers, the UE-RRC layer may inform the upper layer (e.g., NAS layer) that access barring is applicable for all access categories except categories '0' and '2'.

A UE-RRC layer in an RRC inactive or idle state may receive an RRC reject message in response to an RRC resume request message. Based on the RRC reject message, The UE-RRC layer may discard current security keys. The UE-RRC layer may re-suspend the RRC connection. The UE-RRC layer may set pending rna update value to true if resume is triggered due to an RNA update.

A UE-RRC layer in an RRC inactive or idle state may perform a cell (re) selection procedure while performing an RRC procedure to establish an RRC connection. Based on cell selection or cell reselection, the UE-RRC layer may change a cell on the UE camped and stop the RRC procedure. The UE-RRC layer may inform upper layers (e.g., NAS layer) about the failure of the RRC procedure.

A UE in an RRC connected state may detect a failure of a connection with a base station. The UE in the RRC connected state may activate AS security with the base station before the detecting the failure. The failure comprises at least one of: a radio link failure (RLF); a reconfiguration with sync failure; a mobility failure from new radio (NR); an integrity check failure indication from lower layers (e.g., PDCP layer) concerning signaling radio bearer 1 (SRB1) or signaling radio bearer 2 (SRB2); or an RRC connection reconfiguration failure.

The radio link failure may be a radio link failure of a primary cell of the base station. The base station may send a reconfiguration with sync in an RRC message to the UE in RRC connected state. The reconfiguration with sync may comprise a reconfiguration timer (e.g., T304). Based on receiving the reconfiguration sync, the UE may start the reconfiguration timer and perform the reconfiguration with sync (e.g., handover). Based on expiry of the reconfiguration timer, the UE determine the reconfiguration sync failure. A base station may send mobility from NR command message to the UE in RRC connected state. Based on receiving the mobility from NR command message, the UE may perform to handover from NR to a cell using other RAT (e.g., E-UTRA). The UE may determine the mobility failure from NR based on at least one of conditions being met: if the UE does not succeed in establishing the connection to the target radio access technology; or if the UE is unable to comply with any part of the configuration included in the mobility from NR command message; or if there is a protocol error in the inter RAT information included in the mobility from NR message.

Based on detecting the failure, the UE in the RRC connected state may initiate an RRC connection reestablishment procedure. Based on initiating the RRC connection reestablishment procedure, the UE may start a timer T311, suspend all radio bearers except for SRB0, reset MAC (layer). Based on initiating the RRC connection reestablishment procedure, the UE in the RRC connected state may release MCG SCells, release special cell (SpCell) configuration parameters and multi-radio dual connectivity (MR-DC) related configuration parameters. For example, based on initiating the RRC connection reestablishment procedure, the UE may release master cell group configuration parameters.

Based on initiating the RRC connection reestablishment procedure, the UE in the RRC connected state may perform a cell selection procedure. Based on the cell selection procedure, the UE may select a cell based on a signal quality of the cell exceeding a threshold. The UE in the RRC connected state may select a cell based on a signal quality of the cell exceeding a threshold. The UE may determine, based on a cell selection procedure, the selected cell exceeding the threshold. The signal quality comprises at least one of: a reference signal received power; a received signal strength indicator; a reference signal received quality; or a signal to interference plus noise ratio.

Based on selecting a suitable cell, the UE in the RRC connected state may stop the timer 311 and start a timer T301. Based on selecting the suitable cell, the UE in the RRC connected state may stop a barring timer T390 for all access categories. Based on stopping the barring timer T390, the UE in the RRC connected state may consider a barring for all access category to be alleviated for the cell. Based on selecting the cell, the UE in the RRC connected state may apply the default L1 parameter values except for the parameters provided in SIB1, apply the default MAC cell group configuration, apply the CCCH configuration, apply a timer alignment timer in SIB1 and initiate transmission of the RRC reestablishment request message.

The UE in the RRC connected state may stop the timer T301 based on reception of an RRC response message in response of the RRC reestablishment request message. The RRC response message may comprise at least one of RRC reestablishment message or RRC setup message or RRC reestablishment reject message. The UE in the RRC connected state may stop the timer T301 when the selected cell becomes unsuitable.

Based on the cell selection procedure triggered by initiating the RRC connection reestablishment procedure, the UE in the RRC connected state may select an inter-RAT cell. Based on selecting an inter-RAT cell, the UE (UE-AS layer) in the RRC connected state may transition to RRC IDLE state and may provide a release cause 'RRC connection failure' to upper layers (UE-NAS layer) of the UE.

Based on initiating the transmission of the RRC reestablishment request message, the UE in the RRC connected state may send the RRC reestablishment request message. The RRC reestablishment request message may comprise at least one of C-RNTI used in the source PCell, a physical cell identity (PCI) of the source PCell, short MAC-I or a reestablishment cause. The reestablishment cause may comprise at least one of reconfiguration failure, handover failure or other failure.

Based on initiating the transmission of the RRC reestablishment request message, the UE (RRC layer) in the RRC connected state may re-establish PDCP for SRB1, re-establish RLC for SRB1, apply default SRB configurations for SRB1, configure lower layers (PDCP layer) to suspend integrity protection and ciphering for SRB1, resume SRB1 and submit the RRC reestablishment request message to lower layers (PDCP layer) for transmission. Based on submitting the RRC reestablishment request message to lower layers, the UE in the RRC connected state may send the RRC reestablishment request message to a target base station via the cell selected based on the cell selection procedure wherein the target base station may or may not be the source base station.

Based on expiry of the timer T311 or T301, the UE (UE-AS layer) may transition to an RRC idle state and may provide a release cause 'RRC connection failure' to upper layers (UE-NAS layer) of the UE.

Based on receiving the release cause 'RRC connection failure', the UE (UE-NAS layer) in the RRC idle state may perform a NAS signaling connection recovery procedure when the UE does not have signaling pending and user data pending. Based on performing the NAS signaling connection recovery procedure, the UE in the RRC idle state may initiate the registration procedure by sending a registration request message to the AMF.

Based on receiving the release cause 'RRC connection failure', the UE (UE-NAS layer) in the RRC idle state may perform a service request procedure by sending a service request message to the AMF when the UE has signaling pending or user data pending.

Based on receiving the RRC reestablishment request message, the target base station may check whether the UE context of the UE is locally available. Based on the UE context being not locally available, the target base station may perform a retrieve UE context procedure by sending a retrieve UE context request message to the source base station (the last serving base station) of the UE.

For RRC connection reestablishment procedure, the retrieve UE context request message may comprise at least one of: a UE context ID; integrity protection parameters; or a new cell identifier. The UE context ID may comprise at least one of: C-RNTI contained the RRC reestablishment request message; and a PCI of the source PCell (the last serving PCell). The integrity protection parameters for the RRC reestablishment procedure may be the short MAC-I. The new cell identifier may be an identifier of the target cell where the target cell is a cell where the RRC connection has been requested to be re-established. The new cell identifier is a cell identity in system information block (e.g., SIB1) of the target cell (e.g., the selected cell).

For the RRC connection reestablishment procedure, based on receiving the retrieve UE context request message, the source base station may check the retrieve UE context request message. If the source base station is able to identify the UE context by means of the UE context ID, and to successfully verify the UE by means of the integrity protection contained in the retrieve UE context request message, and decides to provide the UE context to the target base station, the source base station may respond to the target base station with a retrieve UE context response message. If the source base station is not able to identify the UE context by means of the UE context ID, or if the integrity protection contained in the retrieve UE context request message is not valid, the source base station may respond to the target base station with a retrieve UE context failure message.

For the RRC connection reestablishment procedure, the retrieve UE context response message may comprise at least one of Xn application protocol (XnAP) ID of the target base station, XnAP ID of the source base station, globally unique AMF identifier (GUAMI) or UE context information (e.g., UE context information retrieve UE context response). The UE context information may comprise at least one of a NG-C UE associated signaling reference, UE security capabilities, AS security information, UE aggregate maximum bit rate, PDU session to be setup list, RRC context, mobility restriction list or index to RAT/frequency selection priority. The NG-C UE associated signaling reference may be a NG application protocol ID allocated at the AMF of the UE on the NG-C connection with the source base station. The AS security information may comprise a security key of a base station (KgNB) and next hop chaining count (NCC) value. The PDU session to be setup list may comprise PDU session resource related information used at UE context in the source base station. The PDU session resource related information may comprise a PDU session ID, a PDU session resource aggregate maximum bitrate, a security indication, a PDU session type or QoS flows to be setup list. The security indication may comprise a user plane integrity protection indication and confidentiality protection indication which indicates the requirements on user plane (UP) integrity protection and ciphering for the corresponding PDU session, respectively. The security indication may also comprise at least one of an indication whether UP integrity protection is applied for the PDU session, an indication whether UP ciphering is applied for the PDU session, and the maximum integrity protected data rate values (uplink and downlink)

per UE for integrity protected DRBs. The PDU session type may indicate at least one of internet protocol version 4 (IPv4), IPV6, IPv4v6, ethernet or unstructured. The QoS flow to be setup list may comprise at least one of QoS flow identifier, QoS flow level QoS parameters (the QoS Parameters to be applied to a QoS flow) or bearer identity.

For the RRC connection reestablishment procedure, the retrieve UE context failure message may comprise at least XnAP ID of the target base station and a cause value.

For the RRC connection reestablishment procedure, based on receiving the retrieve UE context response message, the target base station may send an RRC reestablishment message to the UE. The RRC reestablishment message may comprise at least a network hop chaining count (NCC) value.

Based on receiving the RRC reestablishment message, the UE may derive a new security key of a base station ($K_{gNB}$) based on at least one of current $K_{gNB}$ or next hop (NH) parameters associated to the NCC value. Based on the new security key of the base station and a previously configured integrity protection algorithm, the UE may derive a security key for integrity protection of an RRC signaling ($K_{RRCint}$) and a security key for integrity protection of user plane (UP) data ($K_{UPInt}$). Based on the new security key of the base station and a previously configured ciphering algorithm, the UE may derive a security key for ciphering of an RRC signaling ($K_{RRCenc}$) and a security key for ciphering of user plane (UP) data ($K_{UPenc}$). Based on the $K_{RRCint}$, and the previously configured integrity protection algorithm, the UE may verify the integrity protection of the RRC reestablishment message. Based on the verifying being failed, the UE (UE-AS layer) may go to RRC IDLE state and may provide a release cause 'RRC connection failure' to upper layers (UE-NAS layer) of the UE. Based on the verifying being successful, the UE may configure to resume integrity protection for SRB1 based on the previously configured integrity protection algorithm and the $K_{RRCint}$ and configure to resume ciphering for SRB1 based on the previously configured ciphering algorithm and $K_{RRCenc}$. The UE may send an RRC reestablishment complete message to the target base station.

Based on receiving the retrieve UE context failure message, the target base station may send an RRC release message to the UE. For example, based on the retrieve UE context failure message comprising the RRC release message, the target base station may send the RRC release message to the UE. Based on receiving the retrieve UE context failure message, the target base station may send an RRC setup message or an RRC reject message. Based on receiving the retrieve UE context failure message, the target base station may not send any response message to the UE.

Figure 17:
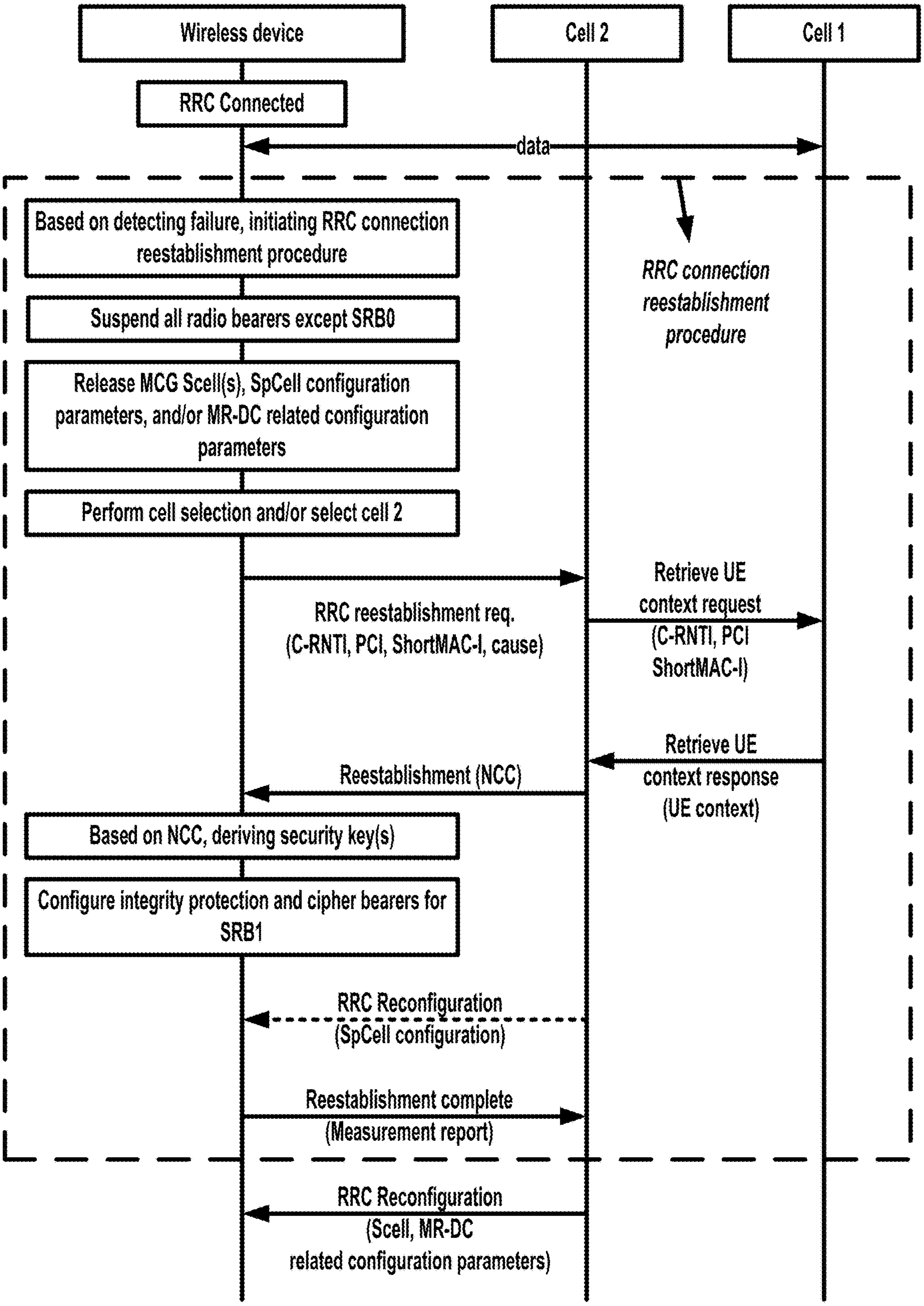
FIG. 17 illustrates an example of an RRC connection reestablishment procedure.

FIG. 17 illustrates an example of an RRC connection reestablishment procedure. The UE in an RRC connected state may send and receive data to/from a first base station (for example, a source base station) via cells where the cells comprise a primary cell (PCell) of the first base station. The UE may detect a failure of a connection with the first base station. Based on the failure, the UE may initiate the RRC reestablishment procedure.

In an example of the FIG. 17, based on initiating the RRC connection reestablishment procedure, the UE may start a timer T311, suspend all radio bearers except for SRB0, and/or reset a MAC (layer). Based on initiating the RRC connection reestablishment procedure, the UE may release MCG SCells, release the special cell (SpCell) configuration parameters and the multi-radio dual connectivity (MR-DC) related configuration parameters. Based on initiating the RRC connection reestablishment procedure, the UE may perform a cell selection procedure. Based on the cell selection procedure, the UE may select a cell 2 of a second base station (for example, a target base station) where the cell 2 is a suitable cell. Based on selecting a suitable cell, the UE may stop the timer T311 and start a timer T301. Based on selecting the suitable cell, the UE may stop one or more barring timer T309(*s*) for all access categories if the one or more barring timer T309(*s*) is running. Based on stopping the one or more barring timer T309(*s*), the UE may consider barring for all access category to be alleviated for the cell. Based on selecting the cell, the UE may apply the default L1 parameter values except for the parameters provided in SIB1, apply the default MAC cell group configuration, apply the CCCH configuration, apply a timer alignment timer in SIB1 and initiate transmission of the RRC reestablishment request message.

In an example of the FIG. 17, the RRC reestablishment message may comprise at least one of C-RNTI used in the source PCell (e.g., the cell 1), a physical cell identity (PCI) of the source PCell, short MAC-I or a reestablishment cause. Based on initiating the transmission of the RRC reestablishment request message, the UE (RRC layer) may re-establish PDCP for SRB1, re-establish RLC for SRB1, apply default SRB configurations for SRB1, configure lower layers (PDCP layer) to suspend integrity protection and ciphering for SRB1, resume SRB1 and submit the RRC reestablishment request message to lower layers (PDCP layer) for transmission. Based on initiating the transmission of the RRC reestablishment request message, the UE may send the RRC reestablishment request message to the second base station via the cell 2.

In an example of the FIG. 17, based on receiving the RRC reestablishment request message, the second base station may check whether the UE context of the UE is locally available. Based on the UE context being not locally available, the second base station may perform the retrieve UE context procedure by sending a retrieve UE context request message to the source base station of the UE. the retrieve UE context request message may comprise at least one of: a UE context ID; integrity protection parameters; or a new cell identifier. The UE context ID may comprise at least one of: C-RNTI contained the RRC reestablishment request message; and a PCI of the source PCell (the last serving PCell). The integrity protection parameters for the RRC reestablishment procedure may be the short MAC-I. The new cell identifier may be an identifier of the target cell where the target cell is a cell where the RRC connection has been requested to be re-established. The new cell identifier is a cell identity in system information block (e.g., SIB1) of the target cell (e.g., the selected cell).

In an example of the FIG. 17, based on receiving the retrieve UE context request message, the source base station may check the retrieve UE context request message. If the source base station successfully identifies the UE context by means of the C-RNTI, and to successfully verify the UE by means of the short MAC-I, and decides to provide the UE context to the second base station, the source base station may respond to the second base station with a retrieve UE context response message. The retrieve UE context response message may comprise at least of GUAMI or the UE context information. Based on receiving the retrieve UE context response message, the second base station may send an RRC reestablishment message to the UE. The RRC reestablishment message may comprise a network hop chaining count (NCC) value.

In an example of the FIG. 17, based on receiving the RRC reestablishment message, the UE may derive a new security key of a base station ($K_{gNB}$) based on at least one of current $K_{gNB}$ or next hop (NH) parameters associated to the NCC value. Based on the new security key of a base station ($K_{gNB}$) and the previously configured security algorithms, the UE may derive security keys for integrity protection and ciphering of RRC signaling (e.g., $K_{RRCint}$ and $K_{RRCenc}$ respectively) and user plane (UP) data (e.g., $K_{UPInt}$ and $K_{UPenc}$ respectively). Based on the security key for integrity protection of the RRC signaling ($K_{RRCint}$), the UE may verify the integrity protection of the RRC reestablishment message. Based on the verifying being successful, the UE may configure to resume integrity protection for one or more bearers (e.g., signalling radio bearer or an RRC message) based on the previously configured integrity protection algorithm and the $K_{RRCint}$ and configure to resume ciphering for one or more bearers based on the previously configured ciphering algorithm and the $K_{RRCenc}$.

In an example of the FIG. 17, the second base station may send a first RRC reconfiguration message. The RRC first reconfiguration message may comprise the SpCell configuration parameters. Based on receiving the SpCell configuration parameters, the UE may initiate transmission and reception of data to/from the second base station. The UE may send an RRC reestablishment complete message to the second base station. The RRC reestablishment complete message may comprise measurement report. Based on receiving the measurement report, the second base station may determine to configure SCells and/or secondary cell groups (e.g., SCG or PSCells). Based on the determining, the second base station may send a second RRC reconfiguration message comprising SCell configuration parameters and/or MR-DC related configuration parameters. Based receiving the second RRC reconfiguration message, the UE may transmit and receive data via the SCells and/or SCGs.

In an example of the FIG. 17, the RRC reconfiguration message may comprise at least one of cell group configuration parameters of MCG and/or SCG, radio bearer configuration parameters or AS security key parameters.

A base station may initiate an RRC connection release procedure to transit an RRC state of a UE from RRC connected state to RRC idle state, from an RRC connected state to RRC inactive state, from RRC inactive state back to RRC inactive state when the UE tries to resume, or from RRC inactive state to RRC idle state when the UE tries to resume. The RRC connection procedure may also be used to release an RRC connection of the UE and redirect a UE to another frequency. The base station may send to a UE the RRC release message comprising suspend configuration parameters. Based on the RRC release message, the UE may suspend an RRC connection. The UE may transition an RRC state of the UE to and RRC inactive state or an RRC idle state. The suspend configuration parameters may comprise at least one of a resume identity, RNA configuration, RAN paging cycle, or network hop chaining count (NCC) value where the RNA configuration may comprise RNA notification area information, or periodic RNA update timer value (e.g., T380 value). The base station may use the resume identity (e.g., inactive-RNTI (I-RNTI) to identify the UE context when the UE is in RRC inactive state.

If the base station has a fresh and unused pair of {NCC, next hop (NH)}, the base station may include the NCC in the suspend configuration parameters. Otherwise, the base station may include the same NCC associated with the current $K_{gNB}$ in the suspend configuration parameters. The NCC is used for AS security. The base station may delete the current AS keys (e.g., $K_{RRCenc}$, $K_{UPenc}$), and $K_{UPint}$ after sending the RRC release message comprising the suspend configuration parameters to the UE but may keep the current AS key $K_{RRCint}$. If the sent NCC value is fresh and belongs to an unused pair of {NCC, NH}, the base station may save the pair of {NCC, NH} in the current UE AS security context and may delete the current AS key $K_{gNB}$. If the sent NCC value is equal to the NCC value associated with the current $K_{gNB}$, the base station may keep the current AS key $K_{gNB}$ and NCC. The base station may store the sent resume identity together with the current UE context including the remainder of the AS security context.

Upon receiving the RRC release message comprising the suspend configuration parameters from the base station, the UE may verify that the integrity of the received RRC release message comprising the suspend configuration parameters is correct by checking PDCP MAC-I. If this verification is successful, then the UE may take the received NCC value and save it as stored NCC with the current UE context. The UE may delete the current AS keys $K_{RRCenc}$, $K_{UPenc}$, and $K_{UPint}$, but keep the current AS key $K_{RRCint}$ key. If the stored NCC value is different from the NCC value associated with the current $K_{gNB}$, the UE may delete the current AS key $K_{gNB}$. If the stored NCC is equal to the NCC value associated with the current $K_{gNB}$, the UE shall keep the current AS key KgNB. The UE may store the received resume identity together with the current UE context including the remainder of the AS security context, for the next state transition.

Based on receiving the RRC release message comprising the suspend configuration parameters, the UE may reset MAC, release the default MAC cell group configuration, re-establish RLC entities for one or more bearers. Based on receiving the RRC release message comprising suspend configuration parameters, the UE may store in the UE inactive AS context current configuration parameters and current security keys. For example, the UE may store some of the current configuration parameters. The stored current configuration parameters may comprise a robust header compression (ROHC) state, quality of service (QoS) flow to DRB mapping rules, the C-RNTI used in the source PCell, the global cell identity and the physical cell identity of the source PCell, and all other parameters configured except for the ones within reconfiguration with sync and serving cell configuration common parameters in SIB. The stored security keys may comprise at least one of $K_{gNB}$ and $K_{RRCint}$. The serving cell configuration common parameters in SIB may be used to configure cell specific parameters of a UE's serving cell in SIB1. Based on receiving the RRC release message comprising the suspend configuration parameters, the UE may suspend all SRB(s) and DRB(s) except for SRB0. Based on receiving the RRC release message comprising suspend configuration parameters, the UE may start a timer T380, enter RRC inactive state, perform cell selection procedure.

The UE in RRC inactive state may initiate an RRC connection resume procedure. For example, based on having data or signaling to transmit, or receiving RAN paging message, the UE in RRC inactive state may initiate the RRC connection resume procedure. Based on initiating the RRC connection resume procedure, the UE may select access category based on triggering condition of the RRC connection resume procedure and perform unified access control procedure based on the access category. Based on the unified access control procedure, the UE may consider access attempt for the RRC connection resume procedure as allowed. Based on considering the access attempt as allowed, the UE may apply the default L1 parameter values as specified in corresponding physical layer specifications, except for the parameters for which values are provided in SIB1, apply the default SRB1 configuration, apply the CCCH configuration, apply the time alignment timer common included in SIB1, apply the default MAC cell group configuration, start a timer T319 and initiate transmission of an RRC resume request message.

Based on initiating the transmission of the RRC resume request message, the UE may set the contents of the RRC resume request message. The RRC resume request message may comprise at least one of resume identity, resume MAC-I or resume cause. The resume cause may comprise at least one of emergency, high priority access, mt access, mo signalling, mo data, mo voice call, mo sms, ran update, mps priority access, mcs priority access.

Based on initiating the transmission of the RRC resume request message, the UE may restore the stored configuration parameters and the stored security keys from the (stored) UE inactive AS context except for the master cell group configuration parameters, MR-DC related configuration parameters (e.g., secondary cell group configuration parameters) and PDCP configuration parameters. The configuration parameter may comprise at least one of the C-RNTI used in the source PCell, the global cell identity and the physical cell identity of the source PCell, and all other parameters configured except for the ones within reconfiguration with sync and serving cell configuration common parameters in SIB. Based on current (restored) $K_{gNB}$ or next hop (NH) parameters associated to the stored NCC value, the UE may derive a new key of a base station ($K_{gNB}$). Based on the new key of the base station, the UE may derive security keys for integrity protection and ciphering of RRC signalling (e.g., $K_{RRCenc}$ and $K_{RRCint}$ respectively) and security keys for integrity protection and ciphering of user plane data (e.g., $K_{UPint}$ and the $K_{UPenc}$ respectively). Based on configured algorithm and the $K_{RRCint}$ and $K_{UPint}$, the UE may configure lower layers (e.g., PDCP layer) to apply integrity protection for all radio bearers except SRB0. Based on configured algorithm and the $K_{RRCenc}$ and the $K_{UPenc}$, the UE may configure lower layers (e.g., PDCP layer) to apply ciphering for all radio bearers except SRB0.

Based on initiating the transmission of the RRC resume request message, the UE may re-establish PDCP entities for one or more bearers, resume the one or more bearers and submit the RRC resume request message to lower layers where the lower layers may comprise at least one of PDCP layer, RLC layer, MAC layer or physical (PHY) layer.

A target base station may receive the RRC resume request message. Based on receiving the RRC resume request message, the target base station may check whether the UE context of the UE is locally available. Based on the UE context being not locally available, the target base station may perform the retrieve UE context procedure by sending the retrieve UE context request message to the source base station (the last serving base station) of the UE. The retrieve UE context request message may comprise at least one of a UE context ID, integrity protection parameters, a new cell identifier or the resume cause where the resume cause is in the RRC resume request message.

For the RRC connection resume procedure, based on receiving the retrieve UE context request message, the source base station may check the retrieve UE context request message. If the source base station is able to identify the UE context by means of the UE context ID, and to successfully verify the UE by means of the integrity protection contained in the retrieve UE context request message and decides to provide the UE context to the target base station, the source base station may respond to the target base station with the retrieve UE context response message. If the source base station is not able to identify the UE context by means of the UE context ID, or if the integrity protection contained in the retrieve UE context request message is not valid, or, if the source base station decides not to provide the UE context to the target base station, the source base station may respond to the target base station with a retrieve UE context failure message.

For the RRC connection resume procedure, the retrieve UE context failure message may comprise at least XnAP ID of the target base station, an RRC release message or a cause value.

For the RRC connection resume procedure, based on receiving the retrieve UE context response message, the target base station may send an RRC resume message to the UE. The RRC resume message may comprise at least one of radio bearer configuration parameters, cell group configuration parameters for MCG and/or SCG, measurement configuration parameters or sk counter where the sk counter is used to derive a security key of secondary base station based on $K_{gNB}$.

Based on receiving the retrieve UE context failure message, the target base station may send an RRC release message to the UE. For example, based on the retrieve UE context failure message comprising the RRC release message, the target base station may send the RRC release message to the UE. Based on receiving the retrieve UE context failure message, the target base station may send an RRC setup message or an RRC reject message. Based on receiving the retrieve UE context failure message, the target base station may not send any response message to the UE.

Based on receiving the RRC resume message, the UE may stop the timer T319 and T380. Based on receiving the RRC resume message, the UE may restore mater cell group configuration parameters, secondary cell group configuration parameters and PDCP configuration parameters in the UE inactive AS context. Based on restoring the master cell group configuration parameter and/or the secondary cell group configuration parameters, the UE may configure SCells of MCG and/or SCG by configuring lower layers to consider the restored MCG and/or SCG SCells to be in deactivated state, discard the UE inactive AS context and release the suspend configuration parameters.

Based on receiving the cell group configuration parameters in the RRC resume message, the UE may perform cell group configuration of MCG and/or SCG. Based on receiving the radio bearer configuration parameters in the RRC resume message, the UE may perform radio bearer configuration. Based on the sk counter in the RRC resume message, the UE may perform to update the security key of secondary base station.

A UE may remain in CM-CONNECTED and move within an area configured by the base station without notifying the base station when the UE is in RRC inactive state where the area is an RNA. In RRC inactive state, a last serving base station may keep the UE context and the UE-associated NG connection with the serving AMF and UPF. Based on received downlink data from the UPF or downlink UE-associated signaling from the AMF while the UE is in RRC inactive state, the last serving base station may page in the cells corresponding to the RNA and may send RAN Paging via an Xn interface to neighbor base station(s) if the RNA includes cells of neighbor base station(s).

Figure 18:
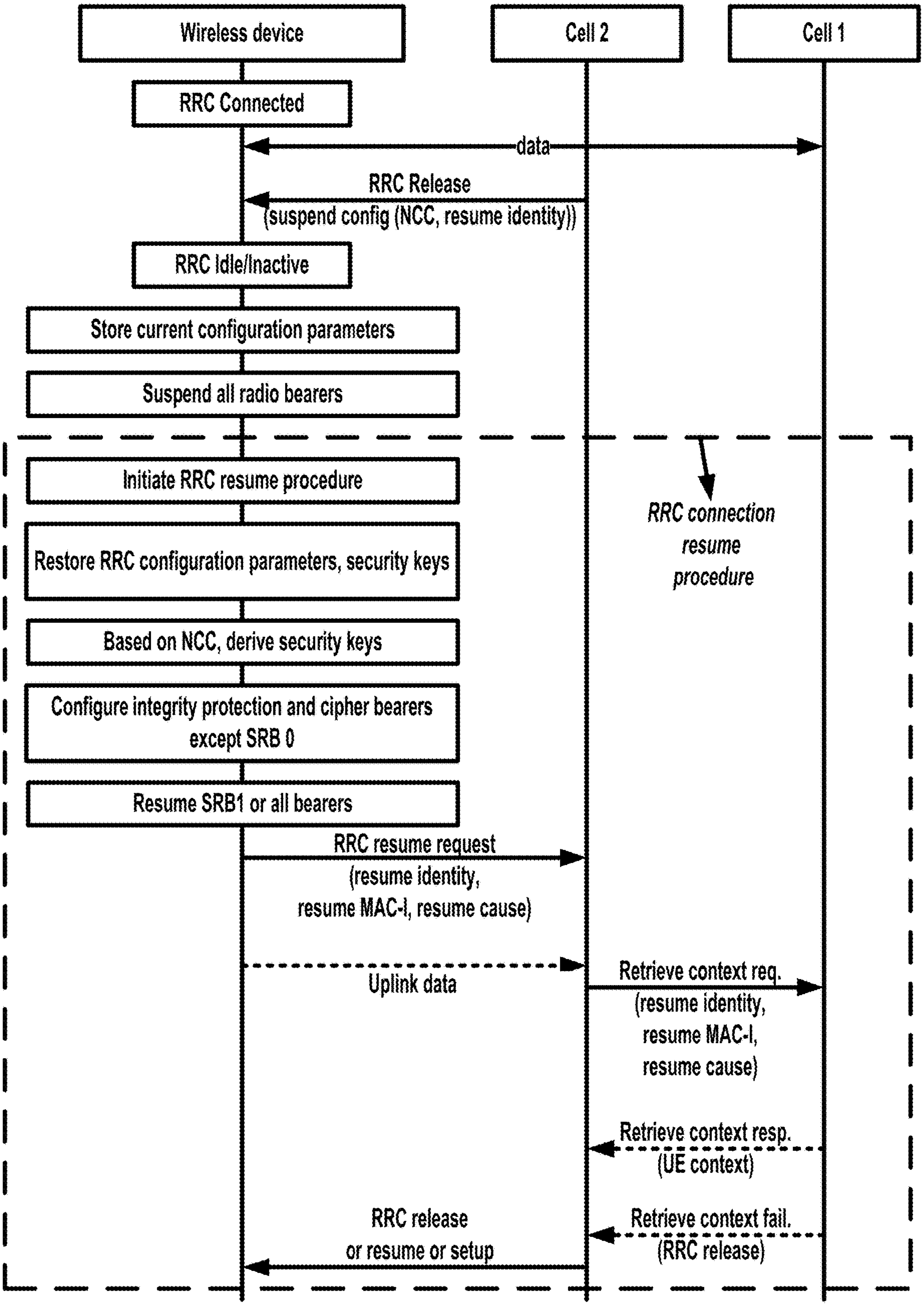
FIG. 18 illustrates an example of an RRC connection resume procedure.

An AMF may provide to the base station a core network assistance information to assist the base station's decision whether a UE can be sent to RRC inactive state. The core network assistance information may include the registration area configured for the UE, the periodic registration update timer, a UE identity index value, the UE specific DRX, an indication if the UE is configured with mobile initiated connection only (MICO) mode by the AMF, or the expected UE behavior. The base station may use the UE specific DRX and the UE identity index value to determine a paging occasion for RAN paging. The base station may use periodic registration update timer to configure periodic RNA update timer (e.g., a timer T380). The base station may use an expected UE behavior to assist the UE RRC state transition decision FIG. 18 illustrates an example of an RRC connection resume procedure. A UE in RRC connected state may transmit and receive data to/from a first base station (a source base station) via a cell 1. The first base station may determine to transit a UE in RRC connected state to RRC inactive state. Based on the determining, the base station may send an RRC release message comprising the suspend configuration parameters.

In an example of the FIG. 18, based on receiving the RRC release message comprising suspend configuration parameters, the UE may store in the UE inactive AS Context the current security keys (e.g., KgNB and KRRCint keys) and current configuration parameters. For example, the UE may store some of the current configuration parameters. The stored (current) configuration parameters may be at least one of: robust header compression (ROHC) state; QoS flow to DRB mapping rules; C-RNTI used in source PCell; global cell identity and physical cell identity of the source PCell; and all other parameters configured except for ones within reconfiguration with sync and serving cell configuration common parameters in SIB. The robust header compression (ROHC) state may comprise ROHC states for all PDCP entity (or all bearers) where each PDCP entity per bearer (or each bearer) may have one ROHC state. The QoS flow to DRB mapping rules may be QoS flow to DRB mapping rules for all data radio bearer (DRB) where each DRB may have one QoS follow to DRB mapping rule.

In an example of the FIG. 18, based on receiving the RRC release message comprising suspend configuration parameters, the UE may suspend all SRB(s) and DRB(s) except for SRB0. Based on receiving the RRC release message comprising suspend configuration parameters, the UE may start a timer T380, enter RRC inactive state, perform cell selection procedure. Based on the cell selection procedure, the UE may select a cell 2 of a second base station (a target base station). The UE in RRC inactive state may initiate an RRC connection resume procedure. The UE may perform the unified access control procedure. Based on the unified access control procedure, the UE may consider access attempt for the RRC connection resume procedure as allowed. The UE may apply the default L1 parameter values as specified in corresponding physical layer specifications, except for the parameters for which values are provided in SIB1, apply the default SRB1 configuration, apply the CCCH configuration, apply the time alignment timer common included in SIB1, apply the default MAC cell group configuration, start a timer T319 and initiate transmission of an RRC resume request message.

In an example of the FIG. 18, based on initiating the transmission of the RRC resume request message, the UE may restore the stored configuration parameters and the stored security keys from the (stored) UE inactive AS context. For example, the UE may restore the stored configuration parameters and the stored security keys (e.g., $K_{gNB}$ and $K_{RRCint}$) from the stored UE Inactive AS context except for the master cell group configuration parameters, MR-DC related configuration parameters (e.g., secondary cell group configuration parameters) and PDCP configuration parameters. Based on current (restored) $K_{gNB}$ or next hop (NH) parameters associated to the stored NCC value, the UE may derive a new key of a base station ($K_{gNB}$). Based on the new key of the base station, the UE may derive security keys for integrity protection and ciphering of RRC signalling (e.g., $K_{RRCenc}$ and $K_{RRCint}$ respectively) and security keys for integrity protection and ciphering of user plane data (e.g., $K_{UPint}$ and the $K_{UPenc}$ respectively). Based on configured algorithm and the $K_{RRCint}$ and $K_{UPint}$, the UE (RRC layer) may configure lower layers (e.g., PDCP layer) to apply integrity protection for all radio bearers except SRB0. Based on configured algorithm and the $K_{RRCenc}$ and the $K_{UPenc}$, the UE may configure lower layers (e.g., PDCP layer) to apply ciphering for all radio bearers except SRB0. For communication between the UE and the base station, the integrity protection and/or the ciphering may be required. Based on the integrity protection and/or the ciphering, the UE may be able to transmit and receive data to/from the second base station. The UE may use the restored configuration parameters to transmit and receive the data to/from the second base station.

In an example of the FIG. 18, based on initiating the transmission of the RRC resume request message, the UE may re-establish PDCP entities for one or more bearers, resume one or more bearers and submit the RRC resume request message to lower layers. Based on receiving the RRC resume request message, the second base station may check whether the UE context of the UE is locally available. Based on the UE context being not locally available, the second base station may perform the retrieve UE context procedure by sending the retrieve UE context request message to the first base station (the last serving base station) of the UE. The retrieve UE context request message may comprise at least one of: resume identity; resume MAC-I; or the resume cause.

In an example of the FIG. 18, based on receiving the retrieve UE context request message, the first base station may check the retrieve UE context request message. If the first base station is able to identify the UE context by means of the UE context ID, and to successfully verify the UE by means of the resume MAC-I and decides to provide the UE context to the second base station, the first base station may respond to the second base station with the retrieve UE context response message. Based on receiving the retrieve UE context response message, the second base station may send an RRC resume message to the UE. Based on receiving the RRC resume message, the UE may restore mater cell group configuration parameters, secondary cell group configuration parameters and PDCP configuration parameters in the UE inactive AS context. Based on restoring the master cell group configuration parameter and/or the secondary cell group configuration parameters, the UE may configure SCells of MCG and/or SCG by configuring lower layers to consider the restored MCG and/or SCG SCells to be in deactivated state, discard the UE inactive AS context and release the suspend configuration parameters. The UE may transmit and receive data via the SCells and/or SCGs.

A base station may send an RRC release message to a UE to release an RRC connection of the UE. Based on the RRC release message, the UE may release established radio bearers as well as all radio resources.

A base station may send an RRC release message to a UE to suspend the RRC connection. Based on the RRC release message, the UE may suspend all radio bearers except for signaling radio bearer 0 (SRB0). The RRC release message may comprise suspend configuration parameters. The suspend configuration parameters may comprise next hop chaining count (NCC) and resume identity (e.g., ID or identifier).

The base station may send an RRC release message to transit a UE in an RRC connected state to an RRC idle state; or to transit a UE in an RRC connected state to an RRC inactive state; or to transit a UE in an RRC inactive state back to an RRC inactive state when the UE tries to resume; or to transit a UE in an RRC inactive state to an RRC idle state when the UE tries to resume.

The base station may send an RRC release message to redirect a UE to another frequency.

A UE may receive an RRC release message from the base station of serving cell (or PCell). Based on the RRC release message, the UE may perform UE actions for the RRC release message from the base station. The UE may delay the UE actions for the RRC release message a period of time (e.g., 60 ms) from the moment the RRC release message was received or when the receipt of the RRC release message was successfully acknowledged. The UE may send HARQ acknowledgments to the base station for acknowledgments of the RRC release message. Based on a RLC protocol data unit (PDU) comprising the RRC release message and the RLC PDU comprising poll bit, the UE may send a RLC message (e.g., a status report) to the base station for acknowledgments of the RRC release message.

The UE actions for the RRC release message from the base station may comprise at least one of: suspending an RRC connection; releasing an RRC connection; cell (re) selection procedure; and/or idle/inactive measurements.

The RRC release message from the base station may comprise the suspend configuration parameters. Based on the suspend configuration parameters, the UE may perform the suspending an RRC connection. The suspending an RRC connection may comprise at least one of: medium access control (MAC) reset (or resetting MAC); releasing default MAC cell group configuration; re-establishing RLC entities for one or more radio bearers; storing current configuration parameters and current security keys; suspending one or more bearers where the bearers comprise signaling radio bearer and data radio bearer; and/or transitioning an RRC idle state or an RRC inactive state.

For example, the suspend configuration parameters may further comprise RNA configuration parameters. Based on the RNA configuration parameters, the UE may transition to an RRC inactive state. For example, based on the suspend configuration parameters not comprising the RNA configuration parameters, the UE may transition to an RRC idle state. For example, the RRC release message comprising the suspend configuration parameters may comprise an indication transitioning to an RRC inactive state. Based on the indication, the UE may transition to an RRC inactive state. For example, based on the RRC release message not comprising the indication, the UE may transition to an RRC idle state.

Based on the MAC reset, the UE may perform to at least one of: stop all timers running in the UE-MAC layer; consider all time alignment timers as expired; set new data indicators (NDIs) for all uplink HARQ processes to the value 0; stop, ongoing RACH procedure; discard explicitly signaled contention-free Random Access Resources, if any; flush Msg 3 buffer; cancel, triggered scheduling request procedure; cancel, triggered buffer status reporting procedure; cancel, triggered power headroom reporting procedure; flush the soft buffers for all DL HARQ processes; for each DL HARQ process, consider the next received transmission for a TB as the very first transmission; and/or release, temporary C-RNTI.

Based on the considering the time alignment timers as expired, the UE may perform at least one of: flush all HARQ buffers for all serving cells; notify RRC to release PUCCH for all Serving cells, if configured; notify RRC to release SRS for all Serving Cells, if configured; clear any configured downlink assignments and configured uplink grants; clear any PUSCH resource for semi-persistent CSI reporting; and/or consider all running time alignment timers as expired.

The default MAC cell group configuration parameters may comprise buffer status report (BSR) configuration parameters (e.g., BSR timers) for a cell group of the base station and power headroom reporting (PHR) configuration parameters (e.g., PHR timers or PHR transmission power factor change parameter) for the cell group of the base station.

The re-establishing RLC entities may comprise at least one of: discarding all RLC SDUs, RLC SDU segments, and RLC PDUs, if any; stopping and resetting all timers of the RLC entities; and resetting all state variables of the RLC entities to their initial values.

The RRC release message from the base station may not comprise the suspend configuration parameters. Based on the RRC message not comprising the suspend configuration parameters, the UE may perform the releasing an RRC connection. The releasing an RRC connection may comprise at least one of: MAC reset (or resetting MAC); discarding the stored configuration parameters and stored security keys (or discarding the stored UE inactive AS context); releasing the suspend configuration parameters; releasing all radio resources, including release of RLC entity, MAC configuration and associated PDCP entity and SDAP for all established radio bearers; and/or transitioning to an RRC idle state.

The RRC release message may comprises an RRC early data complete message.

The layers may be associated with an open system interconnection (OSI) model of computer networking functionality. In the OSI model, layer 1 may correspond to the bottom layer, with higher layers on top of the bottom layer. Layer 1 may correspond to a physical layer, which is concerned with the physical infrastructure used for transfer of signals (for example, cables, fiber optics, and/or radio frequency transceivers). In New Radio (NR), layer 1 may comprise a physical layer (PHY). Layer 2 may correspond to a data link layer. Layer 2 may be concerned with packaging of data (into, e.g., data frames) for transfer, between nodes of the network, using the physical infrastructure of layer 1. In NR, layer 2 may comprise a media access control layer (MAC), a radio link control layer (RLC), a packet data convergence layer (PDCP), and a service data application protocol layer (SDAP).

Layer 3 may correspond to a network layer. Layer 3 may be concerned with routing of the data which has been packaged in layer 2. Layer 3 may handle prioritization of data and traffic avoidance. In NR, layer 3 may comprise a radio resource control layer (RRC) and a non-access stratum layer (NAS). Layers 4 through 7 may correspond to a transport layer, a session layer, a presentation layer, and an application layer. The application layer interacts with an end user to provide data associated with an application. In an example, an end user implementing the application may generate data associated with the application and initiate sending of that information to a targeted data network (e.g., the Internet, an application server, etc.). Starting at the application layer, each layer in the OSI model may manipulate and/or repackage the information and deliver it to a lower layer. At the lowest layer, the manipulated and/or repackaged information may be exchanged via physical infrastructure (for example, electrically, optically, and/or electromagnetically). As it approaches the targeted data network, the information will be unpackaged and provided to higher and higher layers, until it once again reaches the application layer in a form that is usable by the targeted data network (e.g., the same form in which it was provided by the end user). To respond to the end user, the data network may perform this procedure in reverse.

The user plane protocol stack shown in FIG. 2 may be a new radio (NR) protocol stack for a Uu interface between a UE and a gNB. In layer 1 of the UP protocol stack, the UE may implement PHY and the gNB may implement PHY. In layer 2 of the UP protocol stack, the UE may implement MAC, RLC, PDCP, and SDAP. The gNB may implement MAC, RLC, PDCP, and SDAP.

The control plane protocol stack shown in FIG. 2 may be an NR protocol stack for the Uu interface between the UE and the gNB and/or an N1 interface between the UE and an AMF. In layer 1 of the CP protocol stack, the UE 1901 may implement PHY and the gNB may implement PHY. In layer 2 of the CP protocol stack, the UE may implement MAC, RLC, PDCP, RRC, and NAS. The gNB may implement MAC, RLC, PDCP, and RRC. The AMF may implement NAS.

The NAS shown in FIG. 2 may be concerned with the non-access stratum, in particular, communication between the UE and the core network (e.g., the AMF). Lower layers may be concerned with the access stratum, for example, communication between the UE and the gNB. Messages sent between the UE and the core network may be referred to as NAS messages. In an example, a NAS message may be relayed by the gNB, but the content of the NAS message (e.g., information elements of the NAS message) may not be visible to the gNB.

In FIG. 3, the UE may receive services through a PDU session, which may be a logical connection between the UE and a data network (DN). The UE and the DN may exchange data packets associated with the PDU session. The PDU session may comprise one or more quality of service (QoS) flows. SDAP may perform mapping and/or demapping between the one or more QoS flows of the PDU session and one or more radio bearers (e.g., data radio bearers). The mapping between the QoS flows and the data radio bearers may be determined in the SDAP by the gNB, and the UE may be notified of the mapping (e.g., based on control signaling and/or reflective mapping). For reflective mapping, the SDAP of the gNB may mark downlink packets with a QoS flow indicator (QFI) and deliver the downlink packets to the UE. The UE may determine the mapping based on the QFI of the downlink packets.

In FIG. 3, PDCP may perform header compression and/or decompression. Header compression may reduce the amount of data transmitted over the physical layer. The PDCP and PDCP may perform ciphering and/or deciphering. Ciphering may reduce unauthorized decoding of data transmitted over the physical layer (e.g., intercepted on an air interface), and protect data integrity (e.g., to ensure control messages originate from intended sources). The PDCP may perform retransmissions of undelivered packets, in-sequence delivery and reordering of packets, duplication of packets, and/or identification and removal of duplicate packets. In a dual connectivity scenario, PDCP may perform mapping between a split radio bearer and RLC channels.

In FIG. 3, RLC may perform segmentation, retransmission through Automatic Repeat Request (ARQ). The RLC may perform removal of duplicate data units received from MAC and MAC, respectively. The RLCs may provide RLC channels as a service to PDCPs, respectively.

In FIG. 3, MAC may perform multiplexing and/or demultiplexing of logical channels. MAC and MAC may map logical channels to transport channels. In an example, UE may, in MAC, multiplex data units of one or more logical channels into a transport block. The UE may transmit the transport block to the gNB using PHY. The gNB may receive the transport block using PHY and demultiplex data units of the transport blocks back into logical channels. MAC may perform error correction through Hybrid Automatic Repeat Request (HARQ), logical channel prioritization, and/or padding.

In FIG. 3, PHY may perform mapping of transport channels to physical channels. PHY and PHY may perform digital and analog signal processing functions (e.g., coding/decoding and modulation/demodulation) for sending and receiving information (e.g., transmission via an air interface). PHY may perform multi-antenna mapping.

One or more of the base stations of the NG-RAN may be split into a central unit (CU) and one or more distributed units (DUs). A CU may be coupled to one or more DUs via an F1 interface. The CU may handle one or more upper layers in the protocol stack and the DU may handle one or more lower layers in the protocol stack. For example, the CU may handle RRC, PDCP, and SDAP, and the DU may handle RLC, MAC, and PHY. The one or more DUs may be in geographically diverse locations relative to the CU and/or each other. Accordingly, the CU/DU split architecture may permit increased coverage and/or better coordination.

The central unit may be referred to as and/or interchangeable with a base station central unit or a central unit of a base station or a CU or a gNB-CU. The distributed unit may be referred to as and/or interchangeable with a base station distributed unit or a distributed unit of a base station or a DU or a gNB-DU.

In an RRC connected state, a wireless device may measure multiple beams (at least one) of a cell and the measurements results (power values) may be averaged to derive the cell quality. In doing so, the wireless device may be configured to consider a subset of the detected beams. Filtering takes may place at two different levels: at the physical layer to derive beam quality and then at RRC level to derive cell quality from multiple beams. Cell quality from beam measurements may be derived in the same way for the serving cell(s) and for the non-serving cell(s). Measurement reports may contain the measurement results of the X best beams if the UE is configured to do so by a base station (e.g., gNB).

Layer 1 filtering may be internal layer 1 filtering of the inputs measured at point A. Exact filtering is implementation dependent. How the measurements may be executed in the physical layer by an implementation (inputs A and Layer 1 filtering). The A is measurements (beam specific samples) internal to the physical layer. A1 is measurements (e.g., beam specific measurements) reported by layer 1 to layer 3 after layer 1 filtering.

Layer 1 filtering may introduce a certain level of measurement averaging. How and when the UE exactly performs the required measurements may be implementation specific to the point that the output at B fulfils the performance requirements set. The B is a measurement (e.g., cell quality) derived from beam-specific measurements reported to layer 3 after beam consolidation/selection. The beam consolidation/selection is beam specific measurements which are consolidated to derive cell quality. The configuration of this module is provided by RRC signalling. Reporting period at B may equal one measurement period at A1.

Layer 3 filtering for cell quality may be filtering performed on the measurements provided at point B. The configuration of the layer 3 filters may be provided by an RRC signalling. Filtering reporting period at C may equal one measurement period at B. Layer 3 filtering for cell quality and related parameters used may not introduce any delay in the sample availability between B and C. Measurement at point C, C1 is the input used in the event evaluation. The C is a measurement after processing in the layer 3 filter. The reporting rate is identical to the reporting rate at point B. This measurement is used as input for one or more evaluation of reporting criteria. Evaluation of reporting criteria may check whether actual measurement reporting is necessary at point D. The D is measurement report information (message) sent on the radio interface. The evaluation may be based on more than one flow of measurements at reference point C e.g., to compare between different measurements. This may be illustrated by input C and C1. The UE evaluates the reporting criteria at least every time a new measurement result is reported at point C, C1. The configuration may be provided by RRC signalling (UE measurements).

L3 Beam filtering and related parameters used may not introduce any delay in the sample availability between E and F. L3 Beam filtering is filtering performed on the measurements (e.g., beam specific measurements) provided at point A1. The configuration of the beam filters may be provided by RRC signalling. The L3 beam filtering may provide K beams. The K beams may correspond to the measurements on SSB, or CSI-RS resources configured for L3 mobility by a base station (e.g., gNB) and detected by UE at L1. Filtering reporting period at E may equal one measurement period at A1. E is a measurement (e.g., beam-specific measurement) after processing in the beam filter. The reporting rate may be identical to the reporting rate at point A1. This measurement is used as input for selecting the X measurements to be reported. Beam Selection for beam reporting may select the X measurements from the measurements provided at point E. The configuration of this module may be provided by RRC signalling. The F is beam measurement information included in measurement report (sent) on the radio interface.

Measurement reports may be characterized by the following: Measurement reports include the measurement identity of the associated measurement configuration that triggered the reporting; Cell and beam measurement quantities to be included in measurement reports are configured by the network; The number of non-serving cells to be reported can be limited through configuration by the network; Cells belonging to a blacklist configured by the network are not used in event evaluation and reporting, and conversely when a whitelist is configured by the network, only the cells belonging to the whitelist are used in event evaluation and reporting; Beam measurements to be included in measurement reports are configured by the network (beam identifier only, measurement result and beam identifier, or no beam reporting).

Intra-frequency neighbour (cell) measurements and inter-frequency neighbour (cell) measurements may be defined as follows: SSB based intra-frequency measurement where a measurement is defined as an SSB based intra-frequency measurement provided the center frequency of the SSB of the serving cell and the center frequency of the SSB of the neighbour cell are the same, and the subcarrier spacing of the two SSBs is also the same; SSB based inter-frequency measurement where a measurement is defined as an SSB based inter-frequency measurement provided the center frequency of the SSB of the serving cell and the center frequency of the SSB of the neighbour cell are different, or the subcarrier spacing of the two SSBs is different; CSI-RS based intra-frequency measurement; and CSI-RS based inter-frequency measurement where a measurement is defined as a CSI-RS based inter-frequency measurement if it is not a CSI-RS based intra-frequency measurement.

The CSI-RS based intra-frequency measurement is a measurement is defined as a CSI-RS based intra-frequency measurement provided that: the subcarrier spacing of CSI-RS resources on the neighbour cell configured for measurement is the same as the SCS of CSI-RS resources on the serving cell indicated for measurement; For 60 KHz subcarrier spacing, the CP type of CSI-RS resources on the neighbour cell configured for measurement is the same as the CP type of CSI-RS resources on the serving cell indicated for measurement; and the centre frequency of CSI-RS resources on the neighbour cell configured for measurement is the same as the centre frequency of CSI-RS resource on the serving cell indicated for measurement.

For SSB based measurements, one measurement object may correspond to one SSB and the wireless device considers different SSBs as different cells.

Whether a measurement is non-gap-assisted or gap-assisted depends on the capability of a wireless device, the active BWP of the wireless device and the current operating frequency. For SSB based inter-frequency measurement, if the measurement gap requirement information is reported by the wireless device, a measurement gap configuration may be provided according to the information. Otherwise, a measurement gap configuration is provided in the following cases: if the wireless device only supports per-wireless device measurement gaps; If the wireless device supports per-FR measurement gaps and any of the serving cells are in the same frequency range of the measurement object. For SSB based intra-frequency measurement, if the measurement gap requirement information is reported by the wireless device, a measurement gap configuration may be provided according to the information. Otherwise, a measurement gap configuration is always provided in the following case: Other than the initial BWP, if any of the wireless device configured BWPs do not contain the frequency domain resources of the SSB associated to the initial DL BWP.

In non-gap-assisted scenarios, a wireless device may carry out such measurements without measurement gaps. In gap-assisted scenarios, a wireless device may not be assumed to be able to carry out such measurements without measurement gaps.

In an example, a measurement timing configuration (measurementtimingconfiguration) may be used to convey assistance information for measurement timing (meastiming). The measurement timing configuration may comprise at least one of: a measurement timing (meastiming); camp on first SSB (camponfirstSSB); PSCell only on first SSB (PScellonlyonfirstSSB); and CSI-RS configuration (CSI-RS-config). The measurement timing (meastiming) may comprise a frequency and timing (frequencyandtiming); SSB to measure (ssb-tomeasure); and a physical cell identifier (physcellid). The frequency and timing (frequencyandtiming) may comprise at least one of: a carrier frequency (carrierfreq); SSB subcarrier spacing (ssbSubcarrierSpacing); SSB measurement timing configuration (ssb-measurementtimingconfiguration); SS-RSSI measurement (ss-RSSI-Measurement).

In an example, the CSI-RS configuration may comprise at least one of: CSI-RS subcarrier spacing (csi-RS-subcarrierspacing); CSI-RS cell mobility (csi-RS-cellmobility); and reference SSB frequency (refSSBfreq). The csi-RS-cellmobility may indicate the CSI-RS configuration of the cell for which this message is included. The timing of the CSI-RS resources may be based on the SSB indicated by the refSSBfreq. The csi-RS-subcarrierspacing may indicate the subcarrier spacing of the CSI-RS resources included in csi-RS-cellmobility.

In an example, the meastiming may be a list of SMTC information, SSB RSSI measurement information and associated frequency (e.g., NR frequency) exchanged via X2 interface (e.g., for X2 setup/update or DC configuration Setup/update or Xn setup/update or node (e.g., a base station) configuration update or F1 messages between a base station central unit and a base station distributed unit). physcellid may be physical cell identity of the SSB on the ARFCN indicated by the carrierfreq (carrier frequency). The camponfirstSSB (e.g., indicating be a value true) may indicates that the SSB indicated in the first instance of meastiming in the meastiming list can be used for camping and for a PCell configuration. The meastiming list may comprise one or more meastimings. The ssb-tomeasure may be the set of SS blocks to be measured within the SMTC measurement duration.

In an example, the carrierfreq (carrier frequency) and the SSB subcarrier spacing (ssbSubcarrierSpacing) may indicate the frequency and subcarrier spacing of the SS block of the cell for which this message is included, or of other SS blocks within the same carrier. The SSB measurement timing configuration (ssb-measurementtimingconfiguration) may indicate the SMTC which can be used to search for SSB of the cell for which the message is included. The SS-RSSI measurement (ss-RSSI-measurement) may provide the configuration which can be used for RSSI measurements of the cell for which the message is included.

A transmitter (a radio transmitter) of the wireless device may be an electronic device which produces radio waves with an antenna. The transmitter may generate a radio frequency alternating current, which is applied to the antenna. For example, the antenna may radiate radio waves. The term transmitter may be limited to equipment that generates radio waves for communication purposes; or radiolocation, such as radar and navigational transmitters. A transmitter may be a separate piece of electronic equipment, or an electrical circuit within another electronic device. A transmitter and a receiver combined in one unit may be called a transceiver. The term transmitter is often abbreviated “XMTR” or “TX” in technical documents. The purpose of most transmitters may be radio communication of information over a distance. The information may be provided to the transmitter in the form of an electronic signal, such as an audio (sound) signal from a microphone, a video (TV) signal from a video camera, or in wireless (networking) devices, a digital signal from a computer. The transmitter may combine the information signal to be carried with the radio frequency signal which generates the radio waves, which is called the carrier signal. This process may be called modulation. The radio signal from the transmitter may be applied to the antenna, which radiates the energy as radio waves. The antenna may be enclosed inside the case or attached to the outside of the transmitter, as in portable devices such as cell phones. The transmitter may be (group of) antenna or (group of) antenna panel or (group of) MIMO layer or (group of) emitter. Each antenna panel may have one or more antenna elements. For example, a first one or more antennas (or a first one or more antenna panels, or a first one or more MIMO layers) may be a first transmitter. A second one or more antennas (or a second one or more antenna panels, or a first one or more MIMO layers) may be a second transmitter. For example, a base station and/or a wireless device may have multiple antennas. a number of antenna elements may be assembled into multiple antennas. Multi-panel MIMO (layer) may be used for communication between the wireless and the base station.

In an example, a wireless device may receive, from a base station, a measurement configuration. The measurement configuration may indicate one or more frequencies and/or one or more cells on which the wireless device performs measurements. Based on the measurement configuration, the wireless device may perform the measurements on a frequency and/or a cell which is indicated by the measurement configuration.

A wireless device may perform measurements using the measurement configuration during a measurement gap, e.g., indicated by the measurement configuration. In the present disclosure, the measurement gap may be referred to as and/or interchangeable with a gap, a gap (period and/or interval), a measurement gap (period and/or interval), and/or the like.

The measurement gap may be a time duration in which a wireless device may measure wireless channel condition associated with a cell, of a particular base station (e.g., network), and/or configured in a particular frequency using a particular RAT. For example, the particular base station (e.g., network) may be the same base station (e.g., the same network) that the wireless device maintains a connection (e.g., RRC connection). For example, the particular base station (e.g., network) may be different from a base station (e.g., a network) that the wireless device maintains a connection (e.g., RRC connection). For example, the particular RAT may be Wifi, LTE, NR, and/or the like. For example, the particular RAT may be the same RAT that the wireless device uses to maintain a connection (e.g., RRC connection) with a first base station e.g., a network). For example, the particular RAT may be different from an RAT that the wireless device uses to maintain a connection (e.g., RRC connection) with a first base station e.g., a network).

For example, a wireless device may maintain a connection (e.g., RRC connection) with a current base station (e.g., network) during the measurement gap. The wireless device may not communicate with the current base station during the measurement gap. For example, the wireless device may not, during the measurement gap, transmit to and/or receive from the current base station data (e.g., message, packet, SDU, PDU, and/or transport block) and/or a reference signal (e.g., SRS, and/or CSI-RS). The wireless device may not, during the measurement gap, monitor a downlink control channel configured by the current base station. The current base station may not communicate with the wireless device during the measurement gap. For example, the current base station may not, during the measurement gap, transmit to and/or receive from the wireless device, data (e.g., message, packet, SDU, PDU, and/or transport block) and/or a reference signal (e.g., SRS, and/or CSI-RS). The current base station may not, during the measurement gap, monitor an uplink control channel configured for the wireless device.

For example, a wireless device may communicate with a second device (e.g., a second wireless device, a second base station, a second network, and/or the like) during the measurement gap while maintaining a connection (e.g., RRC connection) with a current base station (e.g., network). For example, the communicating with the second device may comprise monitoring a downlink channel (e.g., paging channel, PDCCH, PDSCH, SSB, CSI-RS, and/or the like) of the second device during the measurement gap. For example, the communicating with the second device may comprise receiving a signal and/or data via a downlink channel (e.g., PDCCH, PDSCH, SSB, CSI-RS, and/or the like) from the second device during the measurement gap. For example, the communicating with the second device may comprise receiving a signal (e.g., reference signal such as SSB, CSI-RS) and/or data (e.g., message, packet, SDU, PDU, and/or transport block) via a downlink channel (e.g., PDCCH, PDSCH, SSB, CSI-RS, and/or the like) from the second device during the measurement gap. For example, the communicating with the second device may comprise transmitting a signal (e.g., reference signal such as SRS, preamble, and/or the like) and/or data (e.g., message, packet, SDU, PDU, Msg3, MsgB, and/or transport block) via an uplink channel (e.g., PRACH, PUSCH, PUCCH, and/or SRS, and/or the like) to the second device during the measurement gap.

The wireless device may not communicate with the current base station during the measurement gap. For example, the wireless device may not, during the measurement gap, transmit to and/or receive from the current base station data (e.g., packet, SDU, PDU, and/or transport block) and/or a reference signal (e.g., SRS, and/or CSI-RS). The wireless device may not, during the measurement gap, monitor a downlink control channel configured by the current base station. The current base station may not communicate with the wireless device during the measurement gap. For example, the current base station may not, during the measurement gap, transmit to and/or receive from the wireless device, data (e.g., packet, SDU, PDU, and/or transport block) and/or a reference signal (e.g., SRS, and/or CSI-RS). The current base station may not, during the measurement gap, monitor an uplink control channel configured for the wireless device.

In an example, a wireless device may receive, from a base station, a measurement configuration. The measurement configuration may comprise measurement gap configuration. The measurement gap configuration may comprise one or more configuration parameters. The one or more configuration parameters of the measurement gap may indicate periods that the wireless device may use to perform measurements. The one or more configuration parameters may indicate one or more measurement gaps. Each measurement gap of the one or more measurement gaps may be associated with one or more frequency range that the wireless device performs one or more measurements using the one or more configuration parameters. For example, each measurement gap of the one or more measurement gaps may be per a frequency or a frequency range (e.g., FR1. FR2, and/or FR3) and/or per a wireless device/UE. For example, the measurement gap per a frequency range (e.g., FR1, FR2, and/or FR3) may be applied to measurement(s) that the wireless device performs in the respective frequency range. The measurement gap per the wireless device/UE may be applied to measurement(s) that the wireless device performs one or more (e.g., all) frequencies (e.g., FR1, FR2, and/or FR3). The each measurement gap may comprise at least one of: measurement gap repetition period (mgrp) value, measurement gap length (mgl) value, gap offset value and a serving cell identifier.

The mgrp value may indicate measurement gap repetition period in (ms) of the measurement gap. The mgl value may indicate the measurement gap length in ms of the measurement gap. The gap offset value may indicate the gap offset of the gap pattern with mgrp indicated in the field mgrp.

During the measurement gap period/time, the wireless device may not transmit data to the base station. For example, the data may comprise at least one of: HARQ feedback, SR, and CSI, SRS report and UL-SCH. During the measurement gap, the wireless device may not monitor downlink channel (e.g., PDCCH) of a serving cell of the base station. The wireless device may not receive (downlink data) on DL-SCH.

In an example, during the measurement gap period/time, the base station may not transmit downlink data to the base station. For example, the downlink data may comprise at least one of: DCI, MAC CE, and a data on DL-SCH. During the measurement gap, (a serving cell of) the base station may not monitor uplink channel (e.g., PUCCH/PUSCH) of the wireless device. The base station may not receive (uplink data) on UL-SCH.

A wireless device may receive from a base station one or more messages (e.g., RRC messages) comprising configuration parameters of a plurality of cells (e.g., primary cell, secondary cell). The wireless device may communicate with at least one base station (e.g., two or more base stations in dual-connectivity) via the plurality of cells. The one or more messages (e.g., as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g., the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

In an RRC connected state, a wireless device may measure multiple beams (at least one) of a cell and the measurements results (power values) may be averaged to derive the cell quality. In doing so, the wireless device may be configured to consider a subset of the detected beams. Filtering takes may place at two different levels: at the physical layer to derive beam quality and then at RRC level to derive cell quality from multiple beams. Cell quality from beam measurements may be derived in the same way for the serving cell(s) and for the non-serving cell(s). Measurement reports may contain the measurement results of the X best beams if the wireless device is configured to do so by a base station (e.g., gNB).

Figure 19:
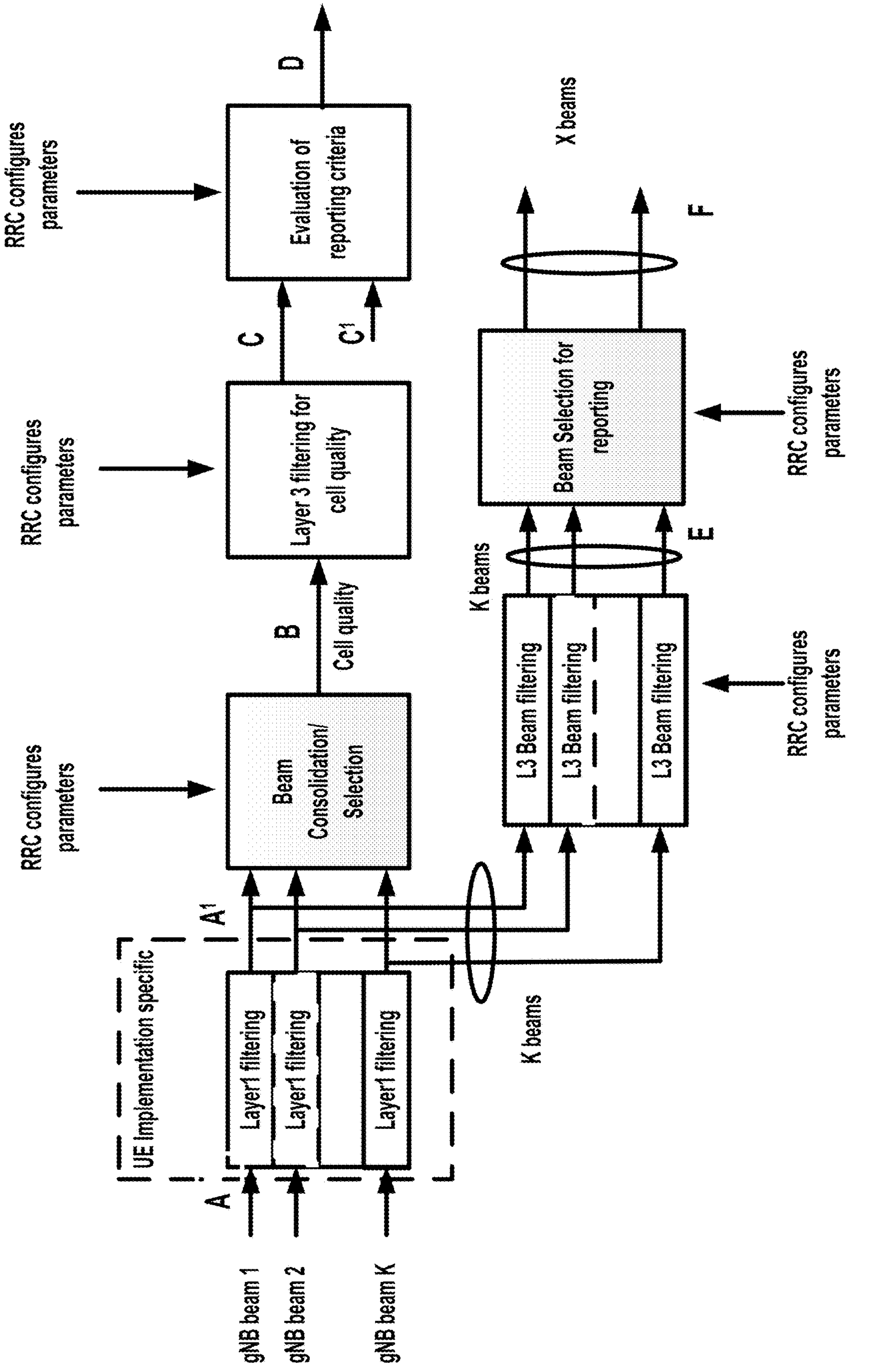
FIG. 19 illustrates an example of measurement model of a wireless device as an aspect of an embodiment of the present disclosure.

FIG. 19 illustrates the measurement model of a UE in RRC connected state. Layer 1 filtering may be internal layer 1 filtering of the inputs measured at point A. Exact filtering is left to UE implementation e.g., how the measurements may be executed in the physical layer by an implementation (inputs A and Layer 1 filtering). The A is measurements (beam specific samples) internal to the physical layer. A1 is measurements (e.g., beam specific measurements) reported by layer 1 to layer 3 after layer 1 filtering. Layer 1 filtering may introduce a certain level of measurement averaging. How and when the UE exactly performs the required measurements may be implementation specific to the point that the output at B fulfils the defined minimum performance requirements.

In an example of FIG. 19, The B is a measurement (e.g., cell quality) derived from beam-specific measurements reported to layer 3 after beam consolidation/selection. The beam consolidation/selection is beam specific measurements which are consolidated to derive cell quality. The configuration of this module is provided by RRC signalling. Reporting period at B may equal one measurement period at A1.

In an example of FIG. 19, Layer 3 filtering for cell quality may be filtering performed on the measurements provided at point B. The configuration of the layer 3 filters may be provided by an RRC signalling. Filtering reporting period at C in may equal one measurement period at B. Layer 3 filtering for cell quality and related parameters used may not introduce any delay in the sample availability between B and C. Measurement at point C, C1 is the input used in the event evaluation. The C is a measurement after processing in the layer 3 filter. The reporting rate is identical to the reporting rate at point B. This measurement is used as input for one or more evaluation of reporting criteria. Evaluation of reporting criteria may check whether actual measurement reporting is necessary at point D. The D is measurement report information (message) sent on the radio interface. The evaluation may be based on more than one flow of measurements at reference point C e.g., to compare between different measurements. This may be illustrated by input C and C1. The UE evaluates the reporting criteria at least every time a new measurement result is reported at point C, C1. The configuration may be provided by RRC signalling (UE measurements).

In an example of FIG. 19, L3 Beam filtering and related parameters used may not introduce any delay in the sample availability between E and F. L3 Beam filtering is filtering performed on the measurements (e.g., beam specific measurements) provided at point A1. The configuration of the beam filters may be provided by RRC signalling. The L3 beam filtering may provide K beams. The K beams may correspond to the measurements on SSB, or CSI-RS resources configured for L3 mobility by a base station (e.g., gNB) and detected by UE at L1. Filtering reporting period at E may equal one measurement period at A1. E is a measurement (e.g., beam-specific measurement) after processing in the beam filter. The reporting rate may be identical to the reporting rate at point A1. This measurement is used as input for selecting the X measurements to be reported. Beam Selection for beam reporting may select the X measurements from the measurements provided at point E. The configuration of this module may be provided by RRC signalling. The F is beam measurement information included in measurement report (sent) on the radio interface.

Measurement reports may be characterized by the following: Measurement reports include the measurement identity of the associated measurement configuration that triggered the reporting; Cell and beam measurement quantities to be included in measurement reports are configured by the network; The number of non-serving cells to be reported can be limited through configuration by the network; Cells belonging to a blacklist or exclude-list configured by the network are not used in event evaluation and reporting, and conversely when a whitelist is configured by the network, only the cells belonging to the whitelist or allow-list are used in event evaluation and reporting; Beam measurements to be included in measurement reports are configured by the network (beam identifier only, measurement result and beam identifier, or no beam reporting).

Intra-frequency neighbour (cell) measurements and inter-frequency neighbour (cell) measurements may be defined as follows: SSB based intra-frequency measurement where a measurement is defined as an SSB based intra-frequency measurement provided the center frequency of the SSB of the serving cell and the center frequency of the SSB of the neighbour cell are the same, and the subcarrier spacing of the two SSBs is also the same; SSB based inter-frequency measurement where a measurement is defined as an SSB based inter-frequency measurement provided the center frequency of the SSB of the serving cell and the center frequency of the SSB of the neighbour cell are different, or the subcarrier spacing of the two SSBs is different; CSI-RS based intra-frequency measurement; and CSI-RS based inter-frequency measurement where a measurement is defined as a CSI-RS based inter-frequency measurement if it is not a CSI-RS based intra-frequency measurement.

The CSI-RS based intra-frequency measurement is a measurement is defined as a CSI-RS based intra-frequency measurement provided that: the subcarrier spacing of CSI-RS resources on the neighbour cell configured for measurement is the same as the SCS of CSI-RS resources on the serving cell indicated for measurement; For 60 KHz subcarrier spacing, the CP type of CSI-RS resources on the neighbour cell configured for measurement is the same as the CP type of CSI-RS resources on the serving cell indicated for measurement; and the center frequency of CSI-RS resources on the neighbour cell configured for measurement is the same as the center frequency of CSI-RS resource on the serving cell indicated for measurement.

For SSB based measurements, one measurement object may correspond to one SSB and the wireless device considers different SSBs as different cells.

Whether a measurement is non-gap-assisted or gap-assisted depends on the capability of a wireless device, the active BWP of the wireless device and the current operating frequency. For SSB based inter-frequency measurement, if the measurement gap requirement information is reported by the wireless device, a measurement gap configuration may be provided according to the information. Otherwise, a measurement gap configuration is provided in the following cases: if the wireless device only supports per-wireless device measurement gaps; If the wireless device supports per-FR measurement gaps and any of the serving cells are in the same frequency range of the measurement object. For SSB based intra-frequency measurement, if the measurement gap requirement information is reported by the wireless device, a measurement gap configuration may be provided according to the information. Otherwise, a measurement gap configuration is always provided in the following case: Other than the initial BWP, if any of the wireless device configured BWPs do not contain the frequency domain resources of the SSB associated to the initial DL BWP.

In non-gap-assisted scenarios, a wireless device may carry out such measurements without measurement gaps. In gap-assisted scenarios, a wireless device may not be assumed to be able to carry out such measurements without measurement gaps.

Figure 20:
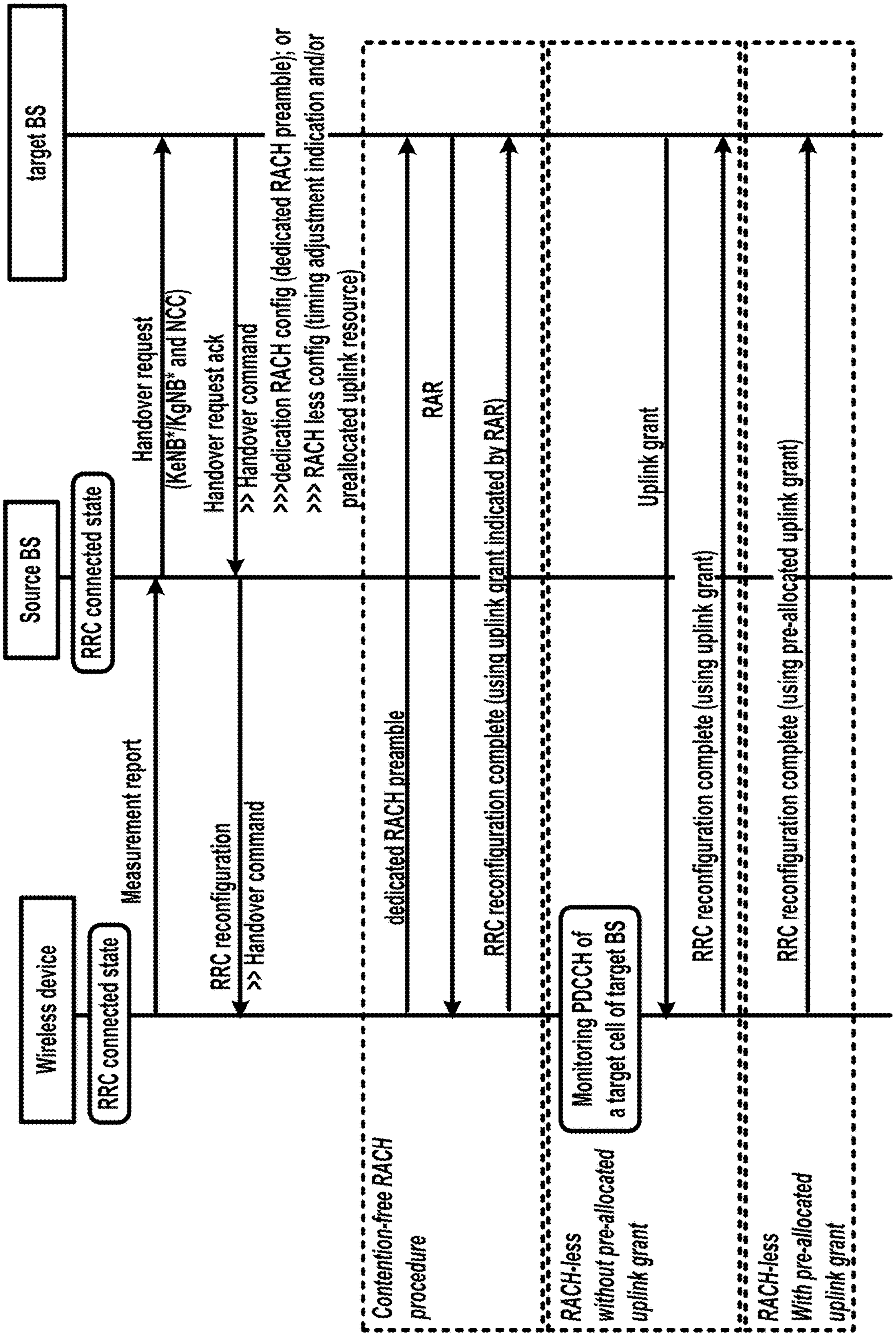
FIG. 20 illustrates an example of a layer 3 (L3) handover of a wireless device.

FIG. 20 illustrates an example of a layer 3 (L3) handover procedure. a wireless device may transmit a measurement report to the base station. The source base station may make decision to hand off the wireless device to a target base station. The decision may be based on a measurement report, load balancing requirement, issue with the source, among others gNB etc. The source base station may issue a handover request message to the target base station passing necessary information to prepare the HO at the target side (wireless device/UE X2/Xn signalling context reference at source base station, wireless device/UE S1 EPC signalling context reference, target cell ID, KeNB*/KgNB*, RRC context including the identity (e.g., Cell-radio network temporary identifier, C-RNTI) of the wireless device in the source base station, AS-configuration, radio (access) bearer context and physical layer ID of the source cell+short MAC-I for possible RLF recovery). The radio (access) bearer context may include necessary radio network layer (RNL) and transport network layer (TNL) addressing information, and QoS profiles of the E-RABs. The information may further comprise at least RRM-configuration including wireless device inactive time. The AS-configuration may comprise antenna Info and DL carrier frequency, the current QoS flow to DRB mapping rules applied to the wireless device, the SIB1 from the source base station, the wireless device capabilities for different RATs and PDU session related information. The AS-configuration may further comprise the wireless device reported measurement information including beam-related information. The PDU session related information may include the slice information and QoS flow level QoS profile(s). The source base station may also request a DAPS handover for one or more DRBs In an example of FIG. 20, admission Control may be performed by the target base station dependent on the received radio (access) bearer QoS information to increase the likelihood of a successful HO, if the resources can be granted by target base station. The target base station may configure the required resources according to the received radio (access) bearer QoS information and reserves a C-RNTI and optionally a RACH preamble. The AS-configuration to be used in the target cell may either be specified independently (e.g., an "establishment") or as a delta compared to the AS-configuration used in the source cell (e.g., a "reconfiguration"). The target base station may prepare HO with L1/L2 and send the handover request acknowledge to the source base station. The handover request acknowledge message may include a transparent container to be sent to the wireless device as an RRC message to perform the handover. The container includes a new C-RNTI, target base station security algorithm identifiers for the selected security algorithms, may include a dedicated RACH preamble, and possibly some other parameters e.g., access parameters, SIBs, etc. For RACH-less HO (e.g., if RACH-less HO is configured), the container includes timing adjustment indication and optionally a preallocated uplink grant. The handover request acknowledge message may also include RNL/TNL information for the forwarding tunnels, if necessary.

In an example of FIG. 20, the target base station may generate the RRC message to perform the handover. The RRC message may be an RRC reconfiguration message including information for HO (e.g., the mobility control info or reconfiguration sync), to be sent by the source base station towards the wireless device. The source base station may perform the necessary integrity protection and ciphering of the message.

In an example of FIG. 20, the source base station may trigger the Uu handover by sending an RRC reconfiguration message to the wireless device, containing the information required to access the target cell: at least the target cell ID, the new C-RNTI, the target base station security algorithm identifiers for the selected security algorithms. The RRC reconfiguration may be able to include a set of dedicated RACH resources, the association between RACH resources and SSB(s), the association between RACH resources and wireless device-specific CSI-RS configuration(s), common RACH resources, and system information of the target cell, etc.

In an example of FIG. 20, the wireless device may receive the RRC reconfiguration message with necessary parameters (e.g., new C-RNTI, target base station security algorithm identifiers, and optionally dedicated RACH preamble, target base station SIBs, etc.) and be commanded by the source base station to perform the HO. For RACH-less HO (e.g., if RACH-less HO) is configured, the RRC reconfiguration may include timing adjustment indication and optionally preallocated uplink grant for accessing the target base station. If preallocated uplink grant is not included, the wireless device may monitor PDCCH of the target base station to receive an uplink grant. The wireless device may not need to delay the handover execution for delivering the HARQ/ARQ responses to source base station.

In an example of FIG. 20, for no RACH-less HO, (e.g., if RACH-less HO is not configured), after receiving the RRC reconfiguration message including the information for HO (e.g., mobility control info or reconfiguration sync) wireless device may perform synchronization to target base station and accesses the target cell via RACH, following a contention-free procedure if a dedicated RACH preamble was indicated in the information for HO, or following a contention-based procedure if no dedicated preamble was indicated. wireless device may derive target base station specific keys and configures the selected security algorithms to be used in the target cell. For no RACH-less HO, (e.g., if RACH-less HO is not configured), the target base station may respond with UL allocation and timing advance. For no RACH-less HO, (e.g., if RACH-less HO is not configured), if the wireless device has successfully accessed the target cell, the wireless device may send the RRC reconfiguration complete message (C-RNTI) to confirm the handover, along with an uplink BSR (buffer status report), and/or UL data, whenever possible, to the target base station, which indicates that the handover procedure is completed for the wireless device. The target base station may verify the C-RNTI sent in the RRC reconfiguration complete message. The target base station may be able to now begin sending data to the wireless device.

In an example of FIG. 20, for RACH-less HO (e.g., if RACH-less HO is configured), the wireless device may perform synchronization to target base station. wireless device derives target base station specific keys and configures the selected security algorithms to be used in the target cell. For RACH-less HO (e.g., if RACH-less HO is configured), if the wireless device did not get the periodic preallocated uplink grant in the RRC reconfiguration message including the information for HO (e.g., mobility control info or reconfiguration sync), the wireless device may receive uplink grant via the PDCCH of the target cell. The wireless device may use the first available uplink grant after synchronization to the target cell. For RACH-less HO (e.g., if RACH-less HO is configured), after the wireless device has received uplink grant, the wireless device may send the RRC reconfiguration complete message (C-RNTI) to confirm the handover, along with an uplink BSR, and/or UL data, whenever possible, to the target base station. The target base station may verify the C-RNTI sent in the RRC reconfiguration complete message. The target base station may be able to now begin sending data to the wireless device. The handover procedure may be completed for the wireless device when the wireless device receives the wireless device contention resolution identity MAC control element from the target base station.

In an example of FIG. 20, the RRM configuration may include both beam measurement information (for layer 3 mobility) associated to SSB(s) and CSI-RS(s) for the reported cell(s) if both types of measurements are available. The RRM measurement information may include the beam measurement for the listed cells that belong to the target base station. The common RACH configuration for beams in the target cell may be only associated to the SSB(s). The network may be able to have dedicated RACH configurations associated to the SSB(s) and/or have dedicated RACH configurations associated to CSI-RS(s) within a cell. The target base station can only include one of the following RACH configurations in the handover command to enable the wireless device to access the target cell: common RACH configuration; common RACH configuration+dedicated RACH configuration associated with SSB; common RACH configuration+Dedicated RACH configuration associated with CSI-RS. The dedicated RACH configuration may allocate RACH resource(s) together with a quality threshold to use them. When dedicated RACH resources are provided, they may be prioritized by the wireless device and the wireless device may not switch to contention-based RACH resources as long as the quality threshold of those dedicated resources is met. The order to access the dedicated RACH resources may be up to wireless device implementation.

In an example, a wireless device may transmit to a base station an RACH-less HO capability indication which indicates whether the wireless device supports RACH-less handover. Based on the RACH-less HO capability indication, a base station may determine to configure/transmit a configuration for RACH-less HO (RACH skip configuration).

In an example, for network-controlled mobility in RRC connected state (e.g., L3 handover), the PCell may be changed using an RRC connection reconfiguration message (e.g., RRCReconfiguration) including reconfigurationWithSync (in NR specifications) or mobilityControlInfo in LTE specifications (handover). The SCell(s) may be changed using the RRC connection reconfiguration message either with or without the reconfigurationWith Sync or mobilityControlInfo. The network may trigger the HO procedure e.g., based on radio conditions, load, QoS, UE category, and/or the like. The RRC connection reconfiguration message may be implemented based on examples which will be described later in FIG. 21 and FIG. 22.

As shown in FIG. 20, the network may configure the wireless device to perform measurement reporting (possibly including the configuration of measurement gaps). The measurement reporting is a layer 3 reporting, different from layer 1 CSI reporting. The wireless device may transmit one or more measurement reports to the source base station (or source PCell). In an example, the network may initiate HO blindly, for example without having received measurement reports from the wireless device. Before sending the HO message to the wireless device, the source base station may prepare one or more target cells. The source base station may select a target PCell.

As shown in FIG. 20, based on the one or more measurement reports from the wireless device, the source base station may provide the target base station with a list of best cells on each frequency for which measurement information is available, for example, in order of decreasing RSRP values. The source base station may also include available measurement information for the cells provided in the list. The target base station may decide which cells are configured for use after HO, which may include cells other than the ones indicated by the source base station. In an example, as shown in FIG. 20, the source base station may transmit a HO request to the target base station. The target base station may response with a HO message. In an example, in the HO message, the target base station may indicate access stratum configuration to be used in the target cell(s) for the wireless device.

In an example, the source base station may transparently (for example, does not alter values/content) forward the HO message/information received from the target base station to the wireless device. In the HO message, RACH resource configuration may be configured for the wireless device to access a cell in the target base station. When appropriate, the source base station may initiate data forwarding for (a subset of) the dedicated radio bearers.

As shown in FIG. 20, after receiving the HO message, the wireless device may start a HO timer (e.g., T304) with an initial timer value. The HO timer may be configured in the HO message. Based on the HO message, the wireless device may apply the RRC parameters of a target PCell and/or a cell group (MCG/SCG) associated with the target PCell of the target base station and perform downlink synchronization to the target base station. After or in response to performing downlink synchronization (e.g., searching a suitable/detectable SSB from candidate SSBs configured on the target base station) to the target base station, the wireless device may initiate a random access (e.g., contention-free, or contention-based, based on examples of FIG. 13A, FIG. 13B and/or FIG. 13C) procedure attempting to access the target base station at the available RACH occasion according to a RACH resource selection, where the available RACH occasion may be configured in the RACH resource configuration (e.g., based on example embodiments of FIG. 22 which will be described later). When allocating a dedicated preamble for the random access in the target base station, RAN may ensure the preamble is available from the first RACH occasion the wireless device may use.

In an example, the wireless device may activate the uplink BWP configured with firstActiveUplinkBWP-id and the downlink BWP configured with firstActiveDownlinkBWP-id on the target PCell upon performing HO to the target PCell.

In an example, the wireless device, after applying the RRC parameters of a target PCell and/or completing the downlink synchronization with the target PCell, may perform UL synchronization by conducting RACH procedure, e.g., based on example embodiments described above with respect to FIG. 13A, FIG. 13B and/or FIG. 13C. The performing UL synchronization may comprise transmitting a preamble via an active uplink BWP (e.g., a BWP configured as firstActiveUplinkBWP-id as shown in FIG. 21) of uplink BWPs of the target PCell, monitoring PDCCH on an active downlink BWP (e.g., a BWP configured as firstActiveDownlinkBWP-id as shown in FIG. 21) for receiving a RAR comprising a TA which is used for PUSCH/PUCCH transmission via the target PCell, receiving the RAR and/or obtaining the TA. After completing the UL synchronization, the wireless device obtains the TA to be used for PUSCH/PUCCH transmission via the target PCell. The wireless device, by using the TA to adjust uplink transmission timing, transmits PUSCH/PUCCH via the target PCell. The adjusting uplink transmission timing may comprise advancing or delay the transmissions by an amount indicated by a value of the TA, e.g., to ensure the uplink signals received at the target PCell are aligned (in time domain) with uplink signals transmitted from other wireless devices.

In an example, the wireless device may release RRC configuration parameters of the source PCell and an MCG/SCG associated with the source PCell.

In this specification, a HO triggered by receiving a RRC reconfiguration message (e.g., RRCReconfiguration) comprising the HO command/message (e.g., by including reconfigurationWithSync (in NR specifications) or mobilityControlInfo in LTE specifications (handover) is referred to as a normal HO, an unconditional HO, which is contrast with a conditional HO (CHO).

In an example, as shown in FIG. 20, the wireless device may transmit a preamble to the target base station via a RACH resource. The RACH resource may be selected from a plurality of RACH resources (e.g., configured in rach-ConfigDedicated IE as shown in FIG. 21 and FIG. 22) based on SSBs/CSI-RSs measurements of the target base station. The wireless device may select a (best) SSB/CSI-RS of the configured SSBs/CSI-RSs of the target base station. The wireless device may select a SSB/CSI-RS, from the configured SSBs/CSI-RSs of the target base station, with a RSRP value greater than a RSRP threshold configured for the RA procedure. The wireless device then determines a RACH occasion (e.g., time domain resources, etc.) associated with the selected SSB/CSI-RS and determines the preamble associated with the selected SSB/CSI-RS.

In an example, the target base station may receive the preamble transmitted from the wireless device. The target base station may transmit a random access response (RAR) to the wireless device, where the RAR comprises the preamble transmitted by the wireless device. The RAR may further comprise a TAC to be used for uplink transmission via the target PCell. In response to receiving the RAR comprising the preamble, the wireless device may complete the random access procedure. In response to completing the random access procedure, the wireless device may stop the HO timer (T304). The wireless device may transmit an RRC reconfiguration complete message to the target base station, after completing the random access procedure, or before completing the random access procedure. The wireless device, after completing the random access procedure towards the target base station, may apply first parts of CQI reporting configuration, SR configuration and SRS configuration that do not require the wireless device to know a system frame number (SFN) of the target base station. The wireless device, after completing the random access procedure towards the target PCell, may apply second parts of measurement and radio resource configuration that require the wireless device to know the SFN of the target base station (e.g., measurement gaps, periodic CQI reporting, SR configuration, SRS configuration), upon acquiring the SFN of the target base station.

In an example, based on HO procedure (e.g., as shown in FIG. 20), for network energy saving purpose, a base station may instruct each wireless device in a source cell to perform a 4-step or 2-step RACH-based (contention free) HO to a neighbor cell. After the wireless devices complete the HO procedure to neighbor cells, the base station may turn off (RF parts and BBUs, etc.) for energy saving.

FIG. 21 shows an example of RRC message for handover (HO). In the example of FIG. 21, a base station may transmit, and/or a wireless device may receive, a RRC reconfiguration message (e.g., RRCReconfiguration-IEs) indicating an RRC connection modification. It may convey information for measurement configuration, mobility control, radio resource configuration (including RBs, MAC main configuration and physical channel configuration) and AS security configuration. The RRC reconfiguration message may comprise a configuration of a master cell group (masterCellGroup). The master cell group may be associated with a SpCell (SpCellConfig). When the SpCellConfig comprises a reconfiguration with Sync (reconfigurationWithSync), the wireless device determines that the SpCell is a target PCell for the HO. The reconfiguration with sync (reconfigurationWithSync) may comprise cell common parameters (spCellConfigCommon) of the target PCell, a RNTI (newUE-Identity) identifying the wireless device in the target PCell, a value of T304, a dedicated RACH resource (rach-ConfigDedicated), etc. In an example, a dedicated RACH resource may comprise one or more RACH occasions, one or more SSBs, one or more CSI-RSs, one or more RA preamble indexes, etc.

FIG. 22 shows an example of RRC messages for RACH resource configuration for HO procedure. As shown in FIG. 21, the reconfigurationWithSync IE comprises a dedicated RACH resource indicated by a rach-ConfigDedicated IE.

As shown in FIG. 22, a rach-ConfigDedicated IE comprises a contention free RA resource indicated by a cfra IE. The cfra IE comprises a plurality of occasions indicated by a rach-ConfigGeneric IE, a ssb-perRACH-Occasion IE, a plurality of resources associated with SSB (indicated by a ssb IE) or CSI-RS (indicated by a csirs IE). The ssb-perRACH-Occasion IE indicates a number of SSBs per RACH occasion. The rach-ConfigGeneric IE indicates configuration of CFRA occasions. The wireless device ignores preambleReceivedTargetPower, preambleTransMax, powerRampingStep, ra-ResponseWindow signaled within this field and use the corresponding values provided in RACH-ConfigCommon.

As shown in FIG. 22, when the plurality of resources for the CFRA configured in the reconfiguration WithSync IE are associated with SSBs, the resources (resources IE) comprise the ssb IE. The ssb IE comprises a list of CFRA SSB resources (ssb-ResourceList) and an indication of PRACH occasion mask index (ra-ssb-OccasionMaskIndex). Each of the list of CFRA SSB resources comprises a SSB index, a RA preamble index and etc. The ra-ssb-OccasionMaskIndex indicates a PRACH mask index for RA resource selection. The mask is valid for all SSB resources signaled in ssb-ResourceList.

A shown in FIG. 22, when the plurality of resources for the CFRA configured in the reconfigurationWithSync IE are associated with CSI-RSs, the resources (resources IE) comprise the csirs IE. The csirs IE comprises a list of CFRA CSI-RS resources (csirs-ResourceList) and a RSRP threshold (rsrp-ThresholdCSI-RS). Each of the list of CFRA CSI-RS resources comprises a CSI-RS index, a list of RA occasions (ra-OccasionList), a RA preamble index and etc.

Figure 23:
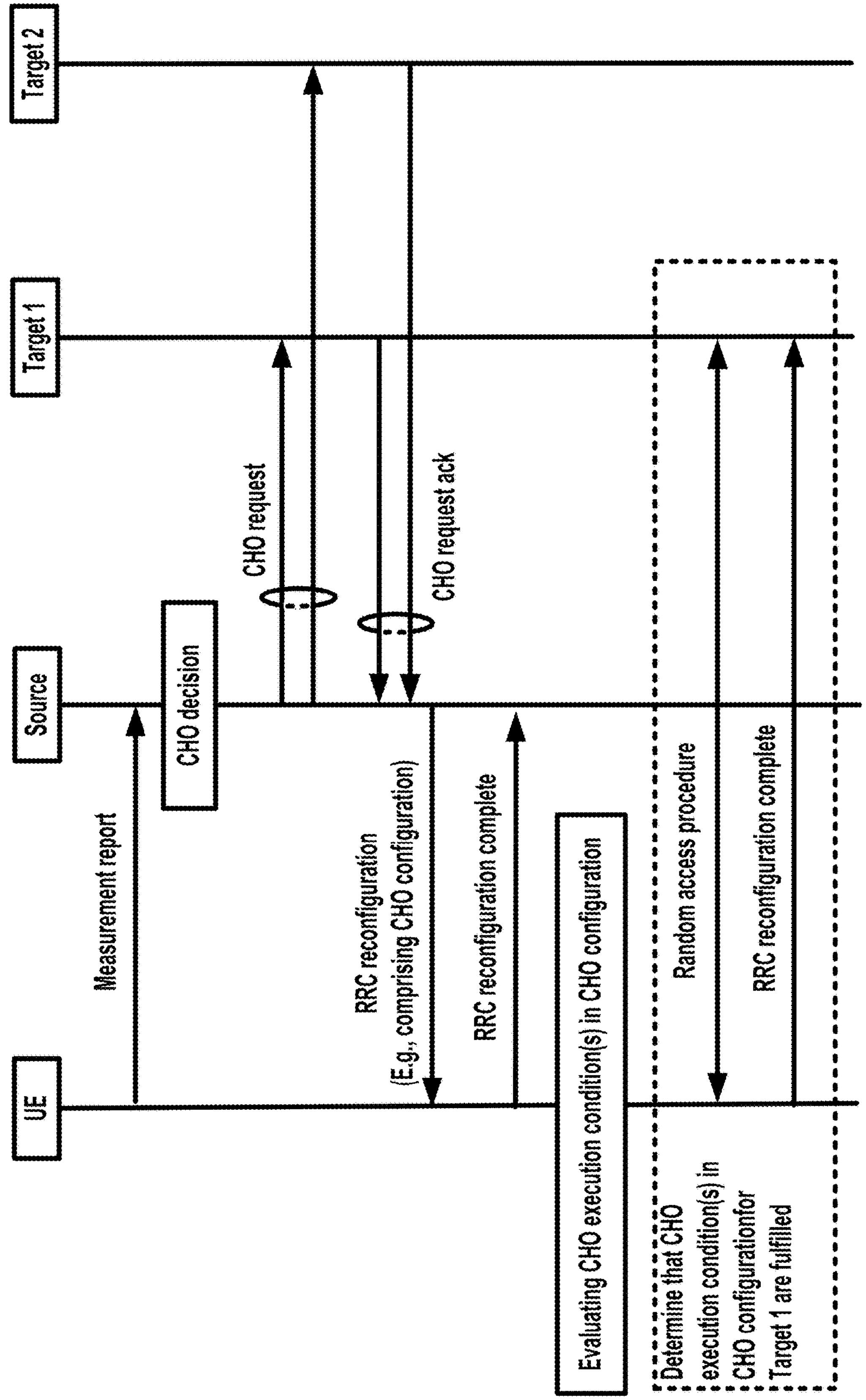
FIG. 23 illustrates an example of a conditional handover (CHO) procedure.

In an example, executing the HO triggered by receiving a RRC reconfiguration message comprising a reconfigurationWithSync IE may introduce HO latency (e.g., too-late HO), e.g., when a wireless device is moving in a network deployed with multiple small cells (e.g., with hundreds of meters of cell coverage of a cell). An improved HO mechanism, based on measurement event triggering, is proposed to reduce the HO latency as shown in FIG. 23.

Multi-radio dual connectivity (MR-DC or DC) is dual connectivity between E-UTRA (e.g., eNB, LTE base station) and NR nodes (e.g., gNB, NR base station), or between two NR nodes. SpCell is a primary cell of a master cell group (MCG) or a primary cell of secondary cell group (SCG). PCell is SpCell of a master cell group. PSCell is SpCell of a secondary cell group.

Master cell group (MCG) may be in MR-DC, a group of serving cells associated with master node, comprising of SpCell (PCell) and optionally one or more SCells. Master node (MN) may be in DC, a radio access node (e.g., base station) that provides a control plane connection to a core network. The MN may be a master eNB, a master ng-eNB or a master gNB. Secondary cell group (SCG) may be in MR-DC, a group of serving cells associated with the secondary Node, comprising of the SpCell (PSCell) and optionally one or more SCells. Secondary node may be in MR-DC, a radio access node, with no control plane connection to the core network, providing additional resources to a wireless device. It may be an en-gNB, a secondary ng-eNB or a secondary gNB.

Conditional PSCell addition is a PSCell addition procedure that is executed only when PSCell addition condition(s) are met. Conditional PSCell change: a PSCell change procedure that is executed only when PSCell execution condition(s) are met.

A conditional handover (CHO) may be defined as a handover (e.g., layer 3 handover) that is executed by a wireless device when one or more handover execution conditions are met. The wireless device may start evaluating the execution condition(s) upon receiving the CHO configuration, and stops evaluating the execution condition(s) once a handover is executed.

The following principles may apply to CHO: the CHO configuration may contain the configuration of CHO candidate cell(s) generated by candidate gNB(s) and execution condition(s) generated by a source gNB. An execution condition may consist of one or two trigger condition(s) (CHO events, e.g., A3/A5). Only single reference signal (RS) type may be supported and at most two different trigger quantities (e.g., RSRP and RSRQ, RSRP and SINR, etc.) may be able to be configured simultaneously for the evaluation of CHO execution condition of a single candidate cell. Before any CHO execution condition is satisfied, upon reception of HO command (without CHO configuration), a wireless device may execute a HO procedure, (e.g., regardless of any previously received CHO configuration). While executing CHO, (e.g., from the time when a wireless device starts synchronization with target cell), the wireless device may not monitor source cell.

For example, CHO procedure (e.g., intra-AMF/UPF CHO procedure) may be as follow. The UE context within a source base station may contain information regarding roaming and access restrictions which were provided either at connection establishment or at the last tracking area (TA) update. The source base station may configure the wireless device a measurement procedure and the wireless device may report according to the measurement configuration. The source base station may decide to use CHO. The source base station may request CHO for one or more candidate cells belonging to one or more candidate base stations. A CHO request message is sent for each candidate cell. Admission control may be performed by a target base station. Slice-aware admission control may be performed if the slice information is sent to the target base station. If the PDU sessions are associated with non-supported slices the target base station may reject such PDU sessions.

In an example of the CHO procedure, the candidate base station(s) may send CHO response (HO request acknowledge) including configuration of CHO candidate cell(s) to the source base station. The CHO response message may be sent for each candidate cell. The source base station may send an RRC reconfiguration message to the wireless device, containing the configuration of CHO candidate cell(s) and CHO execution condition(s). CHO configuration of candidate cells may be able to be followed by other reconfiguration from the source base station.

In an example of the CHO procedure, the wireless device may send an RRC reconfiguration complete message to the source base station. If early data forwarding is applied, the source base station may send the early status transfer message to the target base station(s) of the candidate cell(s). The wireless device may maintain connection with the source base station after receiving CHO configuration and starts evaluating the CHO execution conditions for the candidate cell(s). If at least one CHO candidate cell satisfies the corresponding CHO execution condition, the wireless device may detach from the source base station, apply the stored corresponding configuration for that selected candidate cell, synchronize to that candidate cell and completes the RRC handover procedure by sending RRC reconfiguration complete message to the target base station. The wireless device may release stored CHO configurations after successful completion of RRC handover procedure. The target base station may send the handover success message to the source base station to inform that the wireless device has successfully accessed the target cell. The source base station may send the SN (PDCP sequence number) status transfer message. Late data forwarding may be initiated as soon as the source base station receives the handover success message. The source base station may send the handover cancel message toward the other signalling connections or other candidate target base stations, if any, to cancel CHO for the wireless device.

Conditional Handover (CHO) may be characterized by a configured execution condition that determines when/whether the corresponding HO command is executed. A base station may send a CHO configuration. A wireless device may start evaluating the execution condition(s) for CHO candidate cells upon receiving the CHO configuration. The wireless device may execute the HO command once the condition(s) is met for a CHO candidate cell. The wireless device may stop evaluating the execution condition for other candidate cells during the CHO execution. The CHO configuration may contain the configuration of CHO candidate cell(s) generated by candidate target base stations and execution condition(s) generated by a source base station. The execution condition may consist of measurement event like A3 and A5. At most two different execution quantities (e.g., RSRP and RSRQ, RSRP and SINR, etc.) can be configured simultaneously for the evaluation of CHO execution condition of a single candidate cell. The wireless device may maintain connection with source base station until the wireless device is met with the CHO execution condition for CHO candidate cell(s). A reception of normal HO command (without conditional component) overrides any configured CHO configuration. After source base station sending CHO command to wireless device, the network may be allowed to change a source base station configuration. The network may add, modify and release a configured CHO configuration using RRC message (i.e., until the wireless device starts executing CHO to a candidate cell). While executing CHO, the wireless device may not monitor source cell.

FIG. 23 illustrates example of a conditional handover procedure. A source base station may decide a conditional handover based on measurement report from a wireless device. The source base station may send a CHO request message to CHO target base station candidates. Based on receiving the CHO request message, the target base station may send a CHO response message including a CHO configuration. Based on receiving the CHO response message, the source base station may send an RRC reconfiguration message containing the CHO configuration of candidate cells to the wireless device. Based on receiving the RRC reconfiguration message, the wireless device may send an RRC reconfiguration complete message to the source base station. The wireless device may start evaluating CHO execution conditions for candidate cells in the CHO configuration while maintaining connection with source base station. Based on at least one CHO candidate cell satisfying the corresponding CHO execution condition, the wireless device may detach from the source base station, apply the stored configuration of the selected candidate cell and synchronize to the candidate cell. Based the synchronization, the wireless device may complete the handover procedure by sending an RRC reconfiguration complete message to the target base station via the candidate cell.

A base station may send a CHO configuration. Based on receiving the CHO configuration, the wireless device may execute the HO command once the condition(s) is met for a CHO candidate cell. The wireless device may detect a radio link failure (RLF) in the source base station (e.g., a primary cell (PCell). Based on detecting the radio link failure, the wireless device may perform a cell selection procedure. Based on the cell selection procedure, the wireless device may select a cell. Based on the selected cell being a CHO candidate, then the wireless device may perform CHO execution to the selected cell. Otherwise, the wireless device may perform an RRC connection reestablishment procedure. Based on legacy handover failure or failure to access a CHO candidate cell, the wireless device may perform a cell selection procedure. Based on the selected cell being a CHO candidate cell, the wireless device may perform CHO execution. Otherwise, the wireless device may perform an RRC connection reestablishment procedure.

In an example, as shown in FIG. 23, the network (e.g., a base station, a source base station) may configure the wireless device to perform measurement reporting (possibly including the configuration of measurement gaps) for a plurality of neighbor cells (e.g., cells from a candidate target base station 1, a candidate target base station 2, etc.). The measurement reporting is a layer 3 reporting, different from layer 1 CSI reporting. The wireless device may transmit one or more measurement reports to the source base station (or source PCell).

As shown in FIG. 23, based on the one or more measurement reports from the wireless device, the source base station may provide the target base station with a list of best cells on each frequency for which measurement information is available, for example, in order of decreasing RSRP. The source base station may also include available measurement information for the cells provided in the list. The target base station may decide which cells are configured for use after the CHO, which may include cells other than the ones indicated by the source base station. In an example, as shown in FIG. 23, the source base station may transmit a HO request to the target base station. The target base station may response with a HO message. In an example, in the HO message, the target base station may indicate access stratum configuration (e.g., RRC configurations of the target cells) to be used in the target cell(s) for the wireless device.

In an example, the source base station may transparently (for example, does not alter values/content) forward the handover (e.g., contained in RRC reconfiguration messages of the target base station) message/information received from the target base station to the wireless device.

In an example, the source base station may configure a CHO procedure different from a normal HO procedure (e.g., as shown in FIG. 20, FIG. 21 and/or FIG. 22), by comprising a conditional reconfiguration message (e.g., conditionalReconfiguration IE in RRC reconfiguration message, which will be described later in FIG. 24). The conditional reconfiguration message may comprise a list of candidate target PCells, each candidate target PCell being associated with dedicated RACH resources for the RA procedure in case a CHO is executed to the candidate target PCell. A CHO execution condition (or RRC reconfiguration condition) is also configured for each of the candidate target PCells, etc. In an example, a CHO execution condition may comprise a measurement event A3 where a candidate target PCell becomes amount of offset better than the current PCell (e.g., the PCell of the source base station), a measurement event A4 where a candidate target PCell becomes better than absolute threshold configured in the RRC reconfiguration message, a measurement event A5 where the current PCell becomes worse than a first absolute threshold and a candidate target PCell becomes better than a second absolute threshold, etc.

In the example of FIG. 23, the wireless device, according to the received RRC reconfiguration messages comprising parameters of a CHO procedure, may evaluate the (RRC) reconfiguration conditions for the list of candidate target PCells and/or the current/source PCell. The wireless device may measure RSRP/RSRQ of SSBs/CSI-RSs of each candidate target PCell of the list of candidate target PCells. Different from the normal HO procedure, the wireless device does not execute the HO to the target PCell in response to receiving the RRC reconfiguration messages comprising the parameters of the CHO procedure. The wireless device may execute the HO to a target PCell for the CHO only when the (RRC) reconfiguration condition(s) of the target PCell are met (or satisfied). Otherwise, the wireless device may keep evaluating the reconfiguration conditions for the list of the candidate target PCells, e.g., until an expiry of a HO timer, or receiving a RRC reconfiguration indicating an abort of the CHO procedure.

In the example of FIG. 23, in response to a reconfiguration condition of a first candidate target PCell (e.g., PCell 1) being met or satisfied, the wireless device may execute the CHO procedure towards the first candidate target PCell. The wireless device may select on of multiple candidate target PCells by its implementation when the multiple candidate target PCells have reconfiguration conditions satisfied or met.

In an example, executing the CHO procedure towards the first candidate target PCell is same as or similar to executing the HO procedure. By executing the CHO procedure, the wireless device may release RRC configuration parameters of the source PCell and the MCG associated with the source PCell, apply the RRC configuration parameters of the PCell 1, reset MAC, perform cell group configuration for the received MCG comprised in the RRC reconfiguration message of the PCell 1, and/or perform RA procedure to the PCell 1, etc.

In an example, the MCG of the RRC reconfiguration message of the PCell 1 may be associated with a SpCell (SpCellConfig) on the target base station 1. When the sPCellConfig comprises a reconfiguration with Sync (reconfigurationWithSync), the wireless device determines that the SpCell is a target PCell (PCell 1) for the HO. The reconfiguration with sync (reconfigurationWithSync) may comprise cell common parameters (spCellConfigCommon) of the target PCell, a RNTI (newUE-Identity) identifying the wireless device in the target PCell, a value of T304, a dedicated RACH resource (rach-ConfigDedicated), etc. In an example, a dedicated RACH resource may comprise one or more RACH occasions, one or more SSBs, one or more CSI-RSs, one or more RA preamble indexes, etc. In an example, the wireless device may perform cell group configuration for the received master cell group comprised in the RRC reconfiguration message of the PCell 1 on the target base station 1 according to the example described above with respect to FIG. 20.

FIG. 24 illustrates an example of RRC message for CHO. a base station may transmit, and/or a wireless device may receive, a RRC reconfiguration message (e.g., RRCReconfiguration-V1610-IEs) indicating an RRC connection modification. The RRC reconfiguration message may be comprised in a (parent) RRC reconfiguration message (e.g., RRCReconfiguration-IEs) as shown in FIG. 21, where the (parent) RRC reconfiguration message may comprise (L3 beam/cell) measurement configuration (e.g., measConfig IE).

In the example of FIG. 24, the RRC reconfiguration message (e.g., RRCReconfiguration-V1610-IEs) may comprise a conditional reconfiguration IE (conditionalReconfiguration IE). The conditional reconfiguration IE may comprise a list of conditional reconfigurations (condReconfigToAddModList). Each conditional reconfiguration corresponds to a respective candidate target cell (PCell) of a list of candidate target cells. For each conditional reconfiguration of the list of conditional reconfigurations, the base station may indicate one or more measurement events (condExecutionCond) for triggering the CHO on the candidate target PCell, a RRC reconfiguration message (condRRCReconfig) of a candidate target cell (PCell) which is received by the source base station from the target base station via X2/Xn interface. The RRC reconfiguration message of the candidate target cell may be implemented based on example embodiments described above with respect to FIG. 21 and/or FIG. 22. In an example, the RRC reconfiguration message may comprise a configuration of a master cell group (masterCellGroup) for the target base station. The master cell group may be associated with a SpCell (SpCellConfig). When the sPCellConfig comprises a reconfiguration with Sync (reconfigurationWithSync), the SpCell is a target PCell for executing the CHO. The reconfiguration with sync (reconfigurationWithSync) may comprise cell common parameters (spCellConfigCommon) of the target PCell, a RNTI (newUE-Identity) identifying the wireless device in the target PCell, a value of T304, a dedicated RACH resource (rach-ConfigDedicated), etc. In an example, a dedicated RACH resource may comprise one or more RACH occasions, one or more SSBs, one or more CSI-RSs, one or more RA preamble indexes, etc.

In the example of FIG. 24, a measurement event (condExecutionCond) for triggering the CHO on the candidate target PCell is an execution condition that needs to be fulfilled (at the wireless device) in order to trigger the execution of a conditional reconfiguration for CHO. The indication of the measurement event may point to a measurement ID (MeasId) which identifies a measurement configuration of a plurality of measurement configurations (e.g., comprised in measConfig IE) configured by the source base station. The measurement configuration may be associated with a measurement event (or a conditional event) of a plurality of measurements. A conditional event may comprise a conditional event A3, conditional event A4, and/or conditional event A5, etc. A conditional event A3 is that a candidate target PCell becomes amount of offset better than the current PCell (e.g., the PCell of the source base station). A conditional event A4 is that a candidate target PCell becomes better than an absolute threshold configured in the RRC reconfiguration message. A conditional event A5 is that the current PCell becomes worse than a first absolute threshold and a candidate target PCell becomes better than a second absolute threshold, etc.

In an example, executing CHO by the wireless device's decision based on evaluating reconfiguration conditions (long-term and/or layer 3 beam/cell measurements against one or more configured thresholds) on a plurality of candidate target cells may cause load unbalanced on cells, and/or lead to CHO failure in case that the target cell changes its configuration (e.g., for network energy saving) during the CHO condition evaluation, etc. In an example, a layer 1 signaling may comprise a DCI transmitted via a PDCCH. A layer 2 signaling may comprise a MAC CE scheduled by a DCI. Layer 1/2 signaling is different from Layer 3 signaling, for HO/CHO, which comprises RRC reconfiguration message.

Figure 25:
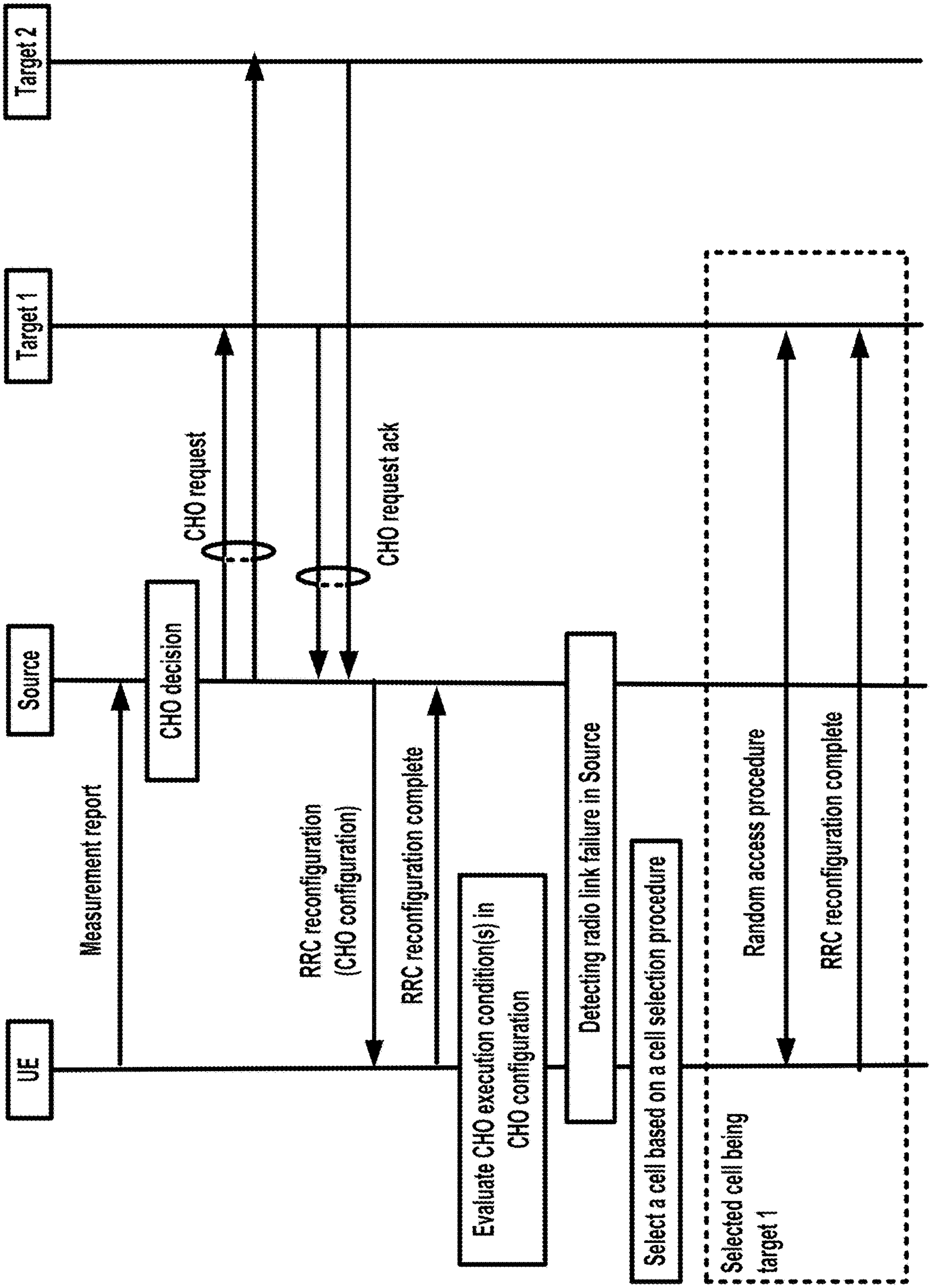
FIG. 25 illustrates an example of connection recovery procedure with conditional handover configuration.

FIG. 25 illustrates example of connection recovery procedure with conditional handover configuration. A source base station may decide a conditional handover based on measurement report from a wireless device. The source base station may send a CHO request message to CHO target base station candidates. Based on receiving the CHO request message, the target base station may send a CHO response message including a CHO configuration. Based on receiving the CHO response message, the source base station may send an RRC reconfiguration message containing the CHO configuration of candidate cells to the wireless device. Based on receiving the RRC reconfiguration message, the wireless device may send an RRC reconfiguration complete message to the source base station. The wireless device may start evaluating CHO execution conditions for candidate cells in the CHO configuration while maintaining connection with source base station. The wireless device may detect a radio link failure in the source base station (e.g., PCell) or a conditional handover failure. The wireless device may perform a cell selection procedure. Based on a selected cell being a conditional handover candidate cell (e.g., target 1 in FIG. 26), the wireless device may perform a CHO execution. The CHO execution may comprise a random access procedure to the selected cell and based one successful completion of the random access procedure, sending an RRC reconfiguration message to the selected cell.

Based on at least one CHO candidate cell satisfying the corresponding CHO execution condition, the wireless device may detach from the source base station, apply the stored configuration of the selected candidate cell and synchronize to the candidate cell. Based the synchronization, the wireless device may complete the handover procedure by sending an RRC reconfiguration complete message to the target base station via the candidate cell.

A conditional PSCell addition (CPA) may be defined as a PSCell addition that is executed by a wireless device when execution condition(s) is met. The wireless device may start evaluating the execution condition(s) upon receiving CPA configuration and stop evaluating the execution condition(s) once PSCell addition or PCell change is triggered.

The following principles apply to the CPA: The CPA configuration may contain the configuration of CPA candidate PSCell(s), execution condition(s) and may contain the MCG configuration, to be applied when CPA execution is triggered. An execution condition may consist of one or two trigger condition(s) (e.g., CondEvents). Only a single RS type and at most two different trigger quantities (e.g., RSRP and RSRQ, RSRP and SINR, etc.) may be able to be used for the evaluation of CPA execution condition of a single candidate PSCell. Before any CPA execution condition is satisfied, upon reception of PSCell addition command or PCell change command, the wireless device may execute a PSCell addition procedure, or a PCell change procedure (e.g., regardless of any previously received CPA configuration). Upon the successful completion of PSCell addition procedure or PCell change procedure, the wireless device may release the stored CPA configuration. While executing CPA, the wireless device may be not required to continue evaluating the execution condition of other candidate PSCell(s). Once the CPA procedure is executed successfully, the wireless device may release all stored conditional reconfigurations (e.g., for CPA and for CHO).

A SN addition procedure may be initiated by the MN and be used to establish a UE context at the SN to provide resources from the SN to the wireless device. For bearers requiring SCG radio resources, this procedure may be used to add at least an initial SCG serving cell of the SCG. This procedure may be able to be used to configure an SN terminated MCG bearer (e.g., where no SCG configuration is needed). In case of CPA, the conditional secondary node addition procedure may be able to be used for CPA configuration and CPA execution.

In an example, a MN may decide to configure CPA for the wireless device. The MN may request the candidate SN(s) to allocate resources for one or more specific PDU Sessions/QoS Flows, indicating QoS Flows characteristics (QoS Flow Level QoS parameters, PDU session level TNL address information, and PDU session level Network Slice info), indicating that the request is for CPA and providing the upper limit for the number of PSCells that can be prepared by the candidate SN. In addition, for bearers requiring SCG radio resources, the MN may indicate the requested SCG configuration information, including the entire UE capabilities and the wireless device capability coordination result. In this case, the MN may provide the candidate cells recommended by MN via the latest measurement results for the candidate SN to choose and configure the SCG cell(s). The MN may request the candidate SN to allocate radio resources for split SRB operation. In NR-DC, the MN may provide all the needed security information to the candidate SN (even if no SN terminated bearers are setup) to enable SRB3 to be setup based on SN decision.

In an example of conditional SN addition procedure, for MN terminated bearer options that require Xn-U resources between the MN and the candidate SN, the MN may provide Xn-U UL TNL address information. For SN terminated bearers, the MN may provide a list of available DRB IDs. The candidate SN may store this information and use it when establishing SN terminated bearers. The candidate SN may reject the addition request. For SN terminated bearer options that require Xn-U resources between the MN and the candidate SN, the MN may provide a list of QoS flows per PDU Sessions for which SCG resources are requested to be setup upon which the candidate SN decides how to map QoS flows to DRB. For split bearers, MCG and SCG resources may be requested of such an amount, that the QoS for the respective QoS Flow is guaranteed by the exact sum of resources provided by the MCG and the SCG together, or even more. For MN terminated split bearers, the MN decision may be reflected by the QoS Flow parameters signaled to the candidate SN, which may differ from QoS Flow parameters received over NG. For a specific QoS flow, the MN may request the direct establishment of SCG and/or split bearers (e.g., without first having to establish MCG bearers). It may be allowed that all QoS flows can be mapped to SN terminated bearers (e.g., there is no QoS flow mapped to an MN terminated bearer).

In an example of conditional SN addition procedure, if the RRM entity in the candidate SN is able to admit the resource request, the SN may allocate respective radio resources and, dependent on the bearer type options, respective transport network resources, and provide the prepared PSCell ID(s) to the MN. For bearers requiring SCG radio resources the candidate SN configures random access so that synchronization of the SN radio resource configuration can be performed at the CPA execution. Within the list of cells as indicated within the measurement results indicated by the MN, the candidate SN may decide the list of PSCell(s) to prepare (considering the maximum number indicated by the MN) and, for each prepared PSCell, the candidate SN may decide other SCG SCells and provide the new corresponding SCG radio resource configuration to the MN in an NR RRC reconfiguration message (e.g., by the SN) contained in the SN addition request acknowledge message. The candidate SN may be able to either accept or reject each of the candidate cells listed within the measurement results indicated by the MN (e.g., the candidate SN may not be able to configure any alternative candidates). In case of bearer options that require Xn-U resources between the MN and the candidate SN, the candidate SN may provide Xn-U TNL address information (e.g., tunnel address) for the respective DRB, Xn-U UL TNL address information for SN terminated bearers, Xn-U DL TNL address information for MN terminated bearers. For SN terminated bearers, the candidate SN may provide the NG-U DL TNL address information for the respective PDU Session and security algorithm. If SCG radio resources have been requested, the SCG radio resource configuration may be provided. For SN terminated bearers using MCG resources, the MN may provide Xn-U DL TNL address information in the Xn-U Address Indication message. In case of early data forwarding in CPA, the MN may send the early status transfer message to the candidate SN.

In an example of conditional SN addition procedure, the MN may send to the wireless device an RRC reconfiguration message including the CPA configuration, (e.g., a list of RRC reconfiguration*messages and associated execution conditions), in which each RRC reconfiguration message*contains the SCG configuration in the RRC reconfiguration**received from the candidate SN and possibly an MCG configuration. The RRC reconfiguration message can also include an updated MCG configuration (e.g., to configure the required conditional measurements).

In an example of conditional SN addition procedure, the wireless device may apply the RRC reconfiguration message, store the CPA configuration and reply to the MN with an RRC reconfiguration complete message. In case the wireless device is unable to comply with (part of) the configuration included in the RRC reconfiguration message, the wireless device may perform the reconfiguration failure procedure. The wireless device may start evaluating the execution conditions. If the execution condition of one candidate PSCell is satisfied, the wireless device may apply RRC reconfiguration* message corresponding to the selected candidate PSCell, and send an MN RRC reconfiguration complete* message, including an RRC reconfiguration completemessage for the selected candidate PSCell, and information enabling the MN to identify the SN of the selected candidate PSCell. The MN may inform the SN of the selected candidate PSCell that the wireless device has completed the reconfiguration procedure successfully via SN reconfiguration complete message, including the RRC reconfiguration completemessage. The MN may send the SN release request message(s) to cancel CPA in the other candidate SN(s), if configured. The other candidate SN(s) may acknowledge the release request.

In an example of conditional SN addition procedure, the wireless device performs synchronization towards the PSCell indicated in the RRC reconfiguration* message applied. The successful RA procedure towards the SCG may be not required for a successful completion of the RRC connection reconfiguration procedure. If PDCP termination point is changed to the SN for bearers using RLC AM, and when RRC full configuration is not used, the MN may send the SN status transfer message. For SN terminated bearers or QoS flows moved from the MN, dependent on the characteristics of the respective bearer or QoS flow, the MN may take actions to minimize service interruption due to activation of MR-DC (Data forwarding). If applicable, the update of the UP path towards the 5GC is performed via a PDU Session Path Update procedure.

A Conditional PSCell Change (CPC) may be defined as a PSCell change that is executed by the wireless device when execution condition(s) is met. The wireless device may start evaluating the execution condition(s) upon receiving the CPC configuration, and stop evaluating the execution condition(s) once PSCell change or PCell change is triggered. Intra-SN CPC without MN involvement, inter-SN CPC initiated either by MN or SN may be supported.

The following principles may apply to CPC: the CPC configuration may contain the configuration of CPC candidate PSCell(s) and execution condition(s) and may contain the MCG configuration for inter-SN CPC, to be applied when CPC execution is triggered. An execution condition may consist of one or two trigger condition(s) (e.g., CondEvents). Only single RS type and at most two different trigger quantities (e.g., RSRP and RSRQ, RSRP and SINR, etc.) may be able to be used for the evaluation of CPC execution condition of a single candidate PSCell. Before any CPC execution condition is satisfied, upon reception of PSCell change command or PCell change command, the wireless device may execute the PSCell change procedure or the PCell change procedure (e.g., regardless of any previously received CPC configuration). Upon the successful completion of PSCell change procedure or PCell change procedure, the wireless device may release all stored CPC configurations. While executing CPC, the wireless device may not be required to continue evaluating the execution condition of other candidate PSCell(s). Once the CPC procedure is executed successfully, the wireless device may release all stored conditional reconfigurations (e.g., for CPC and for CHO). Upon the release of SCG, the wireless device may release the stored CPC configurations.

Secondary node change procedure may initiate either by MN or SN and used to transfer a UE context from a source SN to a target SN and to change the SCG configuration in a wireless device from one SN to another. In case of CPC, the conditional secondary code change procedure initiated either by the MN or SN may be used for CPC configuration and CPC execution.

In an example, a MN may initiate a conditional SN change by requesting the candidate SN(s) to allocate resources for the wireless device by means of the SN Addition procedure, indicating that the request is for CPC. The MN may provide the candidate cells recommended by MN via the latest measurement results for the candidate SN(s) to choose and configure the SCG cell(s), provide the upper limit for the number of PSCells that can be prepared by the candidate SN. Within the list of cells as indicated within the measurement results indicated by the MN, the candidate SN may decide the list of PSCell(s) to prepare (considering the maximum number indicated by the MN) and, for each prepared PSCell, the candidate SN may decide other SCG SCells and provide the new corresponding SCG radio resource configuration to the MN in an RRC reconfiguration**message contained in the SN addition request acknowledge message with the prepared PSCell ID(s). If data forwarding is needed, the candidate SN may provide data forwarding addresses to the MN. The candidate SN may include the indication of the full or delta RRC configuration. The candidate SN can either accept or reject each of the candidate cells listed within the measurement results indicated by the MN (e.g., the candidate SN may be not able to configure any alternative candidates). The MN may trigger the MN-initiated SN modification procedure (to the source SN) to retrieve the current SCG configuration and to allow provision of data forwarding related information before initiating the conditional SN change.

In an example of the MN initiated conditional SN change, the MN may send to the wireless device an RRC reconfiguration message including the CPC configuration, (e.g., a list of RRC reconfiguration* messages and associated execution conditions), in which each RRC reconfiguration* message contains the SCG configuration in the RRC reconfiguration**message received from the candidate SN and possibly an MCG configuration. The RRC reconfiguration message may be able to include an updated MCG configuration, e.g., to configure the required conditional measurements. The wireless device may apply the RRC reconfiguration message received, store the CPC configuration and replies to the MN with an RRC reconfiguration complete message. In case the wireless device is unable to comply with (part of) the configuration included in the RRC reconfiguration message, the wireless device may perform the reconfiguration failure procedure.

In an example of the MN initiated conditional SN change, upon receiving the MN RRC reconfiguration complete message from the wireless device, the MN may inform the source SN that the CPC has been configured via Xn-U address indication procedure, the source SN, (e.g., if applicable, together with the early status transfer procedure), may start early data forwarding. The PDCP SDU forwarding may take place during early data forwarding. Based on receiving the RRC reconfiguration message, the wireless device may start evaluating the execution conditions. If the execution condition of one candidate PSCell is satisfied, the wireless device may apply RRC reconfiguration* message corresponding to the selected candidate PSCell, and send an MN RRC reconfiguration complete* message, including an NR RRC reconfiguration complete**message for the selected candidate PSCell, and information enabling the MN to identify the SN of the selected candidate PSCell. The MN may trigger the MN initiated SN Release procedure to inform the source SN to stop providing user data to the wireless device and may trigger the Xn-U address indication procedure to inform the source SN the address of the SN of the selected candidate PSCell, to start late data forwarding.

In an example of the MN initiated conditional SN change, if the RRC connection reconfiguration procedure was successful, the MN may inform the target candidate SN via SN reconfiguration complete message, including the SN RRC reconfiguration complete**message. The MN may send the SN Release Request message(s) to cancel CPC in the other candidate SN(s), if configured. The other candidate SN(s) may acknowledge the release request. If configured with bearers requiring SCG radio resources, the wireless device may synchronize to the PSCell indicated in the RRC reconfiguration*message applied. If PDCP termination point is changed for bearers using RLC AM, the source SN may send the message, which the MN sends then to the SN of the selected candidate PSCell. Data forwarding from the source SN may take place. It may be initiated as early as the source SN receives the early data forwarding address. The source SN may send the secondary RAT data usage report message to the MN and include the data volumes delivered to and received from the wireless device. A PDU session path update procedure may be triggered by the MN. Upon reception of the UE context release message, the source SN may release radio and C-plane related resources associated to the UE context. Any ongoing data forwarding may continue.

A base station may send a conditional primary secondary cell group cell (PSCell) configuration. A wireless device may start evaluating the execution condition(s) for PSCell candidate cells upon receiving the conditional PSCell configuration. The wireless device may execute a PSCell addition/change (SCG addition) once the condition(s) is met for a PSCell candidate cell. The wireless device may stop evaluating the execution condition for other candidate cells during the PSCell addition/change execution. The conditional PSCell configuration may contain the configuration of PSCell candidate cell(s) generated by candidate target base stations and execution condition(s) generated by a source base station. The execution condition for conditional PSCell change may consist of measurement event like A3 and A5. The execution condition for conditional PSCell addition may consist of measurement event like A4 and A1.

Figure 26:
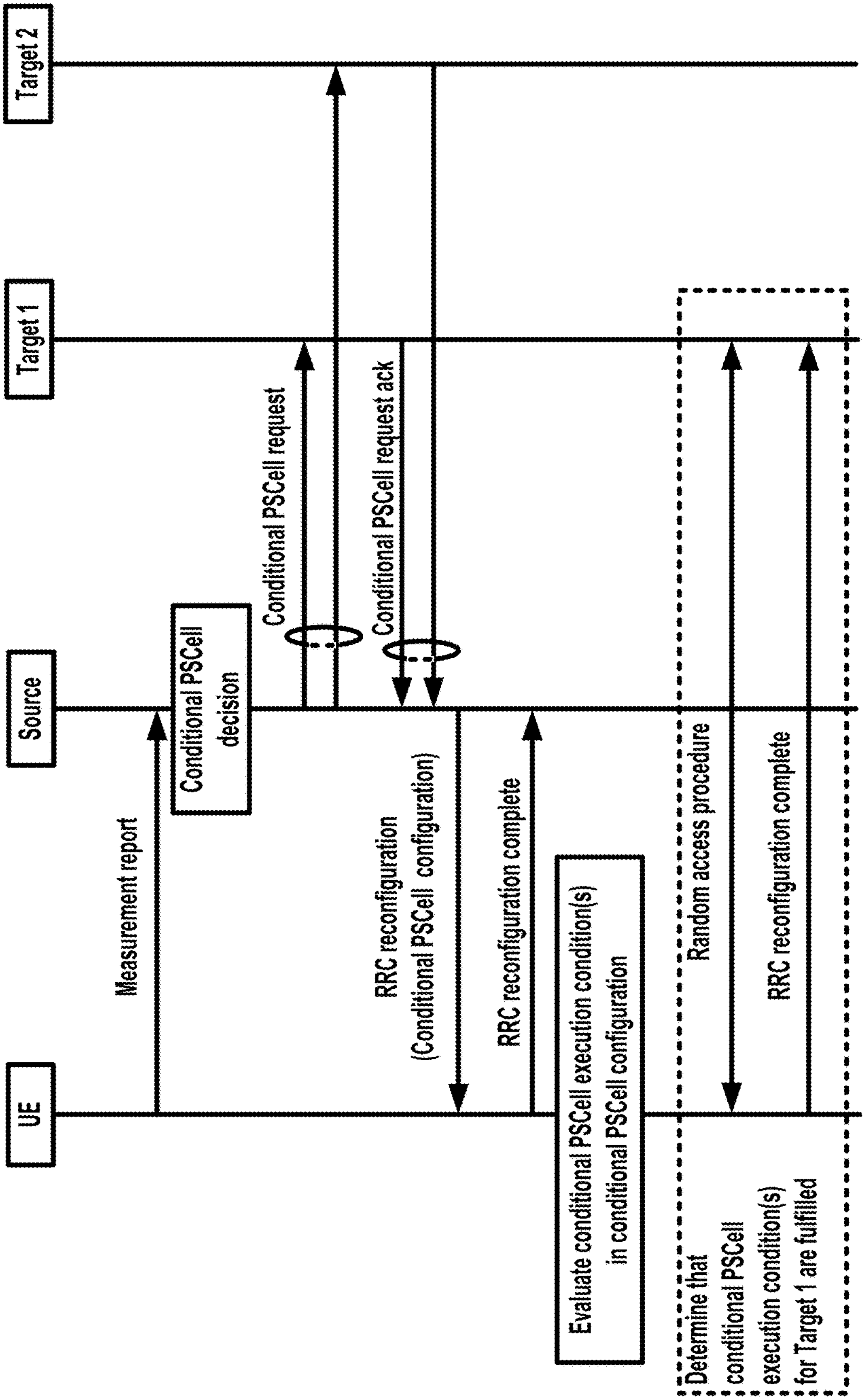
FIG. 26 illustrates an example of a conditional PSCell addition/change procedure.

FIG. 26 illustrates example of a conditional PSCell addition/change procedure. A source base station may decide a conditional PSCell addition/change based on measurement report from a wireless device. The source base station may send a conditional PSCell addition/change request message to target candidate cells for the PSCell addition/change. Based on receiving the conditional PSCell addition/change request message, the target cell may send a conditional PSCell addition/change response message including a conditional PSCell addition/change configuration. Based on receiving the conditional PSCell addition/change response message, the source base station may send an RRC reconfiguration message containing the conditional PSCell addition/change configuration of candidate cells to the wireless device. Based on receiving the RRC reconfiguration message, the wireless device may send an RRC reconfiguration complete message to the source base station. The wireless device may start evaluating conditional PSCell addition/change execution conditions for candidate cells in the conditional PSCell addition/change configuration. Based on at least one conditional PSCell addition/change candidate cell satisfying the corresponding conditional PSCell addition/change execution condition, the wireless device may apply the stored configuration of the selected candidate cell and synchronize to the candidate cell. Based the synchronization, the wireless device may complete the conditional PSCell addition/change procedure.

In an example, a wireless device may be configured with master cell group (MCG) and secondary cell group (SCG). neither MCG nor SCG transmission may be suspended in the wireless device. The wireless device may be configured with split SRB1 or SRB3. Based on detecting radio link failure of the MCG (e.g., PCell), the wireless device may initiate an MCG failure information procedure. The wireless device may send MCG failure information message to the MCG (e.g., PCell) via the SCG (e.g., PSCell) using the split SRB1 or SRB3. The MCG failure information message may comprise a failure type and measurement results. Based on receiving the MCG failure information message, the SCG (e.g., PSCell) may forward the MCG failure information message to the MCG. Based on receiving the MCG failure information message, the MCG may send an RRC reconfiguration message or RRC release message to the wireless device via the SCG. Based on receiving the RRC reconfiguration message, the wireless device may continue the RRC connection without re-establishment.

Figure 27:
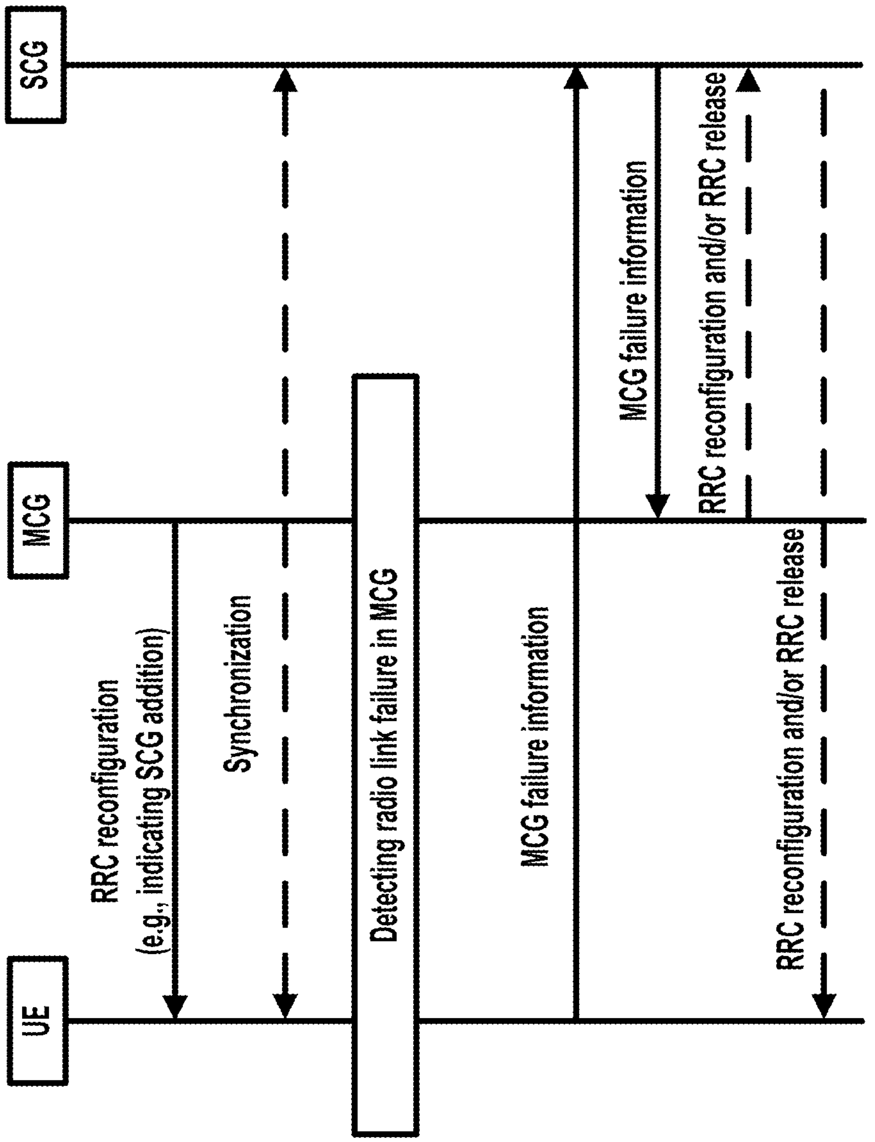
FIG. 27 illustrates an example of an MCG failure information procedure.

FIG. 27 illustrates example of an MCG failure information procedure. A base station of MCG may send an RRC reconfiguration message including a cell group configuration for a secondary cell group (SCG). Based on receiving the RRC reconfiguration message, a wireless device may perform the cell group configuration for the SCG and synchronization to a PSCell of the SCG where the SCG may comprise one PSCell and optionally one or more secondary cells (SCells). For the synchronization, the wireless device may perform a random access procedure to the PSCell. The wireless device may detect a radio link failure in the MCG (e.g., PCell). The wireless device may configure split SRB1 or SRB3. Based on detecting the radio link failure, the wireless device may initiate an MCG failure information procedure. Based on the initiating the MCG failure information procedure, the split SRB1 being configured and PDCP duplication being not configured for the split SRB1, the wireless device may set primary path to a cell group identity of the SCG. The wireless device may send an MCG failure information message to the MCG via SCG, using the split SRB1 or the SRB3. The MCG failure information may comprise a failure type and measurement report. Based on receiving the MCG failure information, the SCG may forward the MCG failure information to the MCG. Based on receiving the MCG failure information, the MCG may send an RRC reconfiguration message or an RRC release message.

In the example embodiment(s) of present disclosure, an L1/L2 triggered mobility (LTM) may refer to a handover or cell switch (e.g., from a current serving cell to a target cell) that a wireless device initiates, triggers, execute, performs, e.g., in response to receiving an L1 control signaling (e.g., DCI) and/or an L2 control signaling (e.g., MAC CE) according to example embodiments in the present disclosure. The current serving cell may be PCell or PSCell. For example, the LTM may refer to an L1 control signaling and/or an L2 control signaling that initiates and/or triggers a handover or cell switch (e.g., from a current serving cell to a target cell). In the present disclosure and/or other literatures, the LTM may be referred to as one or more different names. For example, LTM may be referred to as and/or interchangeable with L1/L2 inter-cell mobility, L1/L2 signaling based handover, L1/L2 based handover, lower layer mobility (LLM) and/or the like. The L1/L2 signaling that triggers the L1/L2 triggered mobility may comprise at least one of layer 1 (e.g., Physical layer) signal (e.g., DCI and/or UCI) and/or a layer 2 (e.g., MAC layer) signal (e.g., MAC CE and/or MAC subheader). The LTM may refer to and/or comprise a procedure that the wireless device receives, from a network (e.g., a serving cell or a serving base station), at least two signals (e.g., at least two control signals/messages). The at least two signals may comprise an L3 signaling (e.g., an RRC message and/or SIB) comprising configuration parameters of the LTM. For example, the configuration parameters may be semi-statically (pre-)configured for the LTM. The at least two signals may comprise the L1/L2 signaling that triggers (e.g., performs and/or initiates) the LTM. For example, in the present disclosure, handover may be referred to as and/or interchangeable with cell switch, LTM and/or the like, e.g., if the handover is initiated and/or triggered by an L1 control signaling (e.g., DCI) and/or an L2 control signaling (e.g., MAC CE).

In an example, a wireless device may receive, from a network (e.g., a serving cell, a serving base station, a serving DU, and/or a serving CU), one or more messages (e.g., RRC message and/or SIB) comprising parameters used for the L1/L2 triggered mobility. For example, the wireless device may receive, via a source cell (e.g., current serving cell) of the network, the one or more messages. The one or more messages may comprise one or more configurations for LTM. For example, the one or more configuration for LTM may comprise parameters used for the LTM. For example, each of the one or more configurations may be associated with a respective (candidate) target cell to which the wireless device initiates, executes, triggers, and/or performs an LTM. For example, a configuration (that is associated with a respective target cell) of the one or more configuration for LTM may comprise configuration parameters of LTM to the respective target cell. For example, each of the configuration parameters comprise: an identifier of the respective target cell; the configuration to be applied when the wireless device access the target cell; and/or an indication indicating that the corresponding to the configuration parameters is triggered (or initiated) by the L1/L2 signaling.

After or in response to receiving the one or more messages, the wireless device may monitor downlink transmission occasions (e.g., PDCCH and/or PDSCH) of the source cell. The wireless device may receive the L1/L2 signaling (e.g., cell switch command) via the downlink transmission occasions. For example, the L1/L2 signaling may comprise a DCI with a particular format that the wireless device detects/receives via the downlink transmission occasion (e.g., PDCCH). For example, the DCI may be addressed to a particular RNTI with which that the wireless device monitors a PDCCH (of a serving cell and/or source cell). For example, the L1/L2 signaling may comprise an MAC CE that the wireless device receives, decodes, and/or parses from a PDSCH that is scheduled by a DCI (or a PDCCH) that the wireless device receives via downlink transmission occasion(s). The L1/L2 signaling may comprise an indication indicating one of the one or more configurations for LTM that are configured and/or indicated by the one or more messages (e.g., RRC message and/or SIB) that the wireless device receives. For example, the indication indicating a first configuration of the one or more configurations for LTM. The indication may comprise an identifier of the first configuration. For example, the indication may be a configuration ID of the first configuration. The indication may comprise an identifier of a target cell respective to the first configuration. The wireless device may perform and/or execute, in response to receiving the L1/L2 signaling, the LTM (e.g., cell switch) to the target cell using configuration parameters of the first configuration.

The L1/L2 signaling (e.g., cell switch command) may comprise an indication indicating a first target cell that is one of (candidate) target cell(s) for LTM. For example, each of the one or more configurations for the LTM that the wireless device receives according to the example embodiments is associated with a respective target cell. For example, the first target cell is a target cell of LTM that a first configuration of the one or more configurations indicates. For example, the indication may comprise an identifier or an index of the first target cell. For example, the L1/L2 signaling indicating the first target cell may indicate that the wireless device initiates, executes, triggers, and/or performs, e.g., in response to receiving the L1/L2 signaling, the LTM to the first target cell using configuration parameters associated with the first target cell. the indication indicating the first target cell may comprise an indication indicating a configuration associated with the first target cell. For example, the indication may comprise an indication indicating a configuration ID of the configuration associated with the first target cell that the wireless device uses for the LTM to the first target cell.

A network (e.g., base station, DU, and/or CU) may determine to perform (e.g., trigger and/or initiate) LTM, e.g., after or in response to transmitting the one or more LTM configurations (e.g., may be referred to as one or more configurations for LTM in the present disclosure) to the wireless device. For example, the network may determine when to transmit, to the wireless device, the L1/L2 signaling to perform (e.g., trigger and/or initiate) LTM, e.g., after or in response to transmitting the one or more LTM configurations to the wireless device. The wireless device may transmit, for the network to determine to perform the LTM, a report comprising one or more measurements (e.g., L1 measurement and/or L3 measurement) of radio channel(s) over which the wireless device receives one or more reference signals from the network. The network may determine to perform (e.g., trigger and/or initiate) the LTM based on the report comprising the one or more measurements. For example, the network may determine, based on the one or more measurements, which cell, among one or more cells configured for the LTM (e.g., as potential target cells for L1/L2 triggered mobility), is a target cell of the LTM. The network may indicate the target cell by transmitting, to the wireless device, the L1/L2 signaling that comprises one or more indications indicating the target cell and/or a trigger (e.g., perform and/or initiate) the LTM to the target cell. For example, the network may determine, based on the one or more measurements, when to transmit, to the wireless device, the indication of the L1/L2 signaling to trigger (e.g., perform and/or initiate) the LTM to the target cell. The LTM can be applied for a PCell change and/or for a PSCell change.

The report that a wireless device transmits to the network may comprise L1 measurement. The L1 measurement may refer to a measurement report generated by a layer 1 (physical layer) and/or transmitted via physical channel(s) (e.g., FIG. 5B). The physical channel(s) may comprise a PUCCH and/or PUSCH. For example, the wireless device may transmit the L1 measurement via PUSCH by piggybacking the PUCCH (e.g., comprising the L1 measurement) onto the PUSCH. For example, the report may comprise L3 measurement. The L3 measurement may refer to a measurement report generated by a layer 3 (RRC layer) and/or transmitted via logical channel(s) (e.g., FIG. 5B). For example, the logical channel(s) may comprise CCCH and/or DCCH. The wireless device may multiplex the L3 measurement into an MAC PDU and transmit the MAC PDU as a TB via the PUSCH.

The network may transmit one or more LTM configurations for the L1/L2 triggered mobility for the L1 measurement. The one or more messages (e.g., a LTM configuration of the one or more LTM configurations) may comprise one or more resource configurations (e.g., CSI-ResourceConfig IE) of one or more reference signals and/or one or more report configurations (e.g., CSI-ReportConfig IE). The one or more resource configurations and/or the one or more report configurations are for the L1 measurement of the L1/L2 triggered mobility. The one or more resource configurations may indicate the radio resource configuration parameters based on which the wireless device receives the one or more reference signals. The one or more report configurations may indicate parameter(s) and/or value(s) to be contained in the report comprising L1 measurement. Each of the one or more report configurations may be associated with at least one (e.g., downlink) reference signal indicated by the one or more resource configurations. For example, a first reporting configuration of the one or more report configurations may comprise an identifier of at least one reference signal indicated by the one or more resource configurations. The wireless device may transmit a report comprising a measured quantity of the at least one reference signal, e.g., if the report is generated based on the first reporting configuration and/or if the first reporting configuration comprises the identifier of at least one reference signal. Each of the one or more report configurations may be associated with a respective uplink resource (e.g., PUCCH and/or PUSCH). For example, the wireless device may transmit the report via the uplink resource associated with the first reporting configuration, e.g., if the report is generated based on the first reporting configuration.

Each (e.g., CSI-ResourceConfig IE) of the one or more resource configurations may be associated with one or more (e.g., downlink) reference signals. For example, a first resource configuration of the one or more resource configurations may comprise radio resource configuration parameters of the one or more reference signals. The radio resource configuration parameters may indicate a set of downlink resources on which the wireless device performs measurements (e.g., receives the set of reference signals) in order to determine the quantity or quantities to be reported. For example, the radio resource configuration parameters may comprise an identifier of each of the one or more reference signals, a type (e.g., CSI-RS, SSB, DM-RS, and/or PT-RS) of each of the one or more reference signals, a transmission type (e.g., periodic, aperiodic, and/or semi-persistent) of each of the one or more reference signals, a sequence ID of each of the one or more reference signals, power control parameter(s) of each of the one or more reference signals, and/or time and frequency resource(s) via which the wireless device receives each of the one or more reference signals.

Each of the one or more reference signals indicated by the one or more resource configurations may be associated with a respective cell. The cell associated with (e.g., respective to) a reference signal of the one or more reference signals may be one of cells configured by the network. For example, the cell associated with (e.g., respective to) the reference signal may be a serving cell (e.g., PCell, PSCell, SCell, SPCell). For example, the cell associated with (e.g., respective to) the reference signal may be a non-serving cell (e.g., referred to as one or more SSBs (e.g., or TRP) configured with a serving cell and/or configured with different PCI than PCI of the serving cell). For example, the cell associated with (e.g., respective to) the reference signal may be a cell configured as one of target cell(s) of L1/L2 triggered mobility. For example, the cell associated with (e.g., respective to) the reference signal may be a neighbor cell configured as measurement configurations for L3 measurement.

Each (e.g., CSI-ReportConfig IE) of the one or more report configurations may indicates: a specific quantity or a set of quantities to be contained in the report; downlink resource(s) (e.g., where the wireless device receives the one or more reference signals) on which the wireless device performs measurements (e.g., receives the set of reference signals) in order to determine the quantity or quantities to be reported; How the actual reporting is to be carried out, for example, when the reporting is to be done and what uplink physical channel to use for the reporting.

In an example, a report configuration of the one or more report configurations may indicate a set of (e.g., downlink) reference signals or a set of (e.g., downlink) resources on which the wireless device performs measurements (e.g., receives the set of reference signals) in order for the wireless device to determine the quantity or quantities to be reported. This is done by associating the report configuration with one or more reference signals (e.g., NZP-CSI-RSResourceSet) to be used for the wireless device to measure channel characteristics. For example, a report configuration may comprise an identifier (e.g., set ID) of a set of one or more reference signals. The one or more resource configurations may comprise the identifier and its corresponding set of one or more reference signals. Each of the one or more reference signals may comprise one or more CSI-RSs, one or more SSBs, one or more PT-RSs, and/or any combination thereof. For example, the set of one or more reference signals may comprise any combination of one or more CSI-RSs, the one or more SSBs, one or more PT-RSs.

In an example, a report configuration of the one or more report configurations may indicate a quantity or set of quantities that the wireless device (e.g., is supposed to) reports/contains in the report. For example, a quantity or set of quantities may be referred to as channel-state information (CSI). The set of quantities may comprise at least any combination of channel-quality indicator (CQI), rank indicator (RI), and precoder-matrix indicator (PMI). The report configuration may indicate reporting of received signal strength, e.g., referred to as reference-signal received power (RSRP), received signal quality, e.g., referred to as reference-signal received quality (RSRQ), and/or signal to interference and noise ratio (SINR). The RSRP and/or RSRQ for the L1 measurement may be referred to as L1-RSRP and/or L1-RSRQ, respectively, e.g., reflecting the fact that the reporting does not include the more long-term ("layer 3") filtering applied for the higher-layer RSRP reporting.

In an example, a report configuration of the one or more report configurations may indicate when and how the wireless device transmit the report. The transmission of the report by the wireless device may be periodic (e.g., referred to as periodic reporting), semi-persistent (e.g., referred to as semi-persistent reporting), and/or aperiodic (e.g., referred to as aperiodic reporting). For the periodic reporting, the report configuration may indicate a periodicity of the periodic reporting. For example, the wireless device may transmit the report periodically (e.g., perform the periodic reporting) via PUCCH. For example, the report configuration may comprise information about a periodically available PUCCH resource to be used for the periodic reporting. In the case of semi-persistent reporting, the wireless device may be configured with periodically occurring reporting instances in the same way as for periodic reporting with activation and/or deactivation mechanism. For example, the wireless device may activate (e.g., start) or deactivate (e.g., stop or suspend) the semi-persistent reporting in response to receiving a control signal (e.g., DCI and/or MAC CE) indicating the activation or deactivation. The wireless device may transmit the report semi-persistently (e.g., perform the semi-persistent reporting). For example, the report configuration may comprise information about a periodically available PUCCH resource to be used for the semi-persistent reporting. The wireless device may transmit the report semi-persistently (e.g., perform the semi-persistent reporting) via semi-persistently allocated PUSCH resource(s).

In an example, the wireless device may receive, from a network (e.g., a serving cell, a service base station, a serving DU, and/or a serving CU), one or more messages (e.g., RRC message and/or SIB). The one or more messages may comprise one or more LTM configurations for the L1/L2 triggered mobility (e.g., L1/L2 triggered mobility). The one or more messages may comprise configuration parameters used for L1 measurement of the L1/L2 triggered mobility. The configuration parameters may comprise one or more resource configurations (e.g., CSI-ResourceConfig IE) and/or of one or more report configurations (e.g., CSI-ReportConfig IE) that are used for the L1 measurement. The wireless device may start, perform, or initiate the L1 measurement according to the configuration parameters of: one or more resource configurations (e.g., CSI-ResourceConfig IE); and/or of one or more report configurations (e.g., CSI-ReportConfig IE), e.g., after or in response to receiving the configuration parameters. For example, the wireless device determines (or measures) CQI, RI, PMI, RSRP, RSRQ, and/or SINR of (or using) one or more reference signals (e.g., CSI-RSs, SSBs, PT-RSs) configured by the one or more resource configurations. The wireless device may generate a report comprising the L1 measurement. The wireless device may determine the contents and/or parameter value(s) contained in the report or the L1 measurement according to a report configuration, of the one or more report configurations, that triggers the transmission of the report. The wireless device may transmit the report to the network. The wireless device may receive, after or in response to transmitting the report, L1/L2 signaling that triggers (or initiates) the L1/L2 triggered mobility using one of the one or more LTM configurations.

Figure 28:
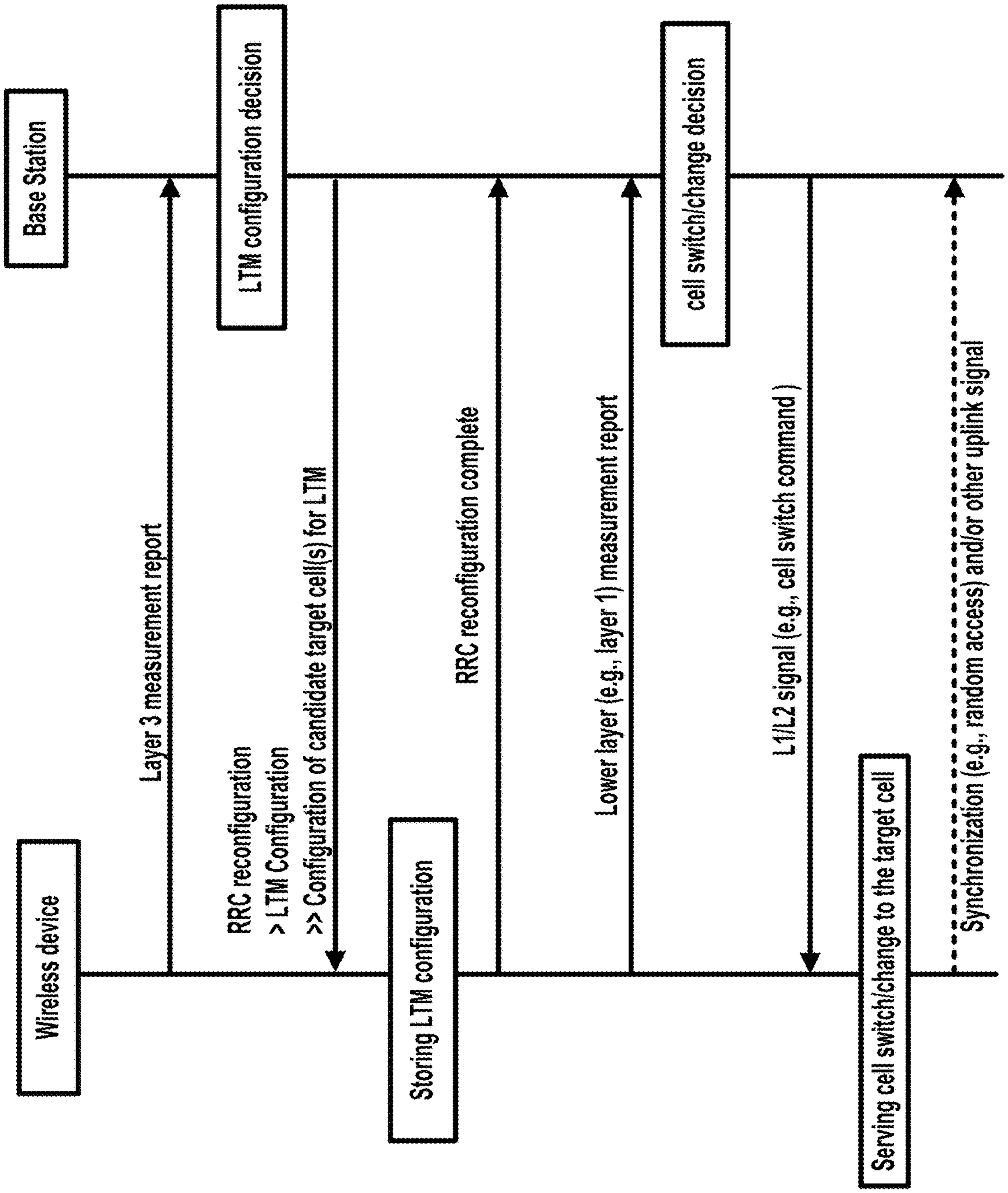
FIG. 28 illustrates an example of L1/L2 triggered mobility.

FIG. 28 illustrates an example of L1/L2 triggered mobility. a wireless device may transmit and/or send to a (serving) base station (and/or a network), a measurement report (e.g., L3 measurement report) comprising one or more measurements of one or more cells. The (serving) base station may determine to configure LTM to the wireless device. The (serving) base station may determine at least one of the one or more cells as a candidate target cell for LTM. The (serving) base station upon receiving the measurement report may transmit to the wireless device an RRC reconfiguration message including the configuration of a candidate target cell for LTM. based on receiving the RRC reconfiguration message, the wireless device may store the configuration of the candidate target cell for LTM and send an RRC reconfiguration complete message to a DU of the (serving) base station.

In the present disclosure, a target cell may refer to a cell to which a wireless device may perform, initiate, trigger, execute a handover or a cell switch, wherein the handover or the cell switch may comprise any type of handover or cell switch referred in the present disclosure, e.g., L3 handover, CHO, LTM, an LTM based on an early TA procedure. In the present disclosure, the candidate target cell may refer to a cell indicated in a LTM configuration, e.g., as a (e.g., potential) target cell to which the wireless device performs the LTM or a cell switch in response to receiving the L1/L2 signal of the LTM. For example, the wireless device may receive a plurality of LTM configurations. Each of the plurality of LTM configurations may comprise an indication and/or identifier of a respective candidate target cell. A candidate target cell may remain as a candidate of the target cell of the LTM (e.g., may not be a target cell) until the L1/L2 signal of the LTM indicates the target cell. For example, none of candidate target cells indicated by the plurality of the LTM configuration becomes a target cell, e.g., if the wireless device doesn't receive the L1/L2 signal of the LTM. For example, (e.g., only) one of candidate target cells indicated by the plurality of the LTM configuration may become a target cell, e.g., if the wireless device receives the L1/L2 signal, of the LTM, that indicate the candidate target cell as a cell to which the wireless device performs the LTM or a cell switch in response to receiving the L1/L2 signal of the LTM.

In an example of FIG. 28, the wireless device may transmit L1 measurement report to the base station. Based on the L1 measurement report, the base station may determine cell switch using LTM. the base station may transmit to the wireless device a L1/L2 signaling (e.g., cell switch command) indicating the determining the cell switch using LTM. The L1/L2 signaling may indicate a target cell of the candidate target cell and/or a configuration, associated with the target cell, among the configuration(s) for LTM. Based on receiving the L1/L2 signaling, the wireless device may switch serving cell (e.g., PCell or PSCell) to the target cell (e.g., may indicate and/or determine the target cell as a (e.g., new serving cell). The wireless device may perform synchronization with the target cell. The synchronization may comprise uplink synchronization and/or downlink synchronization. The wireless device may perform a random access procedure for (e.g., to acquire) the uplink synchronization. For example, the wireless device may determine a downlink timing advance value and/or an uplink timing advance value from the uplink synchronization and/or the downlink synchronization. The wireless device may use the downlink timing advance value to adjust reception timing of a downlink transmission from the target cell. The wireless device may use the uplink timing advance value to adjust transmission timing of an uplink transmission to the target cell.

L1/L2 based inter-cell mobility (e.g., LTM) may comprise at least one of three phases: preparation, execution, and completion. For the preparation phase, the base station central unit (CU) may take decision (e.g., based on L3 measurements from the wireless device (UE) to configure mobility parameters to the wireless device and base station distributed unit(s) (DU(s)) for target candidate cell(s) in advance. For the execution phase, the base station distributed unit may receive L1 measurements from a wireless device and triggers change of cell directly to the wireless device. for the completion phase, path switch toward the new cell may take place.

Figure 29:
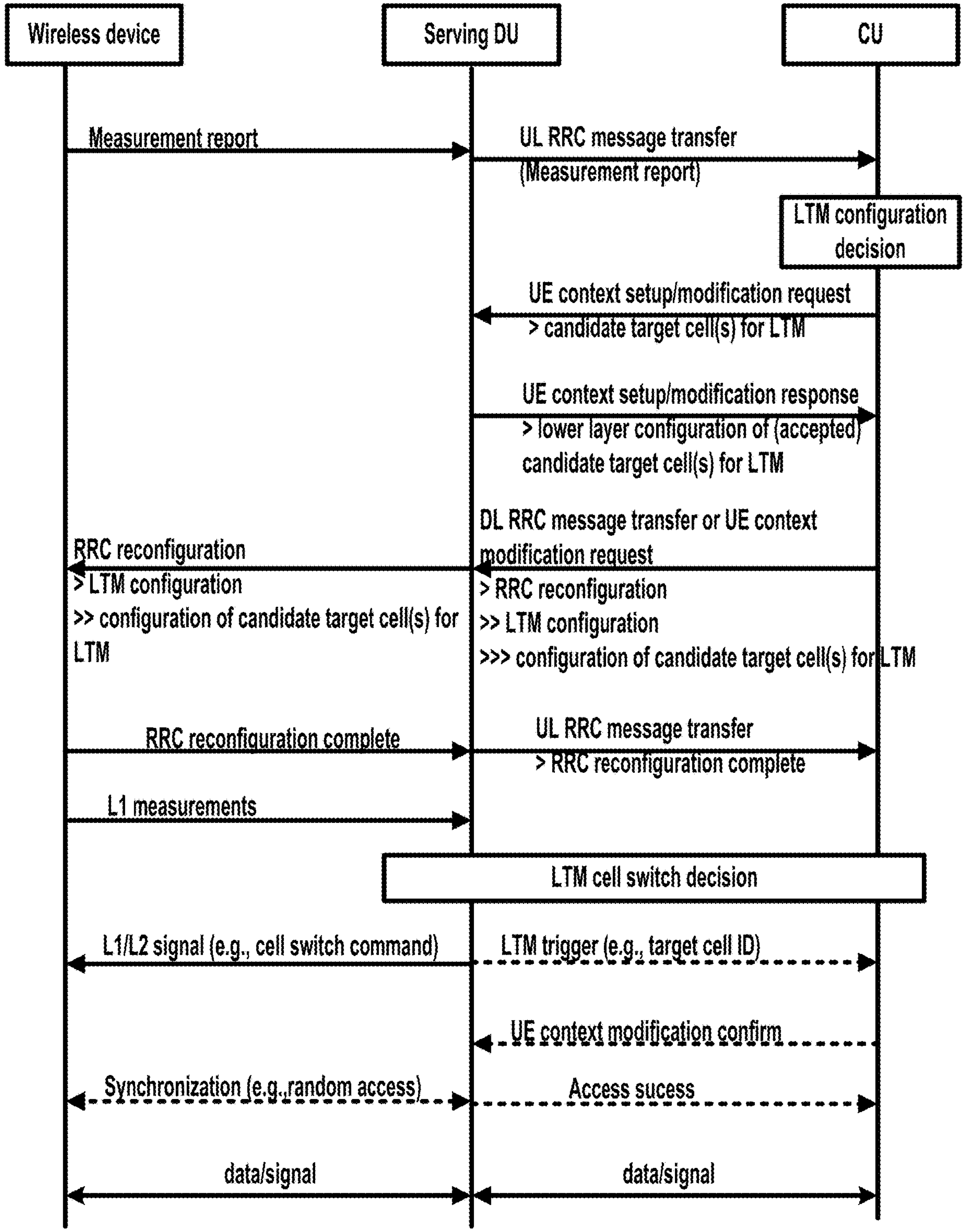
FIG. 29 illustrates an example of intra-DU L1/L2 triggered mobility.

FIG. 29 illustrates example of intra-DU LTM. The intra-DU LTM may refer to a handover or cell switch using LTM from a source cell of a DU to a target cell of the same DU. For example, A serving DU in FIG. 29 may comprise a source cell (e.g., current serving cell or PCell or PSCell) of a wireless device and/or a target cell of the LTM. The wireless device may send, to a CU via a serving DU, a measurement report including one or more measurements of one or more cells, which may become candidate target cell(s) for LTM. A serving DU, of a serving base station, may receive, from the wireless device, the measurement report and/or may include the received measurement report in an UL RRC message transfer message to a CU of the serving base station. The serving DU may send, to the CU, the UL RRC message transfer message comprising the measurement report (e.g., to convey the received measurement report). The CU may determine to initiate LTM configuration. The CU may send a UE context request (e.g., UE context setup/modification request in FIG. 29) message to the serving DU, indicating a request for the serving DU to configure the wireless device with the LTM. the UE context request message may comprise candidate target cell(s) (e.g., to be set up or configured for LTM). If the serving DU accepts the request for configuring LTM for the wireless device upon reception of the UE context request message (e.g., UE context setup/modification request in FIG. 29), the serving DU may send a UE context response message (e.g., UE context setup/modification response in FIG. 29), to the CU, including lower layer configuration of the candidate target cell(s) for LTM. the serving DU generates the lower layer configuration. For example, the lower layer may comprise physical layer and/or MAC layer and/or RLC layer.

In an example of FIG. 29, the serving DU may have identified one or more cells, as (e.g., preferred cell(s) of) candidate target cell(s) for the LTM and correspondingly may send the one or more cells, e.g., as a suggestion, to the CU. This may be realized by the serving DU initiating a UE context setup/modification procedure. The CU may take the one or more cells under consideration to determine the target cell(s) of the LTM.

In an example of FIG. 29, upon reception of the UE context setup/modification response message the CU may transmit to the serving DU a DL RRC message transfer message (or UE context modification request) comprising an RRC reconfiguration to be transmitted to the wireless device, the RRC reconfiguration message may comprise the LTM configuration, the LTM configuration may comprise a configuration for the (accepted) candidate target cell configured for LTM. the configuration may comprise the lower layer configuration and an upper layer configuration, the upper layer may comprise an RRC layer and/or SDAP layer and/or an PDCP layer. The CU generates the upper layer configuration (e.g., based on receiving the UE context setup/modification message from the DU). The serving DU may transmit to the UE the RRC reconfiguration message for configuring the one or more candidate target cells for LTM. The wireless device may send an RRC reconfiguration complete message to the serving DU, e.g., in repose to and/or as a response to the reception of the RRC reconfiguration message. The serving DU may encapsulate the RRC reconfiguration message in the UL RRC message transfer message. The serving DU may send the UL RRC message transfer message (e.g., comprising the RRC reconfiguration message) to the CU. The CU may receive, from the serving DU, the UL RRC message transfer message and may determine (e.g., consider) the wireless device to be configured with LTM, e.g., based on the UL RRC message transfer message.

In an example of FIG. 29, the wireless device may transmit L1 measurement report (e.g., L1 measurements in FIG. 29) to the serving DU of the base station. For example, the LTM configuration in the RRC reconfiguration that the wireless device receives may comprise configuration parameters of the L1 measurement report. The configuration parameters may comprise one or more resource configurations (e.g., CSI-ResourceConfig IE) and/or one or more report configurations (e.g., CSI-ReportConfig IE). The wireless device may perform and/or start the L1 measurement based on the configuration parameters of the L1 measurement report. Based on the L1 measurement report, the serving DU may determine (e.g., LTM decision in FIG. 29) to execute LTM (e.g., a handover and/or a cell switch) to a target cell using LTM. For example, the serving DU may comprise a (e.g., current) service cell and a target cell of the LTM. The serving DU of the base station may transmit to the wireless device a L1/L2 signaling (e.g., LTM cell switch command) indicating the determining the LTM (e.g., the handover and/or the cell switch) to the target cell using the LTM. The serving DU transmitting the L1/L2 signaling to the wireless device may transmit to the CU a message (e.g., LTM trigger in FIG. 29) that may indicate the transmitting the L1/L2 signaling to the wireless device. The message may indicate an identity or identifier (ID) of the target cell. The L1/L2 signaling may indicate a target cell and/or a configuration (e.g., and/or configuration parameters to be used by the wireless device for the LTM to the target cell), associated with the target cell, among the configuration for LTM. The serving DU may receive, from the CU, a response to the message. The response may be a UE context modification confirmation message (e.g., a UE context modification confirm in FIG. 29). Based on receiving the L1/L2 signaling, the wireless device may switch serving cell to the target cell. The wireless device may perform synchronization with the target cell. the synchronization may comprise uplink synchronization and/or downlink synchronization, the wireless device may perform a random access procedure for the uplink synchronization. Based on the synchronization being successfully completed, the wireless device may transmit uplink packet via the target cell and/or receive downlink packet via the target cell. the serving DU may detects access, of the wireless device, (to the target cell). (e.g., based on successful access of the wireless device,) the base station (e.g., the serving DU or the CU) may release the source cell's resources and/or prepared cell (e.g., the candidate target cell(s), the target cell)'s resources.

Figure 30:
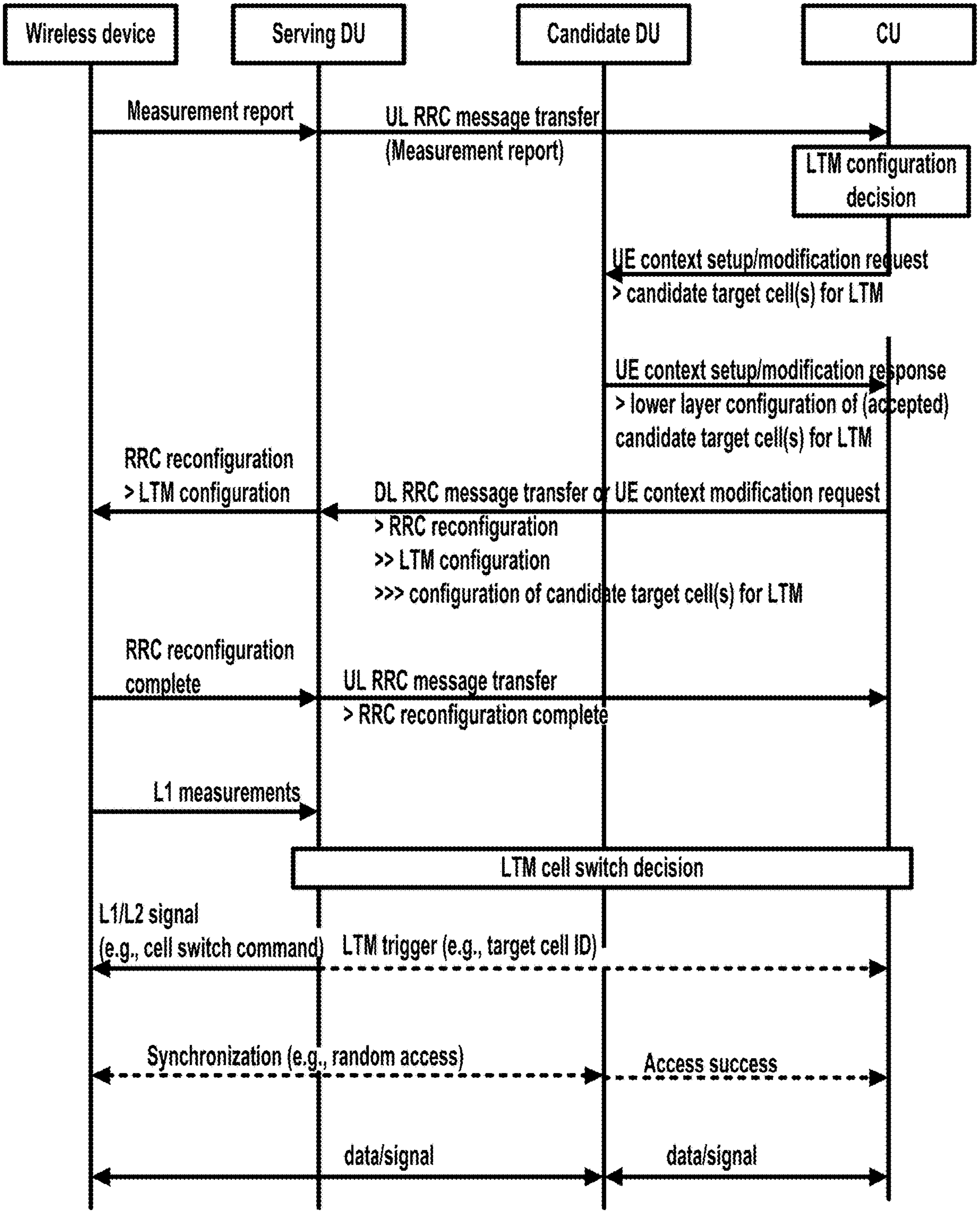
FIG. 30 illustrates an example of inter-DU L1/L2 triggered mobility.

FIG. 30 illustrates example of inter-DU L1/L2 triggered mobility. The inter-DU LTM may refer to a handover or cell switch using LTM from a source cell of a first DU to a target cell of a second DU (e.g., different from the first DU). For example, A serving DU in FIG. 30 may comprise a source cell (e.g., current serving cell or PCell or PSCell) of a wireless device. a candidate DU in FIG. 30 may comprise a target cell of the wireless device for the LTM. For the inter-DU LTM, the serving DU and the candidate DU may communicate to each other, e.g., via one or more CUs to coordinate (e.g., determine) an LTM for the wireless device. For example, if the serving DU and the candidate DU are associated with a same CU, the serving DU and the candidate DU may communicate to each other via the same CU according to example embodiments in the present disclosure. For example, the serving DU and the candidate DU are associated with different CUs. For example, the serving DU and the candidate DU are respectively associated with a serving CU and a candidate CU. In this case, the serving DU and the candidate DU may communicate to their respective CUs. The CUs may communicate to each other, e.g., to coordinate (e.g., determine) an LTM from the source cell of the serving DU to the target cell of the candidate DU for the wireless device.

In an example of FIG. 30, a wireless device may send a measurement report (e.g., L3 measurement report and/or L1 measurement report) including one or more measurements of one or more cells, which may become candidate target cells for LTM. A serving DU, of a serving base station, which receives the measurement report may include the measurement report in an UL RRC message transfer message to a CU of the serving base station. The serving DU may send the UL RRC message transfer message to the CU, e.g., to convey the received measurement report to the CU. The CU may determine to initiate LTM configuration. The CU may send a UE context setup/modification request message to a candidate DU, e.g., to create/modify a UE context of the wireless device and/or indicate a request to the candidate DU to configure the wireless device with LTM. the UE context request message may comprise candidate target cell(s) (e.g., to be set up or configured for LTM). If the candidate DU accepts the request for configuring LTM for the wireless device upon reception of the UE context setup/modification request message, the candidate DU may send a UE context setup/modification response message, to the CU, comprising lower layer configuration of a candidate target cell associated with the candidate DU for the LTM. the candidate DU generates the lower layer configuration. For example, the lower layer may comprise physical layer and/or MAC layer and/or RLC layer. The CU may send a UE context request (e.g., UE context modification request in FIG. 30) message to the serving DU, indicating the candidate target cells for LTM. Upon reception of the UE context response message (e.g., UE context modification response in FIG. 30), the CU may transmit to the serving DU a DL RRC message transfer message (or UE context modification request message) comprising an RRC reconfiguration to be transmitted to the wireless device. For example, the RRC reconfiguration may comprise one or more LTM configurations, the LTM configuration may comprise a configuration for the (accepted) candidate target cell configured for LTM. the configuration may comprise the lower layer configuration and an upper layer configuration, the upper layer may comprise an RRC layer and/or SDAP layer and/or an PDCP layer. The CU generates the upper layer configuration (e.g., based on receiving the UE context setup/modification message from the DU). Each LTM configuration of the one or more LTM configurations may be associated with a respective target cell (e.g., candidate cell) and/or may comprise a respective LTM configuration parameters used by the wireless device for (or during) an LTM to the respective target cell. The serving DU may transmit to the wireless device the RRC reconfiguration message for configuring the one or more LTM candidates. The wireless device may send an RRC reconfiguration complete message to the serving DU. The serving DU may encapsulate the RRC reconfiguration complete message in the UL RRC message transfer message and send the UL RRC message transfer message to the CU. The CU may receive the message and determine (e.g., consider) the wireless device configured with LTM.

In an example of FIG. 30, the wireless device may transmit L1 measurement report (e.g., L1 measurements in FIG. 30) to the serving DU of the base station. Based on the L1 measurement report, the serving DU may determine to execute LTM (e.g., a handover and/or a cell switch) using LTM. The serving DU of the base station may transmit to the wireless device a L1/L2 signaling (e.g., LTM cell switch command in FIG. 30) indicating the determining the LTM. the serving DU may trigger the execution by transmitting the L1/L2 signal (e.g., LTM cell switch command) to the UE. The serving DU may inform the CU of the serving cell switch. the serving DU may request information from a candidate before triggering LTM cell switch command to the UE. The information may comprise resource (e.g., RACH resource and/or PUSCH resource) for access, of the wireless device, to the target cell. The serving DU transmitting the L1/L2 signaling to the wireless device may transmit to the CU a message (e.g., LTM trigger in FIG. 30) indicating the transmitting the L1/L2 signaling to the wireless device. The message may indicate an identity and/or identifier (ID) of the target cell. The L1/L2 signaling may indicate a target cell of the candidate target cell and/or a configuration, associated with the target cell, among the configuration for LTM. Based on receiving the L1/L2 signaling, the wireless device may switch serving cell to the target cell. The wireless device may perform synchronization with the target cell. the synchronization may comprise uplink synchronization and/or downlink synchronization, the wireless device may perform a random access procedure for the uplink synchronization. based on the synchronization being successfully completed, the wireless device may transmit uplink packet via the target cell and/or receive downlink packet via the target cell. the candidate DU may receive a signal for uplink synchronization (e.g., preamble) and/or uplink packet via the target cell. the candidate DU may detects access, of the wireless device, (to the target cell). Based on the receiving, the candidate DU may transmit to the CU a message indicating that the wireless device successfully accesses to the target cell of the candidate DU. (e.g., based on successful access of the wireless device) the base station (e.g., the serving DU or the CU or the candidate DU) may release the source cell's resources and/or prepared cell (e.g., the candidate target cell(s), the target cell)'s resources.

In an example of FIG. 29 and FIG. 30, the serving DU may have identified some cells for the LTM and correspondingly may send them as a suggestion to the CU. The CU may take them under consideration. This may be realized by the serving DU initiating a UE context modification procedure.

A base station configures, to a wireless device, RRC configuration parameters (SSBs, RACH resources, MAC parameters, PHY cell common and/or UE-specific parameters) of a target PCell for performing a HO and/or a CHO to the target PCell from a source PCell. When performing the HO and/or the CHO to the target PCell, the wireless device applies the received/stored RRC configuration parameters. The wireless device starts to perform downlink synchronization towards the target PCell (e.g., time/frequency alignment by monitoring the SSBs configured on the target PCell). After the downlink synchronization is complete, the wireless device starts to perform uplink synchronization, e.g., by initiating an RA procedure based on the RACH resources configured on the target PCell. The wireless device receives a time alignment (TA) command in a RAR corresponding to a preamble transmitted by the wireless device.

For transmitting a preamble during the RA procedure, the wireless device may select, based on a RSRP value of a first SSB being greater than a RSRP threshold, the first SSB from a plurality of candidate SSBs configured in the RACH resources (e.g., based on the example described above with respect to FIG. 22) on the target PCell. The RA procedure that the wireless device performs may be based on example disclosure in the present disclosure (e.g., FIG. 13A, FIG. 13B, and/or FIG. 13C). The RA procedure may be a CBRA and/or CFRA that the wireless device performs based on example disclosure in the present disclosure (e.g., FIG. 13A, FIG. 13B, and/or FIG. 13C). In an example, the wireless device determines the preamble with a preamble index associated with the selected first SSB according to RACH resource configuration parameters. After selecting the first SSB, the wireless device determines a next available PRACH occasion from PRACH occasions corresponding to the selected first SSB permitted by the restrictions given by the ra-ssb-OccasionMaskIndex configured in the rach-ConfigDedicated IE. The wireless device transmits the preamble via the determined PRACH occasion to the target PCell. The wireless device monitors a PDCCH of the target PCell for receiving a RAR corresponding to the preamble. The wireless device receives the RAR comprising the preamble index and/or a TA command. The wireless device completes the CFRA procedure. The CFRA procedure may be implemented based on example embodiments described above with respect to FIG. 13B. After completing the CFRA procedure, the wireless device may receive, from the target PCell, a beam indication (or a TCI state indication) used for PDCCH/PDSCH/CSI-RS reception and/or PUCCH/PUSCH/SRS transmission for the target PCell. The wireless device may apply the beam (or the TCI state) for PDCCH/PDSCH/CSI-RS reception and/or PUCCH/PUSCH/SRS transmission for the target PCell.

For example, the wireless device, after receiving a HO command (e.g., RRC reconfiguration with a ReconfigurationWithSync IE), performs downlink synchronization and uplink synchronization, beam alignment/management via a target PCell. Performing downlink synchronization, uplink synchronization and/or beam alignment may be time consuming.

Figure 31A:
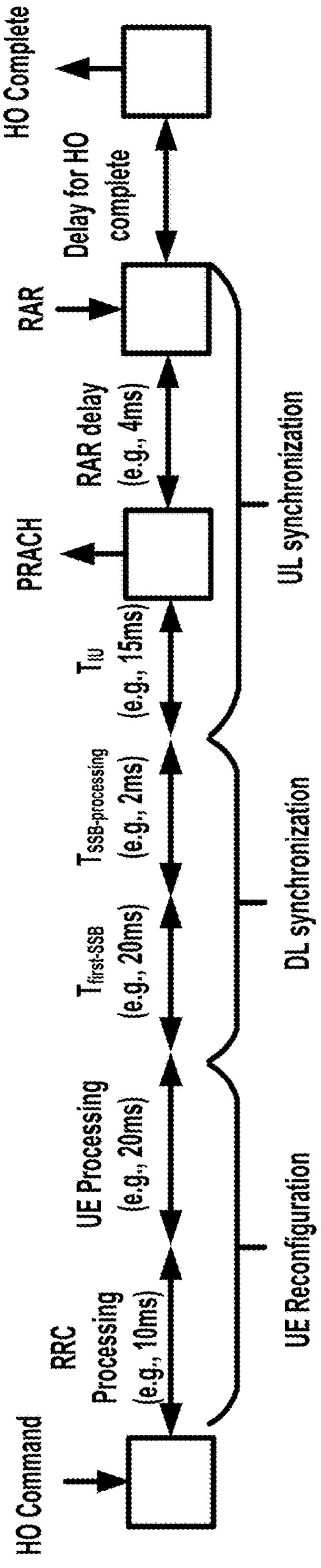
FIG. 31A and FIG. 31B illustrates examples of timeline of PCell switching.

FIG. 31A shows an example of timeline of L3 handover in which the wireless device receives (from a base station) one or more messages (and/or signal) and/or transmits (to the base station) one or more message (and/or signal). In an example, when a wireless device receives a HO command (e.g., a RRC reconfiguration message based on example embodiments described above with respect to FIG. 20, FIG. 21 and/or FIG. 22), the wireless device may spend around 10 ms for RRC message processing (PDCCH/PDSCH decoding, ACK/NACK feedback etc.) and then spend 20 ms for UE processing (e.g., loading RRC/MAC/PHY related parameters to memory unit of the wireless device, etc.). This process of RRC message processing and UE processing may be referred to as UE reconfiguration. Then the wireless device may spend more than 20 ms for searching for a first SSB (Tfirst-SSB) and may need additional 2 ms for processing the SSB (TSSB-processing). The SSB searching and processing may be referred to as downlink (DL) synchronization. The wireless device may spend around 20 ms for uplink (UL) synchronization comprising a first time period of an interruption uncertainty (TIU) in acquiring a first available PRACH occasion for a preamble transmission in the target cell, a second time period used for PRACH transmission, a third time period (4 ms in FIG. 31A) for monitoring PDCCH for receiving a RAR corresponding to the preamble transmission, and/or receiving/decoding the RAR. TIU (15 ms) can be up to the summation of SSB to PRACH occasion association period and 10 ms. There may be additional time period for processing and coding a RRC message for a HO complete indication. Existing HO procedure may increase PCell switching latency.

Figure 31B:
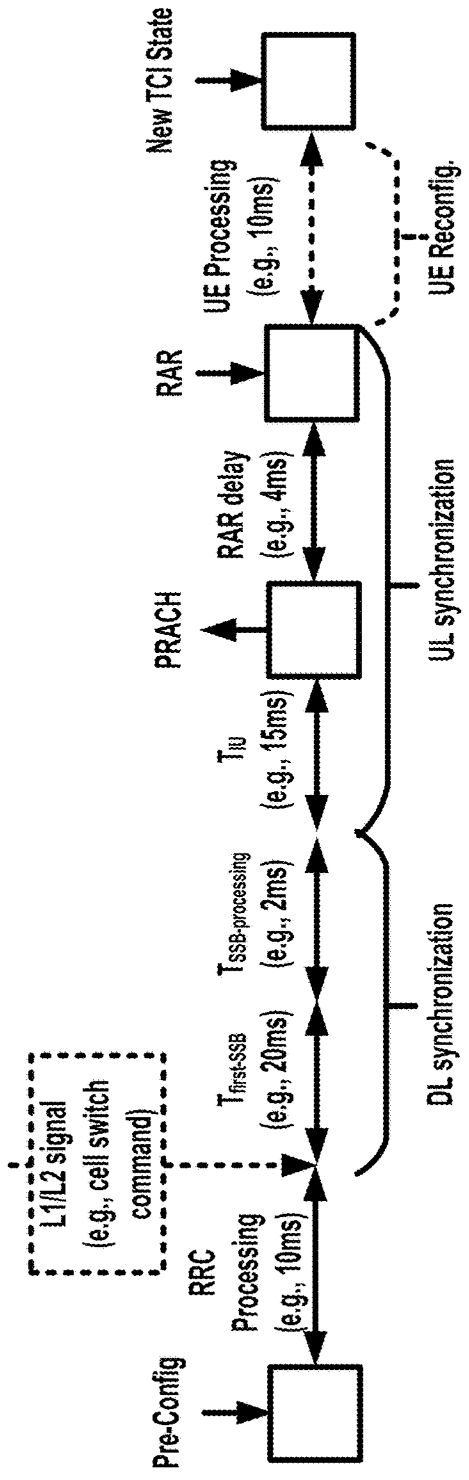

FIG. 31B shows an example of timeline of LTM in which the wireless device receives (from a base station) one or more messages (and/or signal) and/or transmits (to the base station) one or more message (and/or signal) for mobility management and/or network energy saving. In an example, before a wireless device receives a HO command (e.g., a L1/L2 signal described in example embodiments of the present disclosure), the wireless device may receive a RRC reconfiguration message (e.g., Pre-Config in FIG. 31B) according to example embodiment of the present disclosure. The wireless device may spend 10 ms for RRC processing.

In an example of FIG. 31B, the wireless device may receive an L1/L2 signal indicating cell switch (e.g., a PCell switching), e.g., after receiving the RRC reconfiguration message. In response to receiving the layer 1/2 signal indicating the cell switch, the wireless device may perform DL synchronization and/or UL synchronization. After completing the DL/UL synchronization, the wireless device may receive a TCI state indication of the new PCell for PDCCH/PDSCH reception and/or PUCCH/PUSCH transmission via the new PCell. In an example, the wireless device may conduct (e.g., apply) UE reconfiguration after completing the DL/UL synchronization. When the wireless device supports the UE reconfiguration after receiving the RRC reconfiguration message, the UE reconfiguration may be conducted upon receiving the RRC reconfiguration message, rather than after completing the DL/UL synchronization. The latency for HO to the new PCell in this case comprises DL synchronization, UL synchronization, and TCI state indication and/or application.

In an example, the wireless device, after receiving the L1/L2 signal indicating cell switch (e.g., cell switching command), may perform UL synchronization by conducting RACH procedure, e.g., based on example embodiments described above with respect to FIG. 13A, FIG. 13B and/or FIG. 13C. The performing UL synchronization may comprise, transmitting a preamble via an active uplink BWP (e.g., a BWP configured as firstActiveUplinkBWP-id as shown in FIG. 21) of uplink BWPs of the target PCell, monitoring PDCCH on an active downlink BWP (e.g., a BWP configured as firstActiveDownlinkBWP-id as shown in FIG. 21) of the target PCell for receiving a RAR comprising a TA which is used for PUSCH/PUCCH transmission via the target PCell, receiving the RAR and/or obtaining the TA. The wireless device may activate the uplink BWP configured with firstActiveUplinkBWP-id and the downlink BWP configured with firstActiveDownlinkBWP-id on the target PCell upon performing HO to the target PCell. After completing the UL synchronization, the wireless device obtains the TA to be used for PUSCH/PUCCH transmission via the target PCell. The wireless device, by using the TA to adjust uplink transmission timing, and then transmit PUSCH/PUCCH via the target PCell based on the adjusted timing. The adjusting uplink transmission timing may comprise advancing or delaying the transmissions by an amount indicated by a value of the TA, e.g., to ensure the uplink signals received at the target PCell are aligned (in time domain) with uplink signals transmitted from other wireless devices.

To further reduce HO latency, e.g., especially the latency introduced for uplink synchronization, a network and/or a wireless device may perform an early TA acquisition (ETA) or early random access (Early RACH) procedure. The ETA may refer to a procedure comprising a downlink transmission that a wireless device that is configured with an LTM receives a first indication of the ETA from the network (e.g., a serving base station and/or a serving cell). The first indication of the ETA may indicate a uplink reference signal (e.g., preamble, SRS, DM-RS, and/or PT-RS) to a candidate target cell that is one of the candidate target cells configured in the LTM configuration. The first indication may be DCI and/or MAC CE. The ETA may refer to a procedure comprising an uplink transmission that a wireless device transmits, to the candidate target cell, the uplink reference signal. The ETA may be for acquiring a TA value before triggering/initiating/executing the LTM. For example, the wireless device may receive a second indication (e.g., L1/L2 signal in FIG. 28, FIG. 29, FIG. 30, and/or FIG. 31B) indicating a cell switch to a target cell (e.g., the candidate target cell) that is one of candidate targets cell configured in the LTM configuration, e.g., after or in response to receiving the first indication and/or transmitting the uplink reference signal. For example, the wireless device that performs the ETA procedure may not perform an RA procedure to the target cell, e.g., after or in response to receiving the second indication, for example, if the target cell is the same as the candidate target cell to which the wireless device transmits the uplink reference signal based on the first indication.

A base station central unit of a base station determines a layer 3 (L3) handover (e.g., may be referred to as and/or comprise a normal handover or conditional handover) based on L3 measurement report received from a wireless device. For example, the wireless device transmits to the base station the L3 measurement report via an RRC message (e.g., measurement report message). A base station distributed unit of the base station may receive the RRC message and forwards the RRC message to the base station central unit. Based on the determining the L3 handover, the base station central unit may transmit to the wireless device an RRC message (e.g., a handover command) for the L3 handover. The wireless device may require more time to obtain L3 measurement results for the L3 measurement report as compared to a L1 measurement results as shown in FIG. 18. The L3 measurement results may be an averaged value of one or more L1 measurement results.

A base station distributed unit may determine a LTM (e.g., a layer 1/2 handover) based on L1 measurement report received from a wireless device. For example, the wireless device transmits L1 measurement report via a L1/L2 signal to the base station distributed unit. Based on determining the LTM, the base station distributed unit may transmit a L1/L2 signal triggering the LTM to the wireless device. The LTM decision by the base station distributed unit may not require signals between the base station distributed unit and the base station central unit. It may reduce a time for a handover decision and the signals. The LTM decision based on L1 measurement report may increase a chance to handover (e.g., switch a cell) as compared to a handover (e.g., L3 handover) decision based on the L3 measurement report.

From a base station, a wireless device may receive a RRC reconfiguration message triggering a layer 3 (L3) handover (e.g., normal handover). As shown in FIG. 31A, the wireless device receiving the RRC reconfiguration message triggering the L3 handover may spend around 10 ms for RRC message processing and then spend 20 ms for UE processing. the wireless device may delay the L3 handover until the RRC processing and UE processing are completed.

As shown in FIG. 31B, a wireless device may receive an RRC reconfiguration message comprising a pre-configuration for LTM (e.g., a LTM configuration). The wireless device may spend 10 ms for RRC processing the RRC reconfiguration. The wireless device may receive the L1/L2 signal for LTM after the RRC processing is completed. the wireless device receiving the L1/L2 signal for LTM may perform a handover and/or cell switch for the LTM without the delay due to the RRC processing time.

Figure 32:
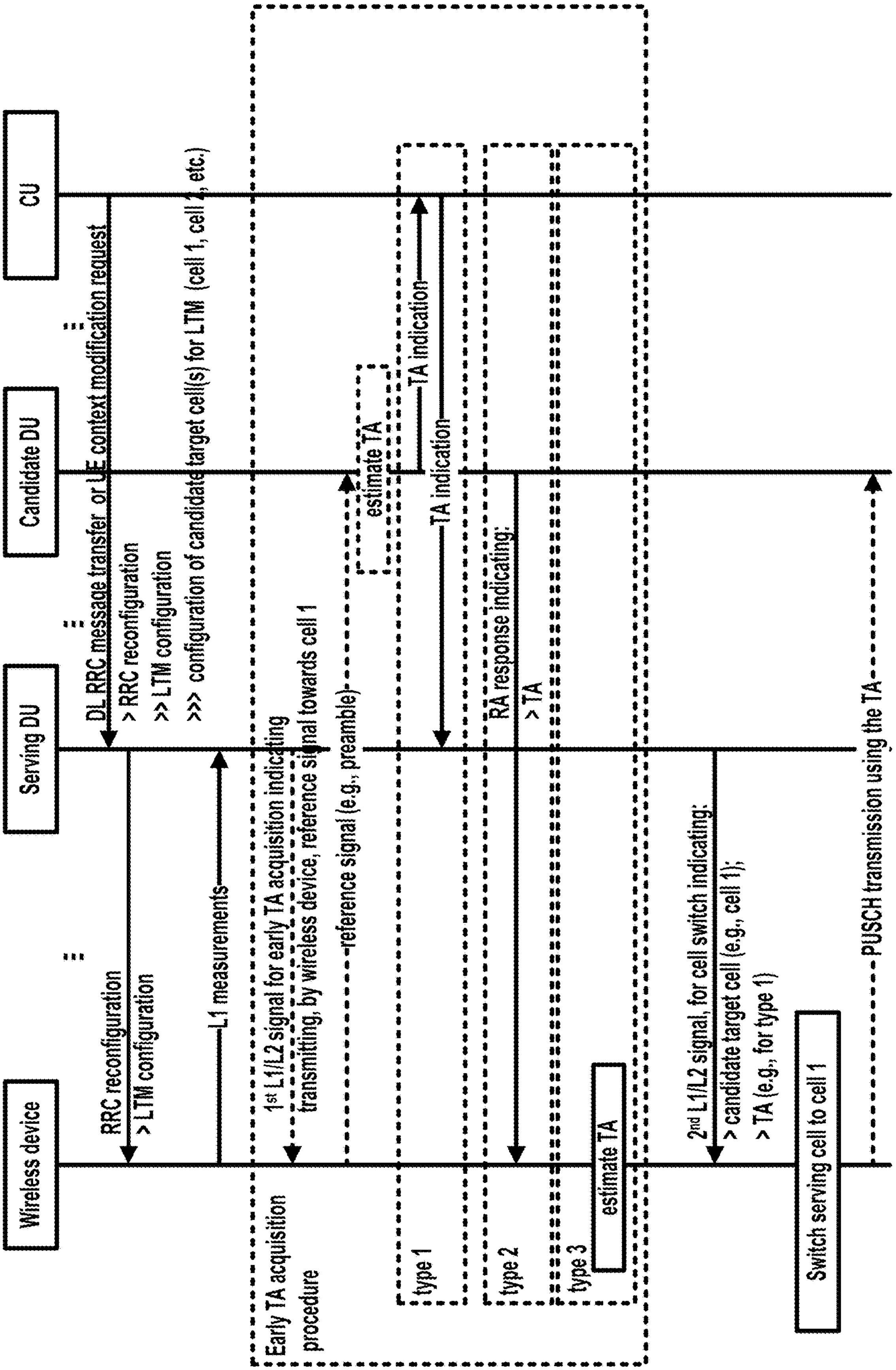
FIG. 32 illustrates an example of early TA acquisition for inter-DU L1/L2 triggered mobility.

FIG. 32 illustrates example of early TA acquisition (or ETA) procedure for an LTM, e.g., inter-DU LTM. In FIG. 32, before the CU performing the transmission of the DL RRC message transfer message (or UE context modification request message) to serving DU, the wireless device and/or network (e.g., serving DU, candidate DU, and/or CU) may perform, among wireless device, serving DU, candidate DU, and CU, one or more transmission(s) and/or reception(s) described in FIG. 30. For example, before the CU performing the transmission of the DL RRC message transfer message (or UE context modification request message) to serving DU in FIG. 32, the wireless device and/or network (e.g., serving DU, candidate DU, and/or CU) may perform, among wireless device, serving DU, candidate DU, and CU, signaling (e.g., reception(s) and/or transmission(s) from a transmission of measurement report (from wireless device to serving DU) to a reception of the RRC reconfiguration (from the serving DU to the Wireless device) described in FIG. 30. In an example, in FIG. 32, according to example disclosure in the present disclosure (e.g., in FIG. 32) and before the early TA acquisition (ETA) procedure, the network (e.g., a base station, a source base station) may configure the wireless device to perform measurement reporting (possibly including the configuration of measurement gaps) for a plurality of neighbor cells (e.g., Cell 1 from a candidate DU, Cell 2 from a serving DU, etc.). The measurement reporting is a L3 measurement reporting, that is different from L1 measurement reporting (e.g., L1 CSI reporting). The wireless device may transmit one or more measurement reports to the source base station (or source PCell, cell 0 in FIG. 32).

In an example, in FIG. 32, according to example disclosure in the present disclosure (e.g., in FIG. 30) and before the early TA acquisition procedure, based on the one or more measurement reports from the wireless device, the base station (e.g., the CU) may determine a candidate target cell for LTM. The base station may also include available measurement information for the candidate target cells provided in the list.

In an example, in FIG. 32, according to example disclosure in the present disclosure (e.g., in FIG. 30) and before the early TA procedure, the base station may transmit to the wireless device an RRC reconfiguration messages comprising LTM configuration, the LTM configuration may comprise one or more configuration of one or more candidate target cell configured for LTM. For example, each of the one or more configurations is associated with or indicate a respective candidate target cell for LTM. each configuration, of the one or more configurations, may comprise an RRC reconfiguration comprising cell group configuration IE of the base station, and/or SpCell configuration IE of the candidate target cell (e.g., a candidate target PCell/SCells of the base station).

In an example, in FIG. 32, according to example disclosure in the present disclosure (e.g., in FIG. 30) and before the early TA acquisition procedure, the base station may configure to the wireless device a LTM (e.g., for PCell switching/changing, mobility, etc.) procedure different from a normal HO procedure (e.g., as shown in FIG. 20 and/or a CHO procedure (e.g., as shown in FIG. 23, by comprising a LTM configuration in a RRC reconfiguration message).

In an example of FIG. 32, each configuration, of the LTM configuration, associated with a candidate target cell may comprise a list of cells, e.g., for a CA and/or DC operation for the case that a wireless device may perform/execute LTM (e.g., a handover or cell switch) to the candidate target cell. For example, the each configuration of the LTM configuration may comprise one or more indications or parameters indicating, among the cell in the list, which cell becomes a PCell, PSCell, SpCell, and/or SCell for the CA and/or DC operation for the case that a wireless device may perform/execute (e.g., a handover or cell switch) to the candidate target cell. For example, if the wireless device successfully completes LTM (e.g., a handover or cell switch) (e.g., based on successful access/transmission to the candidate target cell), the wireless device may configure the CA and/or DC operation according the each configuration of the LTM configuration. For example, a cell (e.g., the candidate target cell) indicated in the list as a PCell becomes a PCell in response to the wireless device successfully completing the LTM (e.g., the handover or cell switch) (e.g., based on successful access/transmission to the candidate target cell). For example, a cell indicated in the list as a PSCell becomes a PSCell in response to the wireless device successfully completing the LTM (e.g., based on successful access/transmission to the candidate target cell). For example, a cell indicated in the list as a SpCell becomes a SpCell in response to the wireless device successfully completing the LTM (e.g., based on successful access/transmission to the candidate target cell). For example, a cell indicated in the list as a SCell becomes a SCell in response to the wireless device successfully completing the LTM (e.g., based on successful access/transmission to the candidate target cell).

In the example of FIG. 32, the wireless device may transmit a reference signal (e.g., PRACH occasion, preamble or SRS) to the candidate target cell of a candidate DU. For example, the wireless device may transmit the reference signal to the candidate target cell based on receiving a first L1/L2 signal as shown in FIG. 32. the wireless device may transmit the reference signal to the candidate target cell without receiving the first L1/L2 signal (e.g., based on determining, by the wireless device, to transmit the reference signal). The candidate DU may monitor uplink transmission occasion (e.g., the PRACH occasion) for receiving the reference signal, from the wireless device. The candidate DU may determine and/or estimate a TA to be used by the wireless device for future uplink transmission in the candidate target cell, e.g., after the wireless device successfully completes LTM (e.g., a handover or cell switch) (e.g., based on successful access/transmission to the candidate target cell).

In an example of FIG. 32, as a first type (type 1 in FIG. 32) for early TA acquisition (or ETA), based on receiving the reference signal from the wireless device, the candidate DU may not transmit to the wireless device a response (e.g., RA response, RAR) indicating an estimated TA value, e.g., associated with the candidate target cell of the candidate DU, in response to or after receiving the reference signal from the wireless device. For example, the candidate DU may send and/or forward the estimated TA value for the candidate target cell to the serving DU via the CU of the base station. In the first type, after or in response to transmitting the reference signal to the candidate target cell, the wireless device may not monitor PDCCH on the candidate target cell. In an example, the serving DU may indicate the estimated TA together with a second L1/L2 signal (e.g., $2^{nd}$ L1/L2 signal in FIG. 32) indicating/triggering LTM to the candidate target cell of the candidate DU.

In the second type of FIG. 32 (type 2 in FIG. 32), the candidate DU may transmit the estimated TA value to the wireless device, e.g., as a response (e.g., an RAR, and/or as a TAC MAC CE), e.g., after or in response to receiving the reference signal from the wireless device. In the second type, the wireless device may (e.g., start to) monitor PDCCH of the candidate target cell of the candidate DU, for receiving the response to the reference signal (e.g., based on example embodiments described above with respect to FIG. 13A, FIG. 13B and/or FIG. 13C), e.g., after or in response to transmitting the reference signal to the candidate target cell of the candidate DU. The wireless device may maintain a TAT for a TAG associated with the candidate target cell. The wireless device may maintain the candidate target cell as a non-serving cell. The response (e.g., RAR and/or the TAC MAC CE) may indicate (e.g., one or more bitfields of the MAC CE) whether the TA value in the response (e.g., RAR and/or the TAC MAC CE) is for a serving cell (or a TAG associated the serving cell), e.g., of the serving DU, or for a non-serving cell (e.g., the candidate target cell) of the candidate DU.

In the second type of FIG. 32, the candidate DU may transmit the estimated TA value to the wireless device, e.g., after or in response to receiving the reference signal from the wireless device. In the second type, the wireless device may (e.g., start to) monitor PDCCH of the candidate target cell of the candidate DU, for receiving the estimated TA (e.g., based on example embodiments described above with respect to FIG. 13A, FIG. 13B and/or FIG. 13C), e.g., after or in response to transmitting the reference signal to the candidate target cell of the candidate DU. For example, the candidate target cell may send to the wireless device, the response (e.g., RAR) comprising the estimated TA based on the reference signal received from the wireless device. The wireless device may maintain a TAT for a TAG associated with the candidate target cell. The wireless device may maintain the candidate target cell as a non-serving cell. The response (e.g., RAR and/or the TAC MAC CE) may indicate (e.g., one or more bitfields of the MAC CE) whether the TA value in the response (e.g., RAR and/or the TAC MAC CE) is for a serving cell (or a TAG associated the serving cell), e.g., of the serving DU, or for a non-serving cell (e.g., candidate target cell) of the candidate DU. In the second type of FIG. 32, the wireless device may receive RAR from a serving cell in response to transmitting the reference signal to the candidate target cell. the wireless device may transmit the reference signal to the candidate target cell. the candidate DU may send and/or forward the estimated TA value for the candidate target cell to the serving DU via the CU of the base station as shown in the first type of FIG. 32. The serving DU may transmit RAR comprising the estimated TA to the wireless device. For example, for intra-DU LTM case in FIG. 29, the serving DU may comprise the candidate target cell. the wireless device may receive RAR comprising the estimated TA value from the candidate target cell the serving DU.

In the third type of FIG. 32 (type 3 in FIG. 32), the wireless device may derive TA of the candidate target cell based on Rx timing difference between current serving cell and the candidate target cell. the wireless device may derive the TA of the candidate target cell further based on TA value for the current serving cell. the type 3 may be referred to as UE based TA measurement.

In the example of FIG. 32, determining/acquiring a TA value of a candidate target cell before executing LTM to the candidate target cell is referred to as an early TA acquisition (ETA) procedure. For example, determining/acquiring a TA value of a candidate target cell before receiving an L1/L2 signal (with or without comprising a TA estimated by the target base station for the candidate target cell) indicating to perform LTM and/or cell switch to the candidate target Cell, is referred to as an early TA acquisition (ETA) procedure. the transmission of a reference signal (e.g., preamble) to a target candidate target cell, before receiving an L1/L2 signal (with or without comprising a TA estimated by the target base station for the candidate target cell) indicating to perform LTM and/or cell switch to the candidate target Cell, is one (e.g., the type 1 or type 2 in FIG. 32) of an early TA acquisition (ETA) procedure. By implementing the ETA, before the wireless device performs the HO, the target base station may obtain the TA to be used by the wireless device after performing the HO/LTM to the candidate target cell. The TA for the candidate target cell may be transmitted as a part of a RAR or combined together with the L1/L2 signal/command indicating the candidate target cell for switching. Compared with the timelines shown in FIG. 31A and/or FIG. 31B, the wireless device may skip the RA procedure after receiving the L1/L2 signal/command indicating the LTM and/or cell. The ETA procedure therefore reduces the interruption due to uplink synchronization with the candidate target cell upon performing HO procedure (or PCell switching procedure).

In the example of FIG. 32, the first L1/L2 signal may be DCI for PDCCH order. The DCI may be DCI format 1_0. A bit of the DCI may indicate a identifier/identity of the candidate target cell. the type 1 and the type 2 may be referred to as PDCCH based RACH for TA measurement.

In an example, an ETA of a wireless device may be referred to as and/or interchangeable with acquiring, by a wireless device, a TA associated with a cell before performing, by the wireless device a handover to the cell and/or the like.

In the present disclosure, transmitting, by a wireless device, a reference signal to a cell before performing, by the wireless device a handover to the cell may be referred to as and/or interchangeable with ETA and/or the like.

In the present disclosure, transmitting, by a wireless device, a reference signal to a cell before performing, by the wireless device a handover to the cell may be for ETA.

In the present disclosure, before performing a handover (e.g., LTM) to a cell may be referred to as and/or interchangeable with before executing a handover (e.g., LTM) to a cell, before receiving a L1/L2 signal indicating cell switch (or LTM or handover) to a cell and/or the like.

An ETA may comprise a procedure to transmit, by a wireless device, a reference signal to a cell before receiving, by the wireless device, a L1/L2 signal, for LTM, indicating a cell switch (or a handover) to the cell. a reference signal for ETA may comprise preamble, sounding reference signal (SRS), demodulation reference signal (DM-RS), phase tracking reference signal (PT-RS) and/or the like. A resource for transmission of the reference signal may be time and frequency resources via which the wireless device transmits the reference signal for ETA. For example, the resource may be PRACH, SRS resource, DM-RS resource (e.g., one or more DM-RS symbol over one or more subcarriers), PT-RS resource (e.g., one or more PT-RS symbol over one or more subcarriers) and/or the like.

An ETA may be referred to as an early RACH (early RA procedure), e.g., if the reference signal is a preamble. The early RACH (early RA procedure) may comprise a procedure to transmit, by a wireless device, a preamble to a cell before receiving, by the wireless device a signal indicating a cell switch (or a handover) to the cell. A resource for transmission of the preamble may be time and frequency resources via which the wireless device transmits the preamble for early RACH. For example, the resource may be PRACH.

In the example of FIG. 32, (e.g., as the first type of ETA), the wireless device may receive a second L1/L2 signal/command (e.g., $2^{nd}$ L1/L2 signal in FIG. 32) indicating to perform LTM and/or cell switch to the candidate target cell. The second L1/L2 signal/command may further indicate the TA (forwarded from the candidate DU of a target base station to the serving DU of a source base station and used for the target PCell in the future), e.g., if the wireless device does not receive the TA before or until receiving the second L1/L2 signal/command. In response to receiving the second L1/L2 signal/command, the wireless device may switch a PCell from a serving cell of the serving DU to the candidate target cell of the candidate DU and transmit PUSCH/PUCCH via the candidate target cell (e.g., that becomes a PCell) of the candidate DU based on the TA. Switching the PCell from the serving cell in the serving DU to the candidate target cell may comprise at least one of: applying RRC configuration parameters of the candidate target cell that becomes the PCell, stopping applying RRC configuration parameters of the serving cell of the serving DU, resetting/reconfiguring MAC entity, receiving RRC messages/MIB/SSBs/SIBs/PDCCHs/PDSCHs from the candidate target cell that becomes the PCell and stopping receiving RRC messages/MIB/SSBs/SIBs/PDCCHs/PDSCHs from Cell 0.

In the example of FIG. 32, as a second type (type 2 in FIG. 32) for early TA acquisition (or ETA), based on receiving the preamble from the wireless device, the candidate DU may transmit to the wireless device a response (e.g., RA response, RAR) indicating a TA, associated with the candidate target cell of the candidate DU, for the wireless device. Based on transmitting the preamble to the candidate target cell of the candidate DU, the wireless device may monitor PDCCH on the candidate target cell of the candidate DU and receive the response (e.g., RA response, RAR) via the PDCCH. The wireless device may maintain a TAT for a TAG associated with the candidate target cell of the candidate DU. The wireless device may maintain the candidate target cell of the candidate DU as a non-serving cell, e.g., after or in response to receiving the response and/or before or until receiving a second L1/L2 signal/command. The response may indicate (e.g., one or more bitfields of the MAC CE) whether the TAC is for a serving cell (or a TAG associated the serving cell) or for a non-serving cell (e.g., the candidate target cell of the candidate DU). The wireless device may receive, via the serving cell of the serving DU, the second L1/L2 signal/command, for cell switch, indicating the candidate target cell of the candidate DU. Based on receiving the second L1/L2 signal/command, the wireless device may switch the PCell from the serving cell of the serving DU to the candidate target cell of the candidate DU and transmit PUSCH/PUCCH via the candidate target cell of the candidate DU based on the TA.

Figure 33:
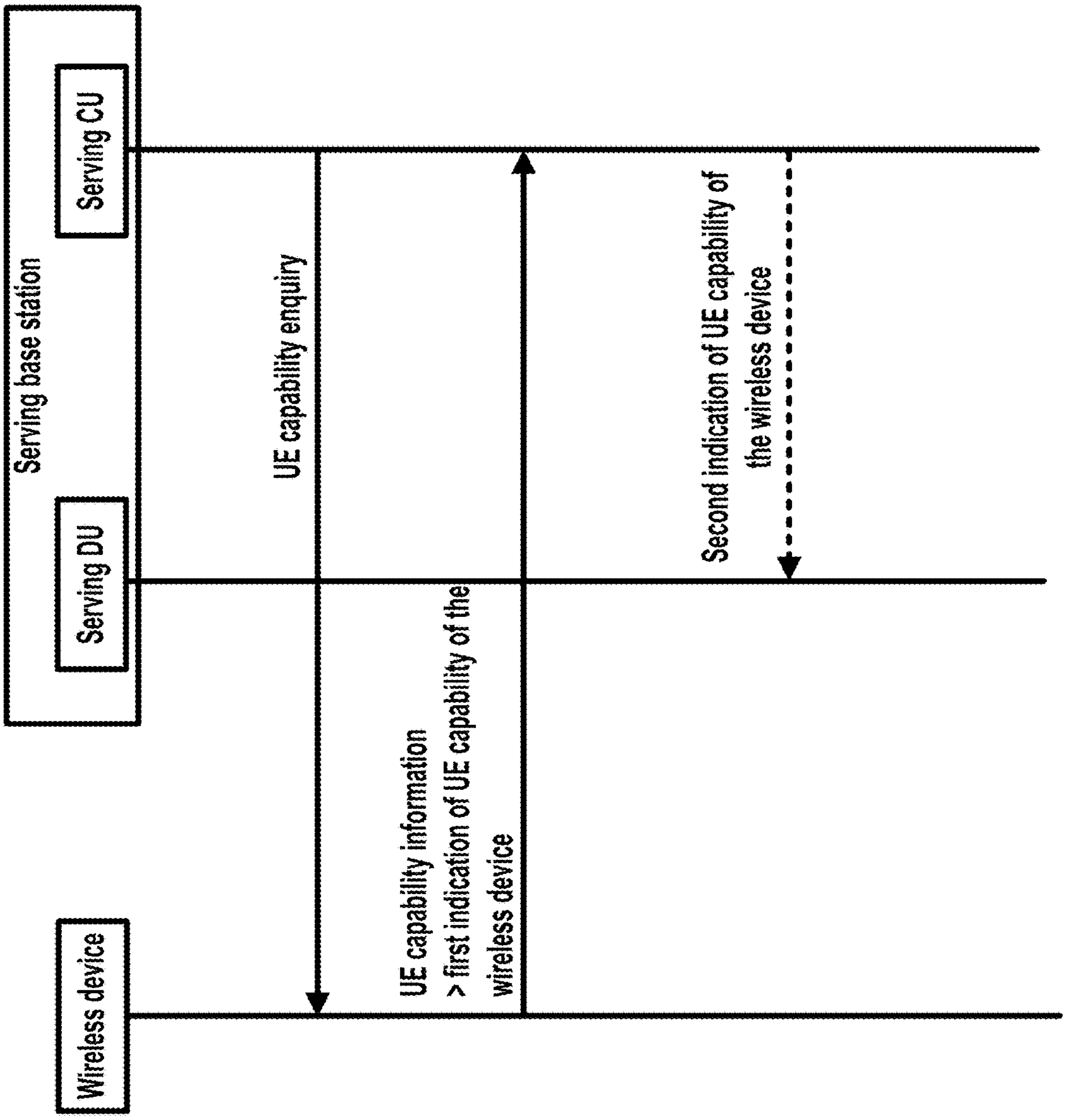
FIG. 33 illustrates an example of capability of a wireless device.

FIG. 33 illustrates example of capability of a wireless device. A wireless device may receive, from a serving CU, an RRC message comprising a UE capability enquiry. The wireless device may transmit to a serving base station a first indication of one or more capability of the wireless device, e.g., in response to receiving the UE capability enquiry. For example, the wireless device may transmit to a serving base station an RRC message (e.g., UE capacity information message) comprising a first indication of one or more capability of the wireless device. For example, a wireless device may transmit to a serving CU of a serving base station, via a serving DU of the serving base station, an RRC message (e.g., UE capacity information message) comprising a first indication of one or more capability of the wireless device.

In an example of FIG. 33, the wireless device may transmit to the serving base station (or the CU) the first indication in response to and/or after receiving a downlink RRC message (e.g., UE capacity enquiry message) from the serving base station (or the CU). For example, the downlink RRC message may indicate one or more types of capability of the wireless device. based on receiving the downlink RRC message, the wireless device may transmit the first indication of one or more capability associated with the one or more types.

In an example of FIG. 33, a CU of a serving base station receiving the first indication from a wireless device may transmit the second indication to a DU (e.g., serving DU). The second indication may indicate at least one of the one or more capability, of the wireless device, indicated by the first indication. For example, the CU may transmit to the DU the second indication via UE associated signaling (e.g., UE context setup/modification request or UE context setup/modification response). Based on receiving the second indication, the DU may take into account the second indication (e.g., when allocating resource(s) to the wireless device or configuring one or more configuration to the wireless device).

The LTM configuration in the present disclosure, e.g., in FIG. 28, FIG. 29, FIG. 30, and/or FIG. 32, may use an RRC reconfiguration message structure of an RRC reconfiguration message, as shown in FIG. 21 and/or FIG. 22. For example, an RRC reconfiguration message transmitted by a base station may comprise one or more RRC reconfiguration messages. Each RRC reconfiguration message of the one or more RRC reconfiguration messages may be associated with a respective LTM configuration. For example, each RRC reconfiguration message of the one or more RRC reconfiguration messages comprises a respective LTM configuration.

The LTM configuration in the present disclosure, e.g., in FIG. 28, FIG. 29, FIG. 30, and/or FIG. 32, may use a cell group configuration IE structure, as shown in FIG. 21 and/or FIG. 22. For example, an RRC reconfiguration message transmitted by a base station may comprise one or more cell group configuration IEs. Each cell group configuration IE of the one or more cell group configuration IEs may be associated with a respective LTM configuration. For example, each cell group configuration IE of the one or more cell group configuration IEs comprises a respective LTM configuration.

The LTM configuration in the present disclosure, e.g., in FIG. 28, FIG. 29, FIG. 30, and/or FIG. 32, may use the SpCell configuration IE structure, as shown in FIG. 21 and/or FIG. 22. For example, an RRC reconfiguration message transmitted by a base station may comprise one or more a SpCell configuration IE. Each a SpCell configuration IE of the one or more SpCell configuration IE may be associated with a respective LTM configuration. For example, the each SpCell configuration IE may comprise a candidate target cell configuration as a respective LTM configuration.

In FIG. 28, FIG. 29, FIG. 30, and/or FIG. 32, for each candidate target cell, a source base station may indicate cell common parameter(s) and/or UE specific parameter(s) (e.g., SSBs/CSI-RSs, BWPs, RACH resources, PDCCH/PDSCH/PUCCH/PUSCH resources etc.).

In the example of FIG. 32, the wireless device, according to the received RRC reconfiguration message comprising a LTM configuration of a list of candidate target cell(s), may perform L1/L2 measurement report (CSI/beam) for the list of candidate target cell(s) (e.g., PCell) and/or the current serving PCell. The L1/L2 measurement report may comprise layer 1 RSRP, layer 1 RSRQ, PMI, RI, layer 1 SINR, CQI, etc.

In an example, a wireless device may trigger the L1/L2 measurement report when the measurement of the CSI/beam of a candidate target cell is greater than a threshold, or (amount of offset) larger than measurement of the CSI/beam of the current serving PCell.

In an example, a wireless device may transmit the L1/L2 measurement report with a periodicity configured by the base station.

In an example, a UCI via PUCCH/PUSCH, or a MAC CE (e.g., event-triggered, associated with a configured SR for the transmission of the MAC CE) may comprise and/or carry the L1/L2 measurement report.

In an example, a wireless device may receive a value $N_{TA,offset}$ of a timing advance offset for a cell by n-TimingAdvanceOffset for the cell. If the wireless device is not provided n-TimingAdvanceOffset for a serving cell, the wireless device may determine a default value (e.g., predefined) $N_{TA,offset}$ of the timing advance offset for the cell. If a wireless device is configured with two UL carriers (e.g., NUL and SUL) for a cell, a same timing advance offset value $N_{TA,offset}$ applies to both UL carriers.

Upon reception of a timing advance command (TAC) for a TAG, the wireless device may adjust uplink timing for PUSCH/SRS/PUCCH transmission on one or more (e.g., all) cells in the TAG based on a value $N_{TA,offset}$ that the wireless device expects to be same for the one or more (e.g., all) cells in the TAG and/or based on the received timing advance command (TAC), e.g., where the uplink timing for PUSCH/SRS/PUCCH transmissions is the same for the one or more (e.g., all) cells in the TAG.

In an example, the TAG may refer to a cell group comprising the one or more cells. The wireless device may maintain, keep, and/or determine the uplink timing of transmission(s) via the one or more cells in the same TAG as the same value of timing advance offset. For example, the one or more cells may comprise a cell from which the wireless device may receive an RRC release message. For example, the one or more cells may comprise a cell from which the wireless device may receive configuration parameters of RA-based SDT and/or CG-based SDT.

For a SCS of $2^{\mu}\cdot 15$ kHz, the timing advance command for a TAG may indicate the change of the uplink timing relative to the current uplink timing for the TAG in multiples of $16\cdot 64\cdot T_c/2^{\mu}$. The start timing of the random access preamble may be predefined.

A timing advance command (TAC) in case of random access response or in an absolute timing advance command MAC CE, $T_A$, for a TAG indicates $N_{TA}$ values by index values of $T_A$ (e.g., $T_A=0, 1, 2, \ldots, 3846$), e.g., where an amount of the time alignment for the TAG with SCS of $2^{\mu}\cdot 15$ KHz is $N_{TA}=T_A\cdot 16\cdot 64/2^{\mu}$. $N_{TA}$ may be predefined and/or may be relative to the SCS of the first uplink transmission from the wireless device, e.g., after or in response to the reception of the random access response or absolute timing advance command MAC CE.

In other example cases, a timing advance command, $T_A$, for a TAG may indicate adjustment of a current $N_{TA}$ value, $N_{TA\_old}$, to the new $N_{TA}$ value, $N_{TA\_new}$, by index values of $T_A$ (e.g., $T_A=0, 1, 2, \ldots, 63$), e.g., where for a SCS of $2^{\mu}\cdot 15$ kHz, $N_{TA\_new}=N_{TA\_old}+(T_A-31)\cdot 16\cdot 64/2^{\mu}$.

In an example, if a wireless device has multiple active UL BWPs in a same TAG, comprising UL BWPs in two UL carriers (e.g., NUL and SUL) of a cell, the timing advance command value may be relative to the largest SCS of the multiple active UL BWPs. The applicable $N_{TA\_new}$ value for an UL BWP with lower SCS may be rounded to align with the timing advance granularity for the UL BWP with the lower SCS while satisfying the timing advance accuracy requirements. Adjustment of an $N_{TA}$ value by a positive or a negative amount may indicate advancing or delaying the uplink transmission timing for the TAG by a corresponding amount, respectively.

In an example, for a timing advance command received on uplink slot n and for a transmission other than a PUSCH scheduled by a RAR UL grant or a fallbackRAR UL grant and/or a PUCCH with HARQ-ACK information in response to a successRAR, the wireless device may apply the corresponding adjustment of the uplink transmission timing from the beginning of uplink slot n+k+1 where $$k = \lceil N_{slot}^{subframe,\mu} \cdot (N_{T,1} + N_{T,2} + N_{TA,max} + 0.5) / T_{sf} \rceil.$$

For example, $N_{T,1}$ may be a time duration in msec of $N_1$ symbols corresponding to a PDSCH processing time for UE processing capability 1 when additional PDSCH DM-RS is configured. For example, $B_{T,2}$ may be a time duration in msec of $N_2$ symbols corresponding to a PUSCH preparation time for wireless device processing capability 1. For example, $N_{TA,max}$ may be the maximum timing advance value in msec that can be provided by a TA command field of 12 bits. For example, $$N_{slot}^{subframe,\mu}$$

may be the number or slots per subframe. For example, $T_{sf}$ may be the subframe duration of 1 msec. The wireless device may determine $N_1$ and $N_2$ with respect to the minimum SCS among the SCSs of all configured UL BWPs for one or more (e.g., all) uplink carriers in the TAG and/or of one or more (e.g., all) configured DL BWPs for the corresponding downlink carriers. For μ=0, the wireless device may determine $N_{1,0}$=14. The wireless device may determine slot n and $$N_{slot}^{subframe,\mu}$$

with respect to the minimum SCS among the SCSs of all configured UL BWPs for all uplink carriers in the TAG. The wireless device may determine $N_{TA,max}$ with respect to the minimum SCS among the SCSs of all configured UL BWPs for all uplink carriers in the TAG and/or for all configured initial UL BWPs provided by initialUplinkBWP. The uplink slot n may be the last slot among uplink slot(s) overlapping in part in time domain with the slot(s) of PDSCH reception assuming $T_{TA}$=0, e.g., where the PDSCH may provide the timing advance command and $T_{TA}$ is predefined.

In an example, if a wireless device changes an active UL BWP between a time of a timing advance command reception and a time of applying a corresponding adjustment for the uplink transmission timing, the wireless device may determine the timing advance command value based on the SCS of the new active UL BWP. If the wireless device changes an active UL BWP after applying an adjustment for the uplink transmission timing, the wireless device may determine a same absolute timing advance command value before and after the active UL BWP change. If the received downlink timing changes and is not compensated or is only partly compensated by the uplink timing adjustment without timing advance command, the wireless device may change $N_{TA}$ accordingly. If two adjacent slots overlap due to a TA command, the wireless device may reduce the latter slot, e.g., in duration relative to the former slot.

A wireless device may receive one or more message (e.g., RRC message, RRC release message, SIB, and/or the like) comprising configuration parameters. The RRC layer of the wireless device may configure the following configuration parameters for the maintenance of UL time alignment: a normal TAT (e.g., timeAlignmentTimer), e.g., which may control how long a wireless device (e.g., a MAC entity of the wireless device) determines the serving cell(s) (e.g., comprising a cell where a normal RA, RA-based SDT, and/or CG-based SDT are configured for the wireless device) belonging to the associated TAG to be uplink time aligned; CG SDT TAT (e.g., cg-SDT-TimeAlignmentTimer), e.g., which may control how long the MAC entity considers the uplink transmission for CG-SDT to be uplink time aligned.

A wireless device (e.g., an MAC entity of the wireless device) may apply the Timing Advance Command (TAC) for the indicated TAG and/or start or restart the TAT associated with the indicated TAG. For example, a wireless device (e.g., an MAC entity of the wireless device) may apply the Timing Advance Command for the indicated TAG and/or start or restart the TAT associated with the indicated TAG, e.g., when a Timing Advance Command MAC CE is received, and/or if an NTA has been maintained with the indicated TAG. For example, a wireless device may start or restart the CG SDT TAT, e.g., when a Timing Advance Command MAC CE is received and CG SDT TAT is configured.

A wireless device may start, restart, and/or stop the normal TAT and/or CG SDT TAT. The following is the example implementation that the wireless device may start, restart, and/or stop the normal TAT and/or CG SDT TAT:

1> when a Timing Advance Command is received in a Random Access Response message for a cell belonging to a TAG or in a MSGB for a particular cell (e.g., an SpCell):

2> if the Random Access Preamble was not selected by the MAC entity among the contention-based Random Access Preamble:

3> the wireless device may apply the Timing Advance Command for this TAG; and/or 3> the wireless device may start or restart the TAT (e.g., normal TAT and/or CG SDT TAT), e.g., associated with this TAG.

2> else if the TAT (e.g., normal TAT and/or CG SDT TAT), e.g., associated with this TAG, is not running:

3> the wireless device may apply the Timing Advance Command for this TAG;

3> the wireless device may start the TAT (e.g., normal TAT and/or CG SDT TAT), e.g., associated with this TAG;

3> when the Contention Resolution is considered not successful; and/or

3> when the Contention Resolution is considered successful for system information (SI) request, e.g., after transmitting HARQ feedback for MAC PDU including UE Contention Resolution Identity MAC CE:

4> the wireless device may stop TAT (e.g., normal TAT and/or CG SDT TAT), e.g., associated with this TAG.

2> else:

3> the wireless device may ignore the received Timing Advance Command.

1> when an Absolute Timing Advance Command is received in response to a MSGA transmission including C-RNTI MAC CE:

2> the wireless device may apply the Timing Advance Command for a particular TAG (e.g., PTAG);

2> the wireless device may start or restart the TAT (e.g., normal TAT and/or CG SDT TAT), e.g., associated with a particular TAG (e.g., PTAG).

1> when the wireless device receives the configuration (e.g., the configuration may be in the RRC release message that the wireless device receives) for TAT (e.g., normal TAT and/or CG SDT TAT):

2> the wireless device may start or restart the TAT (e.g., normal TAT and/or CG SDT TAT).

1> when a TAT (e.g., normal TAT and/or CG SDT TAT) expires:

2> if the TAT (e.g., normal TAT and/or CG SDT TAT) is associated with a particular cell and/or a particular TAG (e.g., PTAG):

3> the wireless device may flush all HARQ buffers for one or more (e.g., all) cells comprising the particular cell;

3> the wireless device may notify RRC layer of the wireless device to release PUCCH for (e.g., configured on) the one or more (e.g., all) cells, if configured;

3> the wireless device may notify RRC layer of the wireless device to release SRS for the one or more (e.g., all) cells, if configured;

3> the wireless device may may clear any configured downlink assignments and configured uplink grants (e.g., (pre-)configured grant type 1, (pre-)configured type 2);

3> the wireless device may clear any PUSCH resource for semi-persistent CSI reporting;

3> the wireless device may determine one or more running TATs (e.g., comprising the normal TAT and/or CG SCT TAT) as expired; and/or 3> the wireless device may maintain NTA of one or more cells of one or more TAGS.

2> else if the TAT (e.g., normal TAT and/or CG SDT TAT) is associated with a second particular TAG (e.g., STAG), then for one or more cells, e.g., belonging to this TAG:

3> the wireless device may flush all HARQ buffers;

3> the wireless device may notify RRC layer of the wireless device to release PUCCH, if configured;

3> the wireless device may notify RRC layer of the wireless device to release SRS, if configured;

3> the wireless device may clear any configured downlink assignments and configured uplink grants;

3> the wireless device may clear any PUSCH resource for semi-persistent CSI reporting; and/or 3> the wireless device may maintain NTA of this TAG.

1> when the TAT (e.g., normal TAT and/or CG SDT TAT) expires:

2> the wireless device may notify RRC to release configured grant type 1 configuration(s) for SDT.

When the MAC entity of the wireless device stops uplink transmissions for a cell (e.g., a secondary cell and/or a cell configured with CG-based SDT), e.g., due to the fact that the maximum uplink transmission timing difference between TAGs of the MAC entity or the maximum uplink transmission timing difference between TAGs of any MAC entity of the UE is exceeded, the MAC entity may determine the TAT (e.g., normal TAT and/or CG SDT TAT), e.g., associated with the cell (e.g., a secondary cell and/or a cell configured with CG-based SDT) as expired.

The MAC entity may not perform any uplink transmission on a cell (e.g., a cell configured with CG-based SDT) except the Random Access Preamble and MSGA transmission when the normal TAT associated with the TAG to which this cell belongs is not running, and/or except CG-SDT when the CG SDT TAT (e.g., cg-SDT-TimeAlignmentTimer) is running. Furthermore, when the normal TAT associated with the PTAG is not running, and when the TAT (e.g., CG SDT TAT) is not running, the MAC entity may not perform any uplink transmission on any cell except the Random Access Preamble and MSGA transmission on the SpCell.

A timing advance group (TAG) may refer to a cell group comprising one or more cells. The one or more cells may comprise a cell from which a wireless device receives an RRC release message. A value of the TAT may indicate how long a timing advance offset value is valid (e.g., is valid to be used) for adjusting uplink timing for uplink transmission to the cell (and/or cell(s) in the cell group). For example, the value of the TAT may determine how long the wireless device determine the cell (and/or cell(s) belonging to the associated TAG) to be uplink time aligned. The wireless device may determine (or adjust), based on the timing advance offset value, uplink timing for uplink transmission (e.g., PRACH, PUSCH, SRS, and/or PUCCH transmission) on the cell (and/or cells in the cell group). For example, the timing advance offset value may indicate how much (and/or long) the uplink timing for uplink transmission is delayed or advanced for uplink synchronization. For example, the wireless device may run the TAT during a time interval (and/or duration) indicated by the value of the TAT. The wireless device may determine that the timing advance offset value is valid (and/or is used) for adjusting uplink timing for uplink transmission on the cell (or cell(s) in the cell group) while the TAT is running. The wireless device may determine that an uplink from the wireless device to the cell (e.g., base station) is out-of-synchronized, e.g., if the TAT associated with the cell group (e.g., TAG) to which the cell belongs is not running and/or expires. For example, the wireless device may stop to perform uplink transmission(s) on a cell (and/or cell(s) in the cell group), e.g., if the TAT associated with the cell group (e.g., TAG) to which the cell belongs is not running and/or expires. The wireless device may stop uplink transmissions for a cell, e.g., due to the fact that the (e.g., maximum) uplink transmission timing difference between TAGs of the wireless device or the (e.g., maximum) uplink transmission timing difference between TAGs of any MAC entity of the wireless device (e.g., two MAC entities configured for a dual connectivity) is exceeded, the wireless device may determine the TAT associated with the cell as expired. The wireless device may perform a random access preamble (re-)transmission and/or MSG A (re-)transmission, e.g., when the TAT associated with the cell group (e.g., TAG) to which the cell belongs is not running and/or expires. The wireless device may (re-)start the TAT after or in response to receiving a timing advance command that indicates a (new and/or updated) timing advance offset value of the cell (and/or cells in the cell group). The timing advance command may be received as an MAC CE and/or DCI. The timing advance command may indicate a timing advance offset value of a cell where the one or more uplink radio resources in a Non-RRC_CONNECTED state.

The wireless device may validate one or more uplink radio resources and/or grants (e.g., of the CG-based SDT) based on the TAT (e.g., normal TAT and/or CG SDT TAT) and/or RSRP measurement. For example, the wireless device may receive one or more messages (e.g., RRC message, RRC release message, and/or SIB) comprising one or more configuration parameters. The RRC of the wireless device may configure the following configuration parameters for TA validation (e.g., for CG-based SDT); RSRP threshold for the increase/decrease of RSRP for time alignment validation (e.g., cg-SDT-RSRP-ChangeThreshold); nrofSS-Blocks ToAverage (e.g., number of SSBs with highest RSRPs for derivation of downlink pathloss reference for TA validation); and/or absThreshSS-BlocksConsolidation (e.g., absolute RSRP threshold for determining the set of SSBs for derivation of downlink pathloss reference for TA validation).

For TA validation (e.g., for CG-based SDT), a wireless device may determine (e.g., derive) a downlink pathloss reference RSRP, e.g., as the linear average of the power values of up to nrofSS-BlocksToAverage of the highest beam measurement quantity values above absThreshSS-BlocksConsolidation. The wireless device may determine one or more uplink radio resources and/or grants (e.g., of the CG-based SDT) to be valid, e.g., if, compared to the stored downlink pathloss reference RSRP value at the wireless device's last uplink transmission, the RSRP has not increased/decreased by more than a RSRP threshold (e.g., cg-SDT-RSRP-ChangeThreshold), if configured.

In the present disclosure, a master base station may be referred to as and/or interchangeable with a master node (MN), a base station and/or like.

In the present disclosure, a secondary base station may be referred to as and/or interchangeable with a secondary node (SN) and/or like.

In the present disclosure, a master node (SN) may be interchangeable with master cell group (MCG) and/or like.

In the present disclosure, a secondary node (SN) may be interchangeable with secondary cell group (SCG) and/or like.

In the present disclosure, configuration may be referred to as and/or interchangeable with configuration parameter and/or the like.

In the present disclosure, keeping may be referred to as and/or interchangeable with retaining, maintaining, suspending, storing and/or the like.

In an example, from a base station, a wireless device may receive one or more conditional configurations from a base station (e.g., a master base station). For example, the one or more conditional configurations may comprise one or more conditional configuration for one or more candidate SCGs (e.g., CPC/CPA configurations). Each conditional configuration for SCGs among the one or more conditional configurations is associated with respective candidate SCG (or PSCell) of the one or more candidate SCGs (or PSCells). Based on receiving the one or more conditional configurations, the wireless device may store the one or more conditional configuration and start evaluation of execution conditions of the one or more conditional configurations. based on performing reconfiguration with synchronization (reconfiguration with sync), the wireless device may release the one or more conditional configurations stored in the wireless device. It may cause for the wireless and the base station additional signals and delay to configure SCG(s). For example, the wireless device may transmit measurement report for cells of the SCG(s). The base station receiving the measurement may transmit a request of configuration parameter for SCG to a secondary base station of the SCG and receive the response comprising the configuration parameter from the secondary base station. The base station may transmit the configuration for the SCG to the wireless device.

In an example, a base station may transmit to a wireless device reconfiguration with sync (information element (IE). For example, a cell group configuration of MCG or SCG may comprise SPCell configuration of PCell or PSCell. The SPCell configuration may comprise the reconfiguration with sync. Based on receiving the reconfiguration with sync, the wireless device may perform an RRC reconfiguration to perform reconfiguration sync. The performing the reconfiguration with sync may comprise performing reconfiguration of the configuration parameter (e.g., of SPCell) and synchronization with SPCell indicated by the reconfiguration with sync. The synchronization may comprise random access procedure. For example, the reconfiguration with sync may be used for changing SPCell. Changing PCell may be handover. Changing PSCell may be SN addition/change (or PSCell addition/change). For example, a base station may transmit to a wireless device an RRC reconfiguration message comprising the reconfiguration with sync. The RRC reconfiguration message may comprise a cell group configuration of MCG or SCG. The cell group configuration may comprise the reconfiguration with sync.

In an example, the RRC reconfiguration to perform reconfiguration with sync includes following cases: reconfiguration with sync and security key refresh, involving random access (RA) to the PCell/PSCell, MAC reset, refresh of security and re-establishment of RLC and PDCP triggered by explicit L2 indicators; reconfiguration with sync but without security key refresh, involving RA to the PCell/PSCell, MAC reset and RLC re-establishment and PDCP data recovery (for AM DRB or AM MRB) triggered by explicit L2 indicators; reconfiguration with sync for dual active protocol stacks (DAPS) and security key refresh, involving RA to the target PCell, establishment of target MAC; reconfiguration with sync for DAPS but without security key refresh, involving RA to the target PCell, establishment of target MAC; reconfiguration with sync for direct-to-indirect path switch, not involving RA at target side, involving re-establishment of PDCP/PDCP data recovery (for AM DRB) triggered by explicit L2 indicators.

In an example of reconfiguration with sync for DAPS and security key refresh, for non-DAPS bearer: refresh of security and re-establishment of RLC and PDCP triggered by explicit L2 indicators; for DAPS bearer: establishment of RLC for the target PCell, refresh of security and reconfiguration of PDCP to add the ciphering function, the integrity protection function and ROHC function of the target PCell; for SRB: refresh of security and establishment of RLC and PDCP for the target PCell.

In an example of reconfiguration with sync for DAPS but without security key refresh, for non-DAPS bearer: RLC re-establishment and PDCP data recovery (for AM DRB or AM MRB) triggered by explicit L2 indicators. for DAPS bearer: establishment of RLC for target PCell, reconfiguration of PDCP to add the ciphering function, the integrity protection function and ROHC function of the target PCell; for SRB: establishment of RLC and PDCP for the target PCell.

In an example, the reconfiguration with sync (IE) may comprise at least one of: SPCell configuration, of SPCell, comprising a configuration parameter of the SPCell; an identity, of the wireless device, configured/assigned for the SPCell; a value of T304 timer (HO timer); dedicated RACH configuration comprising a parameter for RACH (or random access procedure); RACH skip configuration comprising a parameter for skipping RACH (or random access procedure). Based on receiving the reconfiguration with sync, the wireless device may (re) configure the SPCell configuration for the SPCell and synchronizes with the SPCell using the dedicated RACH configuration and/or the RACH skip configuration. Based on initiating the reconfiguration with sync or initiating synchronization, the wireless device may start T304 timer with the value of T305 timer. Based on the reconfiguration with sync or the synchronization being successfully completed, the wireless device may strop the T304 timer. Based on T304 timer being expired, the wireless device may determine a failure of the reconfiguration with sync or the synchronization (e.g., handover failure).

In the present disclosure, a first base station distributed unit, or a base station distributed unit is a serving base station distributed unit and vice versa.

In the present disclosure, a second base station distributed unit is a candidate base station distributed unit and vice versa.

In the present disclosure, an early timing advance acquisition (ETA) of a wireless device may be referred to as and/or interchangeable with acquiring, by a wireless device, a TA associated with a cell before performing, by the wireless device a handover to the cell and/or the like.

In the present disclosure, transmitting, by a wireless device, a reference signal to a cell before performing, by the wireless device a handover to the cell may be referred to as and/or interchangeable with ETA and/or the like.

In the present disclosure, transmitting, by a wireless device, a reference signal to a cell before performing, by the wireless device a handover to the cell may be referred to as and/or interchangeable with ETA and/or the like.

In the present disclosure, before performing a handover (e.g., LTM) to a cell may be referred to as and/or interchangeable with before executing a handover (e.g., LTM) to a cell, before receiving a L1/L2 signal indicating cell switch (or LTM or handover) to a cell and/or the like.

In the present disclosure, a first L1/L2 signal is a L1/L2 signal, for ETA, indicating to transmit a wireless device a reference signal to a candidate cell of one or more candidate cells configured for LTM and/or the like.

In the present disclosure, a second L1/L2 signal is a L1/L2 signal, for cell switch (e.g., LTM), indicating cell switch (e.g., LTM or handover) to a target cell of one or more candidate cells configured for LTM and/or the like.

In the present disclosure, LTM may comprise ETA. For example, LTM procedure may comprise ETA procedure.

serving Cell: For a UE in RRC_CONNECTED not configured with carrier aggregation (CA)/dual connectivity (DC) there may be only one serving cell comprising of the primary cell. For a UE in RRC_CONNECTED configured with CA/DC the term 'serving cells' may be used to denote the set of cells comprising of the Special Cell(s) and all secondary cells.

Secondary Cell (SCell): for a UE configured with CA, a cell providing additional radio resources on top of Special Cell.

Secondary Cell Group (SCG): for a UE configured with dual connectivity, the subset of serving cells comprising of the PSCell and zero or more secondary cells.

Special Cell: For Dual Connectivity operation the term Special Cell refers to the PCell of the MCG or the PSCell of the SCG, otherwise the term Special Cell may refer to the PCell.

Primary SCG Cell (PSCell): For dual connectivity operation, the SCG cell in which the UE perform random access when performing the Reconfiguration with Sync procedure.

Primary Cell (PCell): The master cell group (MCG) cell, operating on the primary frequency, in which the UE either perform the initial connection establishment procedure or initiate the connection re-establishment procedure.

In this present disclosure, "at least one of one or more enumerated elements" may comprise any combination of the one or more enumerated elements. For example, at least one of A, B or C may comprises: A and B; B and C; and A, B and C.

In the present disclosure, a base station distributed unit comprising a candidate target cell may be a serving DU or a candidate DU.

In the present disclosure, a base station distributed unit comprising a serving cell may be a base station distributed unit comprising a primary cell (or PSCell).

In the present disclosure, a message is a message transmitted by a CU to a serving DU or a message transmitted by a base station CU-CP to a base station CU-UP. the message may be associated with a context of a wireless device, the message may be associated with a bearer context of a wireless device. For example, the message may be the UE context setup/modification request message in FIG. 29 or FIG. 30 or the UE context modification message in FIG. 29 or FIG. 30. For example, the message may be a bearer context setup/modification request message.

In the present disclosure, a first message is a message transmitted by a CU to a DU (e.g., a serving DU or a candidate DU). the first message may be associated with a context of a wireless device. For example, the first message may be UE context setup/modification request message in FIG. 29 or FIG. 30.

In the present disclosure, a second message is a message transmitted by a CU to a DU (e.g., a serving DU). the second message may be associated with a context of a wireless device. For example, the second message may be UE context modification request message in FIG. 29 or FIG. 30.

In the present disclosure, 'activate' may be referred to as and/or interchangeable with 'configure', 'resume' and/or like. 'deactivate' may be referred to as and/or interchangeable with 'de-configure', 'suspend' and/or like.

In the present disclosure, a resource for LTM may be a resource configured for LTM. A candidate target cell for LTM may be a candidate target cell configured for LTM. a cell group for LTM may be a cell group configured for LTM.

In the present disclosure, a cell group may be a cell group of a candidate target cell. the cell group may comprise the candidate target cell; and zero or more secondary cell of the candidate target cell.

A bearer context may be a block of information in a base station CU-UP (node) associated to a wireless device that is used for the sake of communication over the E1 interface. It may include the information about data radio bearers, PDU sessions and QoS-flows associated to the wireless device. The block of information may contain the necessary information required to maintain user-plane services toward the UE. For example, the block information may comprise a first information to receive downlink user-plane data of the wireless device from a user plane function (e.g., via NG-U interface), of the wireless device, and to transmit the downlink user-plane data to a base station distributed unit of the wireless device, and a second information to receive uplink user-plane data of the wireless device from the base station distributed unit, and to transmit the uplink user-plane data to the UPF. For example, the information may comprise resource information of data radio bearer(s), PDU sessions and QoS-flows. The information may comprise uplink/downlink tunnel information (e.g., for NG-U interface between a base station CU-UP and UPF; and/or F1-U interface between a base station CU-UP and a base station distributed unit).

In existing technologies, a base station (e.g., a base station distributed unit) may allocate one or more resources for a wireless device to transmit an uplink signal to a candidate target cell for LTM of the wireless device. In some situations, the wireless device may not be likely to perform LTM to the candidate target cell. For example, the wireless device may be in a location far from the candidate target cell. The allocated resource may be wasted in these situations. To avoid waste of the resource, the base station may release a configuration of the candidate target cell. After releasing the configuration, the wireless device may become more likely to perform LTM to the candidate target cell (e.g., if the wireless device moves closer to the candidate target cell). The base station may (re) configure the configuration to the wireless device. Releasing the configuration and (re) configuring the configuration causes signal overhead between the base station and the wireless device, and between a base station central unit and base station distributed units (e.g., the base station distributed unit and a serving base station distributed unit).

Figure 34:
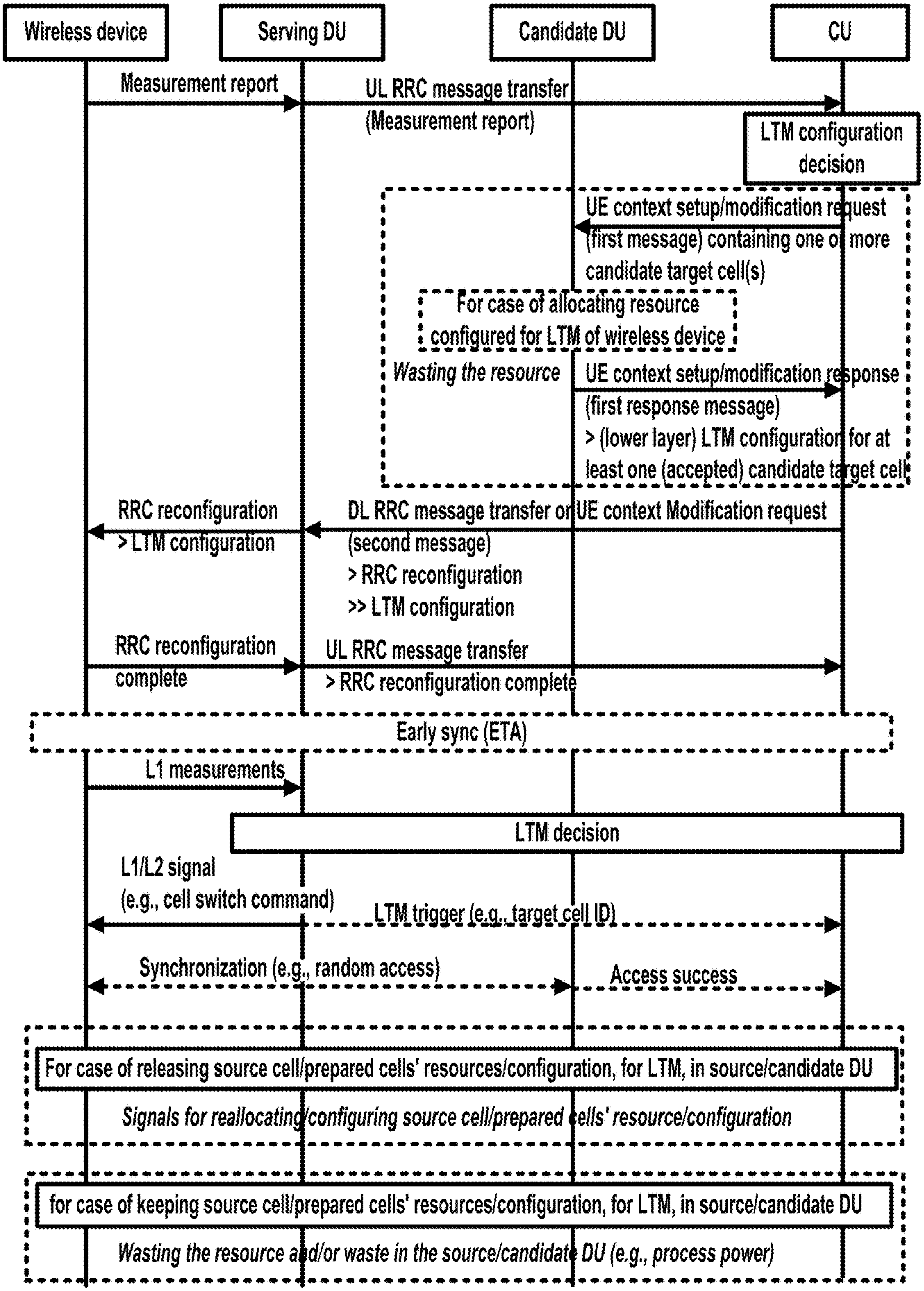
FIG. 34 illustrates an example of releasing/keeping LTM resource in inter-DU LTM.

FIG. 34 illustrates an example of releasing/keeping LTM resource in inter-DU LTM. A base station central unit may initiate a LTM configuration for a wireless device, the base station central unit may transmit to a base station distributed unit a first message comprising one or more candidate target cell(s). Based on receiving the first message, the base station distributed unit may determine whether to accept the one or more candidate target cells. The base station distributed unit may transmit to the base station central unit a first response message comprising a (lower layer) configuration for at least one (accepted) candidate target cell. In existing technologies, the base station distributed unit may (start) allocate a resource for the wireless device to transmit an uplink signal to the at least one candidate target cell for LTM of the wireless device. The resource may be associated with the at least one candidate target cell. For example, the resource may be PRACH resource and/or PUSCH resource. In the existing technology, there is uncertainty about timing of the wireless device to perform/execute the LTM to the candidate target cell. The base station distributed unit configuring the configuration and allocating the one or more resources causes waste of the resources.

In an example of FIG. 34, based on receiving the configuration, the base station central unit may transmit the configuration to the wireless device. For example, the base station may transmit to the wireless device (via a serving base station distributed unit) an RRC reconfiguration message comprising a LTM configuration of the least one candidate target cell. the LTM configuration may comprise the configuration and/or an upper layer configuration of the wireless device and/or measurement configuration for a layer 1 (L1) measurement. The wireless device may perform LTM (e.g., switching a serving cell, primary cell) to one of the at least one candidate target cell based on receiving, from the serving base station distributed unit, a second L1/L2 signal, for LTM, indicating the one of the least one candidate target cell. when the LTM is completed (e.g., the wireless device successfully access to the one of the least one candidate target cell), the base station may determine to release the resource of the at least one candidate target cell (prepared cell in FIG. 34) and/or the (old) serving cell. in existing technologies, the base station may release the configuration of the at least one candidate target cell and/or the serving cell to release the resource. For example, the serving cell may be one of the at least one candidate target cell. it avoid waste of the resource but causes signal overheads to release the resource (or the configuration) and/or reconfigure the resource (or the configuration) (e.g., when the wireless device comes back to the at least one candidate target cell and/or the serving cell). the base station may keep the resource (or the configuration) of the at least one candidate target cell and the (old) serving cell. it causes waste of the resource (e.g., when the wireless device is not likely to perform/execute LTM to the at least one candidate target cell).

Example embodiments enable a base station central unit to transmit to a base station distributed unit a message indicating whether to deactivate or activate a resource (or a candidate target cell or a cell group) for LTM of a wireless device, the resource may be a resource for a wireless device to transmit an uplink signal to a candidate target cell for layer 1 or layer 2 (L1/L2) triggered mobility (LTM) of the wireless device. For example, the message indicating whether to deactivate or activate the resource may be a message indicating whether to deactivate or activate the candidate target cell or a message indicating whether to deactivate or activate the cell group. The cell group may comprise the candidate target cell and/or one or more secondary cell(s) of the candidate target cell. The base station distributed unit may comprise a candidate DU in the inter-DU LTM embodiment shown in FIG. 30, or a serving DU in the intra-DU embodiment shown in FIG. 29. Based on receiving the message indicating to deactivate the resource, the base station distributed unit may not allocate/configure the resource (e.g., for LTM of the wireless device) while keeping a configuration of the candidate target cell for LTM of the wireless device. Based on receiving the message indicating to activate the resource, the base station distributed unit may (start) allocate/configure the resource (e.g., for LTM of the wireless device). Implementing these embodiments avoids waste of resources, and/or signal overheads to release the resource (or the configuration) and to reconfigure the resource (or the configuration).

In example embodiments, a base station central unit may transmit to a base station distributed unit a first message indicating whether to deactivate or activate a resource (or the candidate target cell or the cell group) for LTM of a wireless device, the first message (see in FIG. 34) comprises the candidate target cells for LTM of the wireless device. Implementing these embodiments avoids waste of the resource allocated by the base station distributed unit configuring the candidate target cell.

In example embodiments, a base station central unit (e.g., after) transmitting to a wireless device a configuration of a candidate target cell may transmit to a base station distributed unit a message indicating whether to deactivate or activate a resource (or a candidate target cell or a cell group) for LTM of the wireless device, the base station central unit may dynamically mange activation or deactivation of the resource after configuring the LTM to the wireless device and/or a base station distributed unit (e.g., serving DU and/or candidate DU). Implementing these embodiments avoids the waste of the resource.

In example embodiments, a base station distributed unit may transmit to a base station central unit a response message indicating a status of a resource (or a candidate target cell or a cell group) for LTM of a wireless device. For example, the status of the resource may indicate whether the resource is activated or deactivated. For example, the status of the candidate target cell may indicate whether the candidate target cell is activated or deactivated. For example, the status of the cell group may indicate whether the cell group is activated or deactivated. It avoids misunderstanding about the status of the resource (or the candidate target cell or the cell group) between the base station central unit and the base station distributed unit. For example, the base station distributed unit may transmit to a base station central unit the response message indicating the status of the resource (or the candidate target cell or the cell group) after receiving a message indicating whether to deactivate or activate the resource for the wireless device to transmit the uplink signal to the candidate target cell for LTM of the wireless device. For example, based on receiving a message indicating whether to deactivate the resource (or the candidate target cell or the cell group), the base station distributed unit may transmit a response message indicating the status of the resource (or the candidate target cell) where the status indicates that the resource (or the candidate target cell or the cell group) is deactivated. based on receiving, from a base station central unit, a message indicating whether to activate the resource (or the candidate target cell or the cell group), the base station distributed unit may transmit a response message indicating the status of the resource (or the candidate target cell or the cell group) where the status indicates that the resource (or the candidate target cell or the cell group) is activated. Based on the response message, the base station central unit may confirm whether the base station distributed unit activated or deactivated the resource (or the candidate target cell or the cell group). Implementing these embodiments avoids signal overheads/errors due to misunderstanding about the status of the resource (or the candidate target cell or the cell group) between the base station central unit and the base station distributed unit.

In example embodiments, a base station central unit may transmit to a base station distributed unit a message indicating whether to deactivate or activate a resource (or the candidate target cell or the cell group) for LTM of a wireless device, the base station distributed unit receiving the message may transmit a response message indicating the resource (or the candidate target cell or the cell group) which failed to be deactivated or activated. For example, a base station central unit may transmit to a base station distributed unit a message indicating whether to activate the resource, the base station distributed unit receiving the message may fail to activate the resource (or the candidate target cell or the cell group). the base station distributed unit may transmit a response message indicating the resource (or the candidate target cell or the cell group) which failed to be activated. It increases flexibility for response of the base station distributed unit and resource management of the base station distributed unit. The base station distributed unit may further indicate a cause for the failure. For example, the response message comprising a cause value for the failure. For example, the cause value may be 'no resource available'. based on receiving the response message, the base station central unit may take it into account. The response message may further request to release the resource (or the candidate target cell or the cell group). the base station distributed unit may release the resource (or the candidate target cell or the cell group) and/or the configuration of the candidate target cell. based on receiving the response message, the base station central unit may consider that the base station distributed unit releases the resource (or the candidate target cell or the cell group) and/or the configuration of the candidate target cell. the base station central unit may know the reason of the failure and take it into account for next action/decisions. Implementing these embodiments increases performance for LTM and decreases the failure.

In example embodiments, the resource may be a resource may be a resource for a wireless device to transmit an uplink signal to a candidate target cell for layer 1 or layer 2 (L1/L2) triggered mobility (LTM) of the wireless device. the resource may comprise one of one or more resources. For example, the one or more resources may comprise PRACH resource and/or PUSCH resource and/or PUCCH resource, the message may indicate whether to deactivate or activate each of the resource. For example, a message indicating: whether to activate or deactivate the PRACH resource; and/or whether to activate or deactivate the PUSCH resource; and/or whether to activate or deactivate the PUCCH resource. Implementing these embodiments increases flexibility to manage the resource and increases performance of LTM.

In example embodiments, the message indicating whether to deactivate or activate the resource may further comprises an identifier of the resource of the one or more resources. Based on the identifier of the resource, the message may indicate the resource to be activated or deactivated. a base station distributed unit may determine the identifier of the resource. For example, the base station distributed unit may transmit the first response message comprising the identifier of the resource in FIG. 34. The base station central unit may transmit to the base station distributed unit the first message (see in FIG. 34) indicating a type of the resource, the type may be PRACH or PUSCH or PUCCH. The type may be contention free random access (CFRA); or random access skip/free. Based on the first message, the base station distributed unit may transmit to the base station central unit the first message comprising the identifier of the resource in FIG. 34. The resource may be associated with the type in the first message. Implementing these embodiments increases flexibility to manage the resource and increases performance of LTM.

In example embodiments, the resource may be associated with a candidate target cell (or a cell group) for LTM of the wireless device. For example, the resource may be a resource of the candidate target cell. the resource may be a resource of the cell group. a base station central unit may indicate (e.g., via the message) to a base station distributed unit either to activate or deactivate the resource or to activate or deactivate the candidate target cell (or the cell group).

In existing technologies, a serving base station may transmit to a wireless device a second L1/L2 signal, for layer 1 or layer 2 (L1/L2) triggered mobility (LTM), indicating to switch a serving cell (e.g., primary cell) to a candidate target cell. A resource for a wireless device to transmit an uplink signal to a candidate target cell may be deactivated. The wireless device may transmit the uplink signal to the candidate target cell in response to receiving the second L1/L2 signal. The LTM (e.g., cell switch), of the wireless device, to the candidate target cell may be failed. It causes unnecessary signal overheads and unnecessary waste of the resource.

Example embodiments enable a base station central unit to transmit to a serving base station distributed unit a message indicating whether to deactivate or activate a resource for a wireless device to transmit an uplink signal to a candidate target cell, of a candidate base station distributed unit, for layer 1 or layer 2 (L1/L2) triggered mobility (LT M) of the wireless device. Based on receiving the message indicating to deactivate the resource (or the candidate target cell), the serving base station distributed unit may not transmit to the wireless device a second L1/L2 signal, for the LTM, indicating to switch a serving cell (e.g., primary cell) to the candidate target cell. For example, based on receiving the message, the serving base station distributed unit may determine that the candidate target cell is not a target cell, for the LTM, to which a serving cell is switched. Based on the determining, the serving base station distributed unit may not transmit to the wireless device the second L1/L2 signal. Based on receiving the message indicating to activate the resource (or the candidate target cell), the serving base station distributed unit may transmit to the wireless device a second L1/L2 signal, for the LTM, indicating to switch a serving cell (e.g., primary cell) to the candidate target cell. For example, based on receiving the message, the serving base station distributed unit may determine that the candidate target cell is one of a target cell, for the LTM, to which a serving cell is switched. Based on the determining, the serving base station distributed unit may transmit to the wireless device the second L1/L2 signal. Implementing these embodiments avoids unnecessary signal overheads and waste of the resource due to lack of information about status of the resource (or the candidate target cell) in a serving base station distributed unit.

In an example, a LTM configuration may comprise a configuration of a candidate target cell for LTM of the wireless device, the configuration may be a configuration of a cell group comprising the candidate target cell as a target primary cell, and zero or more target secondary cells.

In an example, a wireless device may perform/execute LTM to the candidate target cell. based on LTM successfully being completed, among the cell group of the candidate target cell, the candidate target cell becomes a primary cell and the zero or more target secondary cells becomes a secondary cell. it may be difficult to manage the LTM configuration with the candidate target cell. For example, a base station and a wireless device may manage/store cell group configuration of the candidate target cell. a base station CU-UP may manage a bearer context. In existing technologies, the bearer context may be associated with a cell group.

Figure 35:
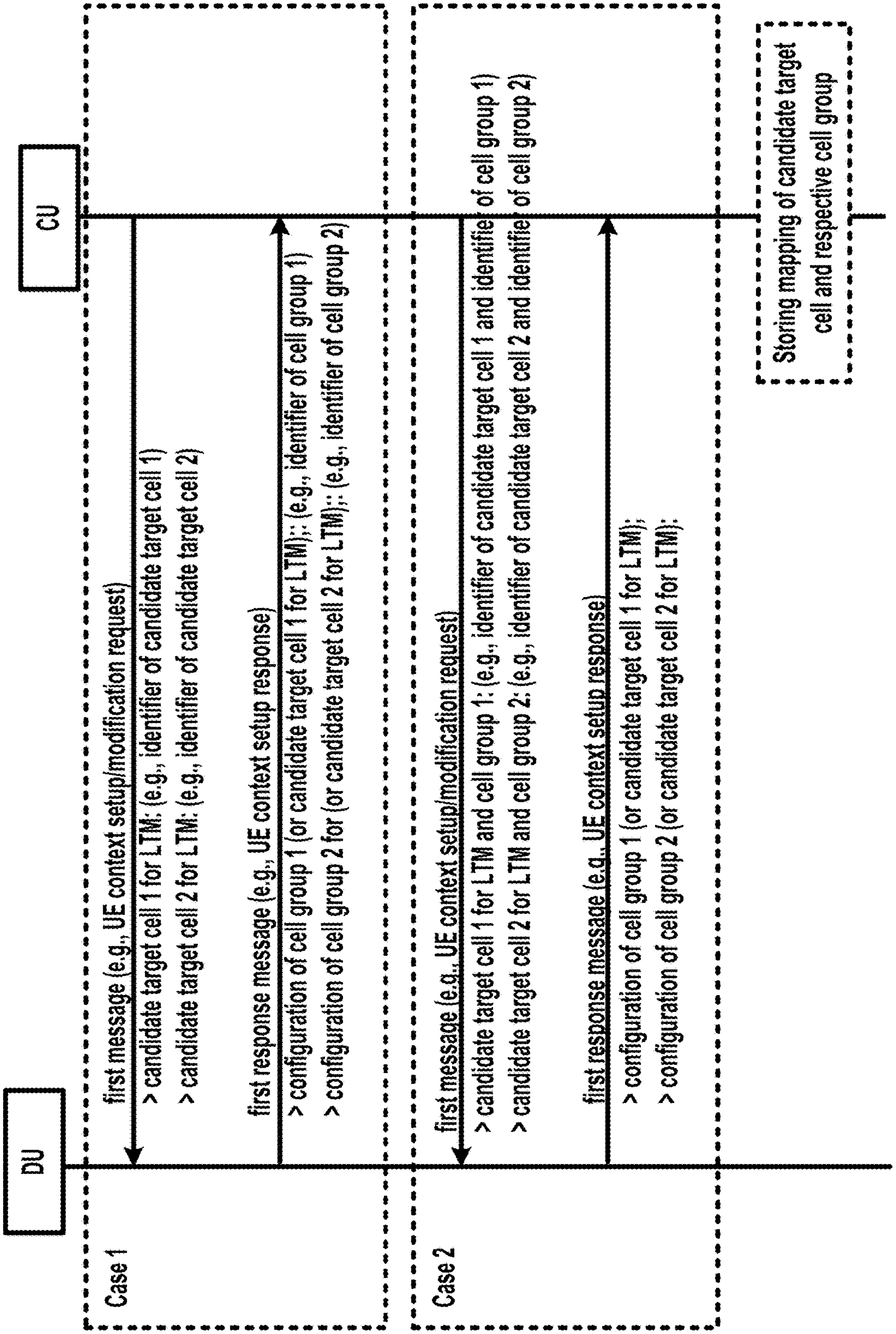
FIG. 35 illustrates an example of cell group of a candidate target cell in CU and DU.

FIG. 35 illustrates an example of cell group of a candidate target cell in CU and DU. in the case 1 of FIG. 35, a base station central unit may transmit to base station distributed unit a first message comprising one or more candidate target cells (e.g., candidate target cell 1 and candidate target cell 2). For example, the first message may comprise identifiers of the one or more candidate target cells. Based on receiving the first message, the base station distributed unit may transmit to the base station central unit a first response message comprising configurations of the one or more candidate target cell(s). the configurations may be configurations of cell groups. Each of cell groups may be associated with respective candidate target cell. For example, the first response message may comprise a configuration of a cell group 1 (or the candidate target cell 1) and/or a configuration of a cell group 2 (or the candidate target cell 2). Each configuration may comprise an identifier of the corresponding cell group. Based on receiving the first response message, the base station central unit may store mapping of a candidate target cell and a cell group.

In the case 2 of FIG. 35, a base station central unit may transmit a first message to a base station distributed unit. the first message may indicate a cell group of a candidate target cell. For example, the first message may comprise an identifier of the cell group. For example, the first message may comprise an identifier of a candidate target cell and an identifier of a cell group of the candidate target cell. based on receiving the first message, the base station distributed unit may transmit a first response message to the base station central unit. the first response message may comprise a configuration of a cell group 1 (or the candidate target cell 1) and/or a configuration of a cell group 2 (or the candidate target cell 2). Each configuration may comprise an identifier of the corresponding cell group. Based on receiving the first response message, the base station central unit may store mapping of a candidate target cell and a cell group.

In an example of FIG. 35, combination of the case 1 and the case may be supported. For example, the combination may comprise the first message in the case 1 and the first response message in the case 2; and the first message in the case 2 and the first response message in the case 1.

Figure 36:
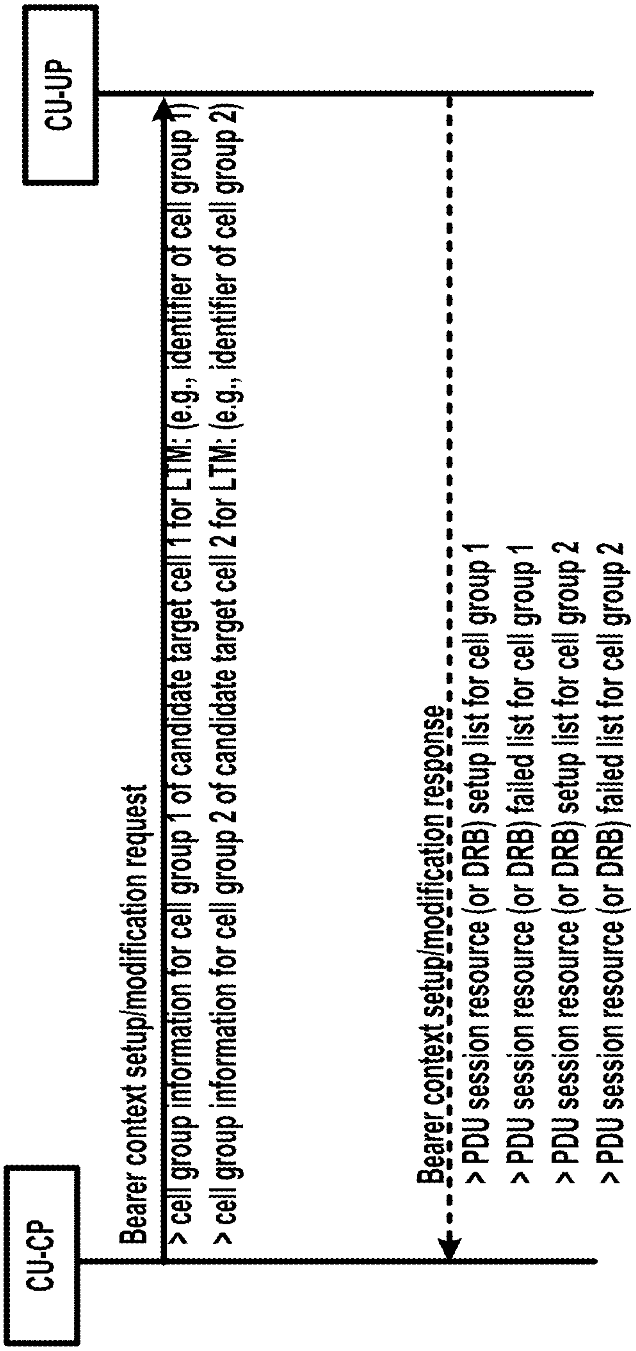
FIG. 36 illustrates an example of cell group of a candidate target cell in CU-CP and CU-UP.

FIG. 36 illustrates an example of cell group of a candidate target cell in CU-CP and CU-UP. A base station CU-CP may transmit to a base station CU-UP a bearer context setup/modification request message for a wireless device, the bearer context setup/modification request message may comprise cell group information for cell group(s) of one or more candidate target cell(s) for LTM of the wireless device. each cell group information of the cell group information may be associated with a respective cell group of the cell group(s). each cell group of the cell group(s) may be associated with a respective candidate target cell of the one or more candidate target cell(s). For example, the bearer context setup/modification request message comprise a cell group information for a cell group 1 of a candidate target cell 1; and a cell group information for a cell group 2 of a candidate target cell 2. The cell group information of the cell group 1 may comprise a identifier of the cell group 1. The cell group information of the cell group 2 may comprise a identifier of the cell group 2.

In an example of FIG. 36, based on receiving the bearer context setup/modification request message, the base station CU-UP may store the cell group information(s) (e.g., for LTM, of the wireless device, to the candidate target cell 1 or 2). based on receiving the bearer context setup/modification request message, the base station CU-UP may determine to establish PDU session resources (or DRBs) for the wireless device (e.g., PDU session resources in NR or DRBs in LTE). each of PDU session resource(s) may be associated with a respective cell group. The base station CU-UP may report the results via a bearer context setup/modification response message. For example, the bearer context setup/modification response message may comprise a PDU session resource setup list (or DRB setup list) for the cell group 1 and/or a PDU session resource failed list (or DRB failed list) for the cell group 1. the bearer context setup/modification response message may further comprise a PDU session resource setup list (or DRB setup list) for the cell group 2 and/or a PDU session resource failed list (or DRB failed list) for the cell group 2. Based on receiving the bearer context setup/modification response message, the base station CU-CP may store the list (e.g., for LTM, of the wireless device, to the candidate target cell 1 or 2).

Figure 37:
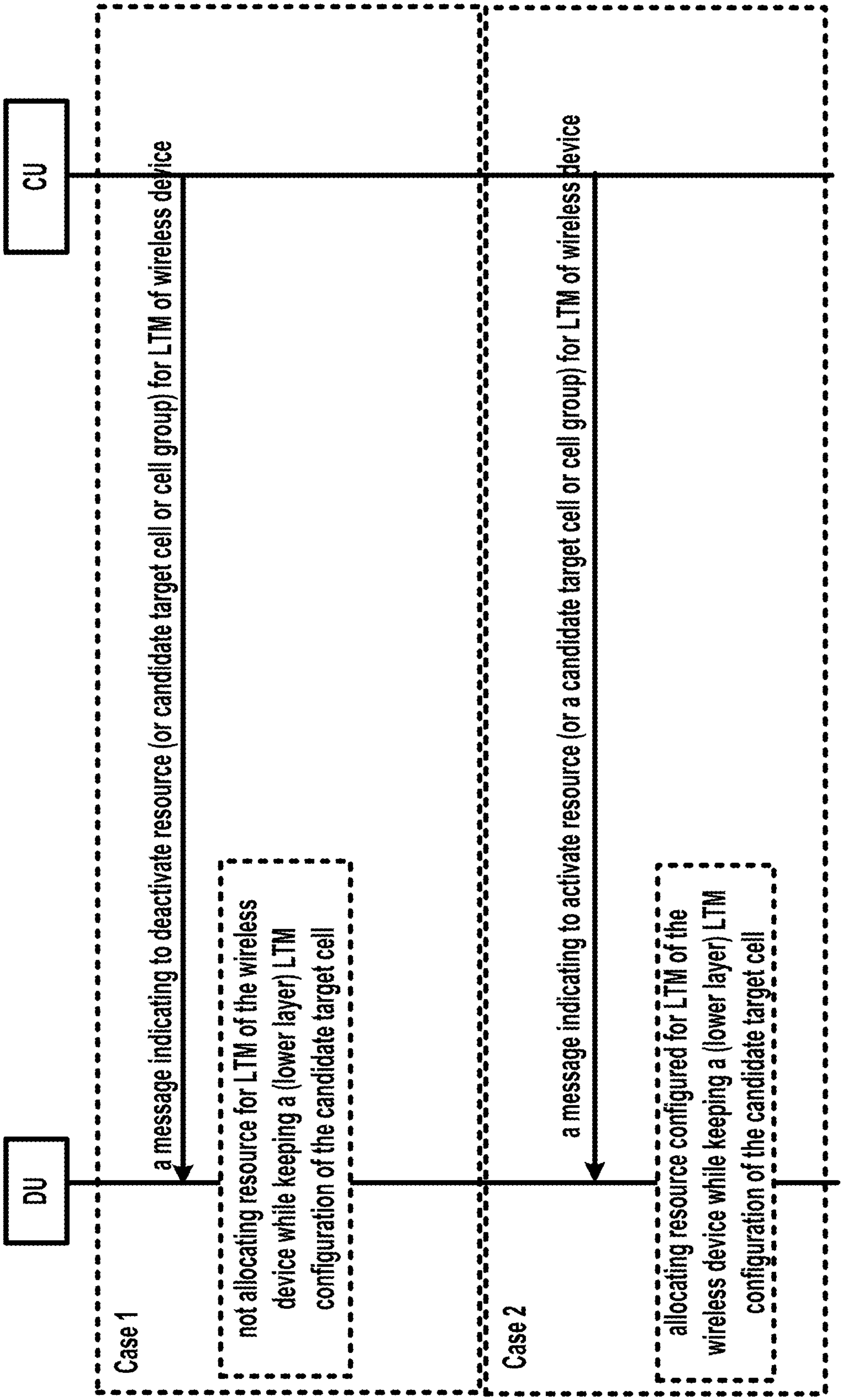
FIG. 37 illustrates an example of deactivation and activation in CU and DU.

FIG. 37 illustrates an example of deactivation and activation in CU and DU. in the case 1, a base station central unit may transmit to a base station central unit a message indicating to deactivate a resource (or a candidate target cell or cell group) for LTM of a wireless device. based on receiving the message, the base station distributed unit may not allocate/configure (or stop allocating/configuring) the resource. based on receiving the message, the base station distributed unit may further keep a (lower layer) LTM configuration of the candidate target cell (or the cell group). based on receiving the message, the base station distributed unit may not release the LTM configuration. The lower layer LTM configuration may be a cell group configuration of the candidate target cell.

In the case 2 of FIG. 37, a base station central unit may transmit to a base station central unit a message indicating to activate a resource (or a candidate target cell or cell group) for LTM of a wireless device. based on receiving the message, the base station distributed unit may allocate/configure (or start allocating/configuring) the resource. based on receiving the message, the base station distributed unit may further keep a (lower layer) LTM configuration of the candidate target cell (or the cell group). based on receiving the message, the base station distributed unit may not release the LTM configuration.

In an example of FIG. 37, the base station distributed unit may be a candidate DU (e.g., in FIG. 30) or a serving DU (e.g., in FIG. 29 or FIG. 30). The message may be the first message in FIG. 34 or the second message in FIG. 34.

In an example of FIG. 37, the base station distributed unit may be a serving base station central unit (e.g., FIG. 29 or FIG. 30). For example, a base station central unit may transmit to a serving base station distributed unit a message indicating whether to deactivate or activate a resource for a wireless device to transmit an uplink signal to a candidate target cell, of a candidate base station distributed unit, for layer 1 or layer 2 (L1/L2) triggered mobility (LTM) of the wireless device. Based on receiving the message indicating to deactivate the resource (or the candidate target cell), the serving base station distributed unit may not transmit to the wireless device a second L1/L2 signal, for the LTM, indicating to switch a serving cell (e.g., primary cell) to the candidate target cell. For example, based on receiving the message, the serving base station distributed unit may determine that the candidate target cell is not a target cell, for the LTM, to which a serving cell is switched. Based on the determining, the serving base station distributed unit may not transmit to the wireless device the second L1/L2 signal. Based on receiving the message indicating to activate the resource (or the candidate target cell), the serving base station distributed unit may transmit to the wireless device a second L1/L2 signal, for the LTM, indicating to switch a serving cell (e.g., primary cell) to the candidate target cell. For example, based on receiving the message, the serving base station distributed unit may determine that the candidate target cell is one of a target cell, for the LTM, to which a serving cell is switched. Based on the determining, the serving base station distributed unit may transmit to the wireless device the second L1/L2 signal.

Figure 38:
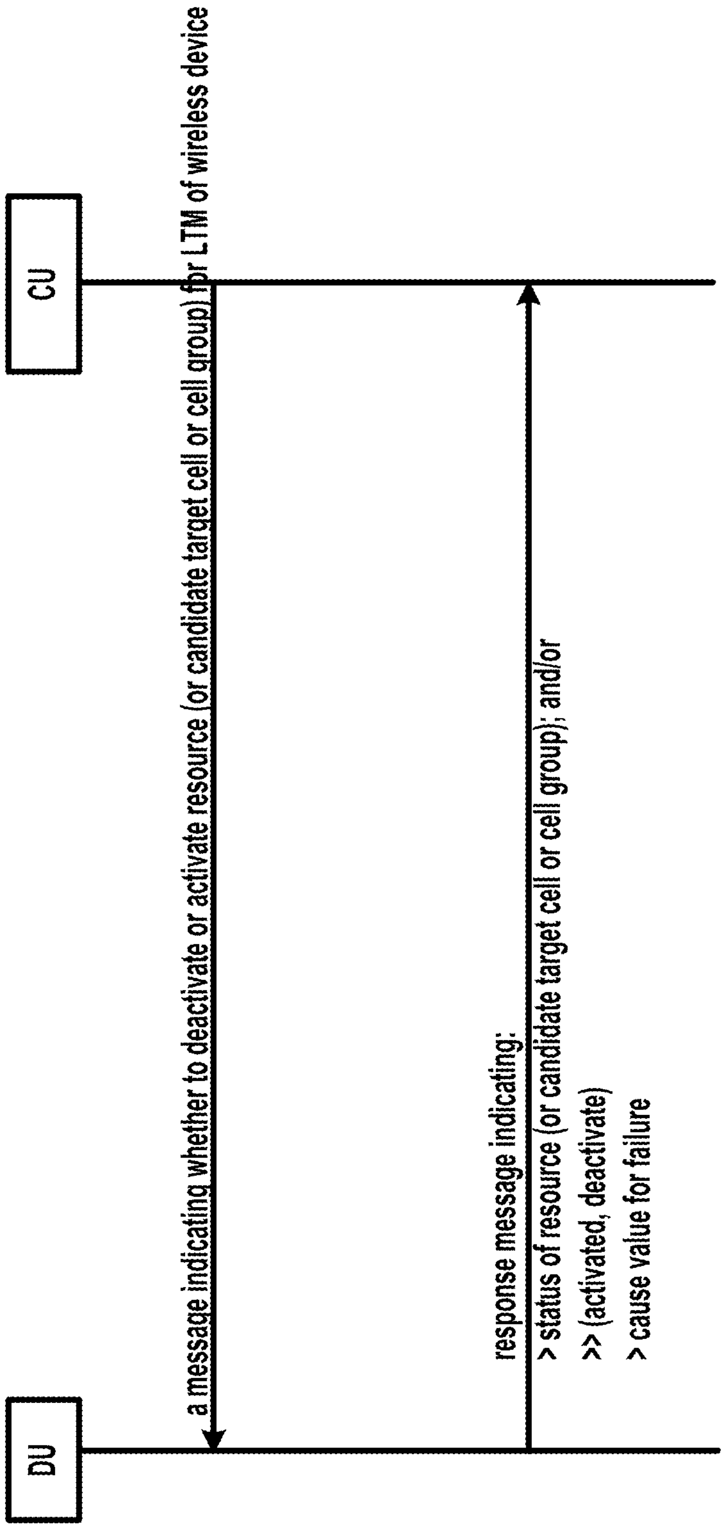
FIG. 38 illustrates an example of response for deactivation and activation in CU and DU.

FIG. 38 illustrates an example of response for deactivation and activation in CU and DU. a base station distributed unit may transmits to a base station central unit a response message indicating a status of a resource (or candidate target cell or cell group) for LTM of a wireless device. For example, the status of the resource may indicate whether the resource is activated or deactivated. For example, the status of the candidate target cell may indicate whether the candidate target cell is activated or deactivated. For example, the status of the cell group may indicate whether the cell group is activated or deactivated.

In an example of FIG. 38, the base station distributed unit may transmits to a base station central unit the response message indicating the status of the resource (or the candidate target cell or the cell group) after receiving a message indicating whether to deactivate or activate the resource (or the candidate target cell or the cell group). For example, the response message may be a response to the message. For example, based on receiving a message indicating whether to deactivate the resource (or the candidate target cell or the cell group), the base station distributed unit may transmit a response message indicating the status of the resource (or the candidate target cell or the cell group). the status may indicate that the resource (or the candidate target cell or the cell group) is deactivated. based on receiving, from a base station central unit, a message indicating whether to activate the resource (or the candidate target cell or the cell group), the base station distributed unit may transmit a response message indicating the status of the resource (or the candidate target cell or the cell group). the status may indicate that the resource (or the candidate target cell or the cell group) is activated. Based on the response message, the base station central unit may confirm whether the base station distributed unit activated or deactivated the resource (or the candidate target cell or the cell group).

In an example of FIG. 38, a base station central unit may transmit to a base station distributed unit a message indicating whether to deactivate or activate a resource (or a candidate target cell or a cell group) for LTM of a wireless device, the base station distributed unit receiving the message may transmit a response message indicating the resource (or the candidate target cell or the cell group) which failed to be deactivated or activated. For example, a base station central unit may transmit to a base station distributed unit a message indicating whether to activate the resource, the base station distributed unit receiving the message may fail to activate the resource (or the candidate target cell or the cell group). the base station distributed unit may transmit a response message indicating the resource (or the candidate target cell or the cell group) which failed to be activated. The base station distributed unit may further indicate a cause for the failure. For example, the response message comprising a cause value for the failure. For example, the cause value may be 'no resource available'. based on receiving the response message, the base station central unit may take it into account. The response message may further request to release the resource (or the candidate target cell or the cell group). the base station distributed unit may release the resource (or the candidate target cell or the cell group) and/or the configuration of the candidate target cell. based on receiving the response message, the base station central unit may consider that the base station distributed unit releases the resource (or the candidate target cell or the cell group) and/or the configuration of the candidate target cell. the base station central unit may know the reason of the failure and take it into account for next action/decisions.

Figure 39:
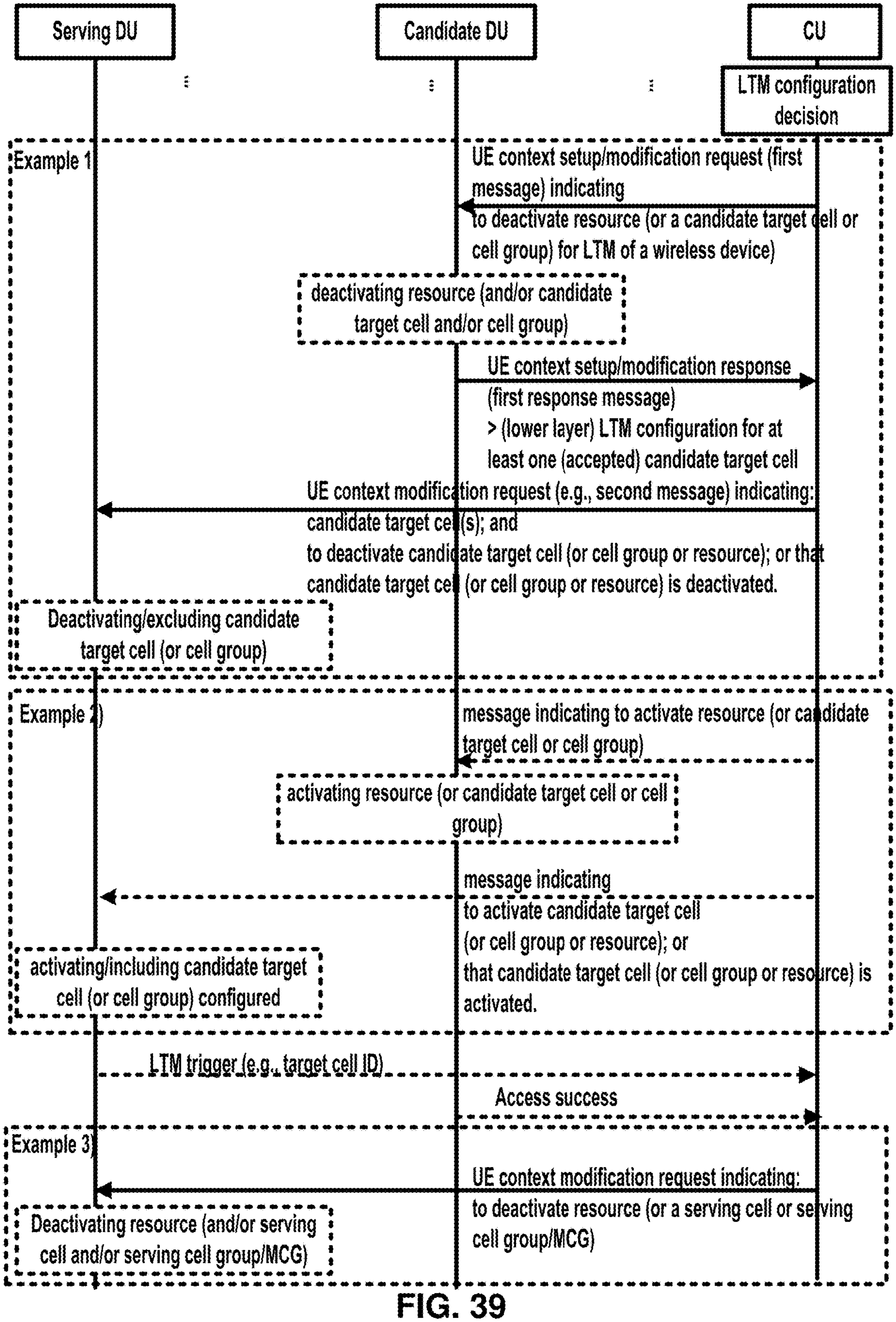
FIG. 39 illustrates an example of activation and deactivation in CU and DU.

FIG. 39 illustrates an example of activation and deactivation in CU and DU. in the example 1, a base station central unit initiating LTM configuration of a wireless device may transmit to a candidate base station distributed unit a first message indicating to deactivate a resource (or candidate target cell or cell group) for LTM of the wireless device. the first message may comprises one or more candidate target cell (or one or more cell groups). The one or more candidate target cell(s) may comprise the candidate target cell. the one or more cell groups may comprise the cell group. For example, the first message may comprise an identifier of the candidate target cell (or the cell group). Based on receiving the first message, the candidate base station distributed unit may deactivate the resource (and/or the candidate target cell and/or the cell group). Based on receiving the first message, the candidate base station distributed unit may accept the candidate target cell (or the cell group) for LTM of the wireless device. Based on receiving the first message, the candidate base station distributed unit may keep a (lower layer) LTM configuration of the candidate target cell (or the cell group). the candidate base station distributed unit may transmit to the base station central unit a first response message comprising the (lower layer) LTM configuration of the candidate target cell (or the cell group).

In the example 1 of FIG. 39, the base station central unit may transmit to a serving base station distributed unit a message indicating: to deactivate the candidate target cell (or the cell group or the resource) for LTM of the wireless device; or that the candidate target cell (or cell group or the resource) is deactivated (e.g., with status of the candidate target cell (or cell group or the resource)). The message may be the second message in FIG. 34. Based on receiving the message, the serving base station distributed unit may deactivate/exclude the candidate target cell (and/or cell group) in a list of candidate target cells (or cell groups) for LTM of the wireless device.

In the example 2 of FIG. 39, the base station central unit may determine to activate the resource (or the candidate target cell or the cell group). the base station central unit may transmit to the candidate base station distributed unit a message indicating to activate the resource (or the candidate target cell or the cell group). Based on receiving the message, the candidate base station distributed unit may activate the resource (and/or the candidate target cell and/or the cell group).

In the example 2 of FIG. 39, the base station central unit may transmit to the serving base station distributed unit a message indicating: to activate the candidate target cell (or the cell group or the resource) for LTM of the wireless device; or that the candidate target cell (or cell group or the resource) is activated (e.g., with status of the candidate target cell (or cell group or the resource)). Based on receiving the message, the serving base station distributed unit may activate/include the candidate target cell (and/or cell group) in a list of candidate target cells (or cell groups) for LTM of the wireless device.

In the example 3 of FIG. 39, the wireless device may successfully complete LTM to the candidate target cell. the base station central unit may transmit to the serving base station distributed unit a message (e.g., UE context modification request message) indicating to deactivate a resource (or a serving cell or serving cell group). the resource may be a resource for a wireless device to transmit an uplink signal to the serving cell for LTM of the wireless device. after the LTM to the candidate target cell, the serving cell may become old serving cell and the serving cell group becomes old serving cell group. the serving cell group may be MCG or SCG. the base station central unit may transmit the message based on the serving cell being one of a candidate target cell for LTM of the wireless device. based on receiving the message, the serving base station distributed unit may deactivate the resource (and/or the serving cell and/or the serving cell group). based on receiving the message, the serving base station distributed unit may not allocate/configure the resource.

Figure 40A:
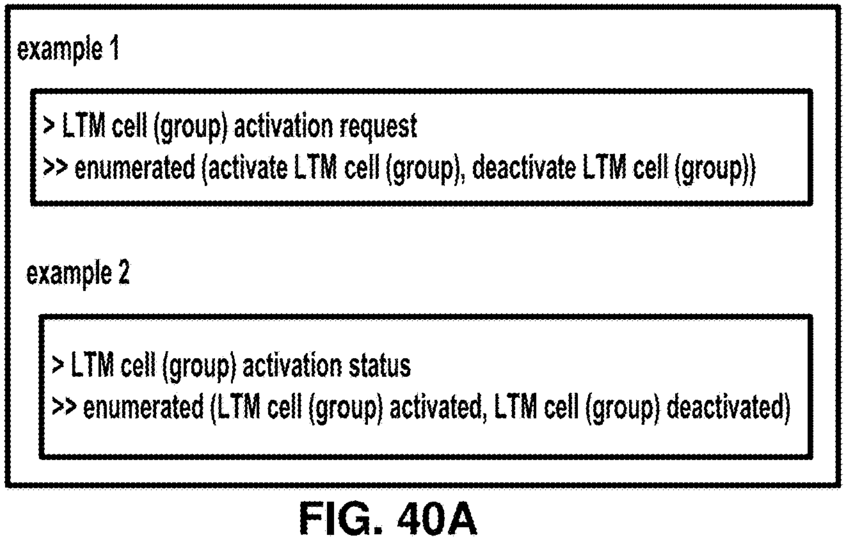
FIG. 40A illustrates an example of message.
Figure 40B:
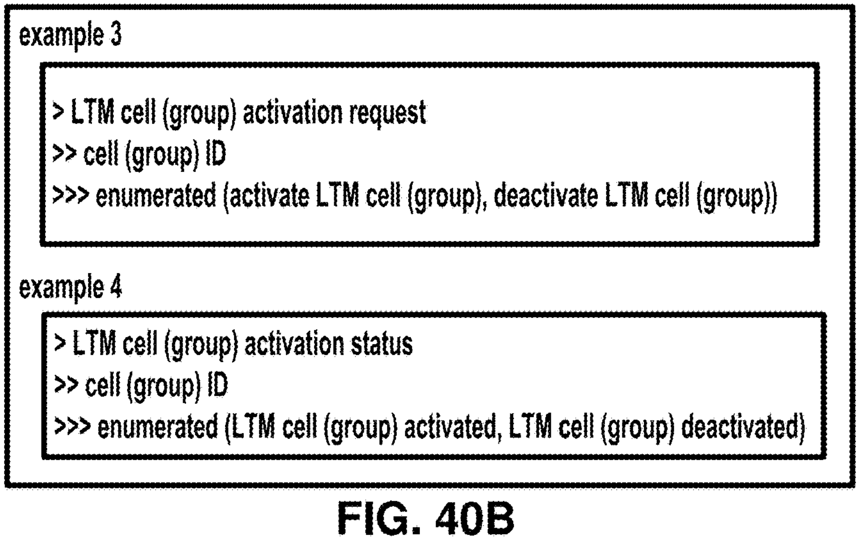
FIG. 40B illustrates an example of message.
Figure 40C:
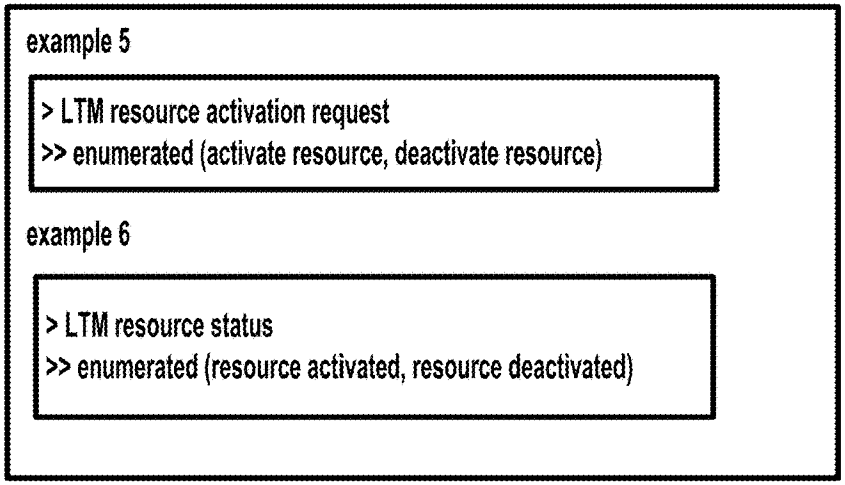
FIG. 40C illustrates an example of message.
Figure 40D:
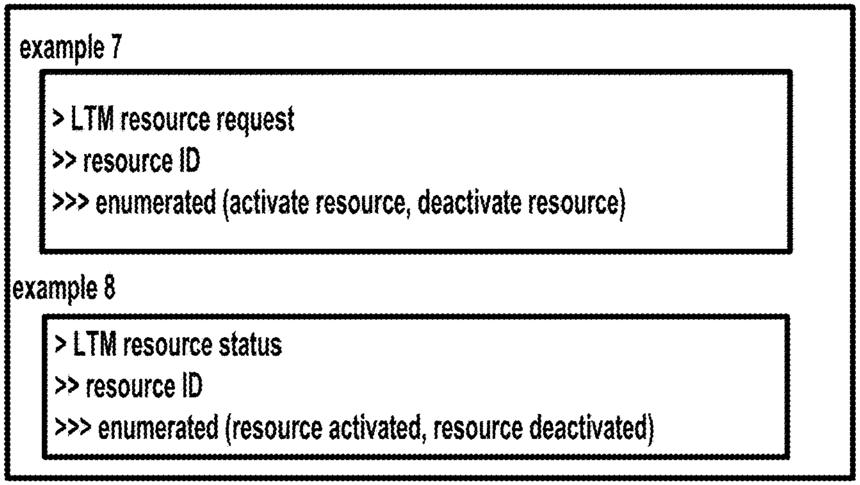
FIG. 40D illustrates an example of message.

FIG. 40A, FIG. 40B, FIG. 40C and FIG. 40D illustrates an example of message indicate whether to deactivate or activate resource (or candidate target cell or cell group). the message (e.g., in FIG. 37) indicating whether to deactivate or activate resource (or candidate target cell or cell group) for LTM of a wireless device may comprise a parameter indicating whether to deactivate or activate the resource (or the candidate target cell or the cell group). in example of FIG. 40A and FIG. 40. B, a cell is the candidate target cell. a cell group is a cell group of the candidate target cell.

In the example 1 of FIG. 40A, the parameter may be a LTM cell (group) activate request information element (IE). the LTM cell (group) activate request IE may be a LTM cell group activate request IE or a LTM cell activate request IE. In an example, the LTM cell (group) activate request IE may indicate either ‘activate LTM cell (group)’ or ‘deactivate LTM cell (group)’. the parameter indicating to activate the resource (or the candidate target cell or the cell group) may be the LTM cell (group) activate request IE indicating ‘activate LTM cell (group)’. the parameter indicating to deactivate the resource (or the candidate target cell or the cell group) may be the LTM cell (group) activate request IE indicating ‘deactivate LTM cell (group)’.

In the example 2 of FIG. 40A, the parameter may be a LTM cell (group) activation status information element (IE). the LTM cell (group) activation status IE may be a LTM cell activation status IE or a LTM cell group activation status IE. In an example, the LTM cell (group) activation status IE may indicate either ‘LTM cell (group) activated’ or ‘LTM cell (group) deactivated’. the parameter indicating to activate the resource (or the candidate target cell or the cell group) may be the LTM cell (group) activation status IE indicating ‘LTM cell (group) activated’. the parameter indicating to deactivate the resource (or the candidate target cell or the cell group) may be the LTM cell (group) activation status IE indicating ‘LTM cell (group) deactivated’.

In the example 3 of FIG. 40 B, the parameter may be a LTM cell (group) activate request information element (IE). the LTM cell (group) activate request IE may be a LTM cell group activate request IE or a LTM cell activate request IE. In an example, the LTM cell (group) activate request IE may comprises identifier(s) of one or more cells (groups). the LTM cell (group) activate request IE may indicate, per each of the one or more cells (groups), either ‘activate LTM cell (group)’ or ‘deactivate LTM cell (group)’. For example, the LTM cell (group) activate request IE may comprises an identifier of a cell (group) of the one or more cell (groups). The LTM cell (group) activate request IE comprising the identifier of the cell (group) may indicate, for the cell (group), either ‘activate LTM cell (group)’ or ‘deactivate LTM cell (group)’. the parameter indicating to activate the resource (or the candidate target cell or the cell group) may be the LTM cell (group) activate request IE indicating ‘activate LTM cell (group)’. the parameter indicating to deactivate the resource (or the candidate target cell or the cell group) may be the LTM cell (group) activate request IE indicating ‘deactivate LTM cell (group)’.

In the example 4 of FIG. 40 B, the parameter may be a LTM cell (group) activation status information element (IE). the LTM cell (group) activation status IE may be a LTM cell activation status IE or a LTM cell group activation status IE. In an example, the LTM cell (group) activation status IE may comprises identifier(s) of one or more cells (groups). the LTM cell (group) activation status IE may indicate, per each of the cell (group), either ‘LTM cell (group) activated’ or ‘LTM cell (group) deactivated’. For example, the LTM cell (group) activation status IE may comprises an identifier of a cell (group) of the one or more cell (groups). The LTM cell (group) activation status IE comprising the identifier of the cell (group) may indicate, for the cell (group), either ‘LTM cell (group) activated’ or ‘LTM cell (group) deactivated’. the parameter indicating to activate the resource (or the candidate target cell or the cell group) may be the LTM cell (group) activation status IE indicating ‘LTM cell (group) activated’. the parameter indicating to deactivate the resource (or the candidate target cell or the cell group) may be the LTM cell (group) activation status IE indicating ‘LTM cell (group) deactivated’.

In the example 5 of FIG. 40 C, the parameter may be a LTM resource activate request information element (IE). In an example, the LTM resource activation request IE may indicate either ‘activate resource’ or ‘deactivate resource’. the parameter indicating to activate the resource (or the candidate target cell or the cell group) may be the LTM resource activate request IE indicating ‘activate resource’. the parameter indicating to deactivate the resource (or the candidate target cell or the cell group) may be the LTM resource activate request IE indicating ‘deactivate resource’.

In the example 6 of FIG. 40 C, the parameter may be a LTM resource activation status information element (IE). In an example, the LTM resource activation status IE may indicate either 'resource activated' or 'resource deactivated'. the parameter indicating to activate the resource (or the candidate target cell or the cell group) may be the LTM resource activation status IE indicating 'resource activated'. the parameter indicating to deactivate the resource (or the candidate target cell or the cell group) may be the LTM resource activation status IE indicating 'resource deactivated'.

In the example 7 of FIG. 40 D, the parameter may be a LTM resource activate request information element (IE). In an example, the LTM resource activate request IE may comprises identifier(s) of one or more resources for LTM of a wireless device, the LTM resource activate request IE may indicate, per each of the one or more resources, either 'activate resource' or 'deactivate resource'. For example, the LTM resource activate request IE may comprises an identifier of a resource of the one or more resources. The LTM resource activate request IE comprising the identifier of the resource may indicate, for the resource, either 'activate resource' or 'deactivate resource'. the parameter indicating to activate the resource (or the candidate target cell or the cell group) may be the LTM resource activate request IE indicating 'activate resource'. the parameter indicating to deactivate the resource (or the candidate target cell or the cell group) may be the LTM resource activate request IE indicating 'deactivate resource'.

In the example 8 of FIG. 40 B, the parameter may be a LTM resource activation status information element (IE). In an example, the LTM resource activation status IE may comprises identifier(s) of resources for LTM of a wireless device, the LTM resource activation status IE may indicate, per each of the one or more resources, either 'resource activated' or 'resource deactivated'. For example, the LTM resource activation status IE may comprises an identifier of a resource of the one or more resources. The LTM resource activation status IE comprising the identifier of the resource may indicate, for the resource, either 'resource activated' or 'resource deactivated'. the parameter indicating to activate the resource (or the candidate target cell or the cell group) may be the LTM resource activation status IE indicating 'resource activated'. the parameter indicating to deactivate the resource (or the candidate target cell or the cell group) may be the LTM resource activation status IE indicating 'resource deactivated'.

In existing technologies, a base station central unit control plane (base station CU-CP) may initiate LTM configuration for a wireless device, the LTM configuration may comprise a configuration of a candidate target cell for LTM of the wireless device, the configuration may be a configuration of a cell group comprising the candidate target cell as a target primary cell, and one or more target secondary cells, the base station CU-CP may perform a bearer context setup/modification procedure with a candidate base station CU-UP. Based on the bearer context setup/modification procedure, a bearer context associated with the candidate target cell (or the cell group) may be established in the base station CU-UP and/or the base station CU-UP may allocate resource for the bearer context. The resource may comprise a resource to handle user plane data of the wireless device in the base station CU-UP. in some situations, the wireless device may not be likely to perform LTM to the candidate target cell. the resource allocated may be wasted in the situations. To avoid the waste of the resource, the base station CU-UP may release the bearer context associated with the candidate target cell (or the cell group), for LTM of the wireless device. after releasing the configuration, the wireless device may be likely to perform LTM to the candidate target cell (or the cell group). the base station CU-UP may (re) establish/configure the bearer context. releasing the bearer context and (re) establishing/configuring the bearer context causes signal overhands between the base station CU-CP and the base station CU-UP (e.g., a candidate base station CU-UP and/or the serving base station CU-UP).

Figure 41:
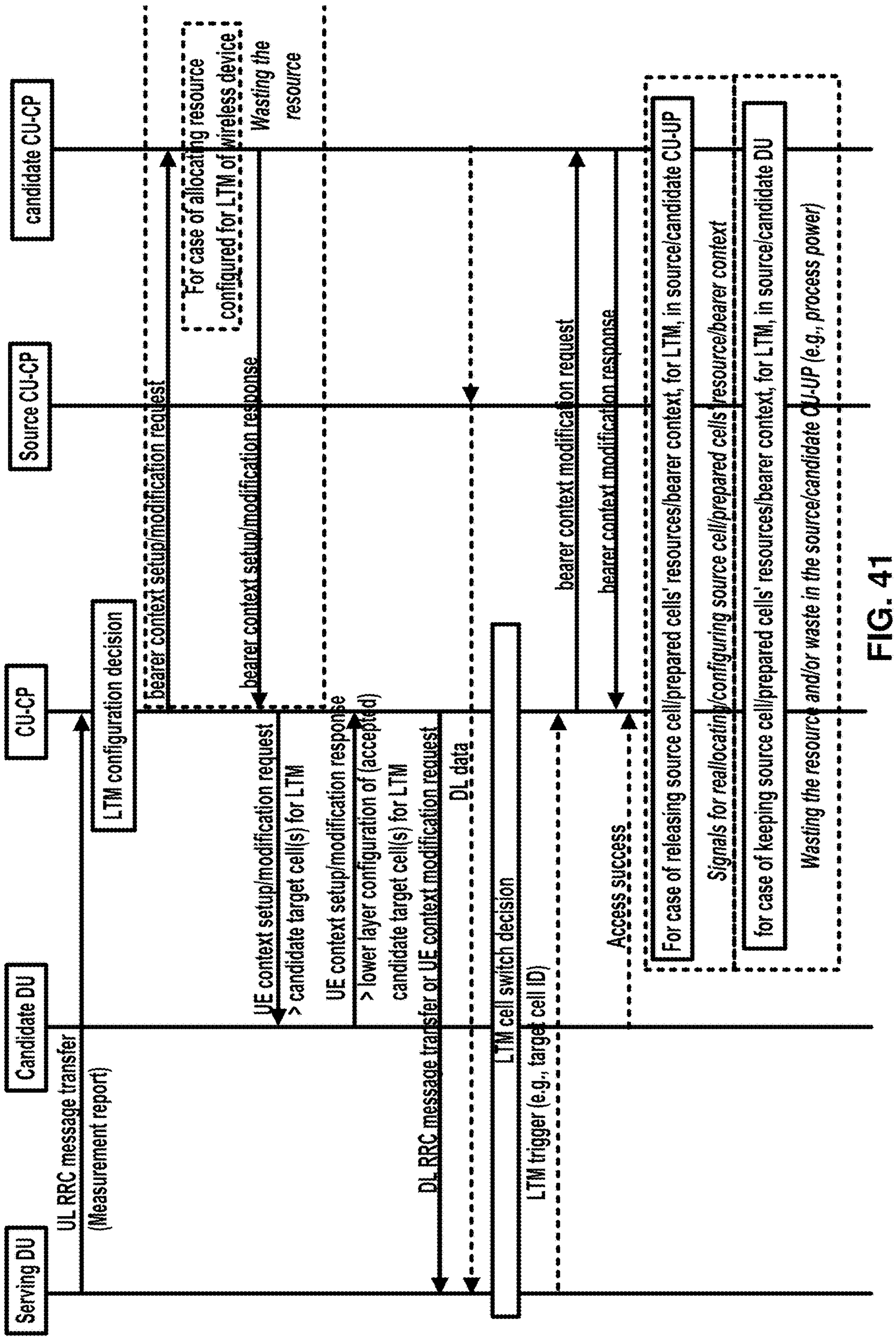
FIG. 41 illustrates an example of releasing/keeping bear context in inter-DU LTM.

FIG. 41 illustrates an example of releasing/keeping bear context in inter-DU LTM. a base station CU-CP may initiate a LTM configuration for a wireless device, the LTM configuration may comprise a configuration of at least one candidate target cell for LTM. the base station CU-CP may transmit to a candidate base station CU-UP a bearer context setup/modification message for the wireless device, the bearer context setup/modification message may indicate LTM of the wireless device. based on receiving the bearer context setup/modification message, the base station CU-UP may establish a bearer context, of the wireless device, for the LTM. the bearer context may be associated with the at least one candidate target cell (or cell group of the at least one candidate target cell). the base station CU-UP may transmit to the base station CU-CP a bearer context setup/modification response message. in existing technologies, the base station CU-UP may (start) allocate a resource for the bearer context. there is uncertainty about timing of the wireless device to perform/execute the LTM to the candidate target cell. Allocating, by the base station CU-UP establishing the bearer context, the resource causes waste of the resource.

In an example of FIG. 41, the wireless device may perform LTM (e.g., switching a serving cell, primary cell) to one of the at least one candidate target cell based on receiving, from the serving base station distributed unit, a second L1/L2 signal, for LTM, indicating the one of the least one candidate target cell. when the LTM is completed (e.g., the wireless device successfully access to the one of the least one candidate target cell), the base station (e.g., the base station CU-CP) may determine to release a first bearer context associated with a serving cell (e.g., bearer context in a serving base station CU-UP) and/or a second bearer context associated with the at least one candidate target cell. the second bearer context may be established in the serving base station CU-UP or the candidate base station CU-UP. in existing technologies, the base station CU-UP may release the first bearer context and/or the second bearer context (e.g., a bearer context release command message from the base station CU-CP). For example, the serving cell may be one of the at least one candidate target cell. it avoid waste of the resource for the bearer context but causes signal overheads to release the bearer context(s) and/or (re) establish/(re) configure the bearer context(s) (e.g., when the wireless device comes back to the at least one candidate target cell and/or the serving cell). the base station may keep the bearer context(s) of the at least one candidate target cell and the (old) serving cell. it causes waste of the resource (e.g., when the wireless device is not likely to perform/execute LTM to the at least one candidate target cell).

Example embodiments enable a base station CU-CP to transmit to a base station CU-UP a message indicating whether to deactivate or activate a candidate target cell (or a cell group or a resource) for layer 1 or layer 2 (L1/L2) triggered mobility (LTM) of a wireless device. based on receiving the message indicating to deactivate the candidate target cell (or the cell group or the resource), the base station CU-UP may not allocate a resource associated with the candidate target cell (or the cell group). based on receiving the message indicating to deactivate the candidate target cell (or the cell group or the resource), the base station CU-UP may further keep a bearer context associated with the candidate target cell (or the cell group). based on receiving the message indicating to activate the candidate target cell (or the cell group or the resource), the base station distributed unit may (start) allocate the resource associated with the candidate target cell (or the cell group). Implementing these embodiments avoid waste of the resource, and/or signal overheads to release the resource (or the bearer context) and to reconfigure the resource (or the bearer context).

In example embodiments, a base station CU-UP may transmits to a base station CU-CP a response message indicating a status of a candidate target cell (or cell group or resource) for LTM of the wireless device. For example, the status of the candidate target cell (or the cell group or the resource) may indicate whether the candidate target cell (or the cell group or the resource) is activated or deactivated. Implementing these embodiments avoids misunderstanding about the status of the candidate target cell (or the cell group or the resource) between the base station CU-UP and the base station CU-CP. For example, based on receiving, from the base station CU-CP, a message indicating whether to deactivate the candidate target cell (or the cell group or the resource), the base station CU-UP may transmit to the base station CU-CP a response message indicating the status of the candidate target cell (or the cell group or the resource).

In example embodiments, a base station CU-CP may transmit to a base station CU-UP a message indicating whether to deactivate or activate a candidate target cell (or a cell group or a resource) for LTM of the wireless device. the base station CU-UP receiving the message may transmit a response message indicating a failure of whether to activate or deactivate the candidate target cell (or the cell group or the resource). For example, the response message may indicate the candidate target cell (or the cell group or the resource) which failed to be deactivated or activated. For example, the response message may indicate that the base station CU-UP cannot handle the candidate target cell (or the cell group or the resource) with the indicated activated or deactivated status. The base station CU-UP may further indicate a cause for the failure. For example, the response message comprising a cause value for the failure. For example, the cause value may be 'LTM cell (group) activation failure' and/or 'LTM cell (group) deactivation failure'. For example, the response message comprising a cause value for the failure. For example, the cause value may be 'resource activation failure' and/or 'resource deactivation failure'. based on receiving the response message, the base station CU-CP may take it into account. the base station CU-CP may know the reason of the failure and take it into account for next action/decisions. Implementing these embodiments increases performance for LTM and decreases the failure.

(or the Cell Group or the Resource)

Figure 42:
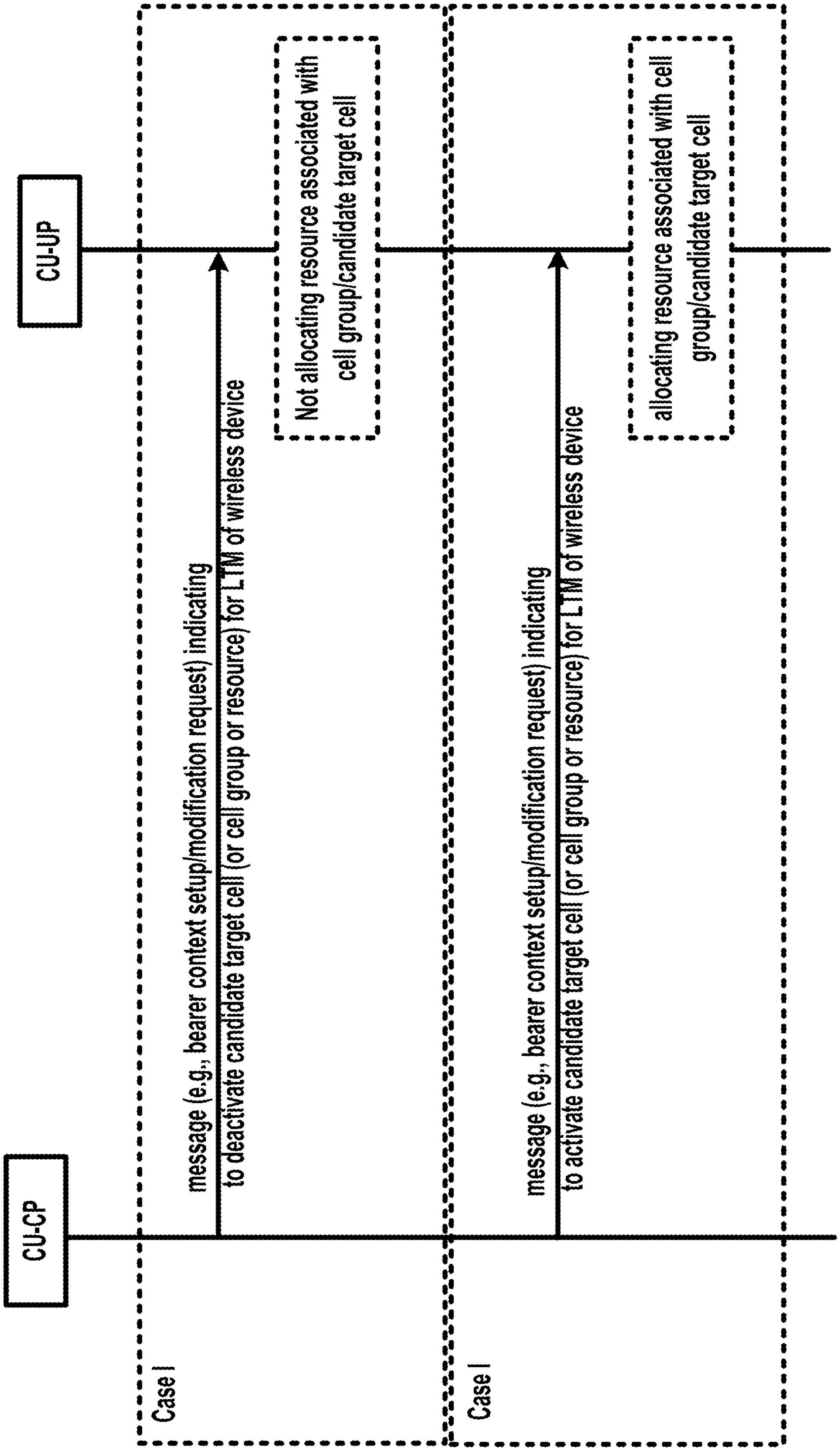
FIG. 42 illustrates an example of a message indicating to activate or deactivate candidate target cell (or cell group or resource) in CU-CP and CU-UP.

FIG. 42 illustrates an example of a message indicating to activate or deactivate candidate target cell (or cell group or resource) in CU-CP and CU-UP. In the case 1 of the FIG. 42, a base station CU-CP may transmit to a base station CU-UP a message (e.g., bearer context setup/modification message) indicating to deactivate a candidate target cell (or a cell group or a resource) for layer 1 or layer 2 (L1/L2) triggered mobility (LTM) of a wireless device. based on receiving the message, the base station CU-UP may not allocate a resource associated with the candidate target cell (or the cell group). For example, based on receiving the message, the base station CU-UP may deactivate the candidate target cell (or the cell group). based on receiving the message, the base station CU-UP may further keep a bearer context associated with the candidate target cell (or the cell group).

In the case of FIG. 42, a base station CU-CP may transmit to a base station CU-UP a message (e.g., bearer context setup/modification message) indicating to activate a candidate target cell (or a cell group or a resource) for layer 1 or layer 2 (L1/L2) triggered mobility (LTM) of a wireless device. based on receiving the message, the base station distributed unit may (start) allocate the resource associated with the candidate target cell (or the cell group). based on receiving the message, the base station CU-UP may activate the candidate target cell (or the cell group).

Figure 43:
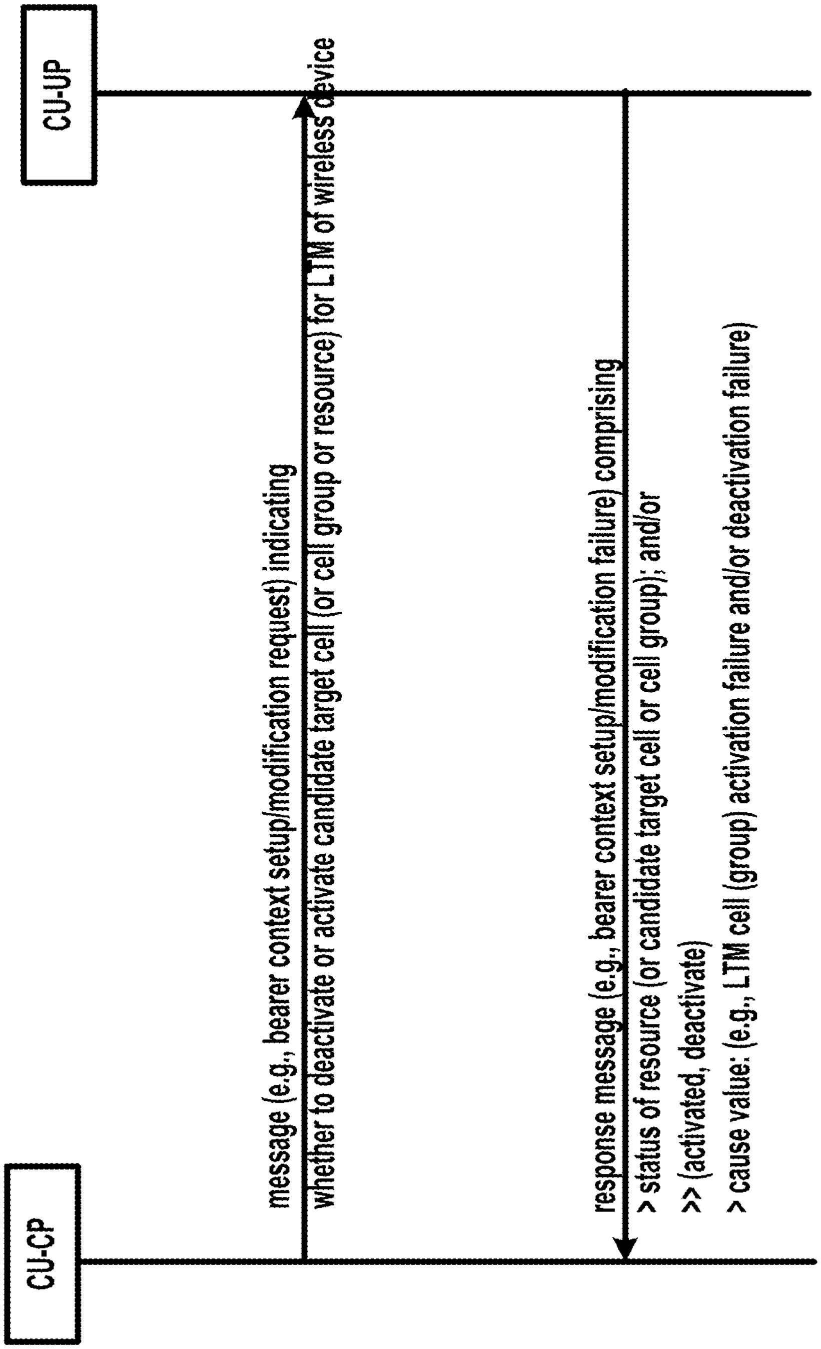
FIG. 43 illustrates an example of response for deactivation and activation in CU-CP and CU-UP.

FIG. 43 illustrates an example of response for deactivation and activation in CU-CP and CU-UP. a base station CU-UP may transmits to a base station CU-CP a response message indicating a status of a candidate target cell (or cell group or resource) for LTM of the wireless device. For example, the status of the candidate target cell (or the cell group or the resource) may indicate whether the candidate target cell (or the cell group or the resource) is activated or deactivated. For example, based on receiving, from the base station CU-CP, a message indicating whether to deactivate the candidate target cell (or the cell group or the resource), the base station CU-UP may transmit to the base station CU-CP a response message indicating the status of the candidate target cell (or the cell group or the resource).

In an example of FIG. 43, a base station CU-CP may transmit to a base station CU-UP a message indicating whether to deactivate or activate a candidate target cell (or a cell group or a resource) for LTM of the wireless device. the base station CU-UP receiving the message may transmit a response message indicating a failure of whether to activate or deactivate the candidate target cell (or the cell group or the resource). For example, the response message may indicate the candidate target cell (or the cell group or the resource) which failed to be deactivated or activated. For example, the response message may indicate that the base station CU-UP cannot handle the candidate target cell (or the cell group or the resource) with the indicated activated or deactivated status. The base station CU-UP may further indicate a cause for the failure. For example, the response message comprising a cause value for the failure. For example, the cause value may be 'LTM cell (group) activation failure' and/or 'LTM cell (group) deactivation failure'. For example, the response message comprising a cause value for the failure. For example, the cause value may be 'resource activation failure' and/or 'resource deactivation failure'. based on receiving the response message, the base station CU-CP may take it into account. the base station CU-CP may know the reason of the failure and take it into account for next action/decisions.

Figure 44:
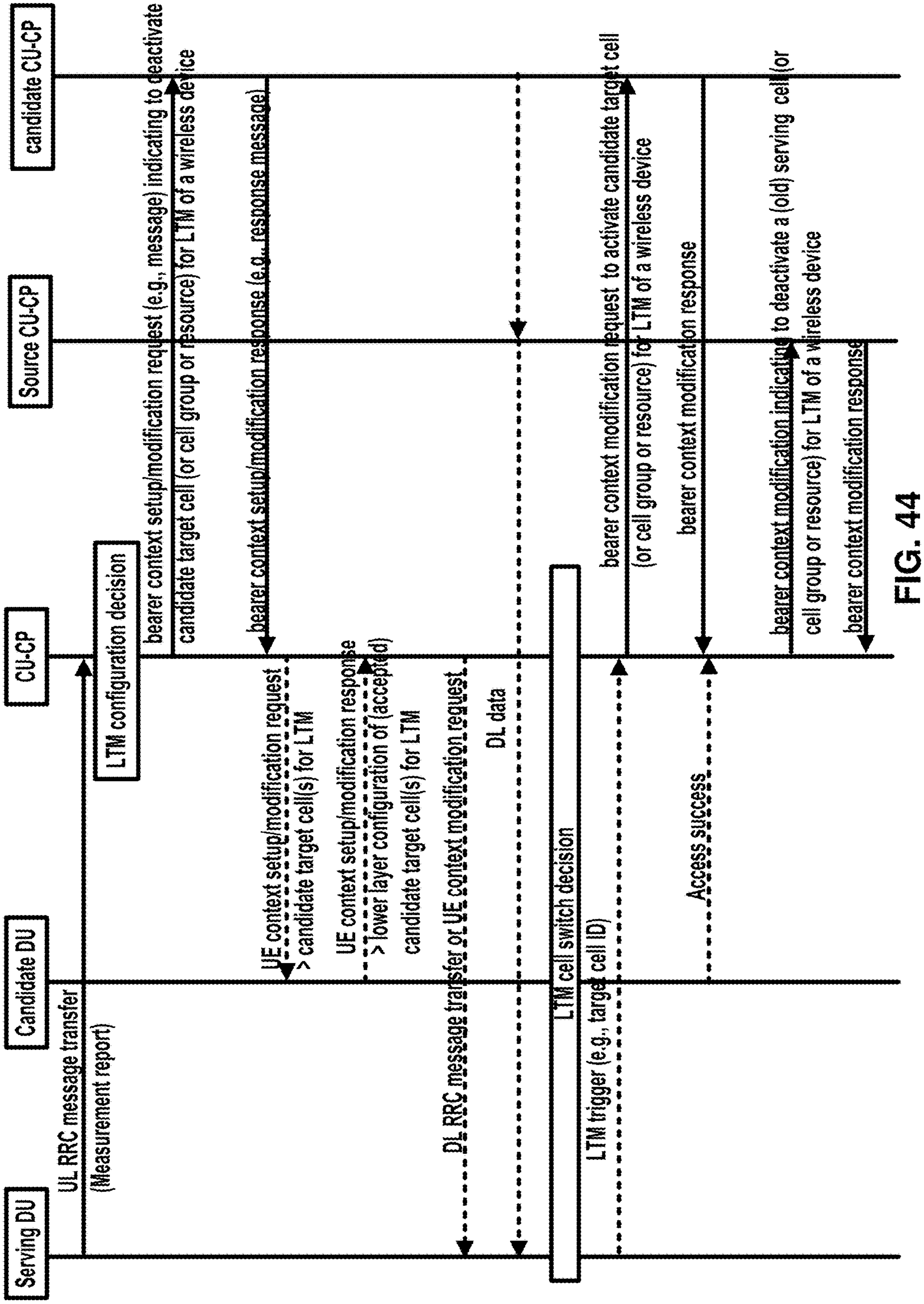
FIG. 44 illustrates an example of activation and deactivation in CU-CP and CU-UP.

FIG. 44 illustrates an example of activation and deactivation in CU-CP and CU-UP. a base station CU-CP initiating LTM configuration of a wireless device may transmit to a candidate base station CU-UP (candidate CU-UP in FIG. 44) a message (e.g., a bearer context setup/modification request message) indicating to deactivate a candidate target cell (or a cell group or a resource) for LTM of the wireless device, the message may indicate to deactivate the candidate target cell (or the cell group or the resource). based on receiving the message, the candidate base station CU-UP may establish a bearer context for the wireless device, the bearer context may be associated with LTM of the wireless device, the bearer context may be associated with the candidate target cell. the bearer context may be associated with the cell group. the message may be the message in FIG. 42 and FIG.

43. based on receiving the message, the candidate base station CU-UP may not allocate/configure the resource. based on receiving the message, the candidate base station CU-UP may keep the bearer context. after receiving the message, the candidate base station CU-UP may transmit to the base station CU-CP a response message. the response message may be a response message in FIG. 43.

In an example of FIG. 44, the wireless device may successfully complete LTM to the candidate target cell. the base station CU-CP may transmit to the candidate base station CU-UP a message (e.g., bearer context modification request message) indicating to activate the candidate target cell (or the cell group or the resource). the base station CU-CP determining the successful LTM of the wireless device may transmit to the candidate base station CU-UP a message (e.g., bearer context modification request message) indicating to activate the candidate target cell (or the cell group or the resource). For example, the base station CU-CP may determine the successful LTM of the wireless device based on receiving an indication of LTM trigger or access success indication/message. based on receiving the message, the candidate base station CU-UP may activate the candidate target cell (or the cell group or the resource). based on receiving the message, the candidate base station CU-UP may allocate/configure the resource.

In an example of FIG. 44, the wireless device may successfully complete LTM to the candidate target cell. the base station CU-CP may transmit to a serving base station CU-UP (source CU-CP in FIG. 44) a message indicating to deactivate a resource (or a serving cell or serving cell group). For example, the base station CU-CP determining the successful LTM of the wireless device may transmit to the serving base station CU-UP the message. the resource may be a resource for a wireless device to transmit an uplink signal to the serving cell for LTM of the wireless device. after the LTM to the candidate target cell, the serving cell may become old serving cell and the serving cell group becomes old serving cell group. the serving cell group may be MCG or SCG.

the base station CU-CP may transmit the message to the serving base station CU-UP based on the serving cell being one of a candidate target cell for LTM of the wireless device. based on receiving the message, the serving base station CU-UP may deactivate the resource (and/or the serving cell and/or the serving cell group). based on receiving the message, the serving base station CU-UP may not allocate/configure the resource.

FIG. 45A, FIG. 45B, FIG. 45C and FIG. 45D illustrates an example of message indicating whether to deactivate or activate resource (or candidate target cell or cell group). the message (e.g., in FIG. 42 and FIG. 43) indicating whether to deactivate or activate a candidate target cell (or a cell group or a resource) for LTM of a wireless device may comprise a parameter indicating whether to deactivate or activate a candidate target cell (or a cell group or a resource). In example of FIG. 45A and FIG. 45. B, a cell is the candidate target cell. a cell group is a cell group of the candidate target cell.

Figure 45A:
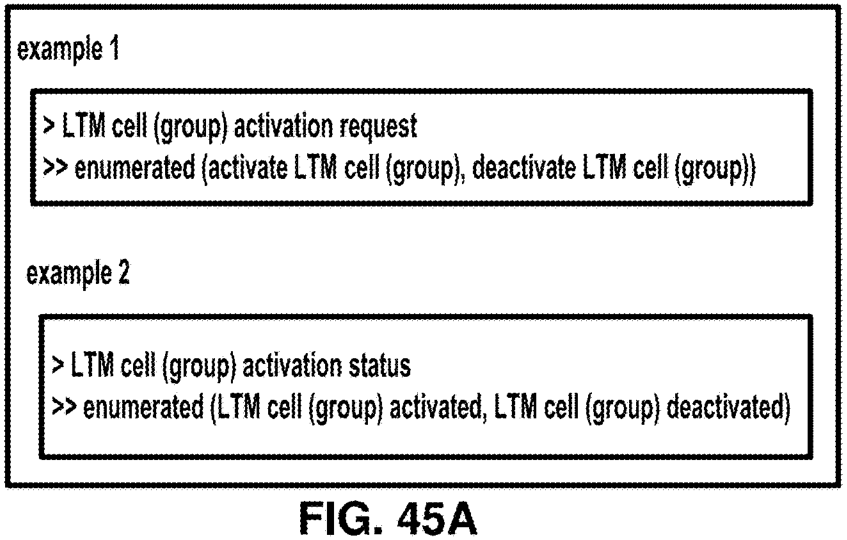
FIG. 45A illustrates an example of message.
Figure 45B:
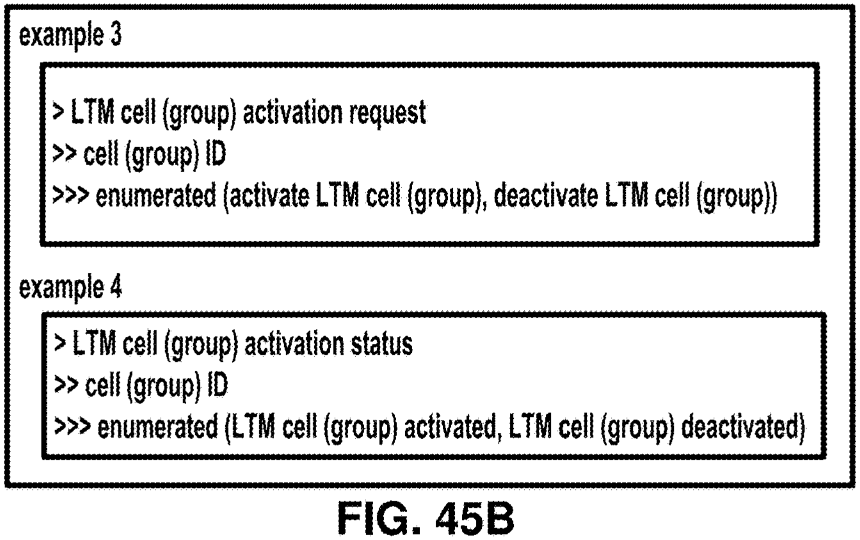
FIG. 45B illustrates an example of message.
Figure 45C:
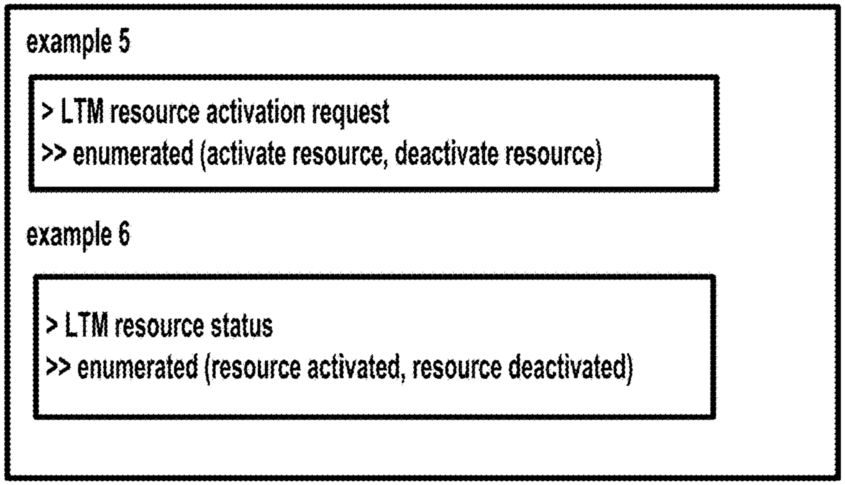
FIG. 45C illustrates an example of message.
Figure 45D:
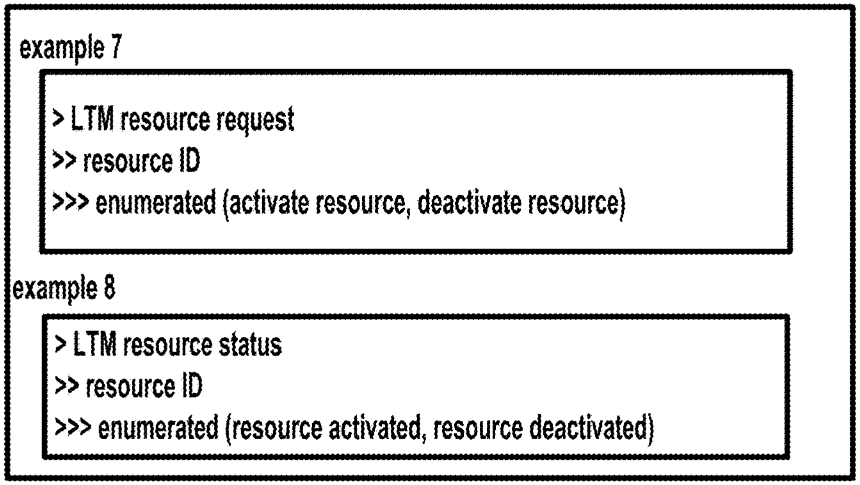
FIG. 45D illustrates an example of message.

In the example 1 of FIG. 45A, the parameter may be a LTM cell (group) activate request information element (IE). the LTM cell (group) activate request IE may be a LTM cell group activate request IE or a LTM cell activate request IE. In an example, the LTM cell (group) activate request IE may indicate either 'activate LTM cell (group)' or 'deactivate LTM cell (group)'. the parameter indicating to activate the candidate target cell (or the cell group or the resource) may be the LTM cell (group) activate request IE indicating 'activate LTM cell (group)'. the parameter indicating to deactivate the candidate target cell (or the cell group or the resource) may be the LTM cell (group) activate request IE indicating 'deactivate LTM cell (group)'.

In the example 2 of FIG. 45A, the parameter may be a LTM cell (group) activation status information element (IE). the LTM cell (group) activation status IE may be a LTM cell activation status IE or a LTM cell group activation status IE. In an example, the LTM cell (group) activation status IE may indicate either 'LTM cell (group) activated' or 'LTM cell (group) deactivated'. the parameter indicating to activate the candidate target cell (or the cell group or the resource) may be the LTM cell (group) activation status IE indicating 'LTM cell (group) activated'. the parameter indicating to deactivate the candidate target cell (or the cell group or the resource) may be the LTM cell (group) activation status IE indicating 'LTM cell (group) deactivated'.

In the example 3 of FIG. 45 B, the parameter may be a LTM cell (group) activate request information element (IE). the LTM cell (group) activate request IE may be a LTM cell group activate request IE or a LTM cell activate request IE. In an example, the LTM cell (group) activate request IE may comprises identifier(s) of one or more cells (groups). the LTM cell (group) activate request IE may indicate, per each of the one or more cells (groups), either 'activate LTM cell (group)' or 'deactivate LTM cell (group)'. For example, the LTM cell (group) activate request IE may comprises an identifier of a cell (group) of the one or more cell (groups). The LTM cell (group) activate request IE comprising the identifier of the cell (group) may indicate, for the cell (group), either 'activate LTM cell (group)' or 'deactivate LTM cell (group)'. the parameter indicating to activate the candidate target cell (or the cell group or the resource) may be the LTM cell (group) activate request IE indicating 'activate LTM cell (group)'. the parameter indicating to deactivate the candidate target cell (or the cell group or the resource) may be the LTM cell (group) activate request IE indicating 'deactivate LTM cell (group)'.

In the example 4 of FIG. 45 B, the parameter may be a LTM cell (group) activation status information element (IE). the LTM cell (group) activation status IE may be a LTM cell activation status IE or a LTM cell group activation status IE. In an example, the LTM cell (group) activation status IE may comprises identifier(s) of one or more cells (groups). the LTM cell (group) activation status IE may indicate, per each of the cell (group), either 'LTM cell (group) activated' or 'LTM cell (group) deactivated'. For example, the LTM cell (group) activation status IE may comprises an identifier of a cell (group) of the one or more cell (groups). The LTM cell (group) activation status IE comprising the identifier of the cell (group) may indicate, for the cell (group), either 'LTM cell (group) activated' or 'LTM cell (group) deactivated'. the parameter indicating to activate the candidate target cell (or the cell group or the resource) may be the LTM cell (group) activation status IE indicating 'LTM cell (group) activated'. the parameter indicating to deactivate the candidate target cell (or the cell group or the resource) may be the LTM cell (group) activation status IE indicating 'LTM cell (group) deactivated'.

In the example 5 of FIG. 45 C, the parameter may be a LTM resource activate request information element (IE). In an example, the LTM resource activation request IE may indicate either 'activate resource' or 'deactivate resource'. the parameter indicating to activate the candidate target cell (or the cell group or the resource) may be the LTM resource activate request IE indicating 'activate resource'. the parameter indicating to deactivate the candidate target cell (or the cell group or the resource) may be the LTM resource activate request IE indicating 'deactivate resource'.

In the example 6 of FIG. 45 C, the parameter may be a LTM resource activation status information element (IE). In an example, the LTM resource activation status IE may indicate either 'resource activated' or 'resource deactivated'. the parameter indicating to activate the candidate target cell (or the cell group or the resource) may be the LTM resource activation status IE indicating 'resource activated'. the parameter indicating to deactivate the candidate target cell (or the cell group or the resource) may be the LTM resource activation status IE indicating 'resource deactivated'.

In the example 7 of FIG. 45 D, the parameter may be a LTM resource activate request information element (IE). In an example, the LTM resource activate request IE may comprises identifier(s) of one or more resources for LTM of a wireless device, the LTM resource activate request IE may indicate, per each of the one or more resources, either 'activate resource' or 'deactivate resource'. For example, the LTM resource activate request IE may comprises an identifier of a resource of the one or more resources. The LTM resource activate request IE comprising the identifier of the resource may indicate, for the resource, either 'activate resource' or 'deactivate resource'. the parameter indicating to activate the candidate target cell (or the cell group or the resource) may be the LTM resource activate request IE indicating 'activate resource'. the parameter indicating to deactivate the candidate target cell (or the cell group or the resource) may be the LTM resource activate request IE indicating 'deactivate resource'.

In the example 8 of FIG. 45 B, the parameter may be a LTM resource activation status information element (IE). In an example, the LTM resource activation status IE may comprises identifier(s) of resources for LTM of a wireless device, the LTM resource activation status IE may indicate, per each of the one or more resources, either 'resource activated' or 'resource deactivated'. For example, the LTM resource activation status IE may comprises an identifier of a resource of the one or more resources. The LTM resource activation status IE comprising the identifier of the resource may indicate, for the resource, either 'resource activated' or 'resource deactivated'. the parameter indicating to activate the candidate target cell (or the cell group or the resource) may be the LTM resource activation status IE indicating 'resource activated'. the parameter indicating to deactivate the candidate target cell (or the cell group or the resource) may be the LTM resource activation status IE indicating 'resource deactivated'.

In an example of FIG. 37, FIG. 38, FIG. 39 and FIG. 40, a base station distributed unit comprising a candidate target cell may transmit to a base station central unit a configuration for switching a serving cell to the candidate target cell for layer 1 or layer 2 (L1/L2) triggered mobility (LTM) of a wireless device, the base station distributed unit may receive, from the base station central unit, a message comprising a parameter indicating to deactivate a resource, of the candidate target cell, for the wireless device to transmit an uplink signal to the candidate target cell. the base station distributed unit may stop, based on the message, allocating the resource while keeping the configuration.

In an example of FIG. 37, FIG. 38, FIG. 39 and FIG. 40, a base station distributed unit may receive, from a base station central unit, a message indicating whether to activate or deactivate a resource for a wireless device to transmit an uplink signal to the candidate target cell for layer 1 or layer 2 (L1/L2) triggered mobility (LTM) of the wireless device.

In an example of FIG. 37, FIG. 38, FIG. 39 and FIG. 40, based on the message indicating to deactivate the resource, the base station distributed unit may stop allocating the resource while keeping a configuration for switching a serving cell to the candidate target cell for LTM of the wireless device; and/or not transmit data/signal associated with the LTM of the wireless device.

In an example of FIG. 37, FIG. 38, FIG. 39 and FIG. 40, based on the message indicating to activate the resource, the base station distributed unit may allocate or configure the resource; and/or transmit data/signal associated with the LTM of the wireless device.

In an example of FIG. 37, FIG. 38, FIG. 39 and FIG. 40, the resource may comprise at least one of: a physical random access channel (PRACH) resource; and/or a physical uplink shared channel (PUSCH) resource; and/or a physical uplink control channel (PUCCH) resource, the message indicating whether to activate or deactivate the resource may comprise a message indicating: whether to activate or deactivate the PRACH resource; and/or whether to activate or deactivate the PUSCH resource; and/or whether to activate or deactivate the PUCCH resource.

In an example of FIG. 37, FIG. 38, FIG. 39 and FIG. 40, the uplink signal may be a random access preamble associated with the PRACH resource; or a medium access control control element (MAC CE) associated with the PUCCH resource and/or the PUSCH resource; or an uplink RRC message (e.g., RRC reconfiguration complete message) associated with the PUSCH resource. The uplink signal may be a uplink signal which the wireless device transmits to the candidate target cell in response to receiving a second L1/L2 signal, for the LTM (the switching), the serving cell to the candidate target cell.

In an example of FIG. 37, FIG. 38, FIG. 39 and FIG. 40, the message indicating whether to activate or deactivate the resource may be a message indicating whether to activate or deactivate the candidate target cell; or a message indicating whether to activate or deactivate a cell group of the candidate target cell.

In an example of FIG. 37, FIG. 38, FIG. 39 and FIG. 40, the base station distributed unit may transmit, based on receiving the message and to the base station central unit, a response message. the response message may indicate: a status, of the resource, indicating whether the resource is activated or deactivated; and/or a status, of the candidate target cell, indicating whether the resource is activated or deactivated. the status of the resource may indicate: the resource being activated based on the message indicating to activate the resource; or the resource being deactivated based on the message indicating to deactivate the resource, the status, of the candidate target cell may indicate: the candidate target cell being activated based on the message indicating to activate the candidate target cell; or the candidate target cell being deactivated based on the message indicating to deactivate the candidate target cell.

In an example of FIG. 37, FIG. 38, FIG. 39 and FIG. 40, the response message may further indicate: the resource which failed to be activated; and/or the candidate target cell which failed to be activated. the response further comprises a cause value for the failure.

In an example of FIG. 37, FIG. 38, FIG. 39 and FIG. 40, the base station distributed unit may transmit, to the base station central unit, a configuration for switching a serving cell to the candidate target cell for LTM. transmitting the configuration may be based on: receiving a first message comprising one or more candidate target cells for LTM; and/or determining to accept the candidate target cell among the one or more candidate target cells, the first message comprising one or more candidate target cells may comprise a first message comprising an identifier of the one or more candidate target cells, the first message may indicate the one more candidate target cells to be set up (configured). the candidate target cell may be a candidate target cell configured (or being set up) for LTM. the configuration may be a lower layer configuration of the candidate target cell. receiving the message may be after transmitting the configuration.

In an example of FIG. 37, FIG. 38, FIG. 39 and FIG. 40, the first message may be the message. the first message may be: an UE context setup request message; or an UE context modification request message.

In an example of FIG. 37, FIG. 38, FIG. 39 and FIG. 40, allocating/configuring the resource may be based on at least one of: transmitting, to the base station central unit, the configuration for switching the serving cell to the candidate target cell for LTM; or receiving, from the base station central unit, a fourth message indicating: an execution of LTM; or a request of information for LTM. the information may comprise information about the resource. the execution may be execution by a serving base station distributed unit. the execution may be indicated by the serving base station distributed unit. the request of the information may be indicated by the serving base station distributed unit.

In an example of FIG. 37, FIG. 38, FIG. 39 and FIG. 40, the message indicating whether to activate or deactivate the resource may comprise: a message indicating whether the resource is required to be activated or deactivated; and/or a message comprising a parameter indicating whether to activate deactivate the resource; and/or a message comprising a parameter indicating whether the resource is required to be activated or deactivated. the parameter may be: an activation request information element (IE); or an LTM resource activation request information element (IE); or an LTM (candidate target) cell activation request information element (IE).

In an example of FIG. 37, FIG. 38, FIG. 39 and FIG. 40, the base station distributed unit may be: a serving base station distributed unit; and a candidate base station distributed unit. the serving cell may comprise at least one of: a primary cell (PCell); a primary secondary cell group cell (PSCell); or a secondary cell (SCell). the candidate target cell may be: the secondary cell; or a non-serving cell. the switching the serving cell to the candidate target cell may not comprises switching the secondary cell to the candidate target cell.

In an example of FIG. 37, FIG. 38, FIG. 39 and FIG. 40, the resource may be associated with the candidate target cell; and/or the wireless device; and/or one or more wireless devices comprising the wireless device. the resource may be one of one or more resources. an RRC message may indicate the one or more resources. the RRC message may indicate at least one of: one or more candidate cells, for the LTM, comprising the candidate target cell; a configuration parameter of the one or more candidate cells; and a configuration parameter, of L1 measurement, for the wireless device, the RRC message may comprise a RACH common configuration, the RACH common configuration may comprise random access parameters indicating the one or more resources. the one or more resources may be common random access resources broadcasted by a system information block (SIB) of the candidate target cell. the resource may be a RACH dedicated resource for the wireless device, the RRC message may comprise: a RACH common configuration; and one or more RACH dedicated configurations, each of the one or more RACH dedicated configurations may be associated with or indicates a respective resource of the one or more resources. each of the one or more resources may be a random access resource dedicated to the wireless device. each of the one or more resources may be associated with a respective RSRP range of one or more RSRP ranges. the RACH common configuration indicates a plurality of resources comprising the one or more resources. the one or more RACH dedicated configurations may comprise one or more parameters indicating, the one or more resources, at least one resource of the plurality of resources. the transmitting an indication of the resource may comprise transmitting the indication via an RRC message. the RRC message may indicate at least one of: one or more candidate cells, for the LTM, comprising the candidate target cell; a configuration parameter of the one or more candidate cells; and a configuration parameter, of L1 measurement, for the wireless device.

In an example of FIG. 37, FIG. 38, FIG. 39 and FIG. 40, the resource may indicate: time; and/or frequency resource; and/or an identifier indicating a respective random access preamble. the time and/or frequency resource and/or the identifier may be PRACH (resource). the resource may indicate a downlink reference signal, (e.g., beam of the candidate target cell, SSB of the candidate target cell or CSI-RS of the candidate target cell) associated with the time and/or frequency resource and the identifier. the resource may indicate a bandwidth part (BWP) comprising the time and/or frequency resource and/or the identifier.

In an example of FIG. 37, FIG. 38, FIG. 39 and FIG. 40, the message may be an UE context setup request message; or an UE context modification request message.

In an example of FIG. 37, FIG. 38, FIG. 39 and FIG. 40, a base station distributed unit may receive, from a base station central unit, a message indicating at least one of: whether to activate or deactivate a resource for a wireless device to transmit an uplink signal to the candidate target cell for layer 1 or layer 2 (L1/L2) triggered mobility (LTM) of the wireless device; whether to activate or deactivate the candidate target cell; or whether to activate or deactivate a cell group of the candidate target cell.

In an example of FIG. 37, FIG. 38, FIG. 39 and FIG. 40, the cell group may comprise the candidate target cell; the cell group may comprise one or more secondary cells of the candidate target cell. the candidate target cell may be a primary cell in the cell group.

In an example of FIG. 37, FIG. 38, FIG. 39 and FIG. 40, based on the message indicating to deactivate, the base station distributed unit may stop allocating the resource while keeping the configuration; and/or not transmit data/signal associated with the LTM of the wireless device. based on the message indicating to activate, the base station distributed unit may allocate/configure the resource; and/or transmit data/signal associated with the LTM of the wireless device.

In an example of FIG. 37, FIG. 38, FIG. 39 and FIG. 40, a base station central unit may receive, by a base station central unit from a base station distributed unit comprising a candidate target cell, a configuration for switching a serving cell to a candidate target cell for layer 1 or layer 2 (L1/L2) triggered mobility (LTM) of a wireless device. the base station central unit may transmit, to the base station distributed unit, a message comprising a parameter indicating to activate a resource, of the candidate target cell, for the wireless device to transmit an uplink signal to the candidate target cell. the base station central unit may receive, from the base station distributed unit, a response indicating whether the resource is activated or deactivated.

In an example of FIG. 37, FIG. 38, FIG. 39 and FIG. 40, a base station central unit may transmit, to a base station distributed unit, a message indicating whether to activate or deactivate a resource for a wireless device to transmit an uplink signal to the candidate target cell for layer 1 or layer 2 (L1/L2) triggered mobility (LTM) of the wireless device.

In an example of FIG. 37, FIG. 38, FIG. 39 and FIG. 40, the base station central unit may receive, from the base station distributed unit, a configuration for switching a serving cell to a candidate target cell for layer 1 or layer 2 (L1/L2) triggered mobility (LTM) of a wireless device. transmitting the message may be after receiving the configuration, the base station distributed unit may comprise the candidate target cell. receiving the configuration may be after transmitting a first message comprising one or more candidate target cells for LTM. the base station central unit may transmit, to the wireless device, an RRC reconfiguration message comprising a LTM configuration, the LTM configuration may comprise at least one of: the configuration; or a upper layer configuration of the wireless device. transmitting the message may be based on determining, by the base station central unit, whether to activate or deactivate the resource.

In an example of FIG. 37, FIG. 38, FIG. 39 and FIG. 40, the base station central unit may transmit, the base station distributed unit, a fourth message indicating: an execution of LTM; or a request of information for LTM. transmitting the fourth message may be based on receiving, from a serving base station distributed unit, a third message indicating: the execution of LTM; or the request of information for LTM.

In an example of FIG. 37, FIG. 38, FIG. 39 and FIG. 40, a base station central unit may transmit, by a base station central unit to a base station distributed unit, a message indicating at least one of: whether to activate or deactivate a resource for a wireless device to transmit an uplink signal to the candidate target cell for layer 1 or layer 2 (L1/L2) triggered mobility (LTM) of the wireless device; whether to activate or deactivate the candidate target cell; or whether to activate or deactivate a cell group of the candidate target cell.

In an example of FIG. 37, FIG. 38, FIG. 39 and FIG. 40, a base station distributed unit comprising a serving cell may receive, from a base station central unit by, a second message indicating one or more candidate target cell for layer 1 or layer 2 (L1/L2) triggered mobility (LTM) of a wireless device, the base station distributed unit may transmit, to the base station central unit and after receiving the second message, a second response message. the base station distributed unit may receive, from the base station central unit, a message indicating whether to activate or deactivate a resource for a wireless device to transmit an uplink signal to a candidate target cell of the one or more candidate target cell.

In an example of FIG. 37, FIG. 38, FIG. 39 and FIG. 40, a base station distributed unit comprising a serving cell may receive, from the base station central unit, a message indicating whether to activate or deactivate a resource for a wireless device to transmit an uplink signal to a candidate target cell of one or more candidate target cells for layer 1 or layer 2 (L1/L2) triggered mobility (LTM) of the wireless device.

In an example of FIG. 37, FIG. 38, FIG. 39 and FIG. 40, the base station distributed unit may receive, from the base station central unit, a second message indicating one or more candidate target cell for the LTM of a wireless device, the base station distributed unit may transmit, to the base station central unit and after receiving the second message, a second response message. based on receiving the message indicating to deactivate the resource, the base station distributed unit may determine that the candidate target cell is not a target cell, for the LTM, to which a serving cell is switched; and/or not transmit, to the wireless device, a second L1/L2 signal, for the LTM, indicating to switch a serving cell to the candidate target cell.

In an example of FIG. 37, FIG. 38, FIG. 39 and FIG. 40, the determining that the candidate target cell may be not the target cell for the LTM comprises determining, that the candidate target cell is not the target cell for the LTM, until receiving a message indicating to activate the resource. not the transmitting, to the wireless device, the second L1/L2 signal may comprise not transmitting, to the wireless device, the second L1/L2 signal until receiving the message indicating to activate the resource.

In an example of FIG. 37, FIG. 38, FIG. 39 and FIG. 40, based on receiving the message indicating to activate the resource, the base station distributed unit may determine that the candidate target cell is one of a target cell, for the LTM, to which a serving cell is switched. The base station distributed unit may transmit, to the wireless device, for the LTM, indicating to switch a serving cell to the candidate target cell.

In an example of FIG. 42, FIG. 43, FIG. 44 and FIG. 45, a base station CU-UP may receive, from a base station CU-CP, a message indicating whether to activate or deactivate a resource for a bearer context of a wireless device, wherein the bearer context is associated with a candidate target cell for layer 1 or layer 2 (L1/L2) triggered mobility (LTM) of the wireless device.

In an example of FIG. 42, FIG. 43, FIG. 44 and FIG. 45, based on the message indicating to deactivate the resource, the base station CU-UP may stop allocating the resource while keeping a bearer context associated with the LTM of the wireless device; and/or not transmit data/signal associated with the LTM of the wireless device.

In an example of FIG. 42, FIG. 43, FIG. 44 and FIG. 45, based on the message indicating to activate the resource, the base station CU-UP may allocate/configure the resource; and/or transmit, to the base station distributed unit, data/signal associated with the LTM of the wireless device, the resource may comprise a resource to handle user plane data of the wireless device, the resource may comprise: a resource between the base station CU-UP and a base station distributed unit; and/or a resource between the base station CU-UP and a user plane function (UPF).

In an example of FIG. 42, FIG. 43, FIG. 44 and FIG. 45, a base station CU-CP may transmit, to a base station CU-UP, a message indicating whether to activate or deactivate a resource for a bearer context of a wireless device, wherein the bearer context is associated with a candidate target cell for layer 1 or layer 2 (L1/L2) triggered mobility (LTM) of the wireless device.

The invention claimed is:

1. A method comprising:

sending, by a base station central unit to a base station distributed unit, a user equipment (UE) context setup or modification request message, for a wireless device, comprising an identifier of a candidate cell for layer 1 or layer 2 (L1/L2) triggered mobility (LTM) of the wireless device;

receiving, by the base station central unit from the base station distributed unit, a UE context setup or modification response message comprising a configuration of the candidate cell; and sending, by the base station central unit to the base station distributed unit, a message comprising a parameter indicating whether to activate or deactivate a channel state information reference signal (CSI-RS) resource of the candidate cell for the LTM of the wireless device.

2. The method of claim 1, wherein the parameter comprises an identifier associated with the CSI-RS resource.

3. The method of claim 1, further comprising transmitting, to the wireless device, one or more radio resource control (RRC) messages comprising at least one of:

the identifier of the candidate cell;

a second parameter indicating the CSI-RS resource of the candidate cell; or the configuration of the candidate cell.

4. The method of claim 1, further comprising receiving, from the base station distributed unit, a second message comprising a request of information for the LTM, wherein the information for the LTM comprises information about the CSI-RS resource.

5. The method of claim 4, wherein the second message comprises the UE context setup or modification request message.

6. The method of claim 1, further comprising receiving, based on sending the message and from the base station distributed unit, a response message indicating at least one of:

a status, of the resource, indicating whether the resource is activated or deactivated; or a status, of the candidate cell, indicating whether the resource is activated or deactivated.

7. The method of claim 6, wherein the status of the resource indicates at least one of:

the resource being activated based on the message indicating to activate the resource; or the resource being deactivated based on the message indicating to deactivate the resource.

8. The method of claim 6, wherein the response message indicates at least one of:

that the resource failed to be activated; or that the candidate cell failed to be activated.

9. A base station central unit comprising one or more processors and memory storing instructions that, when executed by the one or more processors, cause the base station central unit to:

send, to a base station distributed unit, a user equipment (UE) context setup or modification request message, for a wireless device, comprising an identifier of a candidate cell for layer 1 or layer 2 (L1/L2) triggered mobility (LTM) of the wireless device;

receive, from the base station distributed unit, a UE context setup or modification response message comprising a configuration of the candidate cell; and send, to the base station distributed unit, a message comprising a parameter indicating whether to activate or deactivate a channel state information reference signal (CSI-RS) resource of the candidate cell for the LTM of the wireless device.

10. The base station central unit of claim 9, wherein the parameter comprises an identifier associated with the CSI-RS resource.

11. The base station central unit of claim 9, wherein the instructions further cause the base station central unit to transmit, to the wireless device, one or more radio resource control (RRC) messages comprising at least one of:

the identifier of the candidate cell;

a second parameter indicating the CSI-RS resource of the candidate cell; or the configuration of the candidate cell.

12. The base station central unit of claim 9, wherein the instructions further cause the base station central unit to receive, from the base station distributed unit, a second message comprising a request of information for the LTM.

13. The base station central unit of claim 12, wherein the information for the LTM comprises information about the CSI-RS resource.

14. The base station central unit of claim 12, wherein the second message comprises the UE context setup or modification request message.

15. The base station central unit of claim 9, wherein the instructions further cause the base station central unit to receive, based on sending the message and from the base station distributed unit, a response message indicating at least one of:

a status, of the resource, indicating whether the resource is activated or deactivated; or a status, of the candidate cell, indicating whether the resource is activated or deactivated.

16. The base station central unit of claim 15, wherein the status of the resource indicates at least one of:

the resource being activated based on the message indicating to activate the resource; or the resource being deactivated based on the message indicating to deactivate the resource.

17. The base station central unit of claim 15, wherein the response message indicates at least one of:

that the resource failed to be activated; or that the candidate cell failed to be activated.

18. A wireless device comprising one or more processors and memory storing instructions that, when executed by the one or more processors, cause the wireless device to:

transmit, to a base station, a measurement report message;

receive, from the base station, a first radio resource control (RRC) reconfiguration message comprising a layer 1/layer 2 triggered mobility (LTM) configuration, wherein the LTM configuration comprises:

an LTM candidate configuration of a candidate cell for an LTM;

a configuration of a channel state information (CSI) reference signal (RS) (CSI-RS) resource, associated with the candidate cell, for a layer 1 measurement of the LTM; and a configuration of a CSI RS report for the layer 1 measurement of the LTM;

transmit, to the base station and after receiving the first RRC reconfiguration message, an RRC reconfiguration complete message;

perform a layer 1 (L1) measurement on the candidate cell;

transmit, to the base station, a first CSI report, wherein activating or deactivating of the CSI-RS resource is indicated by a message comprising:

a parameter indicating whether to activate or deactivate the CSI-RS resource; and an identifier associated with the CSI-RS resource; and receive, from the base station, an LTM cell switch command medium access control (MAC) control element (CE) indicating the candidate cell.

19. The wireless device of claim 18, wherein the LTM configuration further comprises an identifier of the candidate cell.

20. The wireless device of claim 18, wherein the LTM cell switch command MAC CE comprises the identifier of the LTM candidate configuration.

* * * * *